United States Patent
Notsch

(10) Patent No.: US 10,879,805 B2
(45) Date of Patent: Dec. 29, 2020

(54) SYSTEM AND METHOD FOR A SWITCHED-MODE POWER SUPPLY HAVING A TRANSFORMER WITH A PLURALITY OF PRIMARY WINDINGS

(71) Applicant: Infineon Technologies Austria AG, Villach (AT)

(72) Inventor: Chris Josef Notsch, Villach (AT)

(73) Assignee: Infineon Technologies Austria AG, Villach (AT)

( * ) Notice: Subject to any disclaimer, the term of this patent is extended or adjusted under 35 U.S.C. 154(b) by 558 days.

(21) Appl. No.: 15/265,686

(22) Filed: Sep. 14, 2016

(65) Prior Publication Data

US 2017/0085183 A1 Mar. 23, 2017

Related U.S. Application Data

(60) Provisional application No. 62/221,998, filed on Sep. 22, 2015, provisional application No. 62/263,277, filed on Dec. 4, 2015, provisional application No. 62/360,114, filed on Jul. 8, 2016.

(51) Int. Cl.
| | | |
|---|---|---|
| H02M 3/325 | (2006.01) |
| H02M 3/335 | (2006.01) |
| H02M 1/44 | (2007.01) |
| H02M 1/14 | (2006.01) |
| H02M 1/12 | (2006.01) |
| H02M 1/32 | (2007.01) |

(52) U.S. Cl.
CPC ......... *H02M 3/33507* (2013.01); *H02M 1/12* (2013.01); *H02M 1/14* (2013.01); *H02M 1/32* (2013.01); *H02M 1/44* (2013.01); *H02M 3/33569* (2013.01)

(58) Field of Classification Search
CPC .......... Y02B 70/1433; H02M 3/33569; H02M 2001/0067; H02M 2001/007; H02M 3/33507; H02M 1/12; H02M 1/14; H02M 1/32; H02M 1/44
See application file for complete search history.

(56) References Cited

U.S. PATENT DOCUMENTS

| | | |
|---|---|---|
| 4,685,039 A | 8/1987 | Inou et al. |
| 5,684,683 A | 11/1997 | Divan et al. |
| 2009/0196076 A1 | 8/2009 | Danstrom et al. |
| 2012/0113688 A1 | 5/2012 | Liang et al. |
| 2013/0076310 A1 | 3/2013 | Garnier et al. |

(Continued)

FOREIGN PATENT DOCUMENTS

| | | |
|---|---|---|
| DE | 3441631 A1 | 5/1985 |
| DE | 3712228 | 10/1988 |
| DE | 102007027734 A1 | 12/2008 |

*Primary Examiner* — Adolf D Berhane
(74) *Attorney, Agent, or Firm* — Murphy, Bilak & Homiller, PLLC

(57) ABSTRACT

In accordance with an embodiment, a switched-mode power supply (SMPS) includes a transformer having a plurality of windings sharing a common core and a plurality of primary stages coupled in series. Each of the plurality of primary stages include a winding of the plurality of windings, a switch having a first node coupled to a first terminal of the winding, and a first capacitor coupled between a second terminal of the winding and a second node of the switch.

48 Claims, 57 Drawing Sheets

(56) References Cited

U.S. PATENT DOCUMENTS

| | | | |
|---|---|---|---|
| 2014/0049990 A1* | 2/2014 | Limpaecher | H02M 3/24 363/15 |
| 2014/0111016 A1* | 4/2014 | He | H02M 3/285 307/82 |
| 2014/0140104 A1 | 5/2014 | Norrga et al. | |
| 2014/0369093 A1 | 12/2014 | Park et al. | |

\* cited by examiner

FIG. 25

| PROFILE 1  5V @ 2A | 10W  Default start-up profile |
| PROFILE 2  5V @ 2A, 12V @ 1.5A | 18W |
| PROFILE 3  5V @ 2A, 12V @ 3A | 36W |
| PROFILE 4  5V @ 2A, 20V @ 3A | 60W  Limit for Micro-B/AB connector |
| PROFILE 5  5V @ 2A, 20V @ 5A | 100W  Limit for Standard A/B connector |

Requires new detectable Cables for >1.5A or >5V

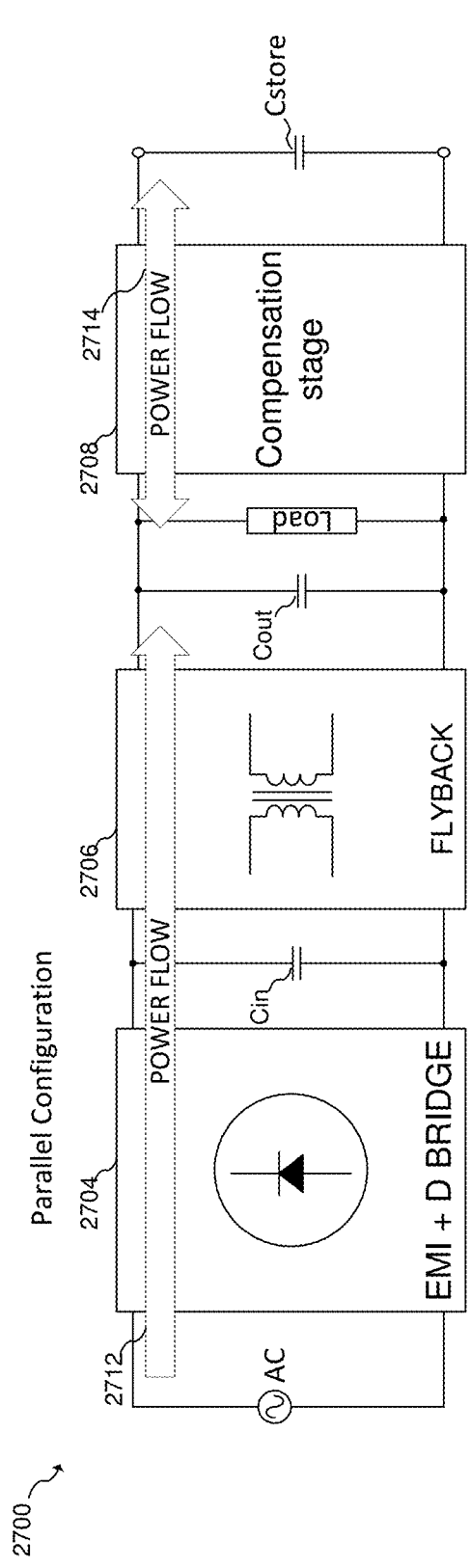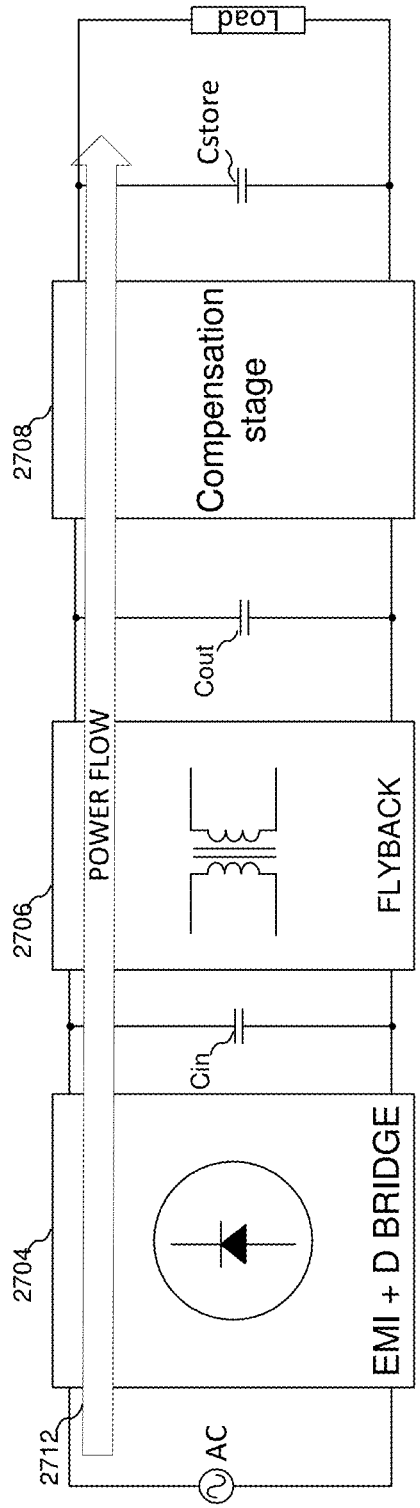
FIG. 28A
FIG. 28B

US 10,879,805 B2

SYSTEM AND METHOD FOR A SWITCHED-MODE POWER SUPPLY HAVING A TRANSFORMER WITH A PLURALITY OF PRIMARY WINDINGS

This application claims the benefit of U.S. Provisional Application No. 62/221,998, filed on Sep. 22, 2015; U.S. Provisional Application No. 62/263,277, filed on Dec. 4, 2015; and U.S. Provisional Application No. 62/360,114, filed on Jul. 8, 2016 which application are hereby incorporated herein by reference in their entireties.

TECHNICAL FIELD

The present invention relates generally to a switched-mode power supply (SMPS) converter system and method of controlling the same, and, in particular embodiments, to a system and method for a switched-mode power supply having a transformer with a plurality of primary windings.

BACKGROUND

Switched-mode power supply (SMPS) converters are widely used in various electronic applications ranging from telecommunication equipment to automobiles. The SMPS system offers advantageous power conversion efficiency and increased design flexibility over linear regulators. One type of SMPS is a fly-back converter that uses a transformer to provide DC isolation between the input and the output of converter, and is thus widely used for converting AC line voltages to regulated DC voltages. This, in addition to their low cost and low part count makes the fly-back converter a commonly used topology for various price-sensitive consumer electronics applications such as AC operated appliances and battery chargers.

In a typical fly-back converter, energy is stored in the primary side of the transformer when a switch in series with the primary side of the transformer is closed. When the switch is opened, the energy is transferred to the secondary side in order to deliver current to the load. While the fly-back converter topology is widely used for its design simplicity, there are a number of design challenges in meeting the requirements of the various applications in which they are used. Such design challenges may include, for example, maintaining efficiency over a wide range of input voltages, reducing ripple in the output voltage, reducing electromagnetic interference (EMI), and ensuring that the various devices within the power supply operate within their rated range of operation.

SUMMARY

In accordance with an embodiment, a switched-mode power supply (SMPS) includes a transformer having a plurality of windings sharing a common core and a plurality of primary stages coupled in series. Each of the plurality of primary stages include a winding of the plurality of windings, a switch having a first node coupled to a first terminal of the winding, and a first capacitor coupled between a second terminal of the winding and a second node of the switch.

BRIEF DESCRIPTION OF THE DRAWINGS

For a more complete understanding of the present invention, and the advantages thereof, reference is now made to the following descriptions taken in conjunction with the accompanying drawings, in which:

FIG. 25 illustrates example USB-PD load profiles;

FIG. 28A illustrates an embodiment AC/DC fly-back converter with a compensation stage and a load connected between the fly-back stage and the compensation stage;

FIG. 28B illustrates an embodiment AC/DC fly-back converter with a compensation stage and a load connected at the output of the compensation stage;

FIGS. 31A-32D illustrate embodiment control diagrams and implementation block diagrams for intermittent operation of a DC-DC converter;

FIGS. 32A-32D illustrate waveform diagram of an embodiment power converter;

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION OF ILLUSTRATIVE EMBODIMENTS

Figure 1A:
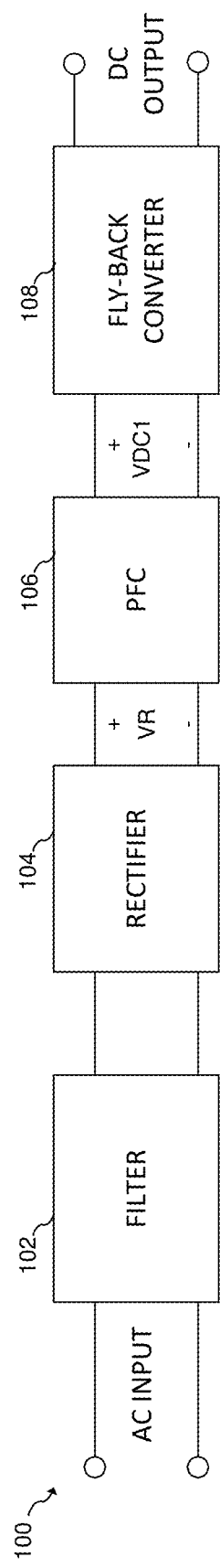
FIG. 1A illustrates a conventional switched-mode power supply (SMPS) converter.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for controlling a switched-mode power supply (SMPS) converter of fly-back topology having a transformer primary winding made up of a plurality of primary windings arranged in a cascaded structure sharing a common core. The invention may also be applied, however, to other power conversion circuits and architectures directed toward other applications such as, but not limited to, a full bridge converter, a forward converter, a frequency converter and an LLC converter.

In an embodiment of the present invention, the primary stage of a fly-back SMPS is constructed of a plurality of cascaded primary stages that are arranged in series between input voltage terminals of the power supply. Each cascaded primary stage includes an independent primary winding connected in series with a switch. By cascading or stacking the primary stages, the voltage seen by each switch during operation may be reduced such that the primary switches may be implemented using smaller, low voltage transistors. In some embodiments, asymmetric voltages across the plurality of primary stage switches are equalized by the mutual coupling between the plurality of primary stage windings. Input capacitors coupled to a respective input of each of the cascaded primary stages may be used to provide to and receive energy from the primary windings during operation of an embodiment SMPS. In some embodiments, the voltages across the cascaded primary stages are further equalized by coupling further capacitors between each cascaded stage.

In some embodiments, the efficiency of the fly-back SMPS is improved by harvesting energy that is provided to the leakage inductance of the transformer. This may be accomplished, for example by providing clamping diodes coupled between the various primary stages to provide a current path from one primary winding to the input capacitor of an adjacent stage when the primary stage switches are open. A current path through the clamping diodes may be disconnected during low voltage portions of the AC input voltage in order to ensure that the stacked and cascaded primary input stages stay in compliance over the AC input voltage range. During operation, one or more of the switches of the cascaded primary input stages may be driven using independent drive stages, or a combination of drive stages and bootstrap capacitors. The use of the stacked and cascaded primary stages may be used, in some embodiments, to provide a single-stage AC to DC conversion.

The efficiency of an SMPS converter using a fly-back topology may be improved by cascading the primary stage. The efficiency is improved by having the primary winding of a transformer split into several windings of equal or different number of turns and connected in series with switches in between, while sharing a common core of the transformer. The construction of the cascaded stages in the primary side includes each stage having a primary winding coupled in series with a switch in a cascaded configuration. The common node, which is termed as a switch node throughout the specification, is the node between the primary winding and the switch. This node swings to a very high voltage when the switch is turned off. A clamp or a damping circuit is connected to this switch node to limit a swing of the voltage during a fly-back when the switch is being turned off.

FIG. 1A illustrates a block diagram of an exemplary SMPS converter system 100 that converts an AC input voltage to a DC output voltage. As shown, SMPS rectifies the AC input voltage using rectifier 104 to produce rectified voltage VR, which is converted to a first DC voltage VDC1 using a first switched-mode power DC-DC converter stage 106. For AC power line systems, this first DC-DC converter stage 106 may be implemented using a power factor correction stage (PFC) in order to reduce AC input current distortion and keep the AC input current in phase with the AC voltage. In many conventional power supply systems, DC voltage VDC1 produced by the first DC-DC converter stage 106 may be a high voltage of a few hundred volts. A second DC-DC converter stage 108 then converts the high voltage VDC1 into a lower, regulated voltage suitable for various electronic applications. Examples of common output voltages include, for instance, 3 V, 5 V, 12 V and 24 V.

In many AC power line systems, filter 102 is coupled to the AC input to prevent switching noise and electro-magnetic interference (EMI) generated in the various switched-mode power supply stages of SMPS converter system 100 from being injected back into the AC line, as well as to filter noise and harmonics from the AC power line. Rectifier 104 may be implemented using a variety of half-wave or full-wave rectifiers, such as a diode bridge.

In conventional systems, second stage DC-DC converter 108 may be implemented using a variety of different topologies such as full-bridge, forward and LLC converters. However, one common topology used in many power supply systems is fly-back topology that provides DC isolation via a transformer, as well as the flexibility to be configured to step up VDC1 to a higher voltage or step down VDC1 to a lower voltage. Such fly-back converters commonly include a switch coupled in series with primary winding of a transformer, and a rectifier coupled to secondary side of the transformer. As such, the elements on the primary side of the transformer, namely the switch and primary windings, are exposed to the full voltage range of the input rectified voltage.

Figure 1B:
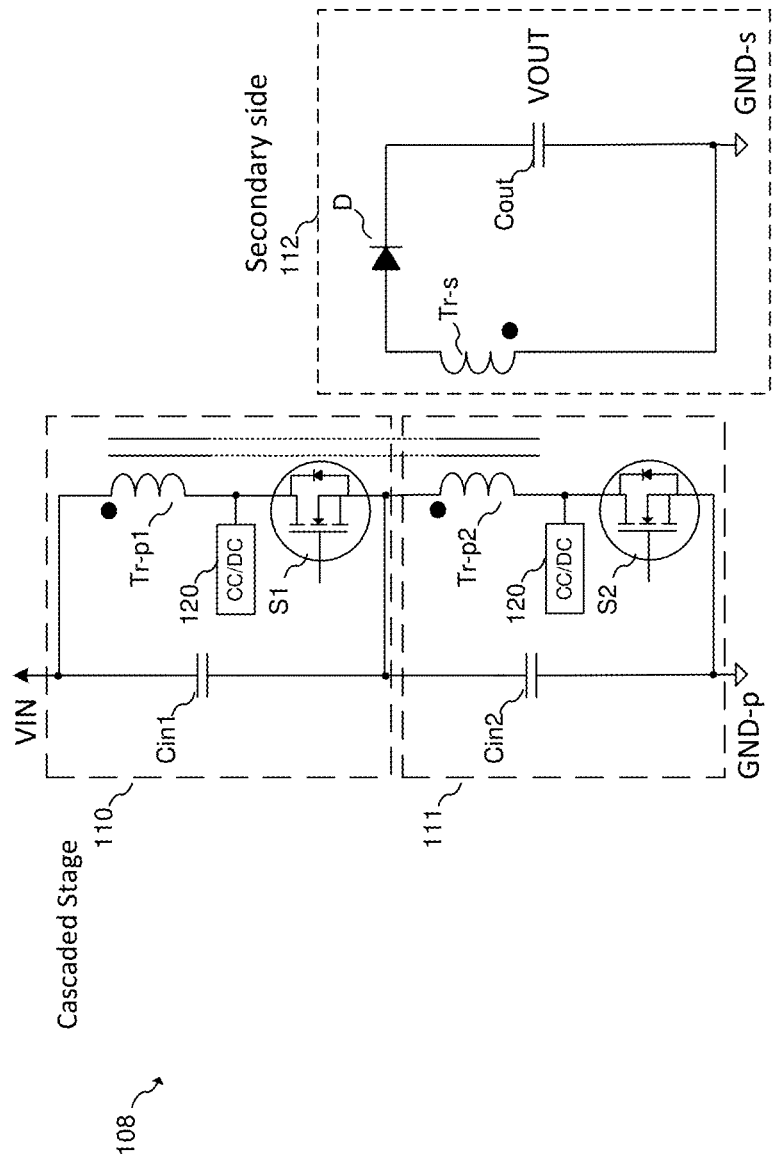
FIG. 1B illustrates an embodiment cascaded fly-back converter.

In embodiments of the present invention, however, the primary winding of the transformer is split into multiple segments that are each connected to its own switch as shown in FIG. 1 that illustrates an embodiment fly-back converter 108. As shown, the primary winding is made up of primary winding segments Tr-p1 and Tr-p2 that are each connected in series with respective switches S1 and S2. Each of primary winding segments Tr-p1 and Tr-p2 may have the same number of windings or a different number of windings. For the purpose of explanation, each combination of primary winding segment, switch and input capacitor may be referred as a stage, so that winding Tr-p1, switch S1 form stage 110 and winding Tr-p2 and switch S2 form stage 111. In an embodiment, clamp circuit 120 may be connected to the common node between each switch and primary winding segment to suppress transient voltage spikes and to prevent overvoltage condition across each switch S1 and S2. Each stage 110 and 111 is coupled in series with each other and may be referred to herein as cascaded stages. While only two stages 110 and 111 are illustrated in FIG. 1B, it should be appreciated that any number of stages may be cascaded with each other.

In various embodiments, an input capacitor Cin1 is connected across the series combination of the primary winding segment Tr-p1 and the switch S1 of the stage 110. Similarly, an input capacitor Cin2 is connected across the series combination of the primary winding segment Tr-p2 and the switch S2 of stage 111. On the secondary side of the transformer, secondary winding Tr-s is coupled in series with diode D and load capacitor Cout.

During operation, both switches S1 and S2 are turned on and primary winding segments Tr-p1 and Tr-p2 are magnetized. During this time, a negative voltage is induced in secondary winding Tr-s, which reverse biases diode D, thereby preventing current flow in the secondary side. When switches S1 and S2 are turned off, energy is transferred from the magnetized primary windings segments and to the secondary side winding Tr-s such that current to flows through diode D, thereby charging output capacitor Cout and providing current to a load coupled to the secondary side. Once secondary winding Tr-s is demagnetized, diode D once again becomes reverse biased and current in the secondary side winding Tr-s stops flowing. Switches S1 and S2 may be turned on again to repeat the power conversion process. In some embodiments, diode D may be implemented using other circuits besides a diode. For example, synchronous rectifier implemented using a switching transistor such as a MOSFET may be used.

In various embodiments, the mutual coupling between primary stage windings Tr-p1 and Tr-p2 balance out unequal input voltage across stages no and in when switches S1 and S2 are turned on. The balancing is achieved by drawing more current from a stage that has a higher voltage than other stages or, in some cases even delivering current to stages that have a low voltage. The natural balancing of voltages by the mutual coupling of transformer primary winding segments in each cascaded stage of the primary side may eliminate the need for complex control circuits to provide overvoltage protection, and may eliminate the need for expensive controllers and that could cause higher power dissipation.

The cascaded structure of the primary winding segments allows use of low voltage switching components, which lowers the cost of the system by allowing the use of smaller sized components. The use of low voltage switches may also increase the overall efficiency of the power converter compared to systems that use lossy high voltage switches. Moreover, power converters using embodiment cascaded primary stages may have an improved power handing capability that makes such power converters suitable for implementing an AC-DC power conversion system in a single stage. In one example, a single state fly-back converter operating in a power factor correction made may have an efficiency of about 96%.

Figure 2:
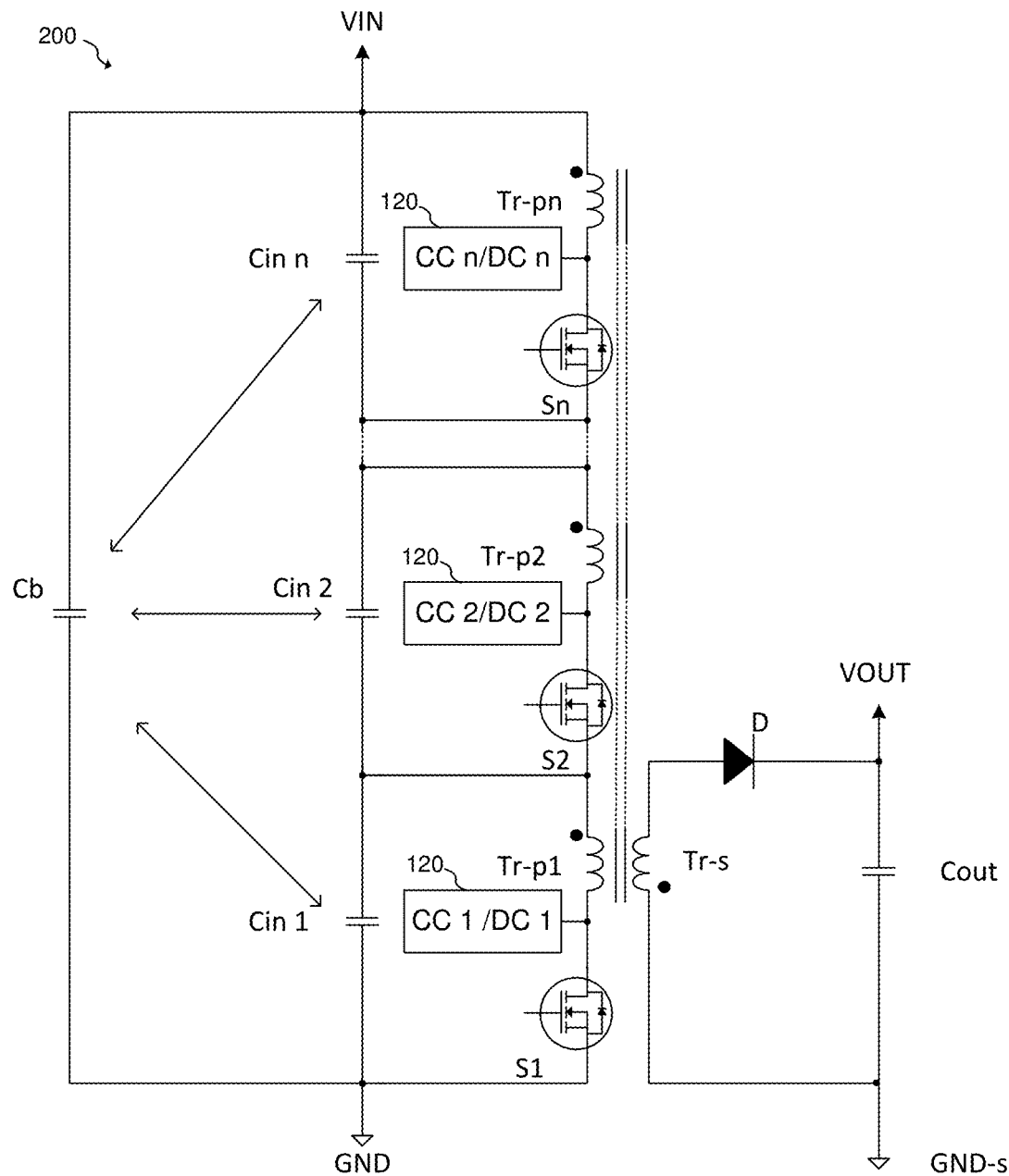
FIG. 2 illustrates an embodiment fly-back converter with n-cascaded primary stages.

The example of two cascaded stages can be applied to an arbitrary number of stages. FIG. 2 shows a fly-back converter 200 in which n primary stages are cascaded to one another such that the primary winding includes n primary winding segments Tr-p1, Tr-2 to Tr-pn that are each coupled in series with n switches S1, S2 to Sn. As shown, the input of each stage has a corresponding input capacitor Cin1, Cin2 to Cinn. In various embodiments, these input capacitors may serve a number of different functions as will be described below. For example, input capacitors Cin1, Cin2 to Cinn may be used to store energy recovered from the leakage inductance of the primary winding segments, may be used to balance charge due to a transient event when switches S1, S2 and Sn are turned on and off, and may be used to provide a current return path to a bootstrap gate drive circuit.

In an embodiment, a bulk capacitor Cb is coupled across the entire primary side of power converter 200 in order to limit voltage ripple on input supply voltage VIN. The relative capacitance values of bulk capacitor Cb and input capacitors Cin, Cin2 to Cinn may be set according to the particular power conversion application being implemented. Generally, capacitances Cin1, Cin2 and Cinn are selected to ensure input voltage stability for the power converter and the total amount of capacitance including Cin1, Cin2 and Cinn and bulk capacitance Cb is chosen to reduce input voltage ripple.

For example, when the power supply system is configured to convert a first stable DC voltage to another DC voltage, most of the capacitance may be grouped in bulk capacitance Cb. In such an embodiment, 90% of the total input capacitance may be devoted to bulk capacitor Cb, while the remaining 10% of the capacitance may be devoted to remaining input capacitors Cin1, Cin2 to Cinn. One specific example of this is a 400 W DC-DC converter having a DC input voltage of about 400 V, which corresponds to an input current of about 1 A. In such a power converter, bulk capacitance Cb may have a value of about 100 μF and Cin1, Cin2 and Cinn are chosen to have a combined capacitance of between about 1 μF and about 2 μF.

In an embodiment in which the power supply system is configured to convert a first stable DC voltage to another DC voltage, the total capacitance may be evenly split between the bulk capacitor Cb an input capacitors Cin1, Cin2 and Cinn. One specific example of this is a 200 W AC-DC converter having an input voltage of between about 100 VAC and 240 VAC. In such a power converter, bulk capacitance Cb may have a value of about 2 μF and Cin1, Cin2 and Cinn are chosen to have a combined capacitance of between about 1 μF. In some embodiments, keeping the total input capacitance low may improve the power factor of the converter. It should be understood that these embodiments represent only a couple examples of embodiment input capacitor partitioning. In alternative embodiments, other capacitance ranges, capacitance values, and power input specifications may be used depending on the particular embodiment. It should be further understood that other considerations including cost and board area may also be taken into consideration when selecting input capacitance values.

Figure 3:
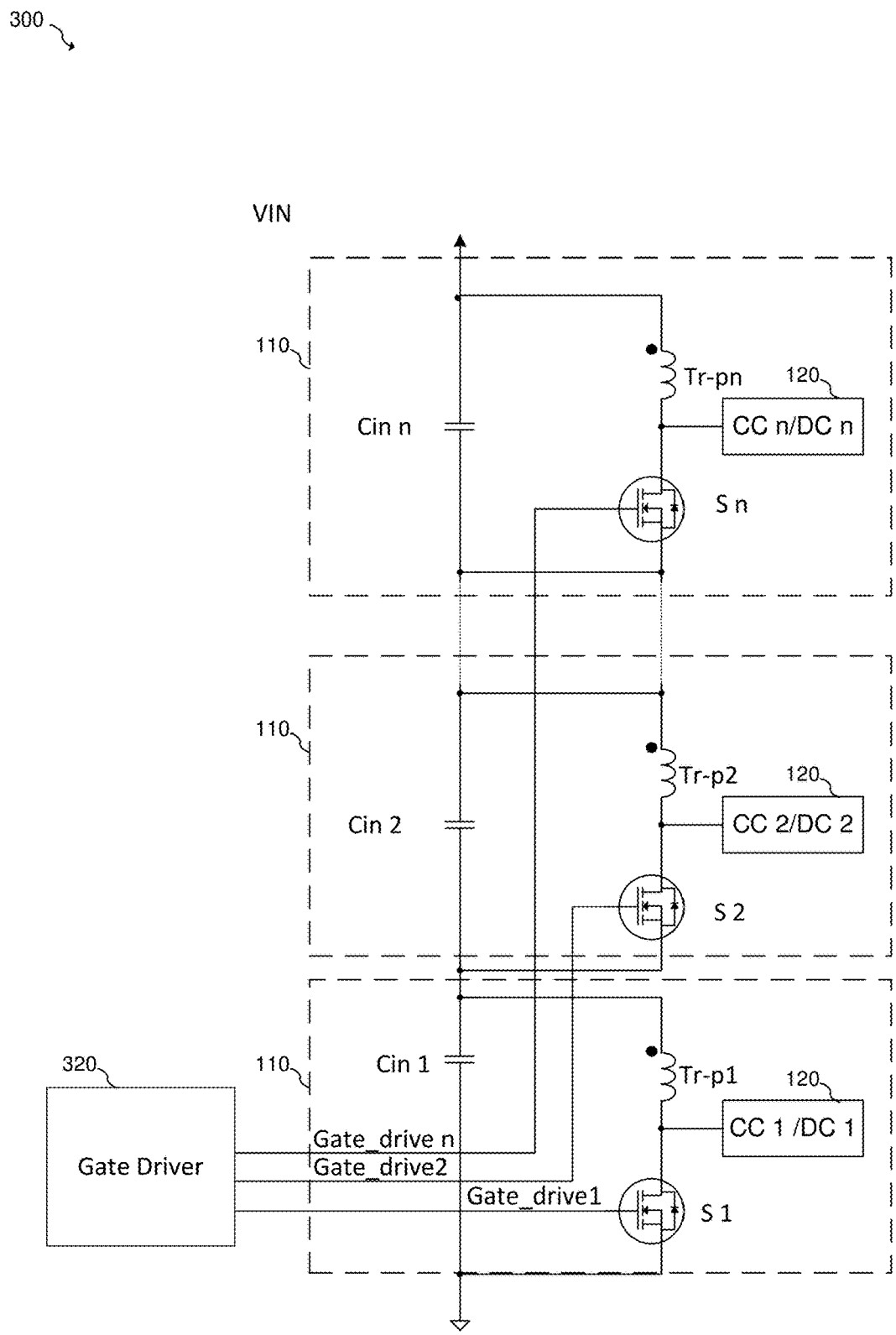
FIG. 3 illustrates an embodiment fly-back converter with n-stage cascaded in the primary driven by a gate driver.

FIG. 3 depicts an embodiment cascaded fly-back converter 300 that includes n primary stages no, where all n switches of the n number of stages are driven by a single gate driver 320 with multiple output control signals Gate_drive1, Gate_drive2 and Gate_drive n. A common node referred to as a switch node between the primary winding Tr_p and the switch S may be coupled to a clamping circuit or a damping circuit 120 to limit a voltage swing of the switch node. In various embodiments, the control nodes of the switches in the cascaded primary stages are turned on and off synchronously to avoid shoot-through currents. When all the switches are turned off, the voltage of the switch nodes fly high while the primary winding is demagnetizing and the energy stored in the primary windings is transferred to the secondary side. Energy stored in leakage inductances of the primary side is not transferred to the secondary side and is absorbed by clamping circuit or damping circuit 120. In some embodiments described herein, clamping circuit or damping circuit 120 may transfer this energy back to one or more of the various input capacitances Cin 1 to Cinn.

Capacitive Node Coupling in Cascaded Topology:

In some embodiments, the voltage across each stage is kept the same and balanced in order to avoid an overvoltage condition. In some embodiments, transient voltages across stages may be equalized by capacitive coupling switching nodes between various adjacent or non-adjacent primary stages. In one example, the common node between a first primary winding segment and a first switch in one stage may be coupled to the common node between a second primary winding segment and a second switch in another stage using what is referred to as a synchronizing capacitor. During operation of the power converter, differences in voltage across various stages may be minimized by transferring charge from a stage having a higher voltage to a stage having a lower voltage via the synchronizing capacitor. In the embodiments described below, synchronizing capacitors are coupled between adjacent stages such that a power converter having n primary stages has n−1 synchronizing capacitors. However, it should be understood that other embodiment systems may couple non-adjacent stages with synchronizing capacitors and/or may utilize greater or fewer than n−1 synchronizing capacitors.

Figure 4A:
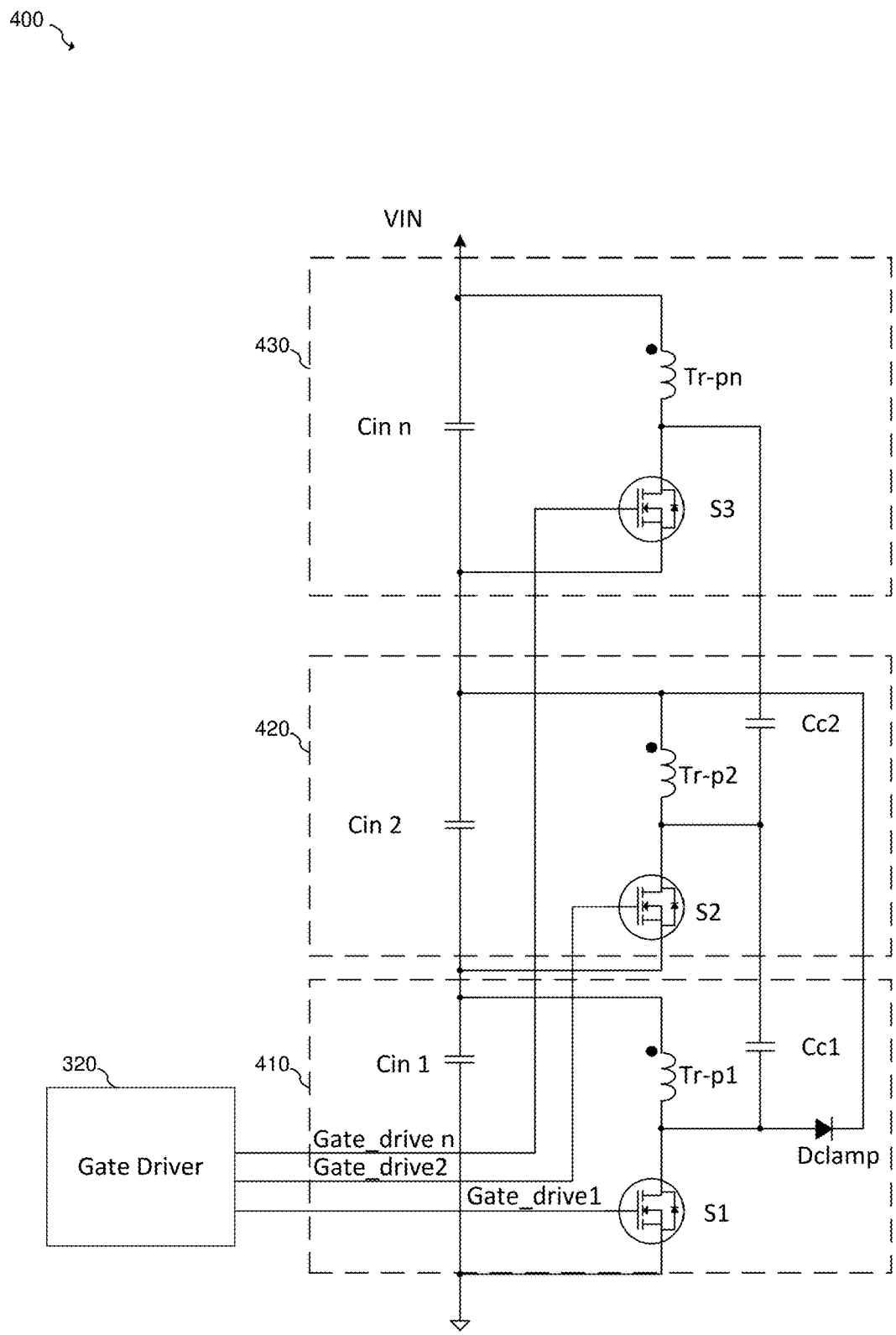
FIGS. 4A-4C illustrate an embodiment fly-back converter having synchronization capacitors, a simulation schematic that illustrates the operation of the synchronization capacitors, and an associated waveform diagram.

FIG. 4A illustrates an embodiment fly-back converter 400 that includes synchronization capacitors Cc1, Cc2 coupled between switch nodes of primary stages 410, 420 and 410. As is shown below, if a voltage difference across stage 420 exceeds a voltage different across stage 410, a synchronization current flows through synchronization capacitor Cc1 to equalize the voltages across stages 410 and 420. Similarly, if a voltage difference across stage 430 exceeds a voltage different across stage 420, a synchronization current flows through synchronization capacitor Cc2 to equalize the voltages across stages 430 and 420. In some embodiments, diode Dclamp also provides a current path for voltage equalization.

Figure 4B:
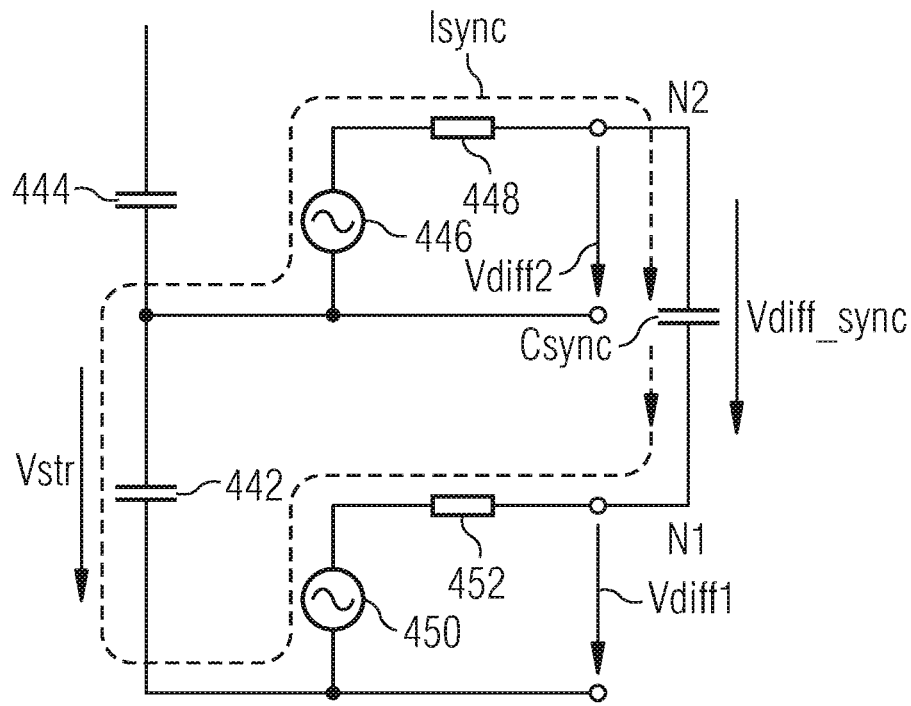
Figure 4C:
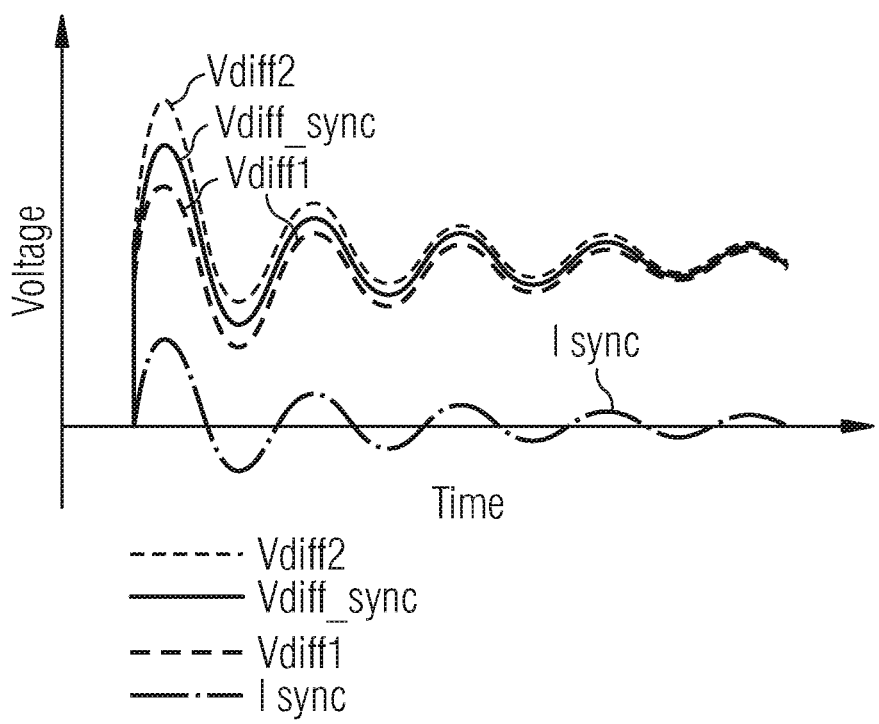

The simulation schematic of FIG. 4B and the waveform diagram of FIG. 4C illustrate the operational concept of synchronizing voltages across different primary stages. As shown, the simulation schematic representative of two primary stages, where each stage is modeled by a Thevenin equivalent source and an input capacitor. For example, a first stage is modeled using voltage source 450, resistor 452 and input capacitor 442, and a second stage is modeled using voltage source 446, resistor 448 and capacitor 444. The voltage across the equivalent source of the first stage is labeled Vdiff1 and the voltage across the equivalent source of the second stage is Vdiff2. Capacitor Csync is coupled between output node N1 of the equivalent source of the first stage and output node N2 of the equivalent source of the second stage. The voltage across first stage capacitor 442 is labeled as Vstr.

In various embodiments, as long as all primary stages perform the same task at the same time, all differential voltages between equivalent terminals of all devices remain constant in time. Therefore, connecting capacitors between such terminals do not influence the behavior, such that there are no AC voltages applied across the connected capacitors and, therefore, no current flow. These differential voltages are represented in the simulation schematic as voltages Vdiff1 and Vdiff2. Thus, is Vdiff1 and Vdiff2 are the same voltage, the voltage across capacitor Csync may be represented by the expression Vdiff_sync=Vstr+Vdiff2−Vdiff1. If voltage Vstr across first stage capacitor 442 is a DC voltage, then there is no AC component across capacitor Csync if Vdiff2=Vdiff1. However, if there is a momentary voltage difference between Vdiff2 and Vdiff1, a current Isync flows through capacitor Csync, which will tend to equalize Vdiff1 and Vdiff2.

The waveform diagram of FIG. 4C illustrates the relationship between voltages Vdiff2, Vdiff1 and the current Isync though capacitor Csync. Voltage Vdiff_sync represents the voltage across capacitor Csync. As is apparent from the waveform diagram, voltages Vdiff1 and Vdiff2 approach voltage Vdiff_sync over time. This is also apparent in waveform of current Isync that shows progressively decreasing amplitude over time. It should be understood that during nominal operation offsets and differences between Vdiff1 and Vdiff2 may come about due to various transient and spurious voltage conditions. Therefore, in embodiments, of the present invention, the use of synchronization capacitors between switch nodes of various primary stages may be used to equalize voltages across each of the primary stages.

Cascaded Fly-Back—Clamping with Enemy Recovery

In an exemplary fly-back converter, a current is passed through the primary winding by turning on a switch connected in series with a primary winding. Energy is stored in the primary winding while the switch remains on and the current builds up in the inductor of the primary winding. This on period is also the time period in which the primary winding period is magnetized. After some time, the switch is turned off and a portion of the energy stored in the primary winding is transferred to the secondary winding by demagnetizing the primary winding. However, a portion of the energy stored in the leakage inductance of the primary winding does not get transferred to the secondary side. Rather, the energy stored in the leakage inductance of the primary winding gets discharged back into the primary side again. In conventional switched-mode power supplies, this energy is usually dissipated in a clamping or damping circuit that is used to protect the primary side switch from avalanche.

In embodiments of the present invention, energy stored in the leakage inductance of the primary winding segments of the transformer is recovered and stored on the input capacitors of the various primary stages. By recovering this energy, the efficiency of the embodiment power converter can be increased. In various embodiments, this energy is recovered by using a clamp diode coupled between a switch node of a first stage of an embodiment cascaded converter to an input capacitor of a second stage of the embodiment cascaded converter. In some embodiments, the voltage potential of the input capacitor of the second stage is higher than the voltage potential of the switch node of the first stage. During the demagnetization of the primary windings, the clamp diode provides a low impedance path between a primary winding segment and an input capacitor wherein the recovered energy is stored.

Figure 5A:
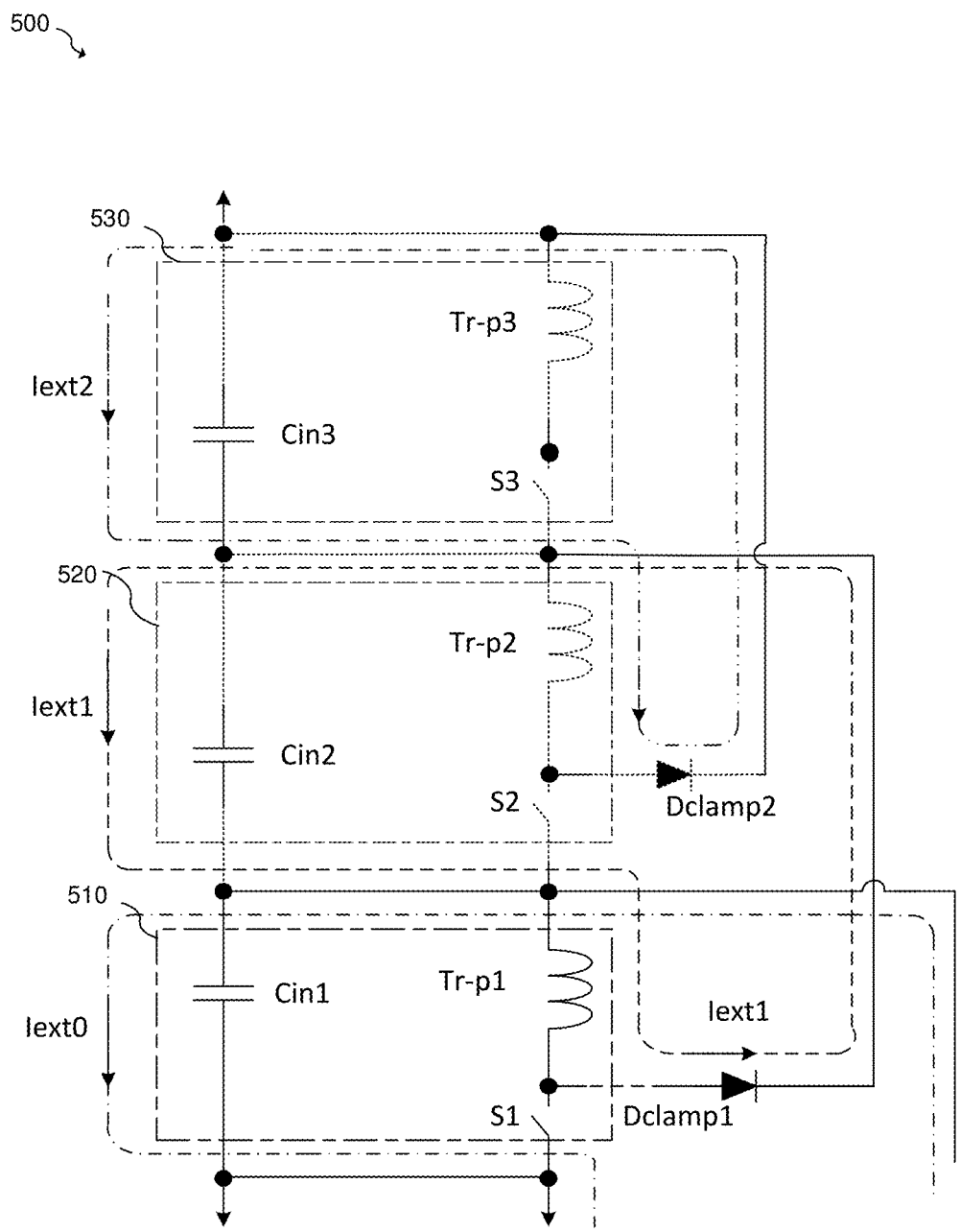
FIGS. 5A-5C show schematics that illustrate energy recovery in embodiment power converters.

FIG. 5A shows a fly-back converter stage 500 formed by three identical stages 510, 520 and 530 coupled in series that each includes a switch, primary winding segment and an input capacitor as described above. Stages 510 and 520 each have a respective clamp diode Dclamp1 and Dclamp2 arranged to recover energy from a leakage inductance of a primary side of a transformer and to store it in an input capacitor coupled across an upper adjacent stage. In alternative embodiments that produce a negative output voltage, energy may be stored in a lower adjacent stage.

In various embodiments, clamp and energy recovery diode Dclamp1 is used to extract energy from the first stage 510 and to store the extracted energy into an input capacitor Cin2 of the second stage 520. Similarly, clamp and energy recovery diode Dclamp2 is used to extract energy from the second stage 520 and to store the extracted energy into an input capacitor Cin3 of the third stage 530. In some embodiments, diodes Dclamp1 and Dclamp2 may be implemented, for example, using a synchronous rectifier. The embodiment of FIG. 5A may be extended to more than three stages by adding additional clamping diodes coupled between a switch node of a particular stage and the top node of the input capacitor of its next upped adjacent neighbor. In some embodiments, a power converter having n primary stages have n−1 clamping diodes such that each stage has its own clamping diode with the exception of the top-most stage. Alternatively a different number of clamping diodes may be used.

FIG. 5A also shows a path of a current Iext1 for each stage during the energy recovery process. When the switches S1 and S2 are turned off, the voltage of the first terminal of the primary winding Tr-p1 increases to the point that diode Dclamp1 becomes forward biased due to current flow caused by energy that was stored in the leakage inductance of the primary windings. By providing a current path Iext1 from winding Tr-p1 of stage 510 to capacitor Cin2 of stage 520 via clamp diode Dclamp1, energy stored in the leakage inductance that would otherwise be lost, is recovered. In various embodiments, the stored energy is reused when the switch is turned on to energize the primary side again. The energy extracted from the leakage inductance in the primary side can be very high and therefore, the efficiency of the power converter can be significantly increased by reusing the recovered energy from the leakage inductance of the primary windings. Embodiments of the present invention in which energy is recovered may also operate efficiently using transformers having relaxed design specifications with respect to leakage inductance. This simplifies the design of transformer designs used in embodiment systems, as potentially reduces system cost.

Figure 5B:
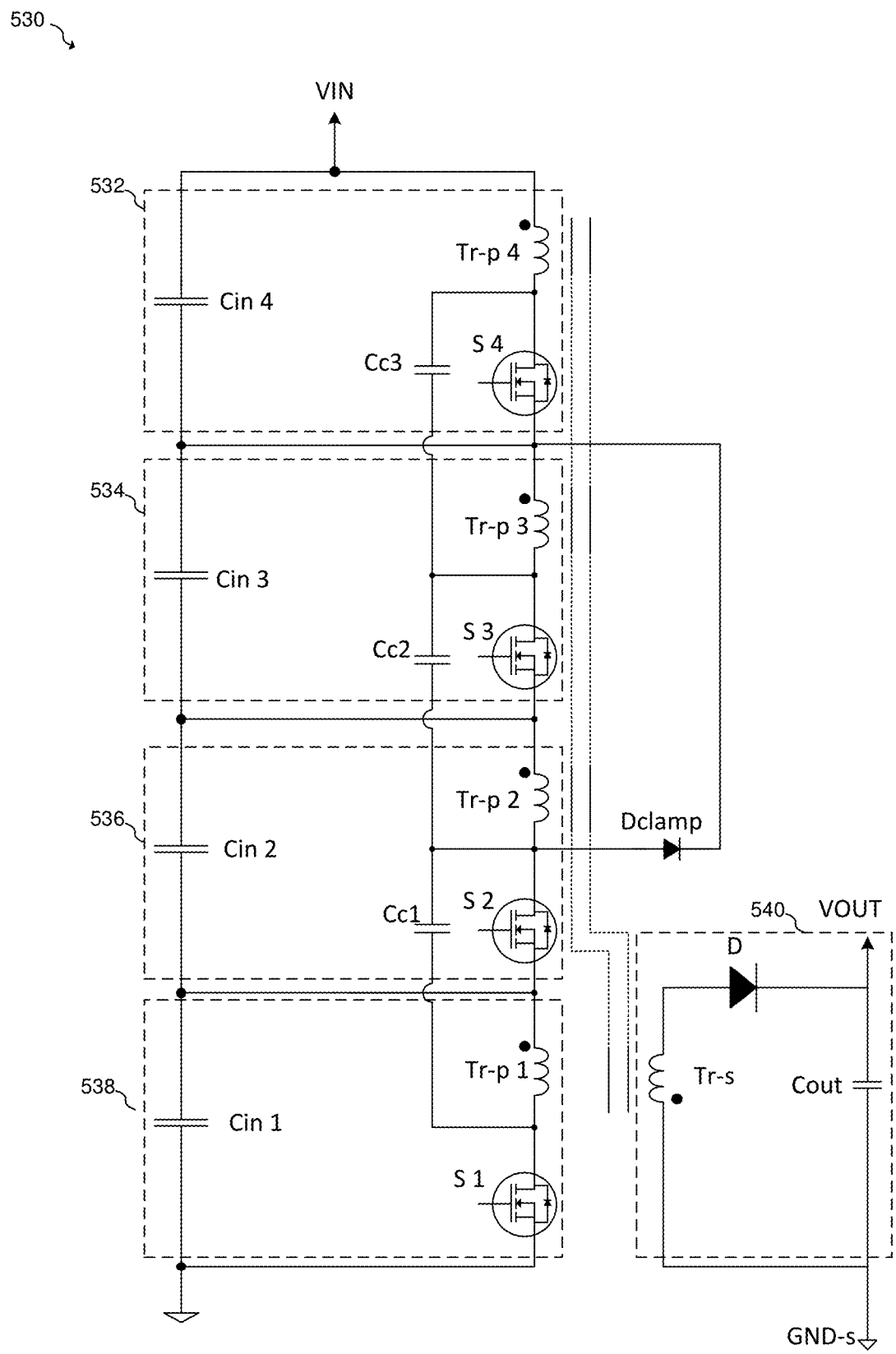

In an alternative embodiment, energy can be recovered using a single clamp diode as shown in FIG. 5B. This is made possible by using the synchronization capacitors as earlier described with respect to FIGS. 4A-4C. FIG. 5B shows an embodiment cascaded fly-back converter 530 that includes four primary stages and are referred to as a top stage 532 that is represented by the primary winding Tr-p4, a switch S4, and an input capacitor Cin4. The next stage is referred to as the third stage 534 that includes a primary winding Tr-p3, a switch S3, and an input capacitor Cin3. The next two stages are described as a second stage 536 and a bottom stage 538, where the second stage 536 includes a primary winding Tr-p2, a switch S2, and an input capacitor Cin3. The bottom stage 538 contains a primary winding Tr-p1, a switch S1, and an input capacitor Cin1. A similar node between the primary winding and the switch is synchronized between all four stages using three synchronizing capacitors Cc1, Cc2 and Cc3. The common node of the primary winding and the switch of the bottom stage 538 is coupled to the switch node of second stage 536 with the synchronizing capacitor Cc1. Similarly a synchronizing capacitor Cc2 is coupled between the same nodes of the second stage 536 and the third stage 534, and a synchronizing capacitor Cc3 is coupled between the same nodes of the third stage 534 and the top stage 532 to synchronize the voltage across these nodes. Fly-back converter 530 also includes secondary stage 540 having secondary winding Tr-s, rectifying diode D and output capacitor Cout. In some embodiments, rectifying diode D may be implemented using a synchronous rectifier according to circuits and methods known in the art.

In an embodiment, a single diode Dclamp is placed in a centralized location of the cascaded primary stages as shown in FIG. 5B. Diode Dclamp is used to clamp the switch node that is a common node between the winding Tr-p2 and the switch S2 of the second stage 536 and it uses a plurality of synchronizing capacitors Cc1, Cc2 and Cc3 across the switch nodes of each stage to extract energy from leakage inductances of the primary windings. In the present embodiment, the diode Dclamp channels the current to the input capacitor Cin3 of the third stage 534. The switch node that is the common node of the winding and the switch nodes in all four stages are synchronized by coupling three synchronizing capacitors Cc1, Cc2 and Cc3 between the four switch nodes. During a fly-back event, when all the switches are turned off synchronously, the switch nodes are synchronized and a constant differential voltage across the switch nodes of each stage is maintained by having a high frequency AC current flowing through the synchronization capacitors and the diode Dclamp.

As shown in FIG. 5B, the voltage at the switch node of the bottom stage 538 is equalized with a current that flows out of the primary winding Tr-p1 and across the synchronization capacitor Cc1 through the diode Dclamp and completes the path via the input capacitor Cin3 and Cin2. Thus in the present embodiment, a fly-back converter uses synchronization capacitors, a single diode and input capacitors to maintain a constant differential voltage across the switch nodes of each stage and balances out unequal voltages during the time when the switches are turned off. The energy stored in the leakage inductance is also recovered by allowing a current flow through the diode Dclamp to the input capacitor Cin3. A portion of the energy stored in capacitor Cin2 by the bottom stage is also recovered via a current flowing from the first terminal of the bottom stage, and completing the path via diode Dclamp, input capacitor Cin3 and Cin2.

Figure 5C:
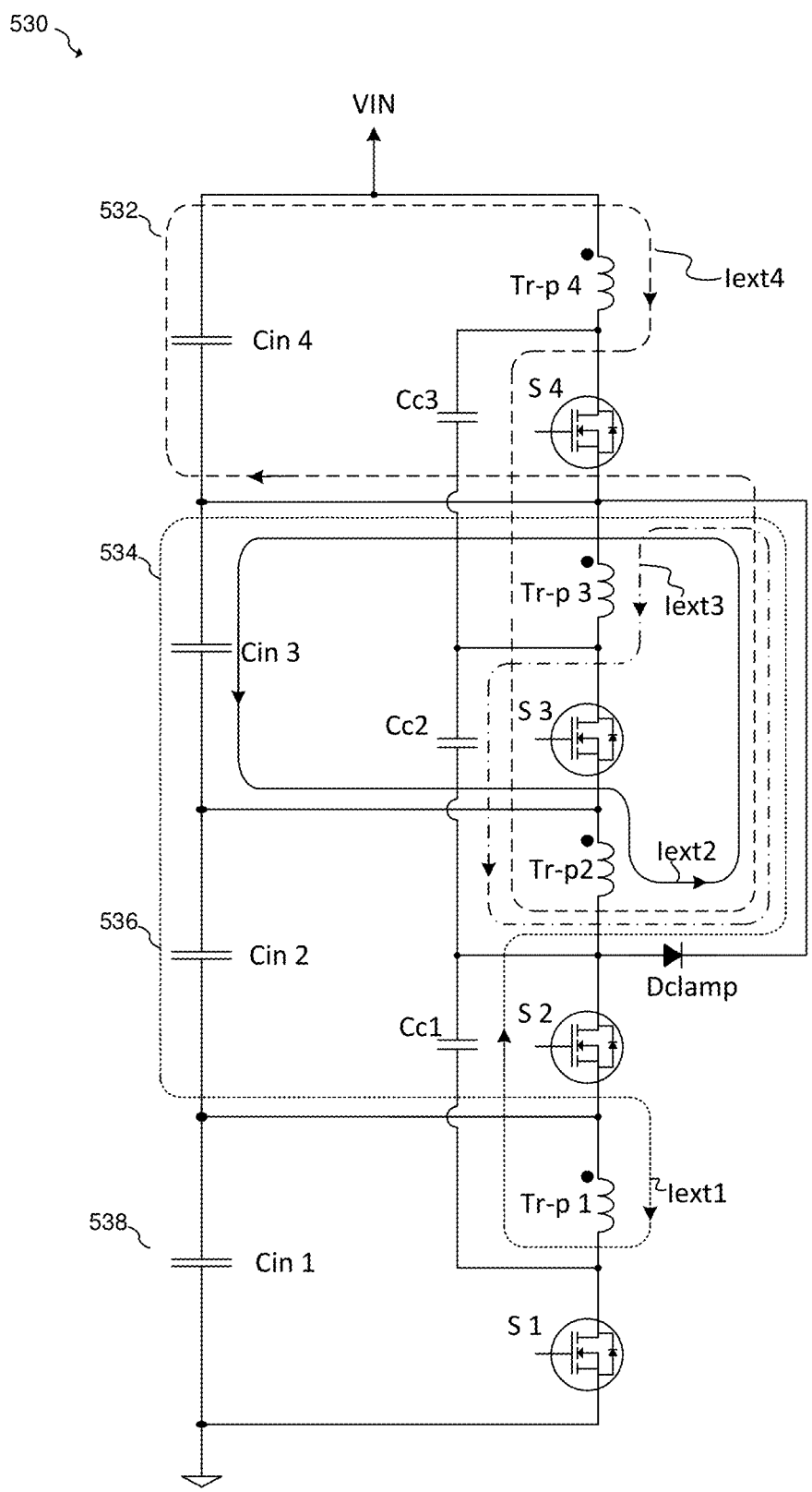

FIG. 5C is an illustrative diagram showing current flow in the embodiment of FIG. 5B. The diagram shows various currents and their circulating paths during energy recovery using diode Dclamp. When using a single diode Dclamp for the whole cascaded stage, synchronization capacitors are also used between similar nodes of each stage to provide a path for the circulating current during the extraction of the energy from each stage. As shown in FIG. 5C, a high frequency current Iext1 flows through a primary winding Tr-p1 and completes its path through a synchronizing capacitor Cc1 and then through the diode Dclamp and into the input capacitors Cin3 and Cin2 to synchronize a switch node of a stage 538 and stage 536. FIG. 5C also shows a DC current Iext2 that is extracting energy from a leakage inductance of a primary winding Tr-p2 and storing that energy into an input capacitor Cin3 via the diode Dclamp. The switch node voltage of stages 536 and 534 is synchronized by a current Iext3 that circulates between a synchronizing capacitor Cc2 and comes out of the diode Dclamp and returns back to the winding Tr-p3. The leakage energy from stage 534 is stored across the synchronization capacitor Cc2 and is recovered within first couple of nanoseconds of the turn on of the switch S3.

Another current Iext4 flows from a primary winding Tr-p4 and synchronizes the switch node voltage of stage 532 and stage 534 by having the current Iext4 flow through synchronizing capacitor Cc3 and Cc2 then complete the path by flowing through the diode Dclamp and back to the primary winding Tr-p4. The energy from the primary winding Tr-p4 is stored across synchronizing capacitor Cc3 and Cc2. The embodiment of FIG. 5B presents an option of using one clamping diode Dclamp and three synchronizing capacitors Cc1, Cc2 and Cc3 to clamp voltages at the switch nodes. In some embodiments, synchronizing capacitors Cc1, Cc2 and Cc3 may be made relatively large in order to provide energy storage during the switch on-time. In some embodiments, synchronizing capacitors Cc1, Cc2 and Cc3 may also be taken into account when determining the amount of total capacitance needed to suppress input voltage ripple.

The cascaded stages in the primary side may be further configured to have an energy recovery circuit at every stage. In this configuration the energy from a winding of one stage is stored in an input capacitor of the adjacent stage. However, in such arrangements the top stage or the stage that is connected to the input supply has a dissipative clamp circuit, as there is no other stage coupled in series with the top stage. In various embodiments, these energy recovery circuits are implemented by a diode connected to a switch node of each primary stage, where the switch node is a common node between a primary winding and a switch. The energy that is stored in the primary side leakage inductance is transferred to input capacitors coupled across each primary stage. In some embodiments, the input capacitor may be sized such that the voltages across each stage are stabilized without large disturbances. The current path for winding when the switch is being turned off is provided via the clamp circuit and through the input capacitor of the next stage and returning back to the winding. The use of a synchronizing capacitor allows the common node of each stage to be in synchronization with one another and allows momentary voltage differences between the nodes of two different stages to be equalized by via AC current flowing through the synchronizing capacitor.

Figure 6A:
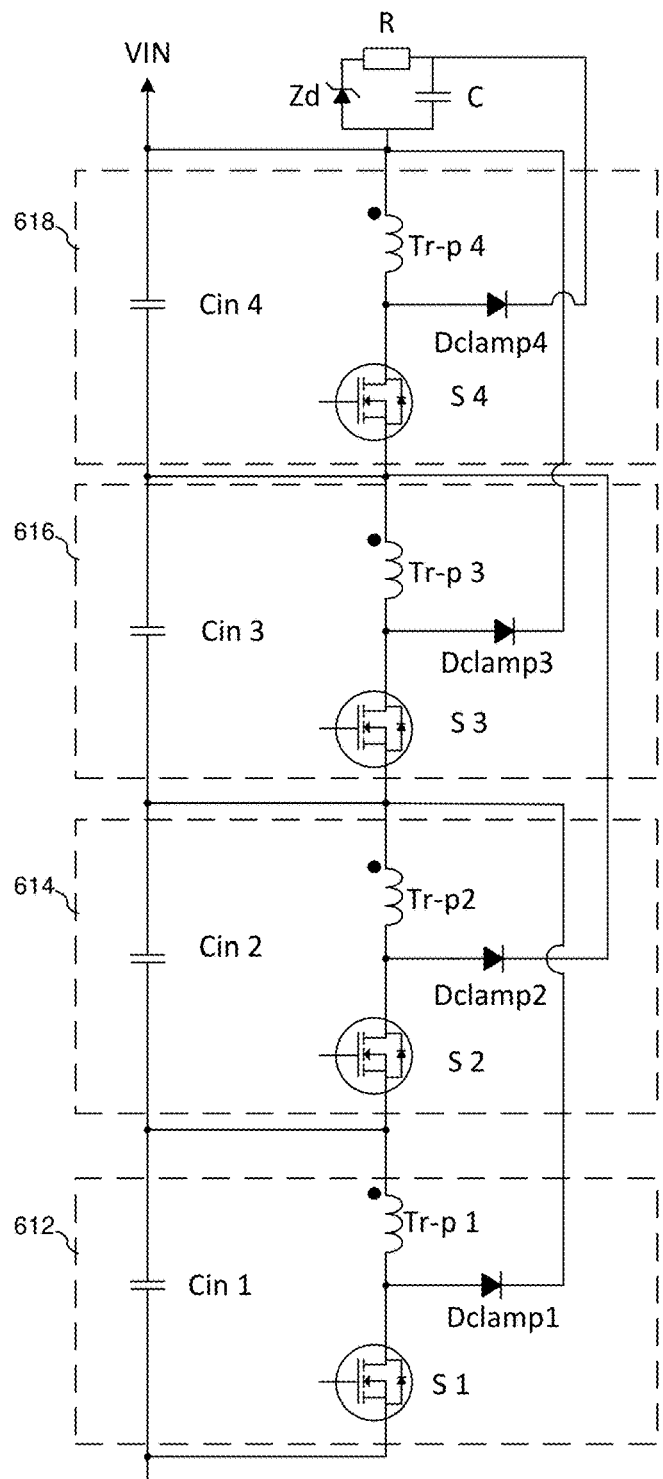
FIGS. 6A and 6B show schematics that illustrate clamping in embodiment power converters.

FIG. 6A illustrates the primary side of an embodiment fly-back converter 600 in which each primary stage 612, 614, 616 and 618 includes a respective clamping diode Dclamp1, Dclamp2, Dclamp3 and Dclamp4. Energy recovered from first three stages 612, 614 and 616 is stored in the input capacitor in each next respective stage. For example, energy recovered from stage 612 is stored in capacitor Cin2 of stage 614 via diode Dclamp1, energy recovered from stage 614 is stored in capacitor Cin3 of stage 616 via diode Dclamp2, and energy recovered from stage 616 is stored in capacitor Cin4 of stage 618 via diode Dclamp3. Energy recovered from top stage 618 is directed to a dissipative clamp circuit that includes a resistor R, a capacitor C and a Zener diode Zd. In various embodiments, the Zener voltage of Zener diode Zd is chosen to be larger than a maximum input voltage of one cascaded stage. Accordingly, inter-primary coupling, which may be significantly lower than the primary-secondary leakage, redirects energy into the lowest voltage recovery clamps. Thus, in some embodiments, only a small portion of the total recovered energy, namely the portion of the energy that is not coupled to the other primary stages, is dissipated across the dissipative clamp circuit.

Figure 6B:
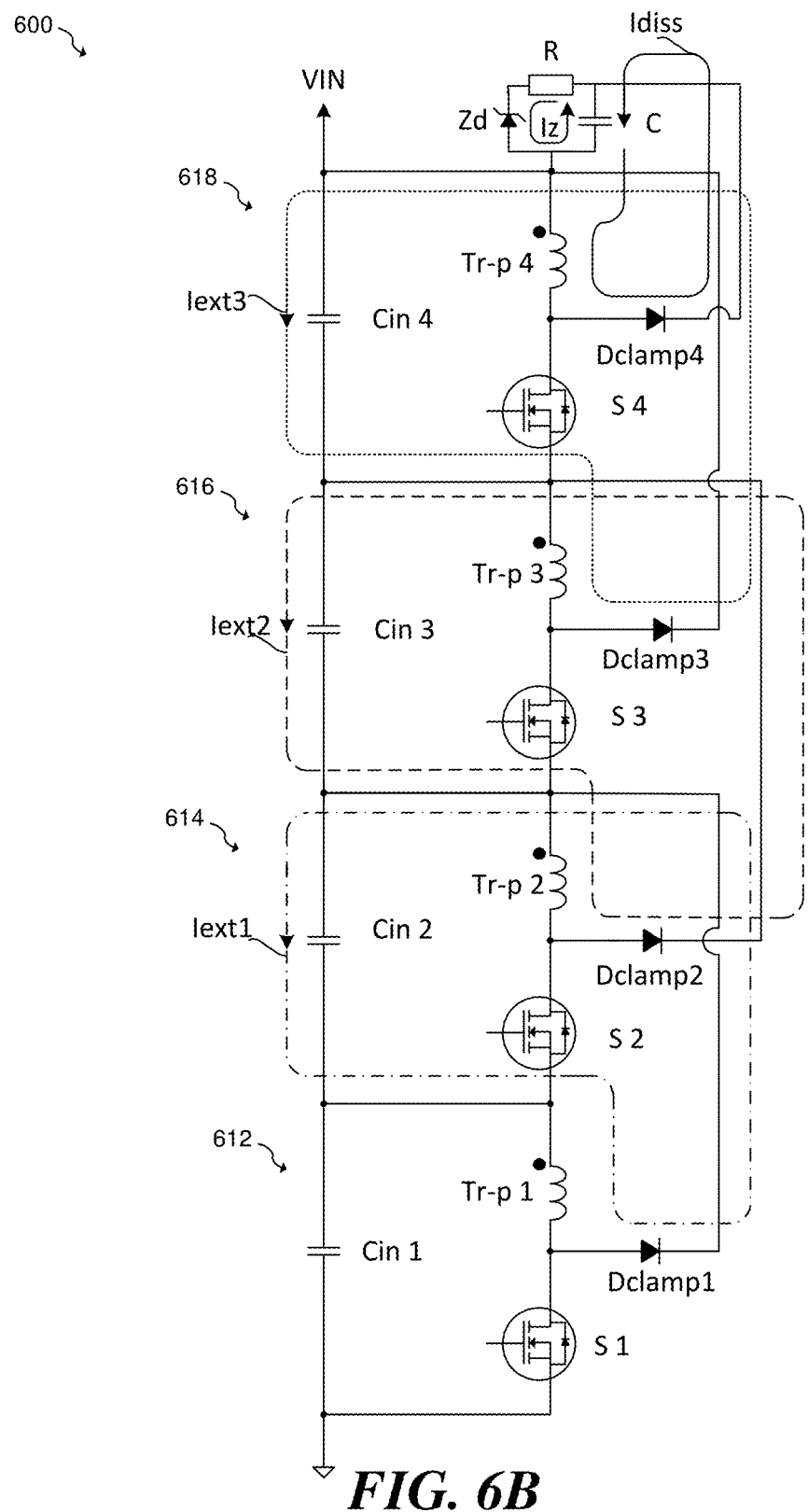

FIG. 6B illustrates the primary side of an embodiment fly-back converter 600 of FIG. 6A in which various currents are labeled in order to illustrate current flow during energy recovery. As mentioned above, the energy extracted from a primary leakage inductance of one stage is stored in an input capacitor of an adjacent stage for stages 612, 614 and 616. For example, current Iext1 carries energy extracted from primary winding Tr-p1 via forward biased clamping diode Dclamp1 of stage 612 and charges input capacitor Cin2 of stage 614. Current Iext2 carries energy extracted from primary winding Tr-p2 via forward biased clamping diode Dclamp2 of stage 614 and charges input capacitor Cin3 of stage 616. Similarly, current Iext3 carries energy extracted from primary winding Tr-p3 via forward biased clamping diode Dclamp3 of stage 616 and charges input capacitor Cin4 of stage 618.

The energy extracted from the primary winding Tr-p4 is carried by current Idiss via diode Dclamp4 and stored in capacitor C. This energy is slowly dissipated via current Iz through Zener diode Zd and resistor R. Thus, a small portion of the energy of the uppermost cascaded primary winding is dissipated but energy from other cascaded stages is extracted and stored in the input capacitors.

Figure 7A:
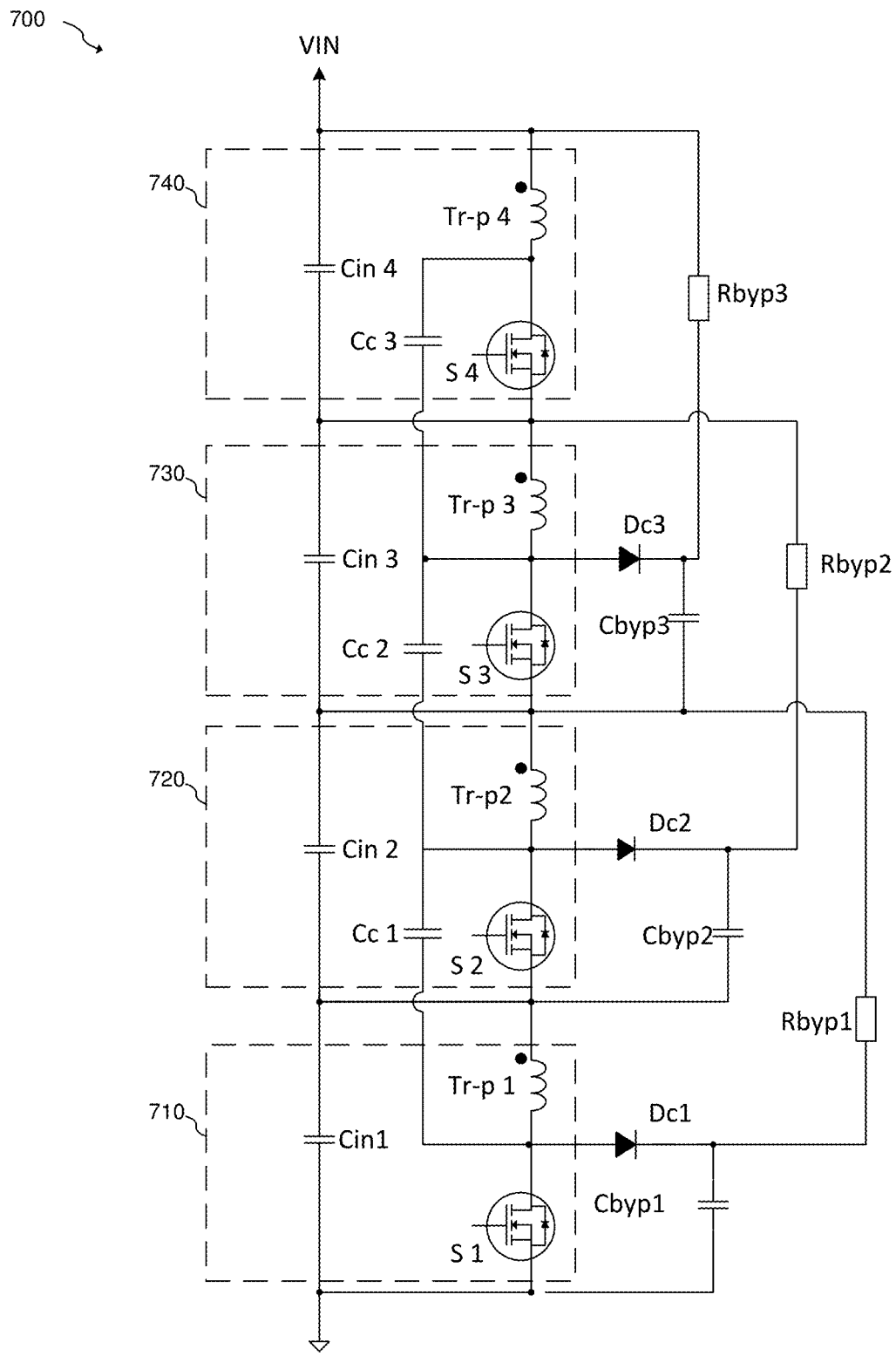
FIGS. 7A-7D show schematics and an associated waveform diagram that illustrate the use of clamping, bypass and energy recovery circuits in embodiment power converters.

In some embodiments, the dissipative clamp circuit may be eliminated by using bypass capacitors and resistors as shown with respect to the primary side of an embodiment fly-back converter 700 illustrated in FIG. 7A. High frequency energy that is radiated due to parasitic inductance and high frequency switching of the current can be kept local to each stage by coupling a bypass capacitor at the output of the clamping diode. The bypass capacitor absorbs the high frequency current generated during the demagnetization of the leakage inductance and prevents the propagation of the current to the next stage, and the series resistor reduces the large amplitude of the high frequency current and prevents large transient voltages across the input capacitors during energy recovery. In some embodiments, synchronization capacitors Cc1, Cc2 and Cc3, in addition to helping synchronizing the input voltage to each primary stage, effectively replace the dissipative clamp circuit of FIGS. 6A and 6B by coupling non-clamped switch S4 to clamped switch S3. Thus, a current at the switch node of each primary stage is absorbed with a bypass circuit coupled at the output of the energy recovery circuit and the rest of the current is circulated to the input capacitors via the bypass resistors. The energy stored in the leakage inductance is thereby extracted via a low frequency current. In some embodiments, the bypass circuit connected to the energy recovery circuit may eliminate or at least reduce overshoot at the switch node.

In an alternative embodiment, a damped series inductor may be used in place of bypass resistors to further reduce energy loss during energy recovery. Such a damped inductor may be implemented using a parallel RL impedance in which the parallel resistance is selected to reduce or avoid ringing and oscillations.

FIG. 7A shows a primary side of a fly-back converter 700 that is formed by a bottom stage 710, a second stage 720, a third stage 730 and a top stage 740 coupled in series to one another and arranged in a cascaded configuration. Diodes Dc1, Dc2 and Dc3 are coupled to the switch nodes of stages 710, 720 and 730 respectively to recover energy and clamp the voltage at each switch node of each of the four cascaded stages in the primary side. A first synchronization capacitor Cm is coupled between the switch nodes of stage 710 and stage 720, a second synchronization capacitor Cc2 is coupled between the switch nodes of stage 720 and stage 730, and a third synchronization capacitor Cc3 is coupled between the switch nodes of stage 730 and stage 740. As shown, stage 740 does not have an energy recovery circuit including a clamp diode. The third synchronization capacitor Cc3 takes care of the switch node and helps maintain a fixed differential voltage across stage 730 and stage 740. There is no dissipative clamp circuit present in the fly-back converter primary stage, and full recovery of the energy in the leakage inductance is possible.

Fly-back converter 700 includes a first bypass circuit in stage 710 formed by a bypass capacitor Cbyp1 coupled at the output of clamp diode Dc1 and a bypass resistor Rbyp1 coupled between the output of the clamp diode and an input capacitor Cin2 of stage 720. A second bypass circuit is formed by a bypass capacitor Cbyp2 connected at the cathode of clamp diode Dc2 and a bypass resistor Rbyp2 that is connected between the output of clamp diode Dc2 and an input capacitor of stage 730. A third bypass circuit is formed by a bypass capacitor Cbyp3 coupled to the output of clamp diode Dc3 and a bypass resistor Rbyp3 connected to the output of clamp diode Dc3 and an input capacitor Cin4 of stage 740. The bypass capacitors reduce the overshoot of the voltage at the switch node by providing a path for high frequency currents when the switches are being turned off. These high frequency currents do not travel to the input capacitors of the adjacent stages; instead, the high frequency currents flow into the bypass capacitors and back to the source nodes of the switches. This buffering of the high frequency current by the bypass capacitor Cbyp may reduce or eliminate ringing caused by a parasitic inductance present in the board routing going to the input capacitor of the next stage. The bypass resistors placed in the return paths to the input capacitors filter the currents that flow to the input capacitors of the adjacent stages. The bypass resistors also prevent instability due to switching of large currents into the input capacitors. The use of a bypass circuit also reduces electro-magnetic interference (EMI) due to fast switching of current in the return path that may contain parasitic inductances.

Figure 7B:
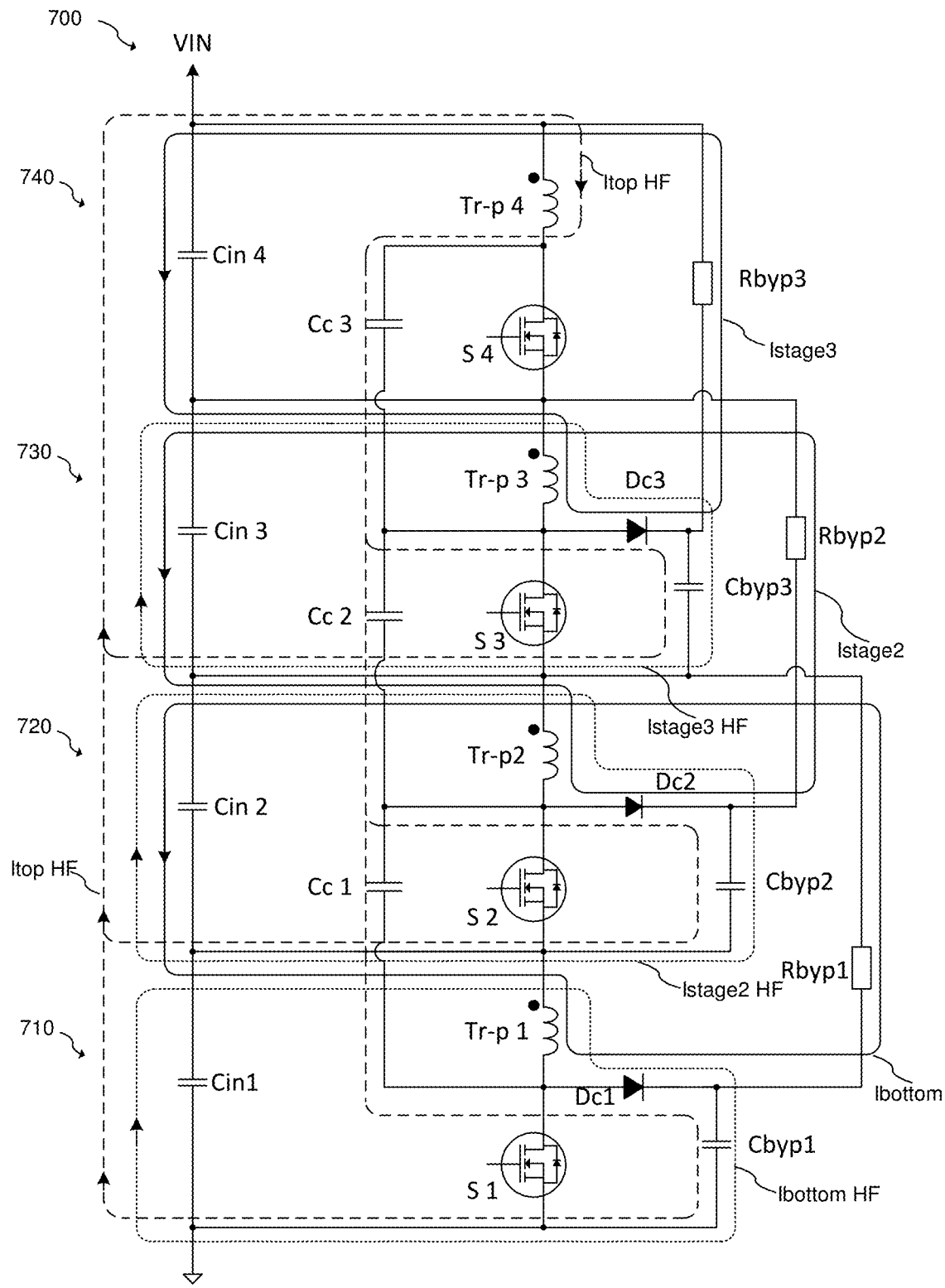

FIG. 7B shows various currents paths that are active when the switches are turned off. The currents shown are of high frequency and low frequency depending on the nature of the action being performed by the currents. The currents shown in solid lines are low frequency currents involved in extracting energy from the leakage inductance of the primary windings, as described above. The currents shown in dotted lines are high frequency currents. The four stages used in the fly-back converter are denoted by 710, 720, 730 and 740 as described above with respect to FIG. 7A.

High frequency current Itop HF flows through the primary winding Tr-p4 and completes its path through the synchronization capacitors Cc3, Cc2, Cc1, diode Dc1, bypass capacitor Cbyp1 and returns back to the winding Tr-p4 via the input capacitors Cin1, Cin2, Cin3 and Cin4. A portion of Itop HF also circulates through the clamp diodes Dc3 and Dc2 and returns back via bypass capacitors Cbyp3 and Cbyp2 respectively as shown in FIG. 7B. In various embodiments, current Itop HF is responsible for clamping the switch node of top stage 740 when switch S4 is opened. Another high frequency current Ibottom HF flows through clamp diode Dc1 and bypass capacitor Cbyp1 to clamp the switch node of bottom stage 710 and completes its path via input capacitor Cin1. Current Ibottom shown in a solid line represents the energy recovery from a leakage inductance of the primary winding Tr-p1 in stage 710 and a portion of the leakage inductance of primary winding Tr-p4 in stage 740. As shown, current Ibottom flows through bypass resistor Rbyp1 and to input capacitor Cin2 to store the extracted energy. Currents Istage2 HF and Istage2 are similar to Ibottom HF and Ibottom, except that the path for Istage2 HF is through clamp diode Dc2 and bypass capacitor Cbyp2. The leakage energy extracted from the leakage inductance primary winding Tr-p2 in stage 720 and another portion of the leakage inductance of primary winding Tr-pr4 from stage 740 is flows via current Istage2 going through bypass resistor Rbyp2 and to the input capacitor Cin3 of stage 730. Current Istage3 HF is the high frequency current completing its return path via clamp diode Dc3, bypass capacitor Cbyp3 and input capacitor Cin3. Embodiment fly-back converter 700 provides paths for various high frequency currents via synchronization capacitors and bypass capacitors to limit voltage swings of various switch nodes when the switch is being turned off.

Figure 7C:
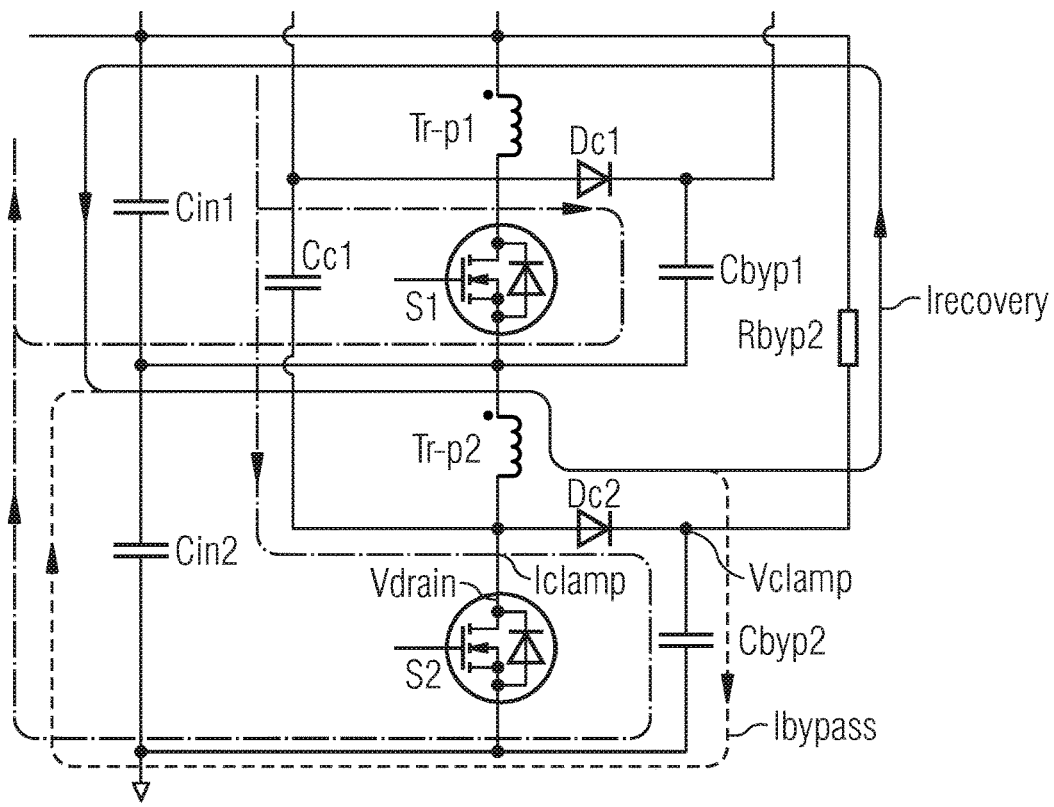

FIG. 7C shows two cascaded stages connected in series with each other. A first stage includes a winding Tr-p1, clamp diode Dc1 and a switch S1 coupled in series with the winding Tr-p1. The stage that is referenced to a ground potential is a second stage and is formed by an input capacitor Cin2 and a switch S2 that is coupled in series with a winding Tr-p2. The second stage also includes a clamping diode Dc2 that is used to extract energy from a leakage inductance of Tr-p2 when switch S2 is opened. The energy recovered from the leakage inductance of Tr-p2 is stored to an input capacitor Cin1 in the first stage adjacent to the second stage. A bypass capacitor Cbyp2 is coupled to a cathode of the clamping diode Dc2 in the second stage and is responsible for absorbing a high frequency current generated during the demagnetization of the primary winding. The common node between switch S2 and winding Tr-p2 is denoted by Vdrain and the cathode node of diode Dc2 is described as Vclamp. FIG. 7C also shows paths for a current Iclamp that is flowing through diode Dc2 when Vdrain node is pulled high by having switch S2 opened. A high frequency current Ibypass is absorbed by bypass capacitor Cbyp2 and a recovery current Irecovery is used to recover energy from the second stage. A synchronization capacitor Cc1 is coupled between the first stage and the second stage to synchronize a first terminal of the winding Tr-p2 and Tr-p1.

Figure 7D:
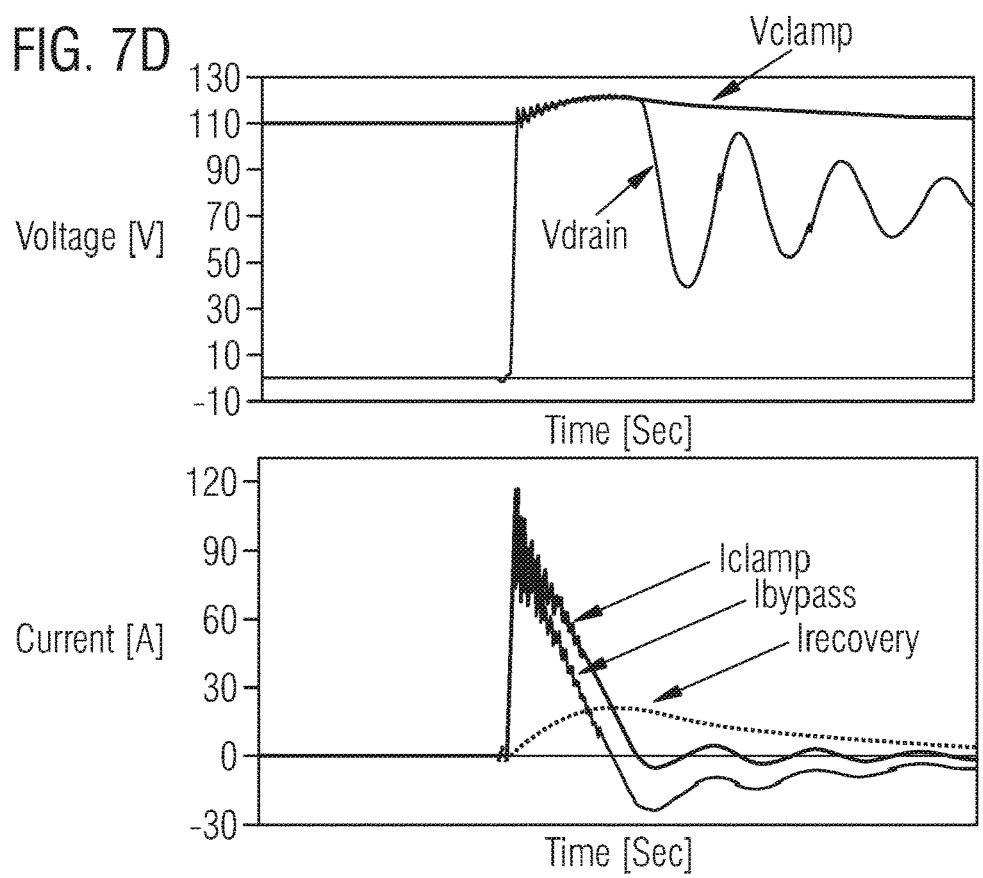

FIG. 7D illustrates various current and voltage waveforms of the embodiment of FIG. 7C that occur during the demagnetization of the primary winding. Waveforms of clamp voltages and currents during an energy recovery from the second stage and storage into the first stage are shown in FIG. 7D. The top plot shows a drain voltage Vdrain of switch S2 and a clamp voltage Vclamp at the output of clamp diode Dc2, which is also the voltage across high frequency bypass capacitor Cbyp2. As shown in the waveform diagram, the voltage of Vdrain remains low at the beginning until the switch S2 is turned off, at which time voltage Vdrain rapidly increases to no V, which is twice the input voltage of 55 V. Vdrain continues to increase while the primary windings demagnetize. However, once the primary windings are demagnetized, voltage Vdrain rings with a DC level of 70 V, which is a sum of input voltage of 55 V of one stage and a reflected output voltage of 15 V. Voltage Vclamp at the output of clamp diode Dc2 starts at no V which is twice the supply voltage and follows voltage Vdrain as it increases. Once Vdrain starts to decrease, resistor Rbyp2 discharges capacitor C absorbing a portion of the leakage energy and transferring the remaining energy to capacitor Cin1. Voltage Vclamp eventually settles to a voltage higher than the input supply of no V, which happens when current Iclamp drops to (Vclamp−2*VIN)/Rbyp2 which is equal to current Irecovery.

The bottom plot in the waveform of FIG. 7D shows current waveforms for curents Iclamp, Ibypass and Irecovery denoted in the circuit diagram of FIG. 7C. More specifically, current Iclamp is the current that flows through diode Dc2 when a switch S2 is turned off; Ibypass is the current that flows through high frequency bypass capacitor Cbyp2, and current Irecovery is a current that flows through a bypass resistor Rbyp2. As shown, these currents are low until switch S2 is turned off. It should be understood, however, that these currents may be larger in embodiments in which resistor Rbyp2 is not small enough to recover all the energy from the previous switching cycle.

Currents Ibypass and Iclamp sharply increase when switch S2 is turned off after primary winding Tr-p2 is energized. The ringing observed in currents Iclamp and Ibypass is due to parasitic inductance present at the output of the clamp diode Dc2 and the output capacitance of switch S2 and diode Dc2.

Current Irecovery exhibits a slow rise and a slow decay due to the buffering of a large portion of high frequency components of Iclamp by bypass capacitor Cybp2. This slow rise and decay in current Irecovery prevents EMI due to the parasitic inductance present in the routing of the output of the diode clamp, bypass resistor Rbyp and input capacitor Cin of the next stage. Furthermore, in some embodiments, the slow rising and decaying current does not produce significant transient voltages across the input capacitors, as a high rate of change of current could cause large voltage spike across the parasitic inductance of the input capacitor. Thus, reducing the rate of change of current.

Bootstrap Gate Driver for Cascaded Topologies:

As was discussed with FIG. 3, control nodes of the switches may be driven using multiple driver circuits. In embodiments of the present invention, bootstrap techniques may be used to reduce the number of driver circuits for a fly-back converter. In addition, embodiment bootstrap techniques may be used to eliminate or reduce the number of level shift circuits that would otherwise be used to drive various stages that are referenced to different potentials. The elimination and/or reduction of the number of such level shift circuits may also result in the reduction or elimination of complex circuitry that includes high voltage components. In various embodiments, bootstrap capacitors are used to drive the control nodes of switches. A clamp circuit coupled between the control node and a reference node of the switch may be further used to equalize offset voltages and prevent voltage drift at the control node of the switch over multiple cycles of operation.

Figure 8A:
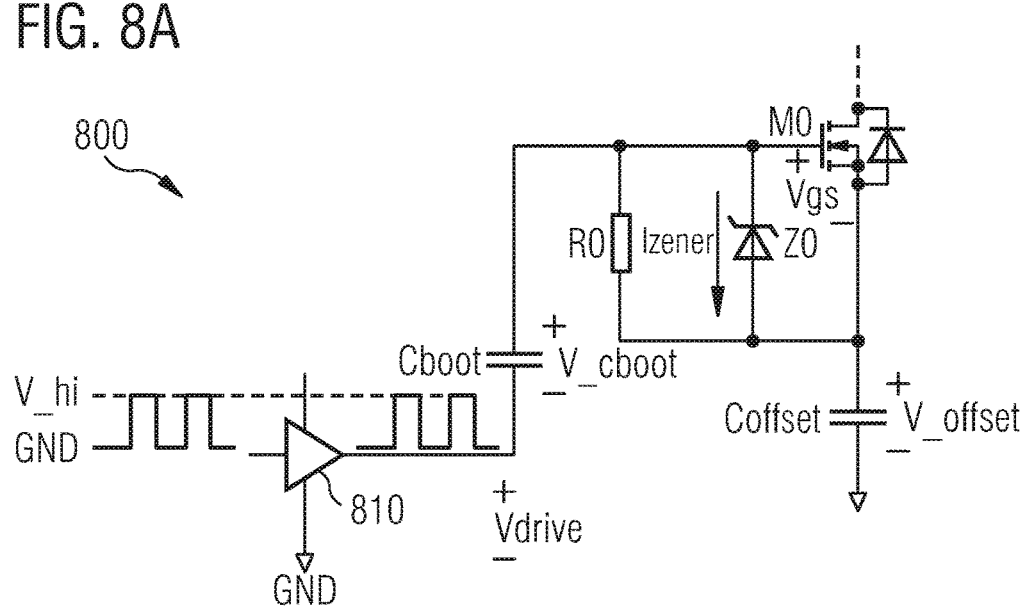
FIGS. 8A-8D show a test circuit and illustrates a test circuit and an associated waveform diagram that illustrate the equalization of DC offset voltages in embodiment power converters.

FIG. 8A illustrates an embodiment bootstrapped gate driving system 800 that includes ground referenced gate driver 810 coupled to non-ground referenced switching transistor Mo via bootstrap capacitor Cboot. As shown, switching transistor Mo is referenced to voltage V_offset, which is the voltage across capacitor Coffset, which is representative of the voltage of a previous primary stage according to embodiments describe above. During operation, the output of gate driver 810 is boosted by voltage V_cboot across capacitor Cboot to produce the drive signal for the gate of Mo. For example, when the output of gate driver 810 goes to V_hi, the voltage at the gate of switching transistor Mo goes to a voltage that is equal to a sum of V_hi and voltage V_cboot that was present across capacitor Cboot. A Zener diode Zo is coupled across the gate and a source of switching transistor Mo to prevent the gate from being continually charged to higher and higher voltages or to lower and lower voltages when Voffset changes. When the driver is not switching, resistor Ro coupled between the gate and the source of switching transistor Mo to allows current to flow between bootstrap capacitor Cboot and capacitor Coffset until voltage V_cboot across capacitor Cboot and voltage V_offset across capacitor Coffset are equalized. While one bootstrap stage is shown in FIG. 8A for clarity of illustration, multiple switches may be connected to the output of gate driver 810 using multiple bootstrap capacitors. In some embodiments, the output of gate driver 810 is directly connected to a ground reference switch (not shown) in addition to being connected to switching transistor Mo via bootstrap capacitor Cboot.

During operation, the voltage of the output of gate driver 810 toggles between voltage of V_hi and ground, which is boosted by voltage V_cboot such that switching transistor Mo turns on when the output of gate driver 810 is at V_hi and turns off when the output of gate driver 810 is at ground potential. In various embodiments, output voltage V_hi is chosen such that the zener voltage of Zener diode Zo is substantially equal to the gate to source voltage Vgs of switching transistor minus the forward clamp voltage of Zener voltage of Zener diode Zo.

When the output voltage of gate driver 810 goes high to V_hi, the voltage V_cboot at capacitor Cboot also goes high and it pulls the gate node of switching transistor Mo to a voltage that is higher than reference voltage V_offset. If the voltage of the gate node of switching transistor Mo increases reaches the Zener voltage, Zener current Izener starts flowing through Zener diode Zo. Once switching transistor Mo is on for some time, reference voltage V_offset is equalized by the Zener clamp current Izener. When switching transistor Mo is turned off by having the output voltage of gate driver 810 transition to ground potential, Zener diode Zo does not clamp in reverse direction. However, Zener diode Zo is forward biased when V_cboot is too small, such that differences in voltage across capacitors Cboot and Coffset are equalized. The series resistor Ro is used for equalization during idle operation.

During operation, the voltages across various primary stages may increase or decrease due to the various operating conditions of the power supply. Because of this, reference voltage V_offset shown in FIG. 8A may drift over time. Since voltage V_offset affects the gate-source voltage Vgs of switching transistor Mo, the drift of V_offset may potentially cause switching transistor to turn-on and turn-off during non-switching times. Accordingly, in embodiments of the present invention, Zener diode Zo is used for equalization during switching operation when V_offset is increasing and resistor Ro is used for equalization during idle operation when V_offset is decreasing. Thus, Zener diode Zo and resistor Ro provides equalization of the gate-source voltage Vgs of switching transistor Mo to avoid spurious turn-on.

Figure 8B:
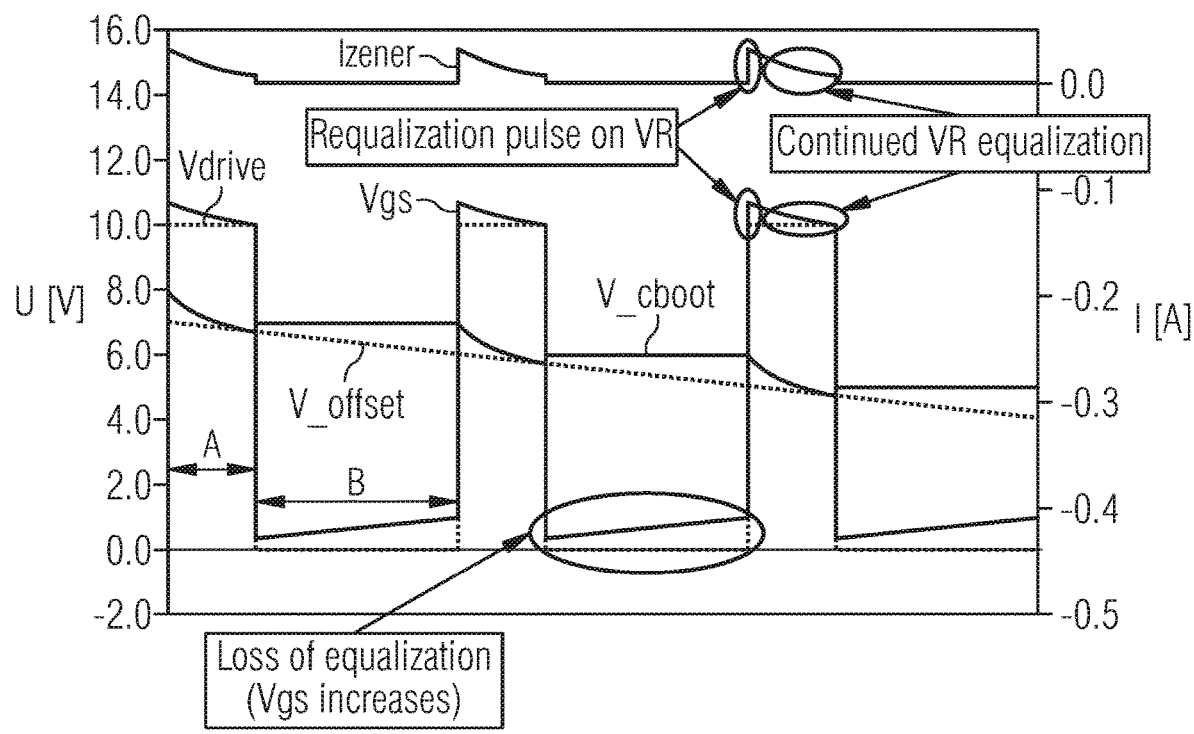

FIG. 8B illustrates a waveform diagram that shows how gate-source voltage Vgs of switching transistor Mo is equalized when reference voltage V_offset has a negative drift over time. The waveform diagram shows reference voltage V_offset, gate-source voltage of switching transistor Mo Vgs, voltage V_cboot across capacitor Cboot, voltage Vdrive of gate driver 810, and current Izener through Zener diode Zo in the Y axis and time in the X axis. At the beginning of time period A, periodic switching signal Vdrive from gate driver 810 switches from a ground value to a voltage V_hi=10 V. Boosted by voltage V_cboot across capacitor Cboot, the gate-source voltage Vgs of switching transistor Mo increases until it is clamped by Zener diode Zo, thereby causing current Izener to flow. During time period A, current Izener discharges capacitor Cboot, which causes voltage V_cboot to decrease following voltage V_offset.

At the beginning of time period B, periodic switching signal Vdrive from gate driver 810 switches from voltage V_hi=10 V to ground potential, thereby causing gate-source voltage Vgs to go to zero. As shown, voltage V_cboot across capacitor Cboot remains constant and Vgs across the gate and source of switching transistor Mo follows approximately the same profile as voltage V_offset.

Reference voltage V_offset is shown to be decreasing from about 7 V. During time period B, when the output of gate driver 810 is at ground potential, voltage V_cboot across capacitor Cboot remains steady around 7 V even when voltage V_offset is decreasing, which effectively causes gate-source voltage Vgs to increase. To prevent the possibility of gate-source voltage Vgs from increasing to the point where switching transistor Mo is inadvertently turned on when the output of gate driver 810 is at ground potential, capacitor Cboot is further discharged via Zener diode Zo the next time the output of gate driver goes high. As seen in FIG. 8B, there is an increase in current Izener after the expiration of time period B. In various embodiments, the voltage between V_cboot and V_offset is equalized when current Izener flows from capacitor Cboot to capacitor C_offset, since voltage V_cboot is higher than voltage V_offset. This process continues each time output of gate driver 810 goes high and the reverse biased Zener diode clamps the gate-source voltage of switching transistor Mo.

As can be seen in FIG. 8B, voltage V_cboot is reset to a voltage of approximately V_offset each time that the output of gate driver 810 does high. Thus, the voltage V_cboot across bootstrap capacitor Cboot tracks changes in the reference voltage of switching transistor Mo. It should be understood that the various voltage levels shown in FIG. 8B are just examples specific to the illustrated embodiment. In alternative embodiments of the present invention, other voltage levels may be used depending on the particular system and its specifications. For example, a Zener diode with a Zener voltage other than 10 V may be implemented.

Figure 8C:
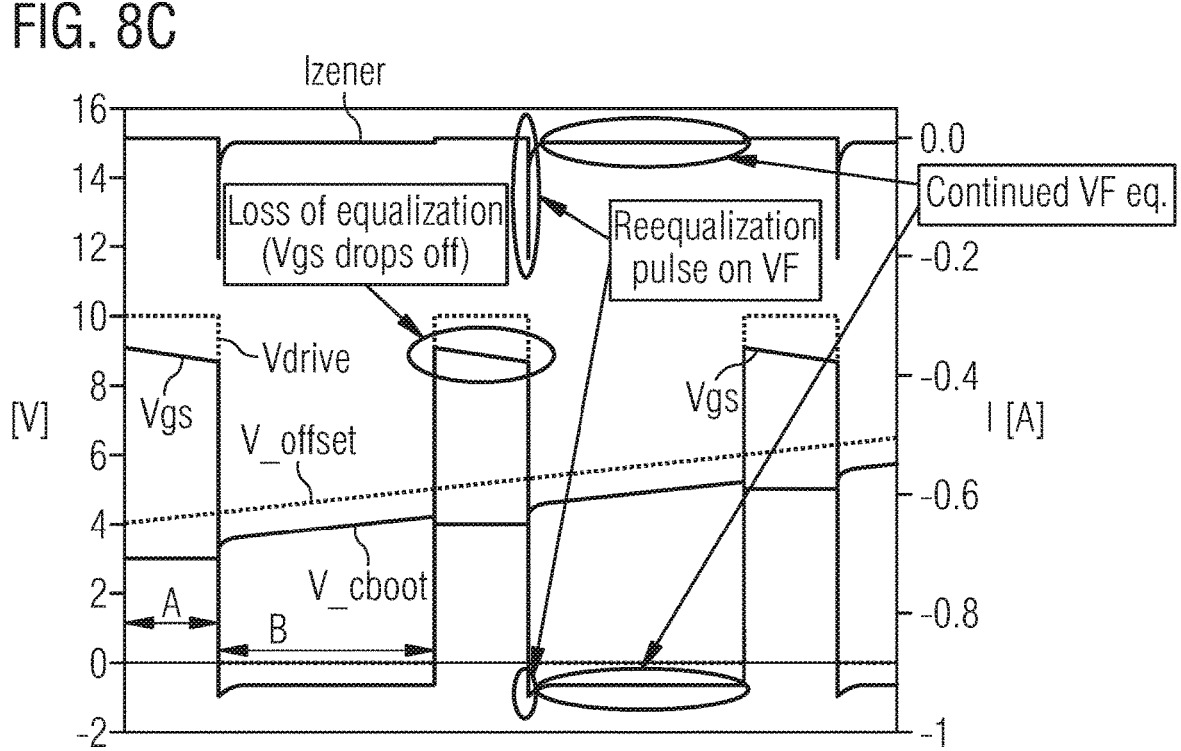

FIG. 8C illustrates a waveform diagram that shows how the voltage V_cboot across bootstrap capacitor Cboot tracks an increase in reference voltage V_offset of switching transistor Mo. During time period A when the output of gate driver 810 is high, V_offset increases from about 4 V; however, Zener diode Zo does not conduct current because the reverse biased voltage across Zener diode Zo is less than the Zener voltage. Consequently voltage V_cboot across bootstrap capacitor Cboot slowly decreases due to the change in V_offset and the constant V_cboot. However, during time period B when the output of gate driver 810 is low, gate-source voltage Vgs becomes negative, thereby forward biasing Zener diode Zo, which causes voltage V_cboot to track V_offset and increase in voltage. As is further shown in FIG. 8C, there is a spike in Zener diode current Izener as Zener diode Zo become forward biased at the beginning of time period B. This spike in Izener charges capacitor Cboot, and is followed by a small current during time period B that enables voltage V_cboot to further track the increase of voltage V_offset.

Figure 8D:
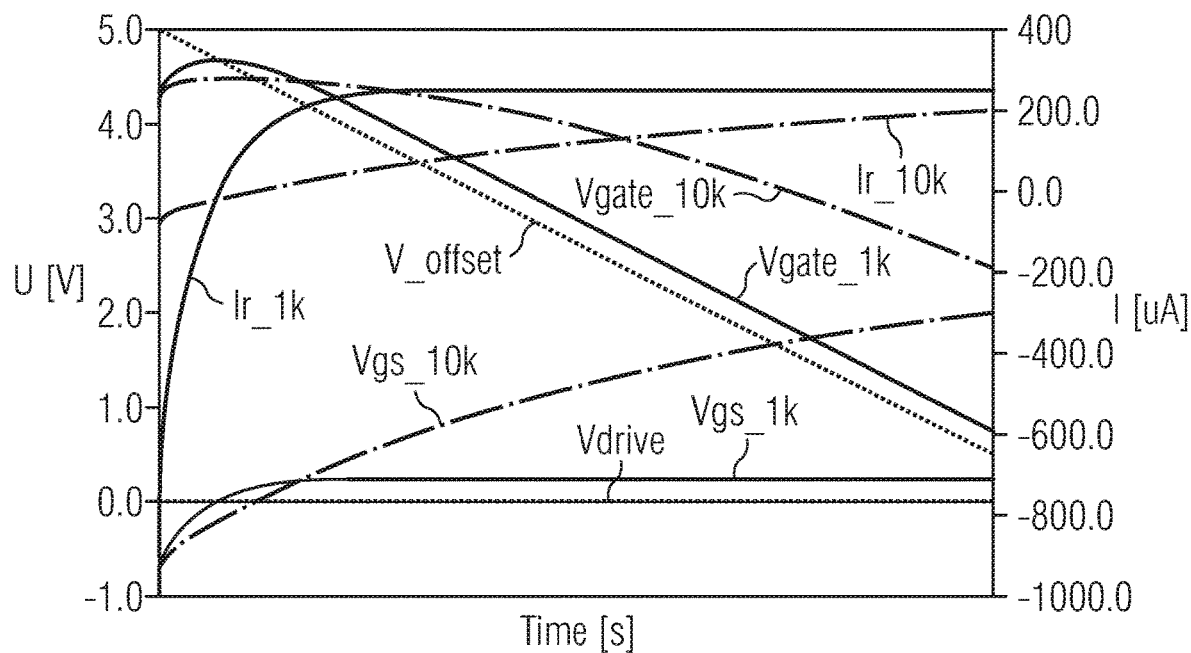

As mentioned above, embodiment bootstrap techniques may be used to avoid an accidental turn on or turn off of the switch during a non-switching period due to a changing voltage at the reference node of the switch. FIG. 8D shows a waveform that illustrates the effect of the value of resistor Ro on the ability of driver system to track a decreasing drift in reference voltage V_offset of switching transistor Mo. It should be understood that, in some embodiments, the driver system may also track a fast increase in the reference voltage V_offset due to the driver being in a low state. The waveform diagram shows various signal levels of driver system 800 during the period of time in which the output voltage Vdrive of driver 810 is at ground potential and reference voltage V_offset decreases for systems in which the resistance of resistor Ro is 1 kΩ and 10 kΩ. When the resistance of resistor Ro is about 1 kΩ, gate-source voltage $Vgs\_1k$ increases from a negative voltage to about 0.2 V. In a system in which the threshold of switching transistor is greater than 0.2 V (e.g., 1 V), switching transistor Mo remains off during the depicted time period. As shown gate voltage $Vgate\_1k$ of switching transistor Mo tracks voltage reference voltage V_offset because there is sufficient current being provided via Ro to discharge Cboot as V_offset decreases. However, when the resistance of Ro is increases to 10 kΩ, gate-source voltage $Vgs\_10K$ increases to 2 V and gate voltage $Vgate\_10k$ diverges from the decreasing V_offset because the 10 KΩ does not provide sufficient equalization current. In embodiments in which the threshold voltage of switching transistor Mo is on the order of 1V, transistor Mo will turn-on during the depicted time period when the resistance of Ro is set to 10 KΩ. It should be understood that the various resistor values and voltage levels used to produce waveform diagram of FIG. 8D are just examples used to illustrate the effect of resistance of Ro on the ability of embodiment system 800 to keep a transistor off. Actual values for resistor Ro may depend on the expected pulse timing and reference voltage drift of the particular system. Resistor size selection may also be influenced by the power budget of the particular system.

Figure 9A:
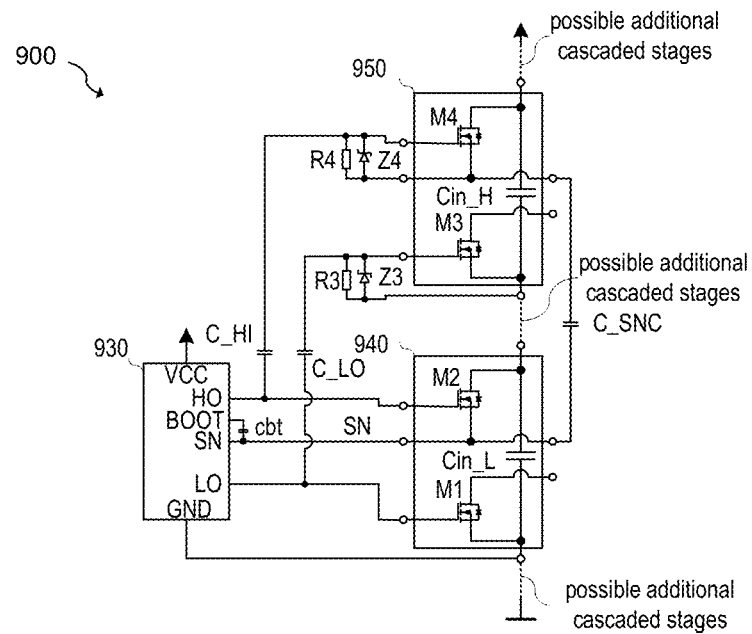
FIG. 9a-9d illustrate embodiment switched mode power supplies in various topologies.

Embodiment bootstrap circuits and methods may also be applied to half-bridge, full-bridge, inductor-inductor capacitor (LLC), and two transistor forward (TTF) topologies as shown in FIG. 9a, which illustrates driver system 900 that includes half-bridge circuits 940 and 950 coupled to driver 930, where half-bridge circuits 940 and 950 together form a full-bridge. Driver system 900 may be used, for example, in SMPS systems in which a plurality of transformer windings are driven using multiple switches that switch at the same time. Such SMPS systems may include, but are not limited to cascaded LLC, cascaded full-bridge and two-transistor forward converters. Driver system 900 may also be applied to cascaded converters that are not linked through a common transformer but still have a DC or low frequency AC offset to one another. In driver system 900, coupling capacitor C_SNC provides the return path for the high side gate current enabling the use of a single half-bridge driver 930 directly connected to base half-bridge 940 to also drive cascaded half-bridge 950 via bootstrap capacitors C_HI and C_LO. Driver system 900 may also be applied to cascaded converters that are not linked through a common transformer but still have a DC or low frequency AC offset to one another. For example, embodiment half-bridge systems such as system 900 may be used to remotely drive gates or communicate digital signals capacitively. By using capacitive node coupling between reference potentials, such as done by coupling capacitor C_SNC, high frequency disturbances on the coupled signal may be minimized or eliminated.

A single driver 930 is used to provide a control signal HO to control high side switches M1 and M3 of half-bridges 940 and 950 respectively. Similarly, a control signal LO is used to control low side switches M2 and M4 of half-bridges 940 and 950 respectively. Half-bridge 940 represents a stage that is referenced to a ground potential. A first bootstrap capacitor C_HI is coupled between the control signal HO and a control node of high side switch M4 which has a reference voltage different than the reference of driver 930. A second bootstrap capacitor C_LO is coupled between a low side control signal LO and a control node of low side switch M3 of half-bridge 950 that also has a different reference voltage than driver 930. Half-bridge 940 that is referenced to ground uses a separate bootstrap capacitor denoted by Cbt to generate a supply BOOT to control high side switch M2 and hence the control node for high side switch M2 is connected directly to HO and a control node of low side switch M1 is coupled directly to the low side control signal LO because both driver 930 and switch M1 have similar reference voltage. A common node SN coupled to transistors M1 and M2 is coupled to driver 930 and provides a control voltage referenced to node SN for high side switch M2. Gate driver 930 uses a capacitor Cbt coupled between an output node SN of half-bridge 940 and a high side supply pin BOOT.

Half-bridge 940 containing switches M1 and M2 forms one primary side and switches M1 and M2 are cascaded with another half-bridge 950 in series with bridge 940, bridge 950 containing the switches M3 and M4. The high side source nodes of half-bridge 950 and half-bridge 940 are coupled to capacitor C_SNC. Capacitor C_SNC provides a return path for the high side or the gate current of switch M4 gate current via bootstrap capacitor C_HI, such that higher frequency gate current flows across the gate and source of switch M4 and through the source and gate of switch M2. The cascaded stage formed by half-bridges 940 and 950 are AC coupled by capacitor C_SNC. It should be understood that additional half-bridge stages may be cascaded with half-bridge 940 and/or 950.

Figure 9B:
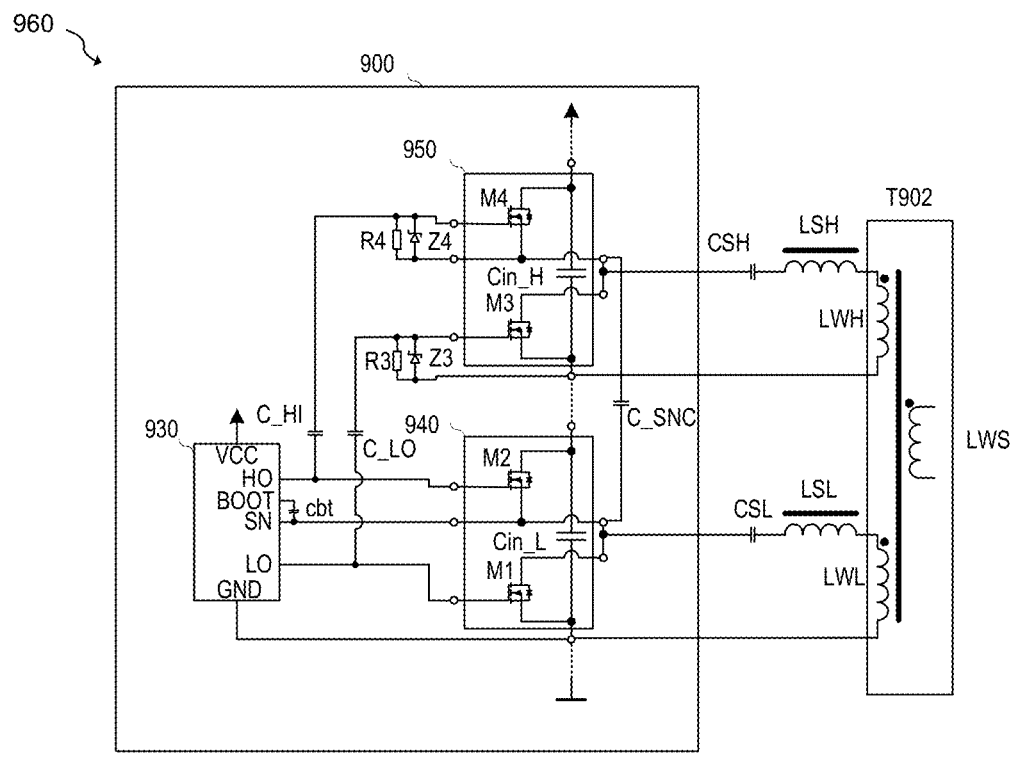

FIG. 9b illustrates an embodiment cascaded LLC converter 960 that incorporates driver system 900 described above with respect to FIG. 9a. As shown, high-side half bridge 950 is coupled to upper primary winding LWH via series capacitor CSH and series inductance LWH of transformer T902. Similarly, low-side half bridge 940 is coupled to lower primary winding LWL of transformer T902 via series capacitor CSL and series inductance LWL. Secondary winding LWS is coupled to a secondary side circuit using circuits and methods known in the art. In alternative embodiments, additional primary windings and corresponding half-bridge stages may be added between the power supply and half-bridge 950, between half-bridge 950 and half-bridge 940 and/or between half-bridge 940 and ground. Moreover, various embodiment circuits and methods applied to cascaded power converters with respect to fly-back topologies disclosed herein may also be applied to cascaded LLC converter 960.

Figure 9C:
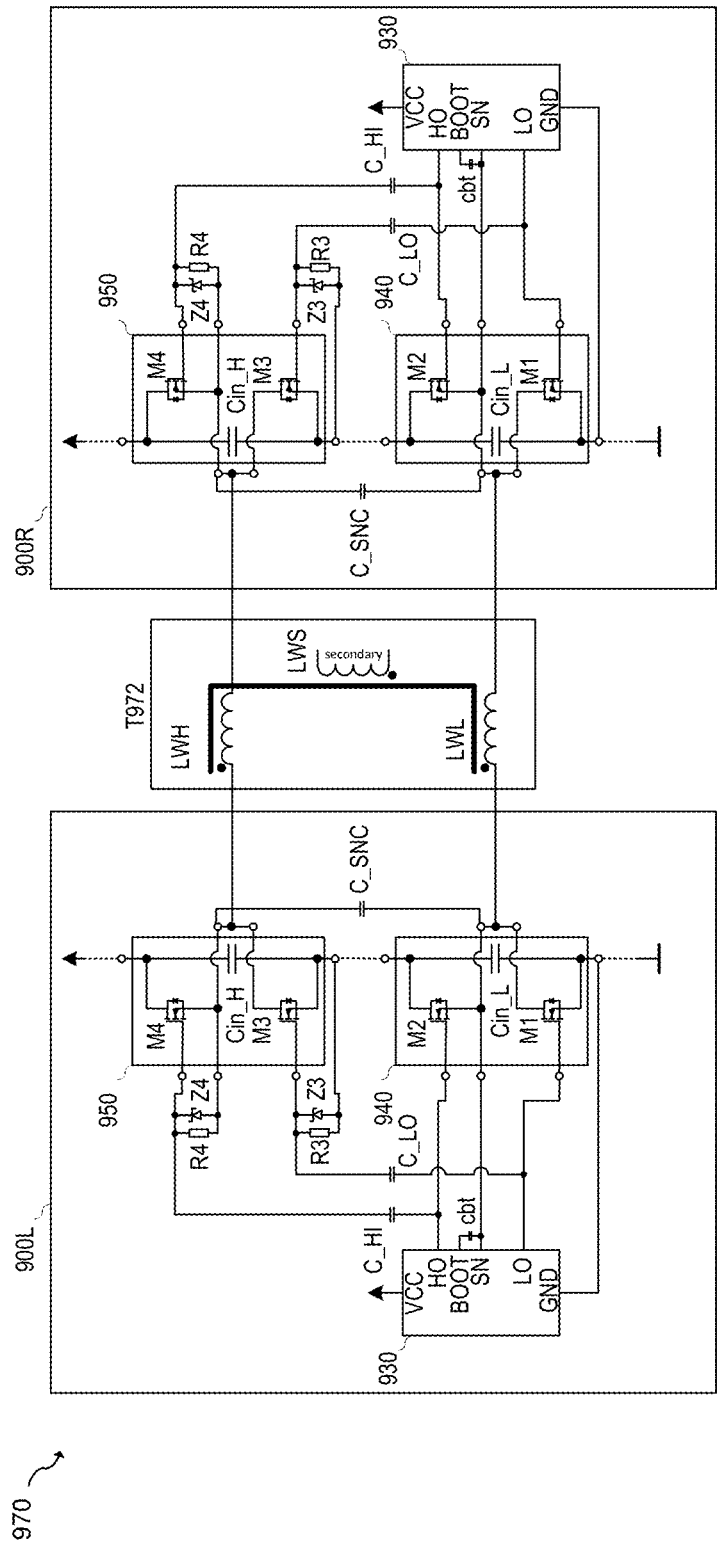

FIG. 9c illustrates an embodiment full-bridge converter 970 that incorporates driver system 900 described above with respect to FIG. 9a. As shown, high-side half bridge 950 of driver system 900L is coupled to a first side of upper primary winding LWH of transformer T972 and high-side half bridge 950 of driver system 900R is coupled to a second side of upper primary winding LWH of transformer T972. Similarly, low-side half bridge 940 of driver system 900L is coupled to a first side of lower primary winding LWL of transformer T972 and low-side half bridge 940 of driver system 900R is coupled to a second side of lower primary winding LWL of transformer T972. Secondary winding LWS is coupled to a secondary side circuit using circuits and methods known in the art. In alternative embodiments, additional primary windings and corresponding half-bridge stages may be added between the power supply and half-bridge 950, between half-bridge 950 and half-bridge 940 and/or between half-bridge 940 and ground of driver systems 900L and 900R. Moreover, various embodiment circuits and methods applied to cascaded power converters with respect to fly-back topologies disclosed herein may also be applied to cascaded LLC converter 970.

Figure 9D:
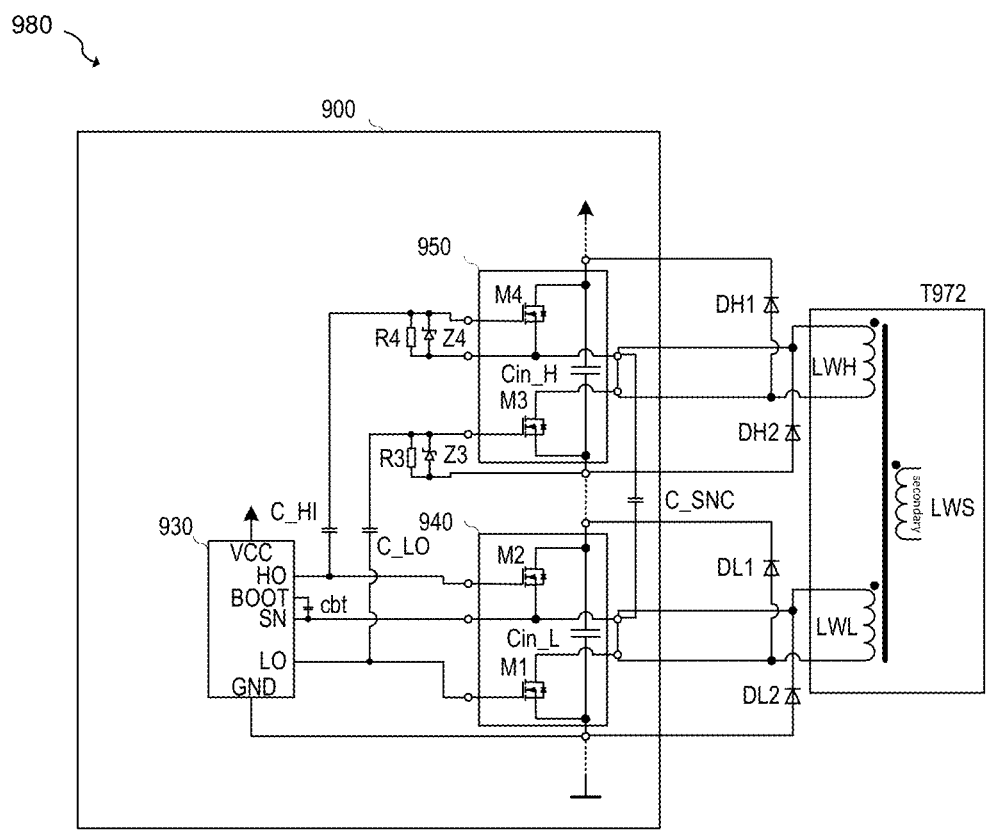

FIG. 9d illustrates an embodiment TTF converter 980 that incorporates driver system 900 described above with respect to FIG. 9a. As shown, high-side half bridge 950 is coupled to upper primary winding LWH of transformer T982 and low-side half bridge 940 is coupled to lower primary winding LWL of transformer T982. Secondary winding LWS is coupled to a secondary side circuit using circuits and methods known in the art.

In alternative embodiments, additional primary windings and corresponding half-bridge stages may be added between the power supply and half-bridge 950, between half-bridge 950 and half-bridge 940 and/or between half-bridge 940 and ground. Moreover, various embodiment circuits and methods applied to cascaded power converters with respect to fly-back topologies disclosed herein may also be applied to cascaded LLC converter 980.

Embodiment bootstrapped gate driver circuits may even be applied to other power supply topologies and other circuits, as well. Generally, a plurality of cascaded stages, such as stages 940 and 950 are coupled in series and are driven by an embodiment bootstrapped gate driver. Diodes, such as Zener diodes Z3 and Z4 may be used to keep the gate source voltage of the switching transistors within a predetermined voltage range, and resistors, such as R3 and R4 may be used to keep switching transistors M2 and M4 in a known state when gate drive 930 is idle and does not provide switching signals. Synchronization capacitors between the various cascaded stages and ground referenced stage 940 may be used to provide a current return path back to gate driver 930. These synchronization capacitors may be coupled between the various stages 950 and ground reference stage 940 directly, or may be coupled between various stages such that a capacitive return path to ground reference stage exists. Magnetic components of the particular topology, such as inductors and transformers are connected to the various switching transistors, such as transistors M1, M2, M3 and M4. Gate driver 930 provides switching signals in a manner appropriate to the particular topology.

Cascaded Fly-Back—Clamp Switching:

In an embodiment of a fly-back converter, as the AC input voltage varies across each line cycle, the voltage across the primary side of the transformer may decrease to the point where there is not enough headroom to stop the clamping diode from being forward biased after the leakage inductance has been discharged, thereby preventing energy from being transferred from the primary side to the secondary side. Instead, this energy is transferred back to the primary side. In some embodiments, this condition may stop the power conversion completely and/or overheat the clamp circuits. This could occur, for example, near the zero crossing of the AC line signal. In some embodiments, by disconnecting the clamp diodes when the AC input voltage is low, energy may continue to be transferred from the primary side to the secondary side of the transformer. In various embodiments, the clamp diodes are disconnected via a switch that opens a low frequency recovery path when the input voltage falls below a predetermined threshold.

A drain voltage of a switch of the primary side may rise to a value that is a sum of the input voltage and a reflected output voltage while the transformer is demagnetizing. If this voltage is lower than twice the input supply voltage, then energy is not transferred from the primary side to the secondary side. Instead the energy is transferred back to the primary side through the clamp diode(s) as the transformer demagnetizes to whichever winding is connected first. In various embodiments, energy is transferred when the voltage at the drain node of the switch is greater than or equal to the sum of the input voltage and the reflected output voltage when the transformer is being demagnetized. Thus, a minimum input voltage is maintained at the primary side in order to transfer energy from the primary side to the secondary side. Maintaining such a condition may be challenging for power converters having rectified AC inputs that produce low voltages over the AC line cycle.

Figure 10A:
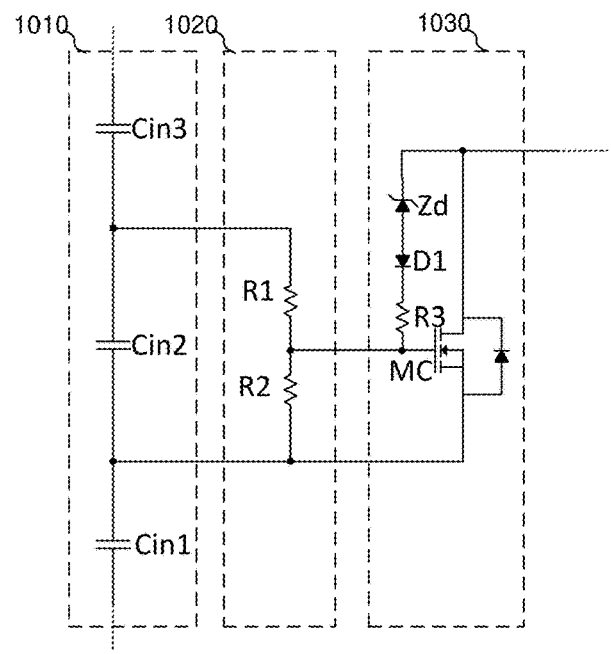
FIGS. 10A and 10B illustrate schematics of embodiment clamp switches.

FIG. 10A shows an embodiment a clamp switch 1030 that may be used to replace bypass resistor Rbyp described in FIG. 7A and provides the ability to disable clamping when it is not needed. Clamp switch 1030 is controlled by voltage divider 1020 from an adjacent stage in the primary side coupled in series, which includes resistors R1 and R2 which are coupled to a control node of clamp switch 1030. Voltage divider 1020 is connected across the input capacitor 1010 of a stage that is coupled above the stage where the clamp switch is connected. The division ratio of voltage divider 1020 is chosen according to a threshold voltage of a MOS transistor Mo used in clamp switch 1030. Clamp switch 1030 turns off as the voltage across input capacitor 1010 decreases below a threshold and turns on when the voltage increases above a threshold. In embodiments wherein an AC line input is used, the resistor divider is used to turn on and off the clamp switch at a frequency of the rectified AC line input, which may be, for example, 120 Hz. In some embodiments, clamp switch 1030 can be implemented with a very weak MOS and can be controlled by voltage divider 1020 having high-valued resistors. A drain terminal of clamp switch 1030 is coupled to the output of the clamp circuit and a source terminal of clamp switch 1030 is coupled to input capacitor Cin of the next stage.

In various embodiments, clamp switch 1030 is turned off or on based on the input voltage. When clamp switch 1030 is turned off, the drain of transistor MC and may drift to a high voltage because of remaining current coming from the clamp circuit as time elapses. This may create an overvoltage condition on the drain terminal of clamp switch 1030, which may be reduced or eliminated by having a self-regulating clamp circuit coupled between the drain and the gate terminal of clamp switch S1. The self-regulating clamp circuit includes Zener diode Zd connected in series with a diode D1 in and resistor R3 as shown in FIG. 110A. The cathode of Zener diode Zd is connected to the drain terminal of clamp switch 1030 and resistor R3 is connected to the gate terminal of clamp switch 1030. Diode D1 and Zener diode Zd have opposite polarities to allow the gate terminal voltage to be pulled above the drain terminal voltage during turn on of clamp switch 1030. Series resistor R1 is used to limit an oscillation that may be seen during the activation of Zener diode Zd to clamp in the reverse direction.

In various embodiments, clamp switch 1030 is controlled by an output of voltage divider 1020 formed by resistors R1 and R2. The input to the sensing circuit is coupled to a stage having an input capacitor Cin2. The source node of clamp switch 1030 is connected to the common node of input capacitors Cin1 and Cin2 and a drain node of clamp switch 1030 is connected to a positive terminal of the bypass capacitor of the clamping circuit connected to a switch node of the stage across which input capacitor Cin1 is connected. Each stage has the same amount of voltage across the input capacitor string therefore the input of one clamp circuit may as well be connected to another stage with the same result. The switch turns off when the voltage at the input string goes below a threshold and the switch turns on when the input voltage goes above a threshold.

Clamp switch 1030 is formed by a MOS transistor MC. A drain and a source of MOS transistor MC is used to replace bypass resistor Rbyp. The drain is coupled to an output of a clamp diode and to a positive terminal of a bypass capacitor of a first stage and the source is coupled to an input capacitor of a second stage. By coupling the clamp diode to the bypass capacitor as well as the clamp switch, the clamp switch is able to carry the current from the clamp diode without being significantly oversized in some embodiments. A gate of MOS transistor MC is controlled by voltage divider 1020 coupled across the input capacitor of a third stage that is placed next to the second stage. A self-regulating clamp circuit that includes Zener diode Zd coupled in series with a diode D in opposite polarity and a series resistor R is coupled between the drain and the gate of MOS transistor MC. A cathode of Zener diode Zd is coupled to the drain and the resistor is coupled to the gate. The self-regulating clamp circuit prevents excessive charge build up at the drain of MOS transistor MC when it is turned off during a low voltage input. Such an excessive charge build up may increase the voltage at the drain and cause an overvoltage stress to a primary switch coupled in series with a primary winding or it may cause an overvoltage to the clamp switch itself.

When the drain voltage goes high and crosses the Zener voltage, the Zener clamp activates and turns on MOS transistor MC and discharges the voltage across its drain and limits the voltage to a value that is approximately equal to:

$$Vgs \approx Vz - Vf \quad (1)$$

where Vgs is a gate to source voltage of transistor MC, Vz is a reverse clamp voltage of the zener diode and Vf is forward voltage drop of the diode in the clamp circuit connected across drain to gate node of transistor MC. In various embodiments, Vgs is limited to Vz−Vf during linear operation of the clamp switch in which maximum power is transferred. Resistor R is used to prevent oscillation at the gate of MOS transistor MC if the voltage discharge is too rapid. The power dissipation during the overvoltage takes place in the clamp switch and not the Zener diode. This allows the use of a lower power Zener diode Zd.

Figure 10B:
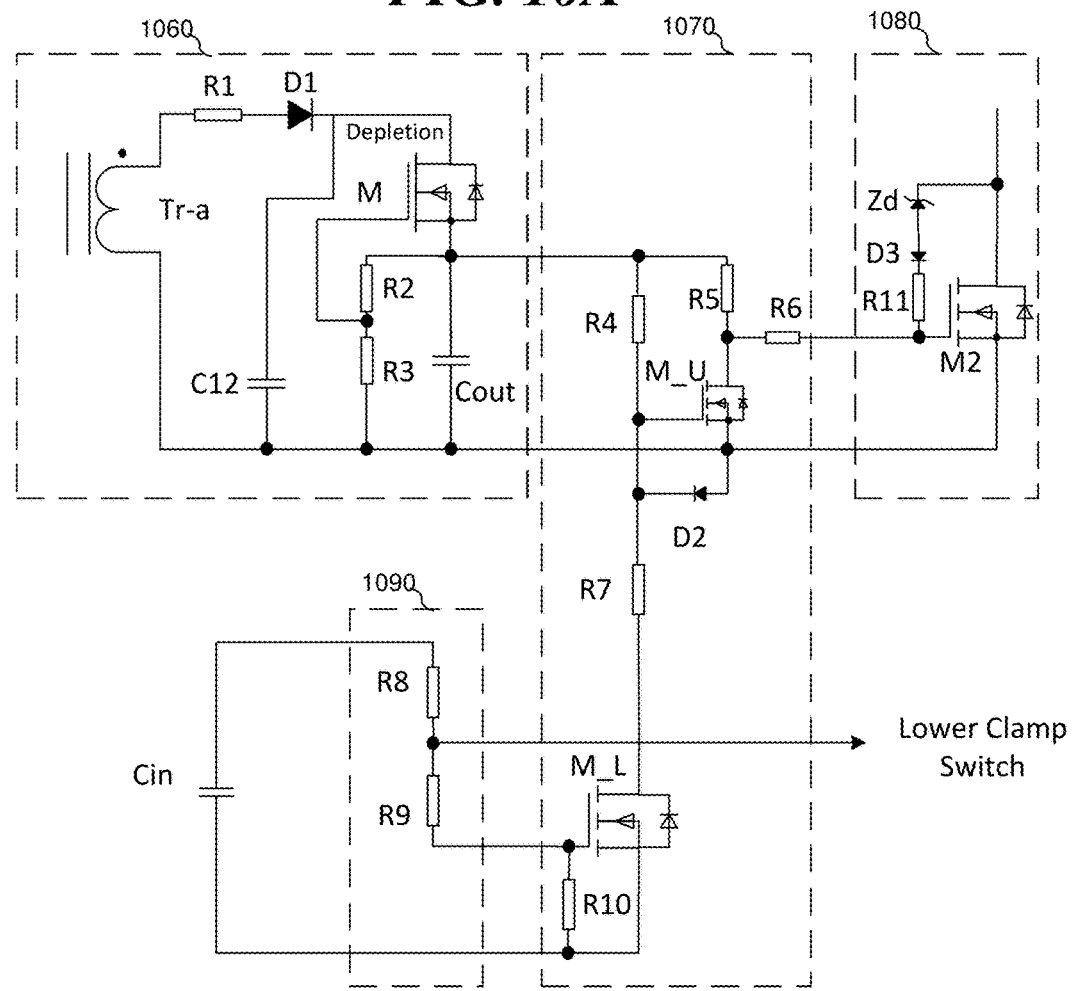

In some embodiments, the clamp switch described in FIG. 10A is not used for an uppermost stage that is connected to an input supply as it does not have another stage next to it. Instead, a level shift circuit is used to operate the clamp switch as shown in FIG. 10B. The clamp switch for the uppermost stage is formed by an auxiliary power supply 1060, a level shift circuit 1070, a clamp switch 1080 and a voltage sensor 1090. Auxiliary power supply 1060 is formed by an auxiliary winding with the polarity in the same direction as the secondary side coil of a transformer. Auxiliary winding Tr-a has a series resistor R1 that is used to limit an over shoot of the voltage at auxiliary winding Tr-a and a rectifying diode D1 to rectify an AC voltage. The rectified voltage is regulated by n-channel depletion-mode MOSFET M whose drain is connected in series with rectifying diode D1 and a gate is connected to a resistor divider formed by a resistor R2 and a resistor R3 connected to the source of the n-channel depletion-mode MOSFET M. The n-channel depletion-mode MOSFET M is generally on and when the output reaches a target voltage the resistor divider connected to the gate turns it off and regulates an output at the source of the n-channel depletion-mode MOSFET M. In some embodiments, optional capacitor C12 is coupled between the drain of MOSFET M and a common node coupled to resistor R3, capacitor Cout and auxiliary winding Tr-a in order to provide a more continuous operation of depletion MOSFET M. An output capacitor Cout is connected at the source to filter the output voltage. In some embodiments, auxiliary winding Tr-a may share the same core as the primary and secondary windings. Alternatively, auxiliary winding Tr-a may be magnetically coupled to a transformer separate from the rest of the switched-mode power supply. For example, auxiliary winding Tr-a may be magnetically coupled to a local and/or auxiliary power supplied used to provide local power to various circuits within the switched-mode power supply. Alternatively, auxiliary winding Tr-a may be replaced by another DC power source such as a DC power supply and/or linear regulator.

The output of regulated auxiliary supply 1060 is used to drive a clamp switch 1080 with a level shifter 1070. Level shifter 1070 is formed by a lower switch M_L that is controlled by a voltage divider 1090 formed by resistors R8, R9 and R10 across an input capacitor Cin. In some embodiments, voltage divider 1090 is reused from stage next to the upper stage. Alternatively, voltage divider is reused from a stage below. As described above, the resistor divider is formed by two resistors across the input capacitor Cin for each of the stages except for the uppermost stage. In the uppermost stage a level shifter 1070 is used to control the clamp switch. The input to the level shifter 1070 is provided by a resistor divider that is used to drive the clamp switch described in FIG. 10A. In this case a common node between resistor R8 and resistor R9 is used to drive the lower clamp switch for lower stages, and a common node between resistor R9 and resistor R10 is used to control lower switch M_L of level shifter 1070. Lower switch M_L has two resistors R4 and R7 connected series with the drain and to the output of the regulated auxiliary supply 1060. Resistor R4 acts a pull up resistor for the gate of upper switch M_U. A common node of the pull up resistors R4 and R7 is used to control a gate of an upper switch M_U in level shift 1070. A drain of upper switch M_U is connected to a second pull up resistor R5 for a gate of clamp switch 1080 and a series resistor R6. Second pull up resistor R5 pulls the gate of clamp switch 1080 to the auxiliary supply with a series resistor R6 coupled between the gate of clamp switch 1080 and the drain of upper switch M_U. In some embodiments, this is done to reduce the switching speed of clamp switch 1080 in order to approximate the speed of the other clamp switches in nominal conditions.

Clamp switch 1080 is similar to switch 1030 described in FIG. 10A. It is formed by a MOS transistor M2 with a self-regulating clamp circuit connected across a gate and a drain of M2. Upper switch M1 in level shift section 1070 may experience a large voltage across its gate and source when lower switching transistor M_L turns on. A diode D2 is coupled between a source node of upper switch M_U and the gate to limit a negative gate source voltage to the diode's forward voltage below a reference node. This reference node is a common node for the source connections of upper switch M_U and MOS transistor M2 in clamp switch 1080. When lower switching transistor M_L turns on, it turns off upper switch M_U and pull up resistor R5 pulls the gate of the clamp switch to regulated auxiliary supply output such that clamp switch 1080 turns on. Similarly, when lower switch M_L turns off as the input voltage goes below a threshold, upper switch transistor M_U is turned on by pull up resistor R4 and pulls the gate of clamp switch 1080 to the reference node of MOS transistor M2 and thereby turning off clamp switch 1080. Clamp switch 1080 is in phase with lower switch M_L; however, the slew rate of clamp switch 1080 is faster than lower switch M_L. The control of lower switch M_L is done by a resistor divider with a high ohmic value and is slower based on the slope of the input voltage. The control for the clamp switch is faster due to the presence of the level shift and hence it is faster in turning on or off. The threshold to turn on the lower switch may be designed to be activated at a higher input voltage than all other clamp switches. The use of a resistor divider from the input capacitors act as an analog control of the clamp switches and causes a slow pulling down to the clamp voltage. However, in the case of level shift 1070 the control to the gate is more digital or abrupt where the control voltage changes rapidly thereby causing a faster slew rate at the output. So, the resistor driver is chosen such that the lower switch M_L of the level shifter is turned on at a lower supply input voltage than other clamp switches. When the supply input voltage increases, other clamp switches turn on before the uppermost clamp switch. The current from the leakage inductance is shifted to other stages before the top stage is being turned on and a lower current turn on can be achieved with turning on the uppermost clamp switch later.

Figure 11:
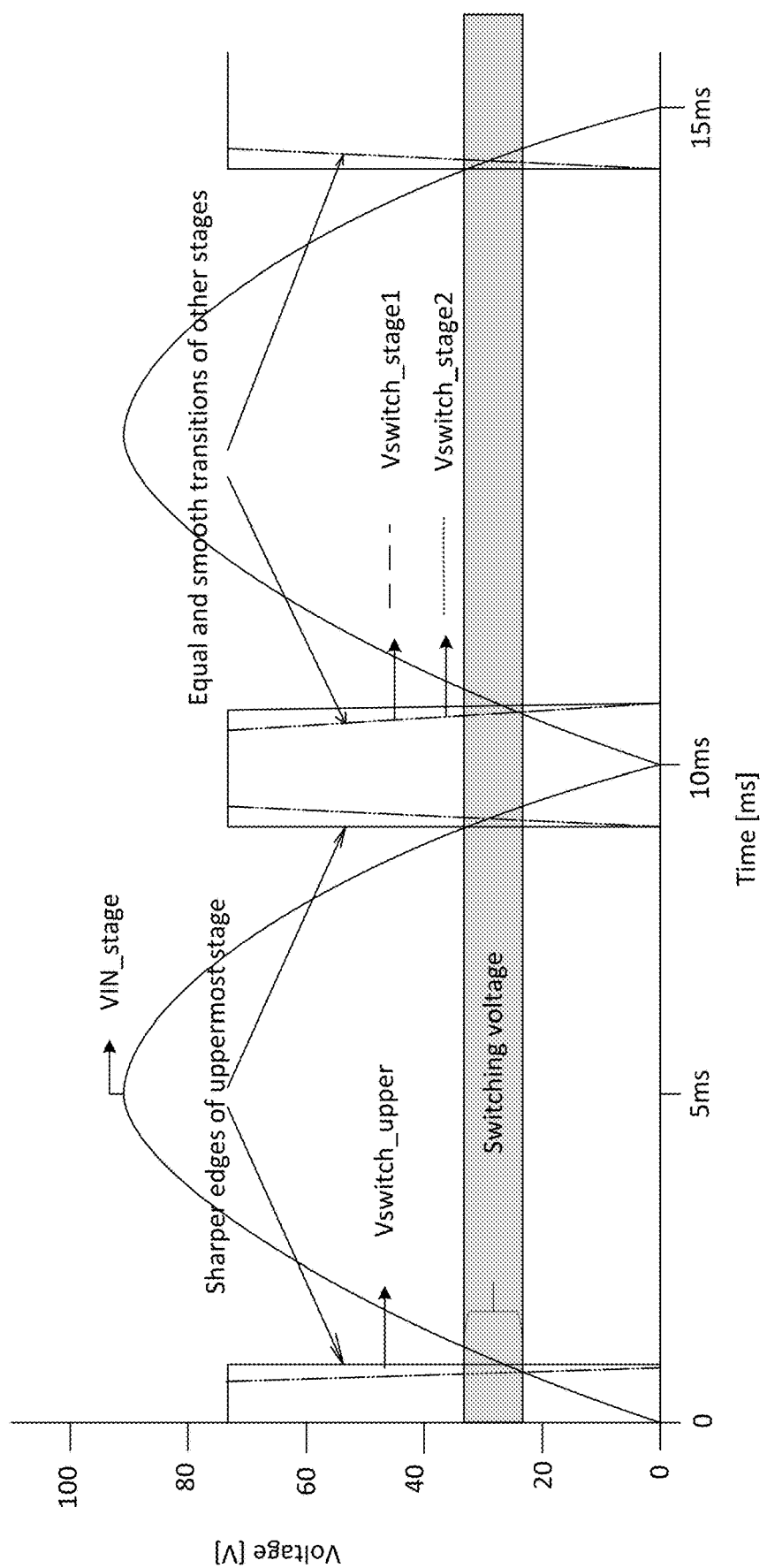
FIG. 11 illustrates a waveform diagram of an embodiment fly-back converter with clamp switches.

FIG. 11 shows a waveform diagram that illustrates the operation of a fly-back converter with multiple stages that use two different types of clamp switches described above. A voltage across the lower clamp switch used in the lower two stages are referred to as Vswitch_stage1 and Vswitch_stage2, whereas the voltage of the uppermost stage's clamp switch is referred to as Vswitch_upper. The switch voltages for three different stages are shown along with a rectified input voltage denoted by VIN_stage that is periodic every 10 milliseconds. The switch voltages Vswitch_stage1 and Vswitch_stage2 go low indicating a turn on of the clamp switch earlier than the Vswitch_upper when the input voltage VIN_stage is rising. The switch voltages Vswitch_stage1 and Vswitch_stage2 goes high later indicating a turn off of the clamp switch later than the Vswitch_upper when the input voltage VIN_stage is falling. The clamp switch for the uppermost stage turns off earlier than the other two stages.

Figure 12:
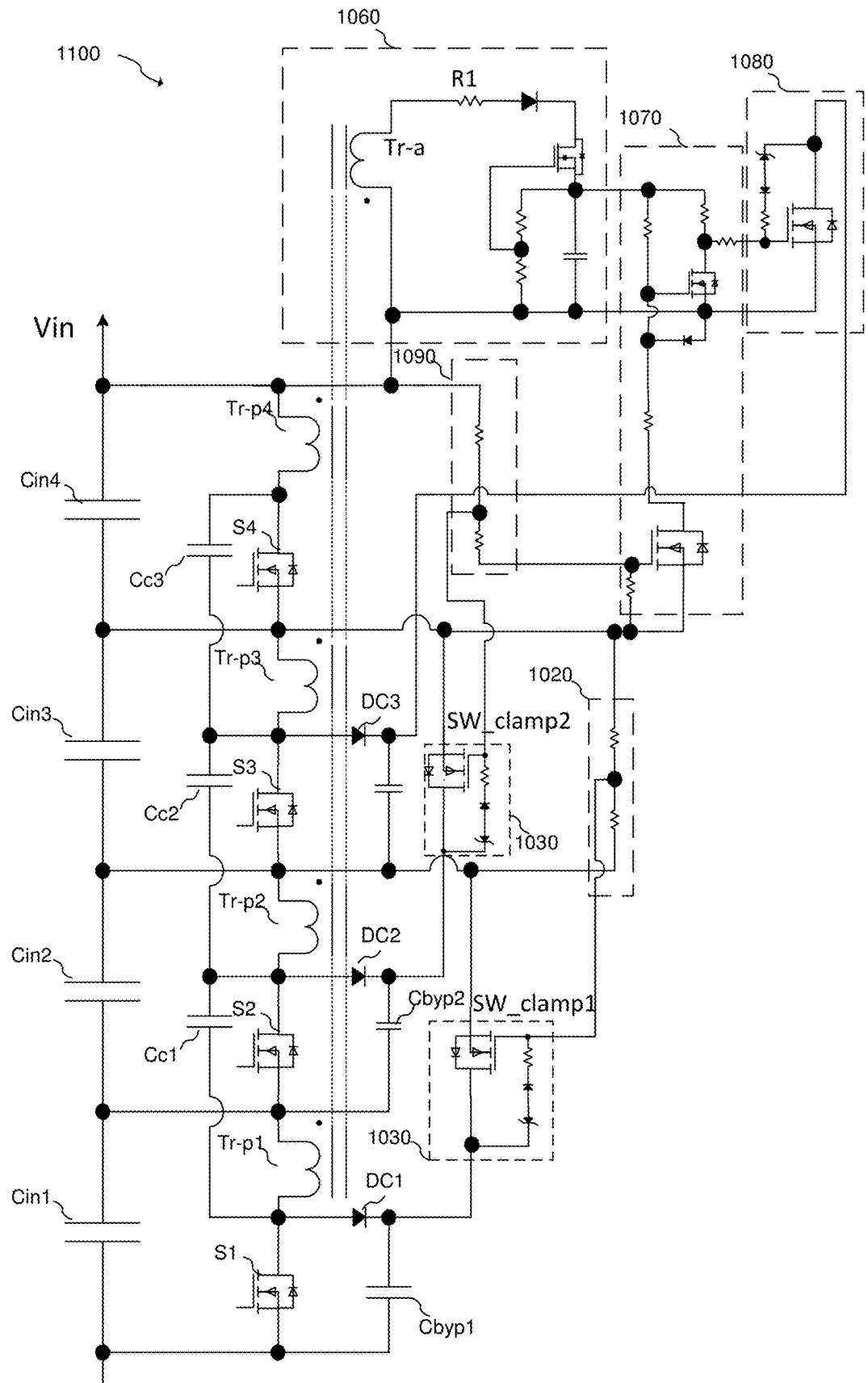
FIG. 12 illustrates a schematic of an embodiment fly-back converter with four cascaded stages in the primary with clamp switches.

FIG. 12 illustrates an embodiment a fly-back converter 1100 that includes synchronizing capacitors, clamping diodes, bypass capacitors and bypass resistors as shown in FIG. 7A with bypass resistors replaced by clamp switches. The fly-back converter 1100 is formed by four cascaded stages and three clamp switches, and one of which is a level shift clamp switch as described earlier. Each of the cascaded primary stages includes an input capacitor Cin, and a primary winding Tr-p coupled in series with a switch S. The cascaded primary stages are arranged such that a first stage is referenced to a ground and a second stage is referenced to the first stage, a third stage is referenced to the second stage and a fourth stage, which is also an uppermost stage, is referenced to the third stage. Energy recovery from each stage is performed by three clamp diodes Dc1, Dc2 and Dc3, respectively, and they are coupled to the switch nodes of the first, second and third stages. The fourth or the uppermost stage does not use an energy recovery clamp diode as the energy recovery is performed with the three synchronization capacitors Cc3, Cc2 and Cc1 coupled between the switch nodes of all four stages. High frequency bypass capacitors Cbyp1, Cbyp2, and Cbyp3 are connected at the output of the three energy recovery clamp diodes Dc1, Dc2 and Dc3 respectively.

Clamp switches 1030 and 1080 are used to turn-on or turn-off the clamping action at the switch nodes of each stage based on an input voltage Vin. The first clamp switch SW_clamp1 is coupled between a cathode of the clamp diode Dc1 and the input capacitor Cin3 of the second stage, where the extracted energy is stored. A second clamp switch SW_clamp2 is coupled between a cathode of clamp diode Dc2 of the second stage and an input capacitor Cin3 of the third stage. The clamping of the switch node of the fourth or the uppermost stage is performed by clamp switch 1080 that uses an auxiliary regulated supply 1060 and a level shifter circuit 1070. A lower switch M_L of level shifter circuit 1070 is controlled by voltage divider 1090 that is also used to control the clamp switch SW_clamp2 responsible for clamping the switch node of the second stage. The switch node of the third stage is clamped by having the cathode of the clamp diode coupled to the input voltage.

Cascaded Fly-Back—Basic Structure with Cascading in Primary and/or Secondary

Figure 13A:
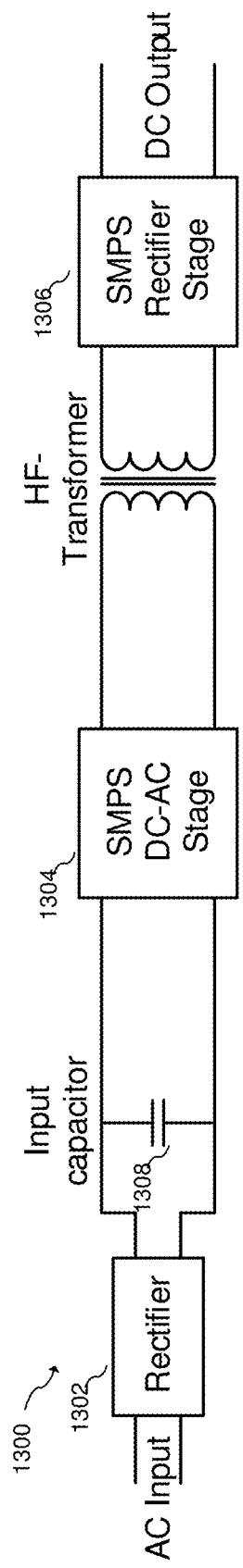
FIG. 13A illustrates a conventional AC-DC SMPS converter with a non-cascaded primary transformer.

FIG. 13A shows a conventional AC-DC SMPS converter 1300 that includes a rectifier 1302 rectifying an AC line input, an input capacitor 1308 connected at the output of the rectifier 1302 to decrease input ripple and reduce harmonics. The input capacitor 1308 is coupled across an SMPS DC-AC stage 1304 converting a rectified AC input to a high frequency AC output. The AC output from the SMPS DC-AC stage 1304 is isolated from the output by a High Frequency (HF) transformer connected at the output of the SMPS DC-AC stage 1304. A secondary side of the HF transformer is coupled to an SMPS rectifier stage 1306 that rectifies an AC output at the secondary side of the HF transformer and provides a desired DC output.

Figure 13B:
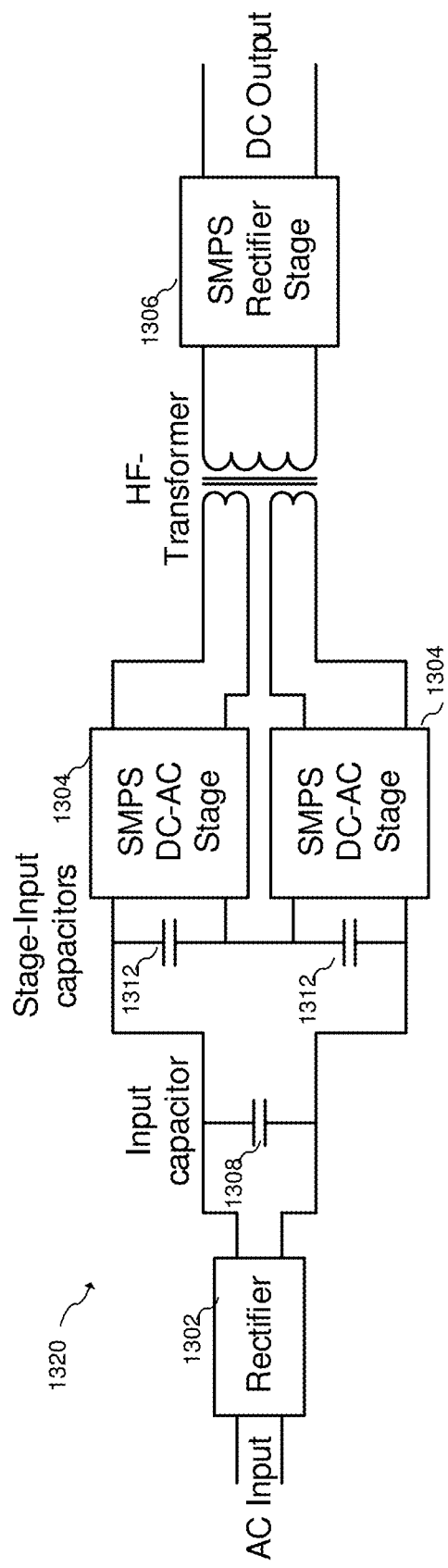
FIG. 13B illustrates an embodiment AC-DC SMPS converter with cascaded primary transformer.

In embodiments of the present invention, a single SMPS DC-AC stage 1304 can be replaced with two SMPS DC-AC stages coupled in series with a stage input capacitor across each stage. FIG. 13B shows an embodiment AC-DC SMPS converter 1320 where a primary winding of the HF transformer is split into two windings cascaded in series and each primary winding is driven by an SMPS DC-AC stage 1304 cascaded to one another. Each stage 1304 has a stage input capacitor 1312 to balance transients and switching ripple. The stage input capacitor 1308 across the two cascaded stages is also used to further reduce switching ripple as well as sharp transients from the line input. The secondary side of the HF transformer is coupled to an SMPS rectifier stage 1306 to rectify the high frequency AC output at the secondary side of the HF transformer and provide a desired DC output. In embodiments directed toward flyback converters, AC-DC SMPS 1320 converter uses a cascaded primary winding of an HF transformer and stage input capacitors 1312 to increase an efficiency of the power conversion, and to use low voltage switching devices in the SMPS DC-AC stage thus avoiding an overvoltage situation.

Figure 14A:
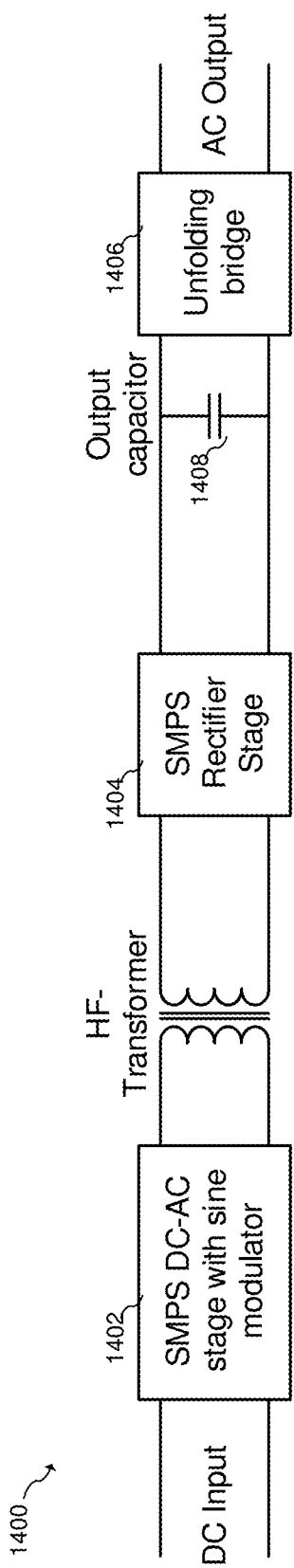
FIG. 14A illustrates a conventional DC-AC SMPS converter with non-cascaded transformer.

Embodiments of the present invention may also be applied to a power inverter. FIG. 14A shows a conventional DC-AC SMPS converter 1400 that includes an SMPS DC-AC stage with sine modulator 1402 that is coupled to an HF transformer primary side and a secondary side of the HF transformer is coupled to an SMPS rectifier stage 1404 with an output capacitor 1408 coupled at the output. The output of SMPS rectifier stage 1404 is further coupled to an unfolding bridge 1406 to provide an AC output. A rectified sinusoid is converted into a full sinusoid using the unfolding bridge 1406.

Figure 14B:
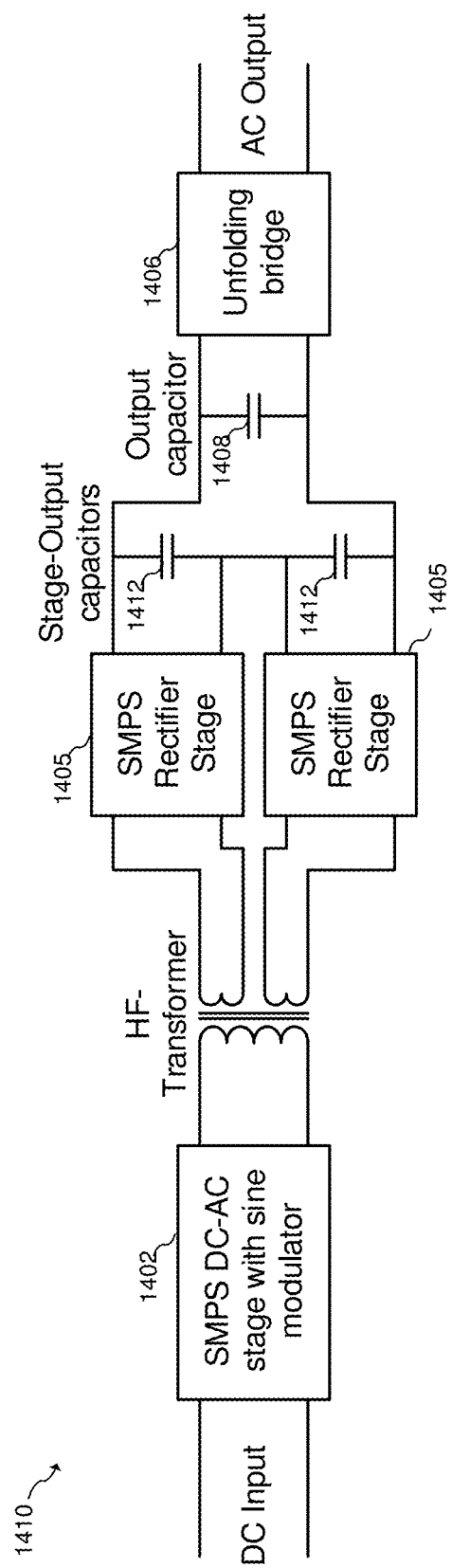
FIG. 14B illustrates an embodiment DC-AC converter with a transformer having a cascaded secondary SMPS rectifier stage.

FIG. 14B shows an embodiment DC-AC SMPS converter 1410 that utilizes the cascaded secondary winding in the transformer with cascaded SMPS rectifier stages 1405. Each SMPS rectifier stage 1405 includes a stage output capacitor 1412 and output capacitor 1408 across the cascaded stages 1405. In various embodiments, for example fly-back converters, SMPS rectifier stages 1405 may have the same construction and operation as embodiment cascaded primary stages as described hereinabove, with the exception that the direction of the current is different. That is, rather than the cascaded primary stages supplying power to the transformer, the cascaded secondary stages receive power from the transformer. In various embodiments, the cascaded stages at the secondary side of the HF transformer may utilize low voltage components as described above with respect to cascaded primary stages.

Figure 15A:
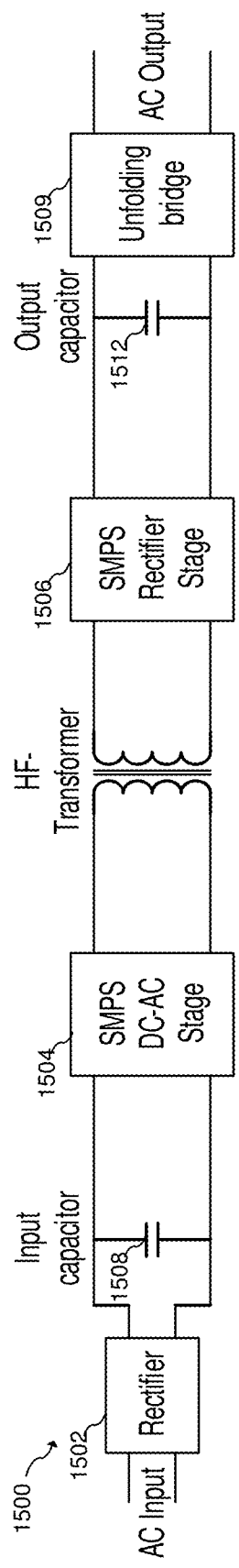
FIG. 15A illustrates a conventional AC-AC SMPS converter with non-cascaded primary and secondary.

FIG. 15A shows a conventional AC-AC SMPS converter 1500 that includes a rectifier 1502 across an AC line input. The output of rectifier 1502 uses an input capacitor 1508 to filter line ripple, reduce harmonics, and provide a rectified output to SMPS DC-AC stage 1504. The rectified output is converted to a high frequency AC output from SMPS DC-AC stage 1504, and the HF-AC output is isolated from the next stages by having an HF transformer connected to it. The secondary side of the HF transformer is coupled to an SMPS rectifier stage 1506 to rectify the ouptut of the HF transformer which is further filtered by an output capacitor 1512. The rectified output available at the output capacitor 1512 is then converted to a full sinusoid by an unfolding bridge 1509 to provide a desired AC output.

Figure 15B:
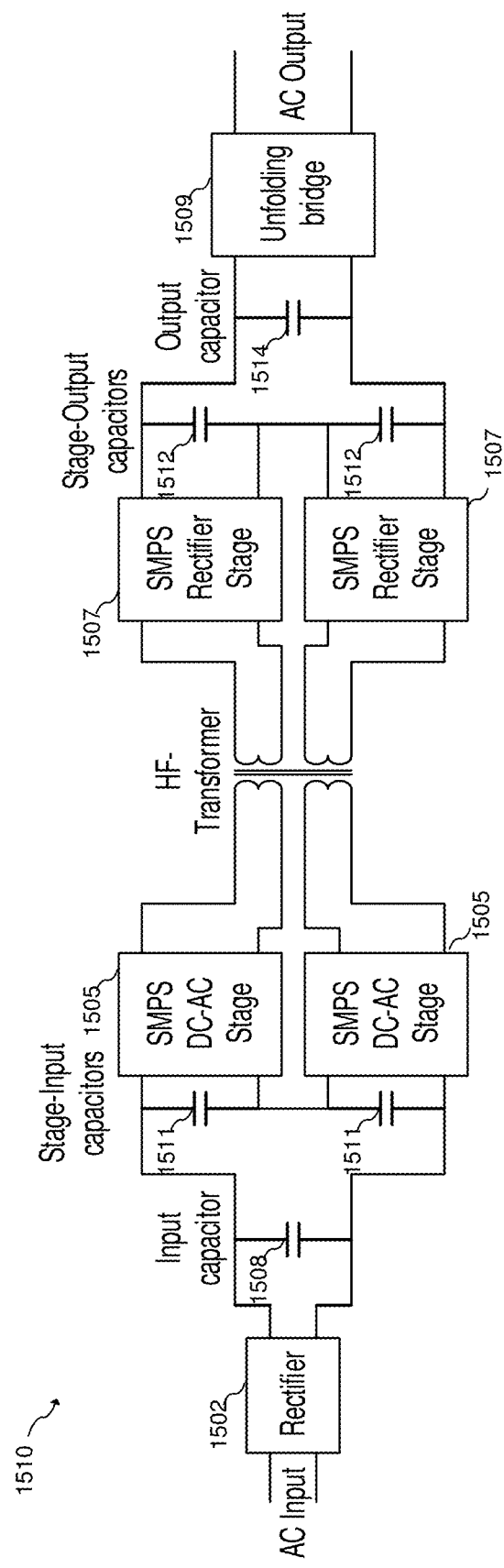
FIG. 15B illustrates an embodiment AC-AC SMPS converter with cascaded primary DC-AC stage and cascaded secondary SMPS rectifier stage.

An embodiment AC-AC SMPS converter 1510 is also shown in FIG. 15B in which the DC-AC stage 1504, HF transformer and rectifier stage 1506 are replaced by embodiment cascaded multi-winding structures. As shown, converter 1510 has cascaded primary stages 1505 and a multi-winding HF transformer and cascaded secondary stages 1507. The cascaded primary stages 1505, secondary stages 1507 and HF transformer may be implemented using embodiment cascaded power supply stages as described with respect to embodiments above. As shown, each stage 1505 has a stage input capacitor 1511 coupled across it to balance out voltage differences across each cascaded stage switching transitions of the primary side, and each of the cascaded SMPS rectifier stages 1507 includes a stage output capacitor 1512 to balance out the rectified output voltage in the cascaded stages during the switching transitions and thereby allowing low voltage switching components in each stage. An output capacitor 1514 is coupled across cascaded stage output capacitors 1512 to filter ripple in the rectified sinusoid from SMPS rectifier stages 1507. The unfolding bridge 1509 is used to convert the rectified sinusoid to a desired fully sinusoid AC output.

Figures 16A, 16B, 16C:
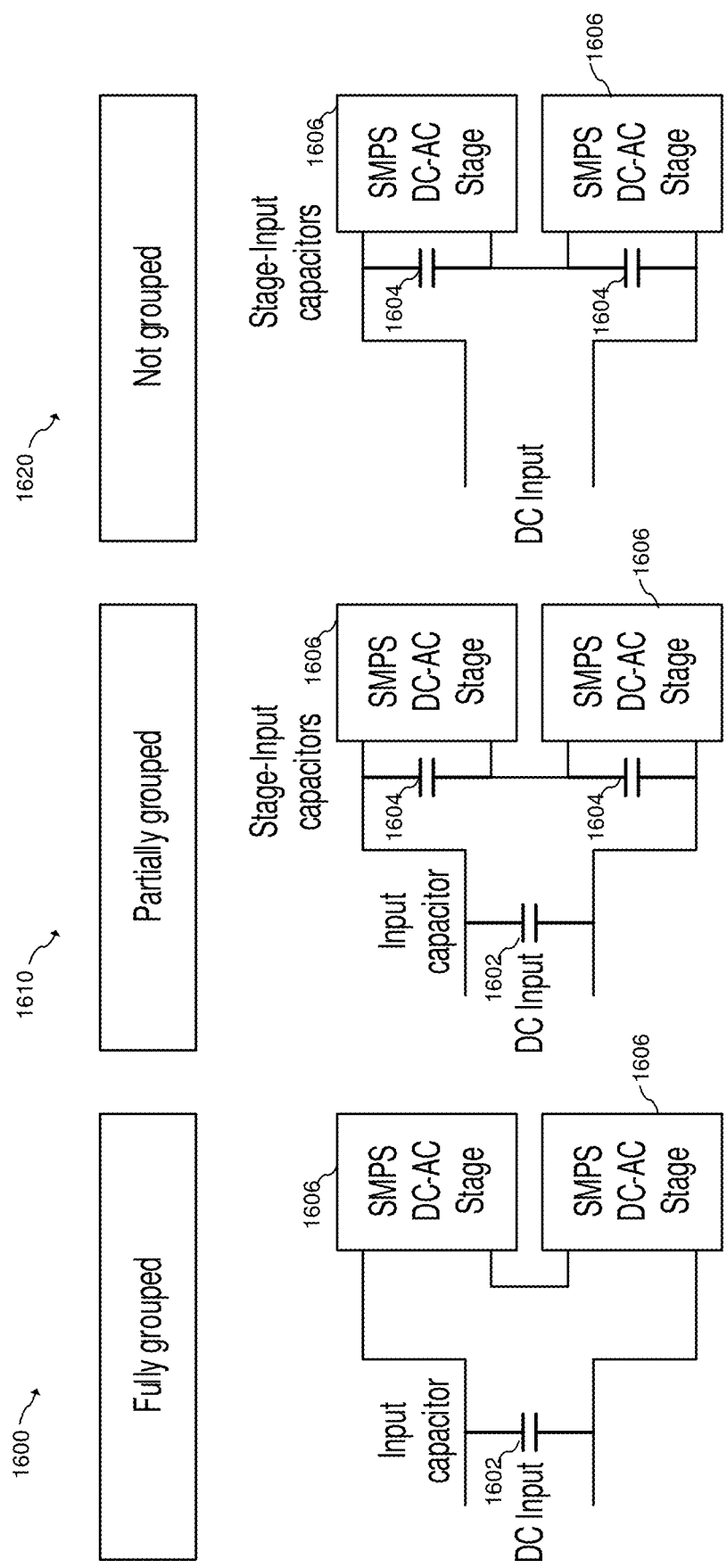
FIGS. 16A-16C illustrate embodiment power converters having different groupings of input capacitors.

FIGS. 16A-16C illustrate block diagrams of embodiment cascaded primary stages that utilize various groupings of input capacitors. It should be understood that, in alternative embodiments, these grouping could be applied to output capacitors of embodiment cascaded secondary stages. FIG. 16A illustrates primary stages 1600 having fully grouped capacitor arrangement. As shown, one input capacitor 1602 is coupled across a cascaded SMPS DC-AC stages 1606. Input capacitor 1602 reduces an input ripple in the DC input applied to the primary side of the SMPS DC-AC stage 1606.

FIG. 16B illustrates primary stages 1610 having a partially grouped capacitor arrangement in which the input of each SMPS DC-AC stage 1606 is coupled to its own input capacitor 1604 in addition to input capacitor 1602 being coupled across all cascaded stages 1606. In embodiment flyback converters, input capacitors 1604 coupled to each cascaded stage 1606 may be used as high frequency transition buffers and input capacitor 1602 is used to mitigate ripple in a similar manner as the embodiment of FIG. 16A.

FIG. 16C illustrates primary stages 1620 having an ungrouped capacitor arrangement in which the input of each SMPS DC-AC stage 1606 is coupled to its own input capacitor 1604 but not to a global input capacitor across all stages. In an embodiment, a value of input capacitors 1604 are be chosen such that it exceeds the value needed by a DC-DC-SMPS bulk capacitor to compensate for switching ripple.

Single Stage AC-DC Converter—Parallel Output Compensation:

One of the issues faced in AC to DC power conversion is line ripple. Essentially, when a switched mode power converter converts a rectified AC voltage to a DC voltage line ripple may appear at the output of the switched mode power converter because of the varying amount available power due to the voltage variation within the AC line cycle. For example, when the AC line voltage is at or near a zero crossing, little or no power is available for power conversion, thus causing the output current of the switched mode power converter to be low. On the other hand, when the AC line voltage is at or near its peak, more power may be available to the load than is needed by the load.

One way of dealing with this varying amount of available power is to use a large storage capacitor coupled to the output of the power converter. This storage capacitor stores energy during higher voltage portions of the AC line cycle and then supplies power during low voltage portions of the AC line cycle. By using such a storage capacitor, the amount of voltage ripple seen at the output of the power converter is inversely proportional to the size of the storage capacitor. Depending on the particular application and its specifications, this storage capacitor may become very large and/or cost prohibitive and/or may not fully reduce the ripple voltage within the particular applications specified limits. In addition, the presence of a large storage capacitor at the output of the power converter may make fast load regulation difficult.

Another way in which output ripple voltage may be addressed is by using second power converter stage. For example, a first power supply stage may convert an AC voltage or a rectified AC voltage to a first DC voltage having some ripple, and then a second power supply converts the first DC voltage into a regulated output voltage having little or no ripple. The use of a second power converter stage, however, has additional costs associated due to additional power consumption and board area.

In embodiments of the present invention, power is transferred to an additional storage capacitor that is at least partially decoupled from the output of the power supply during higher voltage portions of the AC line cycle. During lower portions of the AC line cycle, energy is transferred from the additional storage capacitor to the output of the power supply to provide power to the load. In some embodiments, energy is transferred back and forth between the output of the power supply and the additional storage capacitor via a switched mode power supply such as a buck converter.

Figure 17:
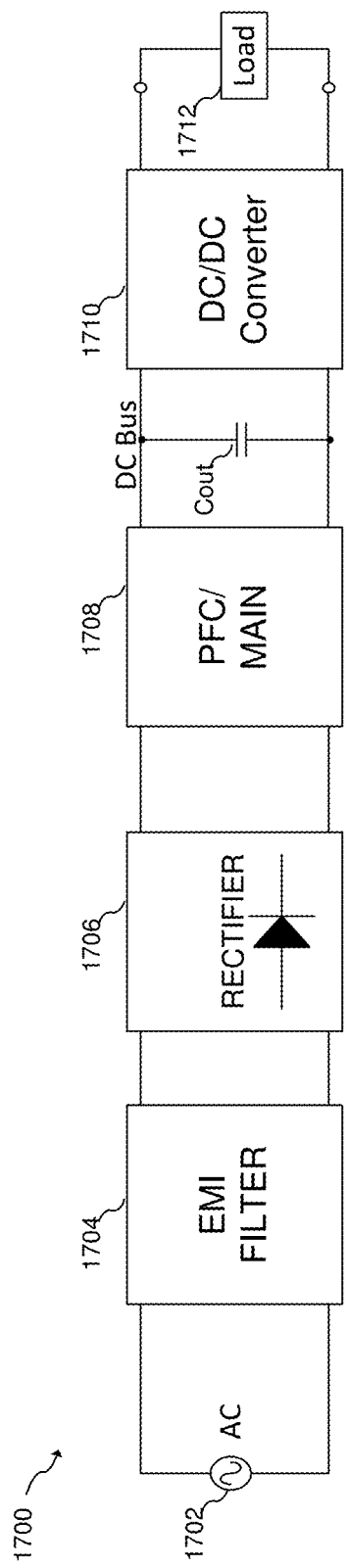
FIG. 17 illustrates an example two-stage AC/DC switched-mode power supply.

FIG. 17 illustrates a two-stage AC/DC converter 1700 that converts an AC input voltage 1702 to a DC voltage to supply load 1712. As shown, AC input voltage 1702 is rectified using rectifier 1706 and converted to a first DC voltage across capacitor Cout using power converter 1708. In many AC line applications, power converter 1708 is implemented using switched-mode power converter that also performs power factor correction (PFC) to ensure that the input current of power converter 1708 follows its input voltage. EMI filter 1704 may be used to lowpass filter input AC voltage 1702 to reduce high frequency line interference. As mentioned above, capacitor Cout stores energy from power converter 1708 when AC input voltage 1702 is at higher voltage portions of the input AC line cycle and provides energy when AC input voltage 1702 is at lower portions of the input AC line cycle. Second stage DC/DC converter 1710 converts the first DC voltage across capacitor Cout to an output DC voltage across load 1712. As is further mentioned above, the use of second stage DC/DC converter may reduce the amount of ripple voltage seen across load 1712.

Figure 18A:
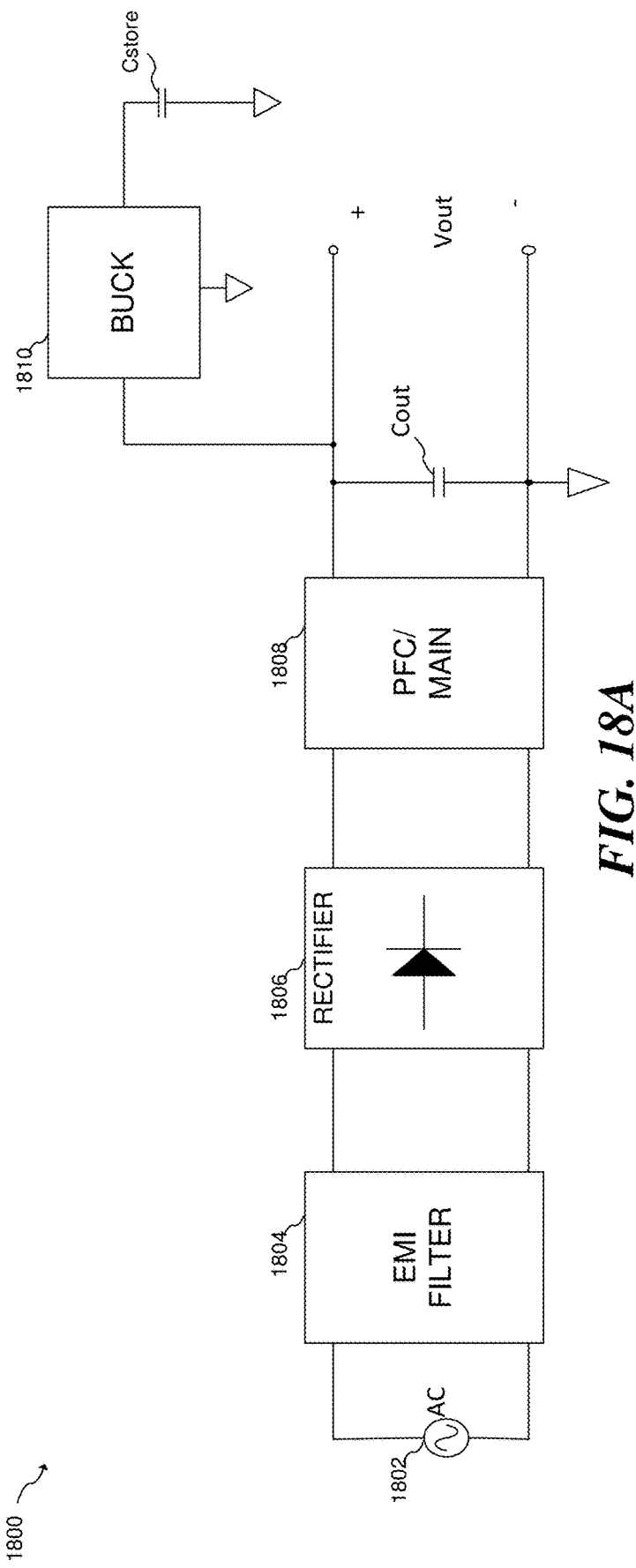
FIG. 18A illustrates an embodiment AC/DC SMPS converter using a PFC with a buck regulator.

FIG. 18A illustrates an embodiment power converter 1800 that provides an output voltage Vout across capacitor Cout that is coupled to the output of the first stage power converter 1808. In various embodiments, first stage power converter 1808 may be implemented using embodiment multiple primary stage power converters described above. In some embodiments, first stage power converter may also be configured to provide power factor correction. During operation, buck converter 1810 transfers excess energy delivered by first stage power converter 1808 to storage capacitor Cstore during higher voltage portions of the AC line cycle of AC input voltage 1808. During lower voltage portions of the AC line cycle of AC input voltage 1808, buck converter transfers energy from storage capacitor Cstore to Cout and/or any load coupled to the output of first stage power converter 1808. In some embodiments, buck converter 1810 adjusts its duty cycle based on the ripple associated with the voltage at capacitor Cout.

In various embodiments, buck converter 1810 regulates the output of the PFC stage 1810 using a high enough bandwidth to quickly respond to voltage ripple at the output of first stage power converter 1808. During operation, buck converter 1810 attempts to maintain a constant voltage at the output of first stage power converter 1808 while the voltage across capacitor Cstore is permitted to vary as capacitor Cstore is charged and discharged. In some embodiments, the voltage across capacitor Cstore is limited to a voltage range having an upper limit and a lower limit. The upper limit is a function of the voltage across capacitor Cout, which is reached when buck converter 1810 operates at a duty cycle ratio of 100%. The lower limit may be set to limit the maximum amount of current provided by Cstore. Because the energy stored by capacitor Cstore is related to the square of its voltage, capacitor Cstore is more efficient at storing energy at higher voltages than at lower voltages. As the voltage across capacitor Cstore decreases, buck converter 1810 operates at higher and higher currents in order to transfer a same amount of power. For example, half of the energy in Cstore has already been discharged from capacitor Cstore when the voltage across Cstore decreases from 100% of its maximum voltage to about 70% of its maximum voltage. In some embodiments of the present invention, the voltage across capacitor Cstore is controlled to be above about 40% of this maximum voltage. Alternatively, other upper and lower limits may be used depending on the particular embodiment and its specifications.

In an embodiment, buck converter 1810 operates at a switching frequency of about 400 KHz and has a regulation loop bandwidth of about 40 KHz. In such an embodiment, the high bandwidth of buck converter 1810 can respond quickly to transient output load conditions. In alternative embodiments, other switching frequencies and regulation loop bandwidths may be used according to the particular application and its specifications.

Figure 18B:
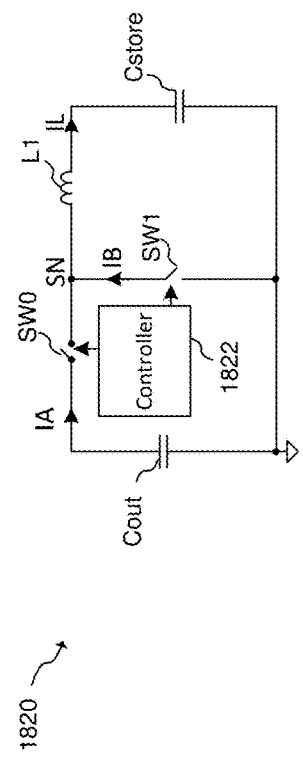
FIG. 18B illustrates an embodiment buck converter.

FIG. 18B illustrates an example buck converter 1820 that may be used to implement buck converter 1810 shown in FIG. 18A. As shown, buck converter 1820 includes inductor L1 coupled to capacitor Cstore. Switches SW0 and SW1 selectively couple one end of inductor L1 to the top plate of capacitor Cout and to ground under the control of controller 1822. During operation, energy is transferred from Cout to Cstore by closing switch SW0, thereby causing inductor L1 to become magnetized as current IA flows from capacitor Cout to capacitor Cstore. Next, switch SW0 is open and switch SW1 is closed to allow inductor L1 to demagnetize through switch SW1. During this time current IB flows through inductor L1 until inductor L1 is demagnetized and switch SW1 is opened. The cycle repeats itself when switch SW0 is closed and inductor L1 is magnetized again. During operation, the voltage across Cout may be regulated by adjusting the duty cycle of the PWM switching signals applied to switch SW0. In various embodiments, switch S1 operates as a synchronous rectifier such that switch S1 is closed when the voltage at node SN1 is below ground. Controller 1822 may be configured to provide non-overlapping switching signals to switches SW0 and SW1. Alternatively, switch S1 may be replaced with a diode.

Figure 18C:
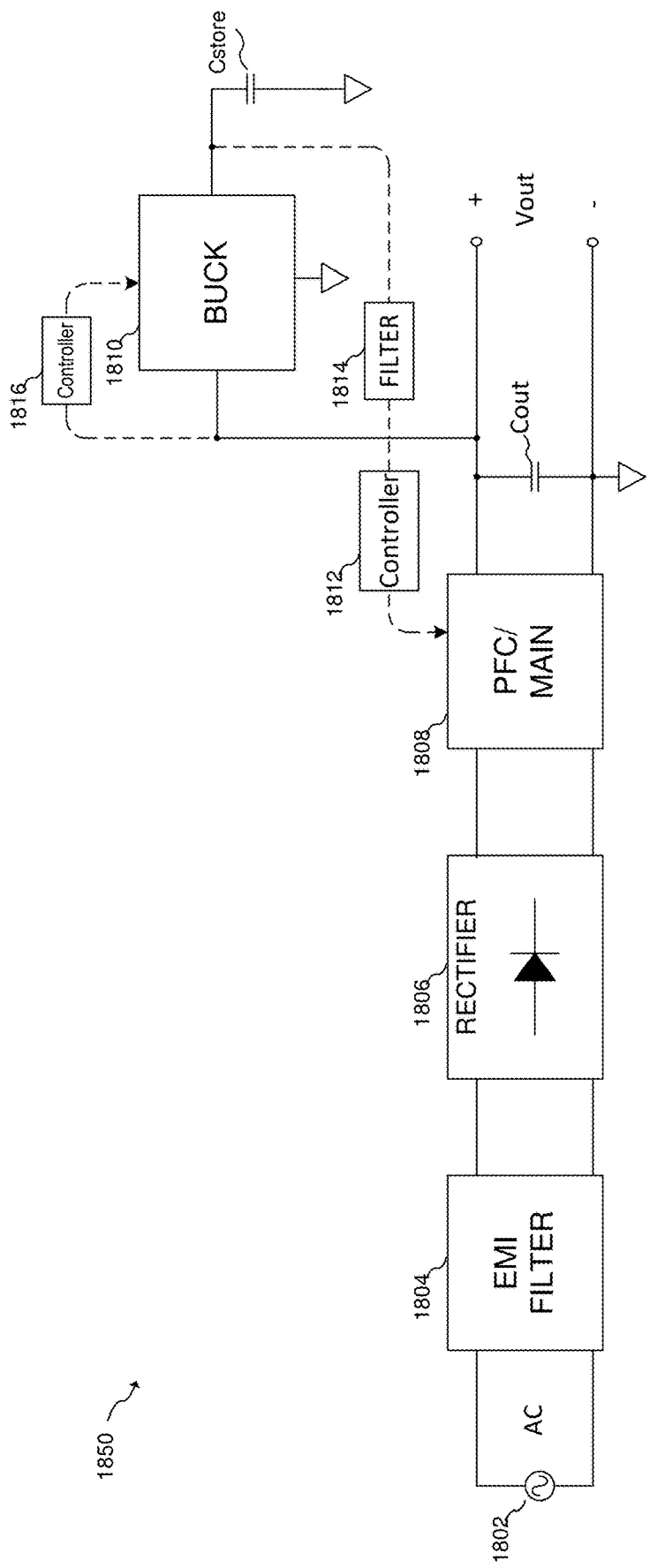
FIG. 18C illustrates an embodiment AC/DC SMPS converter that includes a filter and a PID controller.

FIG. 18C illustrates a further embodiment power supply system 1850 that is similar to power converter 1800 shown in FIG. 18A with the addition of controllers 1812 and 1816 and filter 1814. In various embodiments, a controller 1816 coupled to the input of buck converter 1810 forms a feedback loop that regulates output voltage Vout. During operation, controller 1816 feeds back the output voltage Vout of first stage power converter 1808 and buck converter 1810 and is compared with a reference signal (not shown). As voltage Vout varies, the switching duty cycle provided by controller 1822 (FIG. 18B) within buck converter 1810 is modified in response to the output of controller 1816. For example, when the voltage across capacitor Cout decreases, controller 1816 adjusts the duty cycle of buck converter in order to transfer charge from storage capacitor Cstore to capacitor Cout in order to increase the voltage across capacitor Cout. Likewise, when the voltage across capacitor Cout increases, controller 1816 adjusts the duty cycle of buck converter in order to transfer charge from storage capacitor Cout to capacitor Cstore in order to decrease the voltage across capacitor Cout. In some embodiments, controller 1816 may be implemented by using a proportional-integral differential (PID) controller. Alternatively, other controller architectures known in the art may be used.

In some embodiments, buck converter 1810 and controller 1816 is configured to keep the voltage across capacitor Cout substantially ripple free and remove or attenuate the high frequency components from output voltage Vout. Hence, the regulation loop of buck converter 1810 is connected to its own input via controller 1816 so that the buck converter 1810 attempts to keep its input at the reference voltage of the converter. For example, if power supply system 1850 is configured to provide a voltage of 12 V at Vout and voltage across capacitor Cout goes a little higher than 12 V, then buck converter 1810 increases its duty cycle starts charging capacitor Cstore, in order to reduce output voltage Vout back down to 12 V. On the other hand, when capacitor Cout goes a little below 12 V, buck converter 1810 decreases its duty cycle and operates in reverse (boost) operation to cause charge to be transferred from capacitor Cstore to capacitor Cout. In some embodiments, when power supply system 1850 is very lightly loaded, buck converter 1810 is operated at a 100% duty cycle, which essentially connects capacitors Cstore and Cout together.

In various embodiments, an additional controller 1812 is used to keep the voltage across capacitor Cstore within voltage boundaries to prevent low voltage conditions across capacitor Cstore that may cause high currents during operation. As shown, controller 1812 is coupled between capacitor Cstore and a control path (not shown) of first stage power converter 1808. Controller 1812 monitors the voltage across capacitor Cstore and adjusts the switching behavior of first stage power converter 1808 in order to maintain the voltage across capacitor Cstore to be within a predetermined range. In various embodiments, optional filter 1814 coupled to the input of controller 1812 may be used to filter the voltage across storage capacitor Cstore. During operation, capacitor Cstore may be charged by increasing the output power of first stage power converter 1808 and discharged by decreasing the output power of first stage power converter 1808 via controller 1812.

Figure 19:
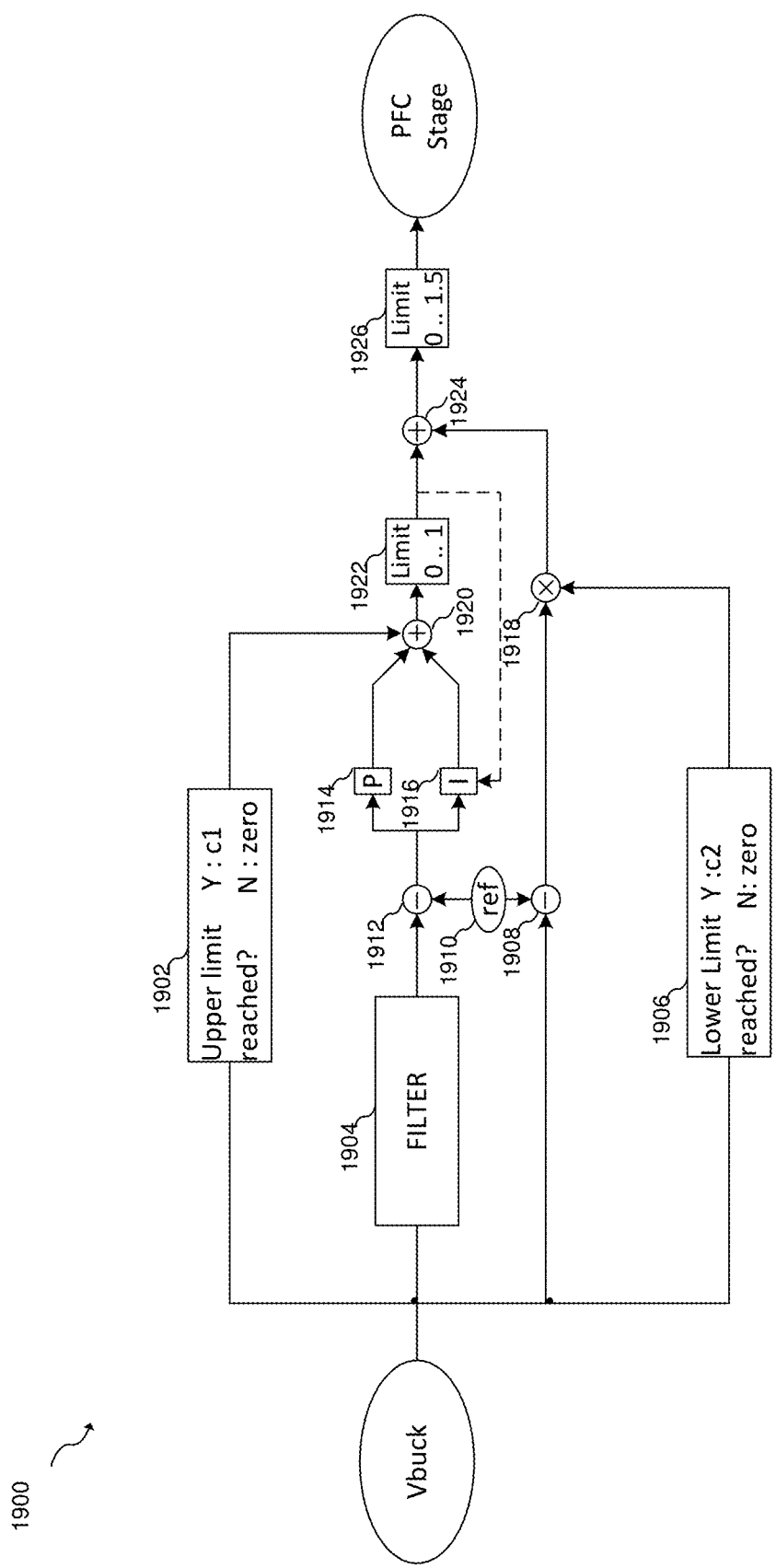
FIG. 19 illustrates an embodiment control circuit used to control a PFC stage.
Figure 20:
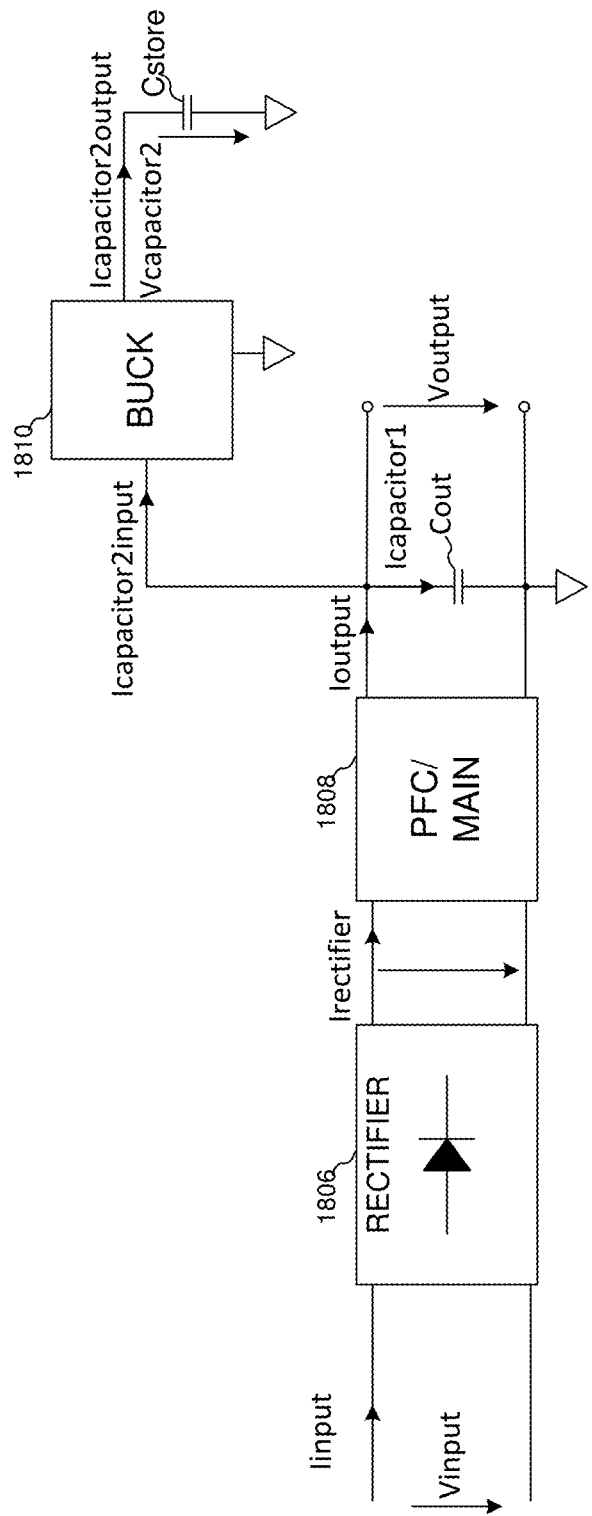
FIG. 20 illustrates an embodiment AC/DC SMPS converter using a PFC and a buck regulator at the output of the PFC.

FIG. 19 illustrates a block diagram of embodiment controller 1900 that may be used to implement controller 1812 coupled between storage capacitor and first stage power converter 1808. In an embodiment, controller is configured to cause the voltage of storage capacitor Cstore to be between a lower limit and an upper limit. In one embodiment, the lower limit is set to be about 40% in order to prevent high current conditions as described above, and upper limit c1 is set to be about 95% of the available output of buck converter 1810 in order to provide some margin to allow the duty cycle of buck converter 1810 to adjust its voltage. Alternatively, other limits may be used.

In FIG. 19, input voltage Vbuck represents the output voltage of buck converter 1810, which corresponds to the voltage across capacitor Cstore in FIG. 18C, and the output of limiter 1926 represents a control signal input of first stage power converter 1808. In various embodiments during nominal operation when the voltage Vbuck is between the upper limit and the lower limit signal Vbuck is filtered using filter 1904, which may be implemented using an averaging filter that takes the average value of the voltage of the capacitor Cstore over one-half an input AC line cycle. In some embodiments, the voltage across capacitor Cstore is averaged or integrated over exactly one-half of the AC line cycle on a half-cycle by half-cycle basis in order to detect fast changes in the load. Alternatively a conventional low-pass filter having a low corner frequency, for example, 10 Hz or another suitable frequency, may be used.

The output of filter 1904 is then compared to a reference signal 1910 via summing block 1912, which outputs an error signal. In some embodiments, reference signal 1910 is set to correspond to about 95% of the output voltage minus half of the ripple voltage of capacitor Cstore at full load. This ensures that the peak of the voltage across capacitor Cstore is within 95% of the output voltage Vout. Alternatively, reference signal 1910 may be set to correspond to other voltages.

The error signal produced by summing block 1912 is processed by a proportional-integral (PI) controller that includes gain block P that implements the proportional term, integrator block 1916 that implements the integral term I, and summer 1920 that sums the proportional and integral terms. The output of summing block 1920 is coupled to the controller of first stage converter 1808 via limiters 1922 and 1926. In some embodiments integrator block 1916 uses the output of limiter 1922 as the input of its feedback path.

In embodiments, where filter 1904 outputs an average value every half line cycle and/or where filter 1904 has a slow time response, there is a delay between a change in Vbuck and when the PI controller sees the changes. In order to respond to fast and/or large changes in Vbuck, limit detection circuits 1902 and 1906 provide a fast feed forward path within controller 1900 that quickly allows the loop to quickly charge and/or discharge capacitor Cstore when the voltage across capacitor Cstore exceeds the upper or lower voltage limits.

For example, when voltage Vbuck decreases below the lower limit, constant c2 is multiplied by an unfiltered error signal using multiplier 1918 and summed with the PI output signal via summer 1924, the output of which is limited by limiter 1926. This unfiltered error signal is generated by subtracting the reference signal from unfiltered voltage Vbuck using summer 1908. Constant c2 by the unfiltered error signal allows for a rapid change in the control signal to first stage converter 1808, which causes the output voltage Vout of first stage 1808 to increase rapidly in some embodiments. Once Vout increases beyond above the lower limit, the output of limit detection circuit 1906 returns to zero. In one example, the upper and lower limits of limiter 1926 are zero and 1.5, respectively. An output of 1.5 from controller 1900 is configured to cause first stage power converter 1808 to exceed its nominally rated output for a short time in some embodiments in order to allow capacitor to rapidly recharge capacitor Cout in order to avoid high current conditions. In alternative embodiments of the present invention, limiter 1926 may be set to provide limits that are different from zero and 1.5.

In such embodiments, first stage power converter 1808 is configured to withstand higher outputs at least for the short period of time that it takes to charge capacitor Cstore to a voltage that exceeds the lower limit. In various embodiments, care is taken to make sure that first stage power converter 1808 does exceed a thermal rating during periods of time that its nominally rated output is exceeded. By allowing a higher power for a short period of time, the response time to recharge capacitor Cstore can be made faster without losing stability of the first stage power converter 1808. In some embodiments, the input current of the power supply 1850 may be momentarily distorted during these short periods of correction. However, this momentary distortion may be tolerable in some embodiment power supply systems. By allowing a current adjustment for a short period of time during large output transients, faster recovery during large load transients and line dropouts may be achieved.

When voltage Vbuck increases above the upper limit, constant c1 is asserted by limit detection circuit 1902 and summed with the PI output signal via summer 1920, which is then limited to between zero and one via limiter 1922. Alternatively, limiter 1922 may be set to have different limits depending on the particular embodiment and its specifications. In some embodiments, constant c1 is a negative constant that decreases the output of controller 1900, thereby causing output voltage Vout of first stage power converter 1808 to decrease. Since constant c1 is introduced via summer 1920 inside the integration loop, the assertion of constant c1 by limit detection circuit 1902 causes cycle by cycle decreases in the output of controller 1900 and a corresponding cycle by cycle decrease in the output voltage of first stage power supply 1808. For example, in one embodiment, constant c1 is selected such that the output of first stage power supply 1801 decreases at a rate of 1% per cycle until a stable point is reached where capacitor Cstore is no longer charging. Alternatively, constant c1 may be configured to reduce the output voltage of first stage power converter 1808 a rates different from 1%.

In various embodiments, the current that charges storage capacitor may be estimated by the following expression:

$$Istore = \frac{Ireactive}{Duty} \quad (3)$$

where Ireactive is the current that buck converter delivers to output capacitor Cout and the load, and Duty is the duty cycle of the buck converter. As shown in the above expression, current Istore is inversely proportional to duty cycle Duty. In order to prevent current Istore from reaching very high values, the minimum duty cycle of buck converter 1810 is limited to a minimum value in some embodiments. For example, in some power supply systems. the minimum duty cycle of buck converter 1810 is limited to a value between about 40% and 60%. Alternatively, other minimum duty cycle limits may be used depending on the particular system and it specifications. It can be further seen in the above equation that at 100% percent duty cycle, Istore is substantially equal to Istore.

In an embodiment, a compensating current ICOMPmax used to adjust the output of the first stage power converter 1808 is related to a duty cycle of the buck regulator by the equation shown below:

$$ICOMPmax = \frac{Ioutmax}{Duty\_min} \quad (4)$$

where ICOMPmax is the current compensating for the ripple in the output voltage Vout of the first stage power converter

1808, IOUTmax is the maximum current of buck converter 1810 and Duty_min is the minimum duty cycle set for a particular application.

In various embodiments, when the voltage of storage capacitor Cstore approaches the same voltage of output voltage Vout at low output loads, the duty cycle of buck converter 1810 is set to 100%, which essentially means that the buck converter 1810 stops switching and that Cout and Cstore are connected together in parallel. Thus, in some low load conditions, switching losses may be avoided.

FIGS. 20-24 illustrate a simulation schematic and corresponding waveform diagrams that illustrate the operation of embodiment power converter 1800 shown in FIG. 18A. Various voltages and current labeled in the simulation schematic of FIG. 20 correspond to the waveform diagrams of FIGS. 21-24. For example, the voltage and a current input to rectifier 1806 are denoted by Vinput and Iinput respectively; the rectifier output voltage is denoted by Vrectifier and an output current of rectifier 1806 going into first stage power converter 1808 is labeled as Irectifier. Icapacitor2 represents the current going into buck converter 1810; the output voltage of first stage power converter 1808 is denoted by Voutput; and the portion of output current Ioutput that is used to charge output capacitor Cout is denoted by Icapacitor1. The voltage across storage capacitor Cstore is denoted by Vcapacitor2 and the current going to storage capacitor Cstore is denoted by Icapacitor2 output. The waveforms of various currents, voltages and power are shown in FIG. 21 to FIG. 24 to describe the present embodiment quantitatively.

Figure 21:
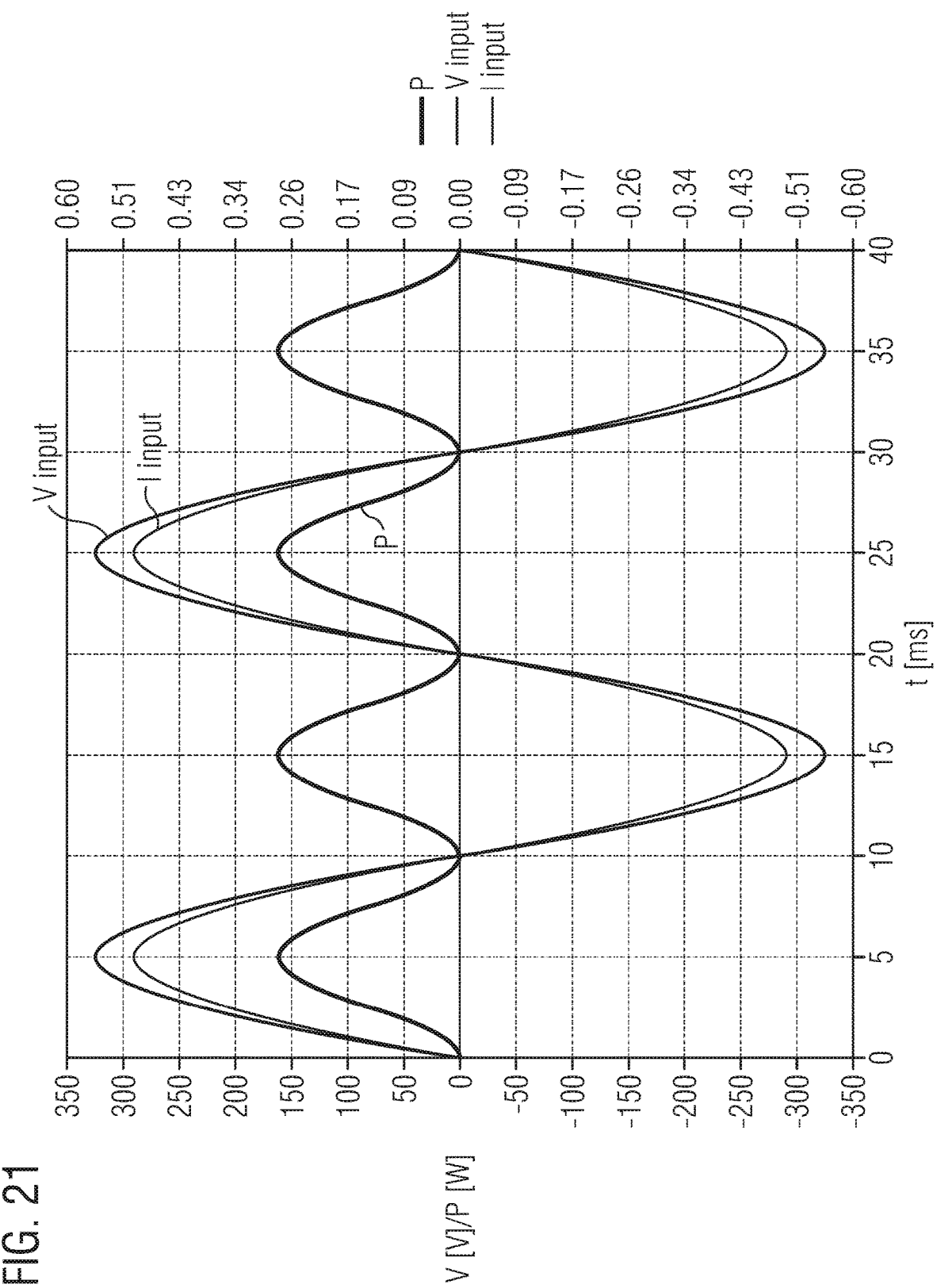
FIG. 21 illustrates a waveform diagrams of an embodiment AC/DC SMPS converter.

FIG. 21 illustrates a waveform diagram showing various signals related to rectifier 1806 within power supply 1800. Timing information is shown in the horizontal axis and voltage, current and power is shown in the vertical axis. FIG. 21 illustrates a sinusoidal AC line input voltage Vinput having a peak value of 325 Volts and a frequency of 50 Hz. A current Iinput is in phase with input voltage Vinput and has a peak value of 0.5 A. Input voltage Vinput is a typical sinusoidal line input with a sinusoidal input current Iinput and their product defines the input power P. Input power P is the instantaneous input power with a peak value of 162.5 watts.

Figure 22:
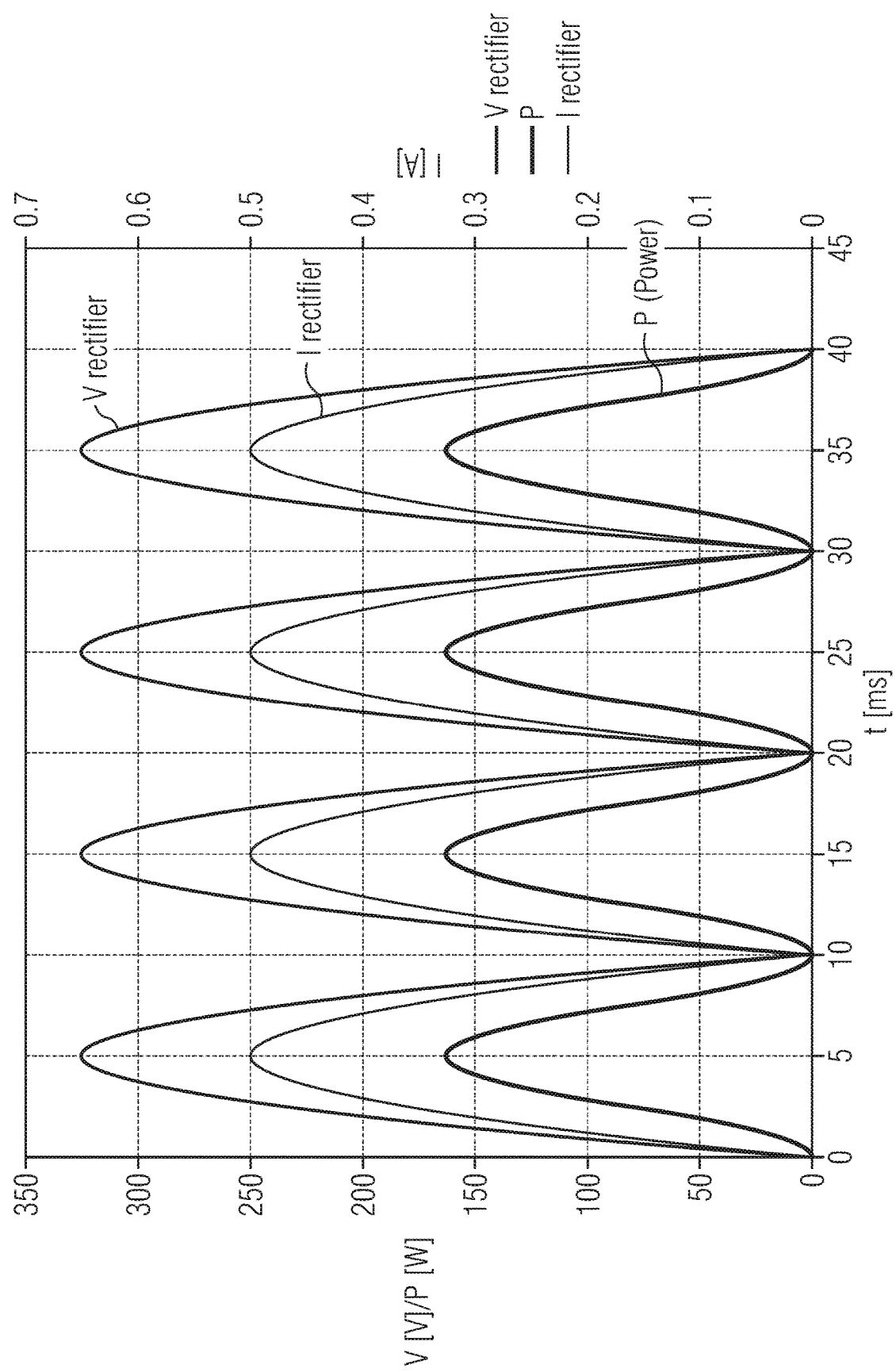
FIG. 22 illustrates a waveform diagram showing various waveforms of a rectifier block in an embodiment AC/DC SMPS converter.

FIG. 22 illustrates a waveform diagram showing an output voltage Vrectifier, an output current Irectifier and a power P of the rectifier 1806. Voltage Vrectifier shows a full wave rectification of the input voltage based on the embodiment shown in FIG. 18A and Vinput shown in FIG. 21. According to an embodiment, output voltage Vrectifier is a full wave rectified output with a peak value of 325 Volts and current Irectifier is also in phase with Vrectifier with a peak value of 0.5 A. Voltage Vrectifier and current Irectifier exhibit a frequency of 100 Hz because of the full wave rectification of the 50 Hz input signal. A power P is also shown in the waveform diagram with a peak value of 162.5 watts.

Figure 23:
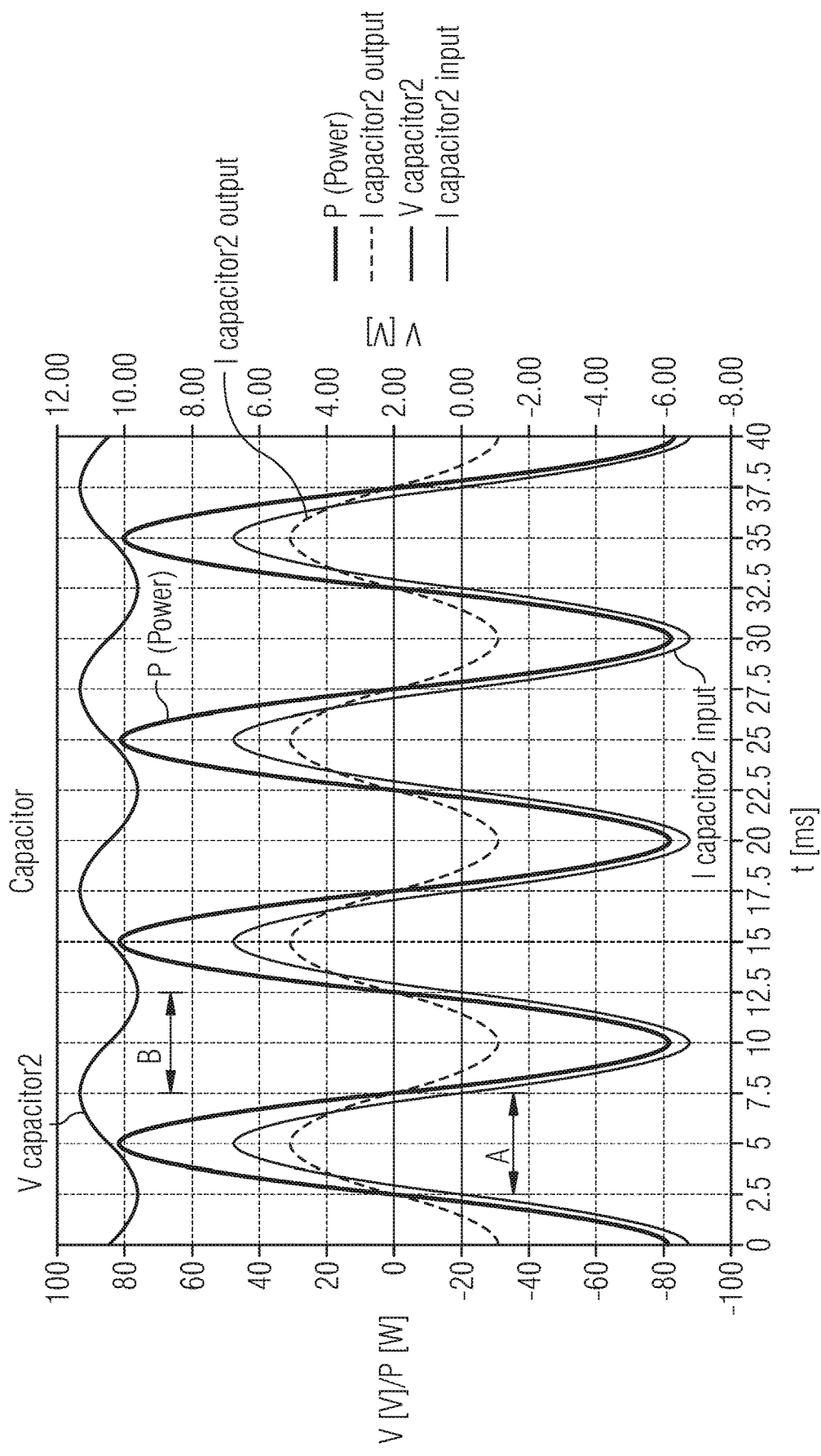
FIG. 23 illustrates a waveform diagram showing various signals of a buck regulator in an embodiment AC/DC SMPS converter.

FIG. 23 illustrates a waveform diagram that shows input current Icapacitor2input and an output current Icapacitor2ouput flowing to capacitor Cstore from buck converter 1810. A positive polarity of the currents Icapacitor2input and Icapacitor2output indicate currents flowing to the capacitor Cstore and a negative polarity indicates currents flowing away from capacitor Cstore. The output voltage of buck converter 1810 across capacitor Cstore is denoted by Vcapacitor2, and instantaneous output power P is a product of Vcapacitor2 and Icapacitor2output. The waveform diagram is defined in two time regions to explain a periodic functionality of buck converter 1810 while compensating an output voltage across output capacitor Cout of first stage power converter 1808.

A first time region A spans between 2.5 milliseconds and 7.5 milliseconds and is periodic every 5 milliseconds. This is a period where a rectified output from the line providing input to first stage power converter 1808 is higher than an output voltage of the first stage power converter 1808. During this time, first stage power converter 1808 converts an excess amount of energy that may be twice as much as the energy required by the load. This additional energy is transferred to the output of buck converter 1810 and stored in output capacitor Cstore. A positive current flow of Icapacitor2input indicates a current flowing into the buck converter 1810, and a positive current flow of Icapacitor2output indicates a current flow to capacitor Cstore. The voltage Vcapacitor2 is seen rising from a value of 9.3 volts to a peak value of 11.3 volts and power P is also positive.

A second time region B spans from 7.5 milliseconds to 12.5 milliseconds and has a length of 5 milliseconds. In this period, buck converter 1810 provides power to the output of first stage power converter 1808. The rectified line input to first stage power converter 1808 is below the output voltage of first stage power converter 1808 and hence no power is transferred from the input of first stage power converter 1808. During this time, buck converter 1810 provides power required by output of first stage power converter 1808. Currents Icapacitor2input and Icapacitor2output are negative, thus, indicating a current flow away from capacitor Cstore. Output voltage Vcapacitor2 decreases from a peak value of 11.3 volts to 9.3 volts in this time span B. The instantaneous power P is shown to be negative as the current is negative.

All the signals in the waveform diagram of FIG. 23 are periodic with a frequency of 100 Hz or a period of 10 milliseconds because of the full wave rectification of a 50 Hz line input voltage. The peak of voltage Vcapacitor2 is 11.3 volts at 7.5 milliseconds and periodic every 10 milliseconds. The positive peak value of current Icapacitor2input is 6.76 A at time 5 milliseconds and repeats every 10 milliseconds. Current Icapacitor2output crosses zero at 2.5 milliseconds and peaks at 5 milliseconds with 5.1 A. Since current Icapacitor2output crosses zero at 2.5 milliseconds with a 10 milliseconds period, power P is also zero at 2.5 milliseconds and power P peaks at 5 milliseconds and repeats every 10 milliseconds. Buck converter 1810 maintains voltage Vcapacitor2 slightly below the output of the first stage power converter 1808.

Figure 24:
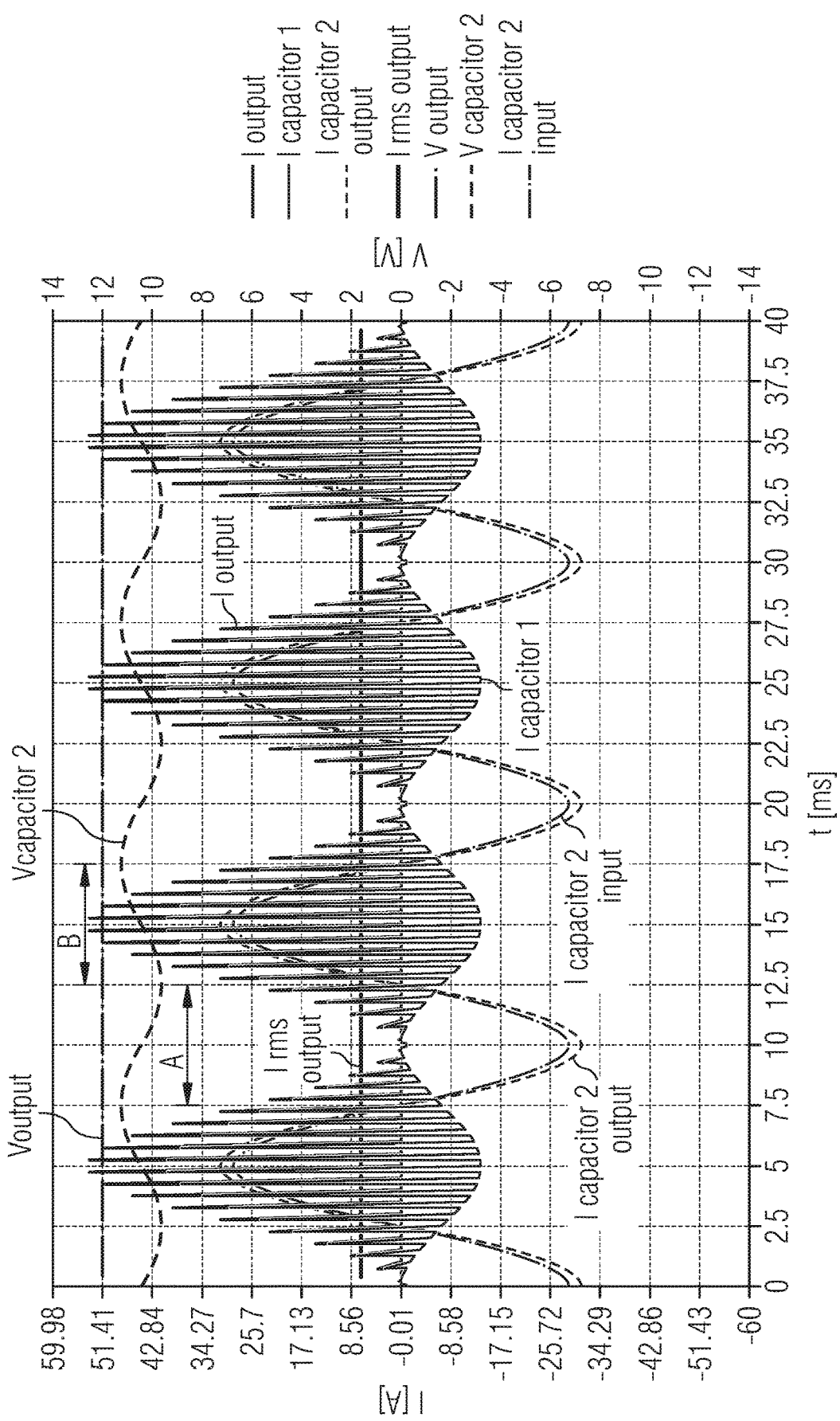
FIG. 24 illustrates a waveform diagram showing various signals of a PFC stage and a buck regulator in an embodiment AC/DC SMPS converter.

FIG. 24 illustrates a waveform diagram of signals of embodiment first stage power converter 1808 and buck converter 1810 depicted in FIG. 18A. The waveforms in FIG. 24 illustrate the operation of buck converter 1810 and interaction between first stage power converter 1808 and buck converter 1810 when buck converter 1810 compensates the output of first stage power converter 1808. Time span A shown in FIG. 23 starts at 2.5 milliseconds and represents a period of time when the output voltage of the buck converter 1810 is used to boost the output of first stage power converter 1808. During time period A, current Icapacitor2output and current Icapacitor2input are negative and the output voltage of buck converter 1810 is decreasing. This indicates that the charge is being taken away capacitor Cstore via buck converter 1810 and provided to first stage power converter 1808 output capacitor Cout.

The second time span B indicates the period of time when power is delivered from the rectified output to the first stage power converter 1808. This is also the time period where the rectified output is high enough to deliver power to first stage power converter 1808. Currents Icapacitor2output and Icapacitor2input are now positive indicating an energy transfer from output capacitor Cout of first stage power converter 1808 to storage capacitor Cstore of buck converter 1810. The output of the buck converter 1810 across capacitor Cstore rises to a peak value of 11.3 volts at the end of time span B. The output current Ioutput has a peak value larger than the rms value. Current Ioutput is a sum of current Icapacitor1 and Icapacitor2input. Buck converter 1810 draws input current Icapacitor2input from capacitor Cout and thus current Icapacitor1 has negative polarity during portions of the AC line cycle, which indicates that Current Icapacitor1 flows out of capacitor Cout.

The waveforms in FIG. 24 also include an output voltage Voutput of first stage power converter 1808, an output current Ioutput, an rms value of Ioutput, a current Icapacitor1 flowing through output capacitor Cout coupled at the output of first stage power converter 1808. The output voltage of first stage power converter 1808 is maintained at 12 volts, and an rms value of Ioutput is around 6.8 A. A switching current Ioutput switches and charges output capacitor Cout based on a duty cycle of the first stage power converter 1808. At any point in time, current Ioutput is a sum of current Icapacitor1 and current Icapacitor2input. Current Ioutput is zero when a switch in first stage power converter 1808 is closed, and current Ioutput reaches the peak when the switch is open. Current Icapacitor1 also shows a switching characteristic as it is switching at a period of 0.5 milliseconds or a frequency of 200 KHz. Current Icapacitor1 is a portion of current Ioutput, and it is used to charge and discharge capacitor C1, and current Icapacitor1 goes negative when current Ioutput is zero. A negative current Icapacitor1 indicates that current flows out of output capacitor Cout. Current Icapacitor2input draws current from capacitor Cout and this is causes current Icapacitor1 to go negative.

It should be appreciated that the currents, voltages and operating frequencies depicted in the waveform diagrams of FIGS. 21-24 are just examples of one particular embodiment. Alternative embodiments may yield different currents, voltages and operating frequencies.

Fly-Back Topology for Universal Serial Bus Power Delivery (USB-PD):

In electronic applications many devices are charged via Universal Serial Bus (USB) ports. In addition, the USB port may also be used as a power supply in electronic devices, such as, laptop computers, MP3 players, and cell phones. Since power requirements may vary from device to device, many USB power circuits are configured to handle the varying power requirements using a variable circuit topology. To this end USB-PD specification has been developed that supports adjustable USB power profiles that vary in output currents and output voltages.

FIG. 25 illustrates various power profiles that may be used in a USB-PD system. For example, default power profile 1 is configured to provide a 5 V output voltage and deliver 2 A of current for 10 W of power. A USB may also request profile 2 that delivers 18 W by providing 12 V a 1.5 A, profile 3 that delivers 36 W by providing 12 V at 3 A, profile 4 that delivers 60 W by providing 20 V at 3 A or profile 5 that delivers 100 W by providing 20 V at 5 A in addition to 5 V at 2 A. Each one of these example profiles may be requested, for example, by the USB device itself via the USB interface.

Figure 26:
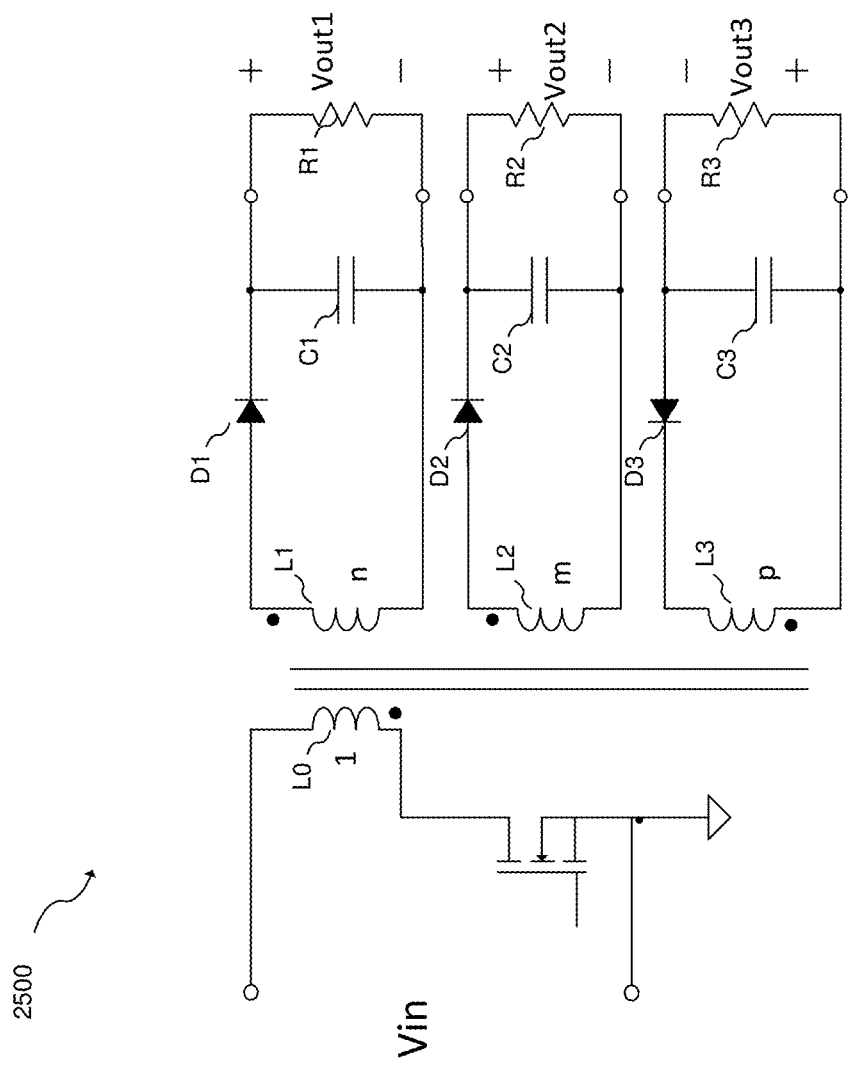
FIG. 26 illustrates an example fly-back converter with multiple secondary windings.

One way to handle power different power requirements using the same circuit to use switched-mode fly-back converter having multiple secondary windings that are each configured to have different output voltages, such as conventional power converter 2500 shown in FIG. 26, which includes primary winding L0 coupled in series switch SW1. Primary winding L0 is magnetically coupled to multiple secondary windings L1, L2 and L3, each of which has a turns ratio n:1, m:1 and p:1 with respect to the primary winding L0. The current in the respective secondary windings are rectified using respective diodes D1, D2 and D3 and output voltages Vout1, Vout2 and Vout3 are filtered using respective capacitors C1, C2 and C3. Output loads are represented as resistors R1, R2 and R3. The magnitude and polarity of each output voltage Vout1, Vout2 and Vout3 may be set by configuring the turns ratios n:1, m:1 and p:1, and polarity of diodes D1, D2 and D3 and the polarity of windings L1, L2 and L3. It should be appreciated that in conventional power supply 2500, each power supply voltage is associated with an additional secondary winding, diode and output capacitor.

In an embodiment of the present invention, multiple power profiles may be supported using embodiment fly-back converters described herein having multiple primary windings in conjunction with a buck converter to attenuate output ripple such as the power supply systems depicted in FIGS. 18A and 18B. In such embodiments, less circuit board space is devoted to output capacitors with respect to the conventional embodiment of FIG. 26. This is because a smaller output capacitor may be used without introducing appreciable voltage ripple as described above. However, in some embodiments, if the embodiment fly-back converter is designed for a higher power profile, such as Profile 4 that provides 20 V at 3 A, the energy stored in storage capacitor Cstore may not be sufficient to compensate for voltage ripple in a lower power profile such as 5 V at 3 A. This is because at lower voltage power profiles, capacitor Cstore would operate in a lower energy region of operation. Since the energy stored on a capacitor is proportional to the square of its voltage, reducing the voltage across capacitor Cstore from 20 V to 5 V, or ¼ of its voltage, results in capacitor Cstore only being able to store 1/16 of its energy when using the same capacitor. For example, in embodiment power converter 1800 of FIG. 18A, capacitor Cstore has one-sixteenth of the energy available when the output voltage changes from 20 volts to 5 volts.

In various embodiments of the present invention, a first stage power converter, such as the multiple primary winding power converter described herein is used to deliver power for higher voltage power profiles. In such higher power profiles, the output of the embodiment first stage power converter is connected to the load as shown with respect to FIG. 18A above. On the other hand, for lower power profiles output power is provided to the load via the output of the compensation buck converter. In such lower power profiles, the buck converter appears in series between the embodiment first stage power converter and the load. In some embodiments, the load is switched between the output of the first stage power converter and the output of the buck converter depending on the selected power profile.

Figure 27:
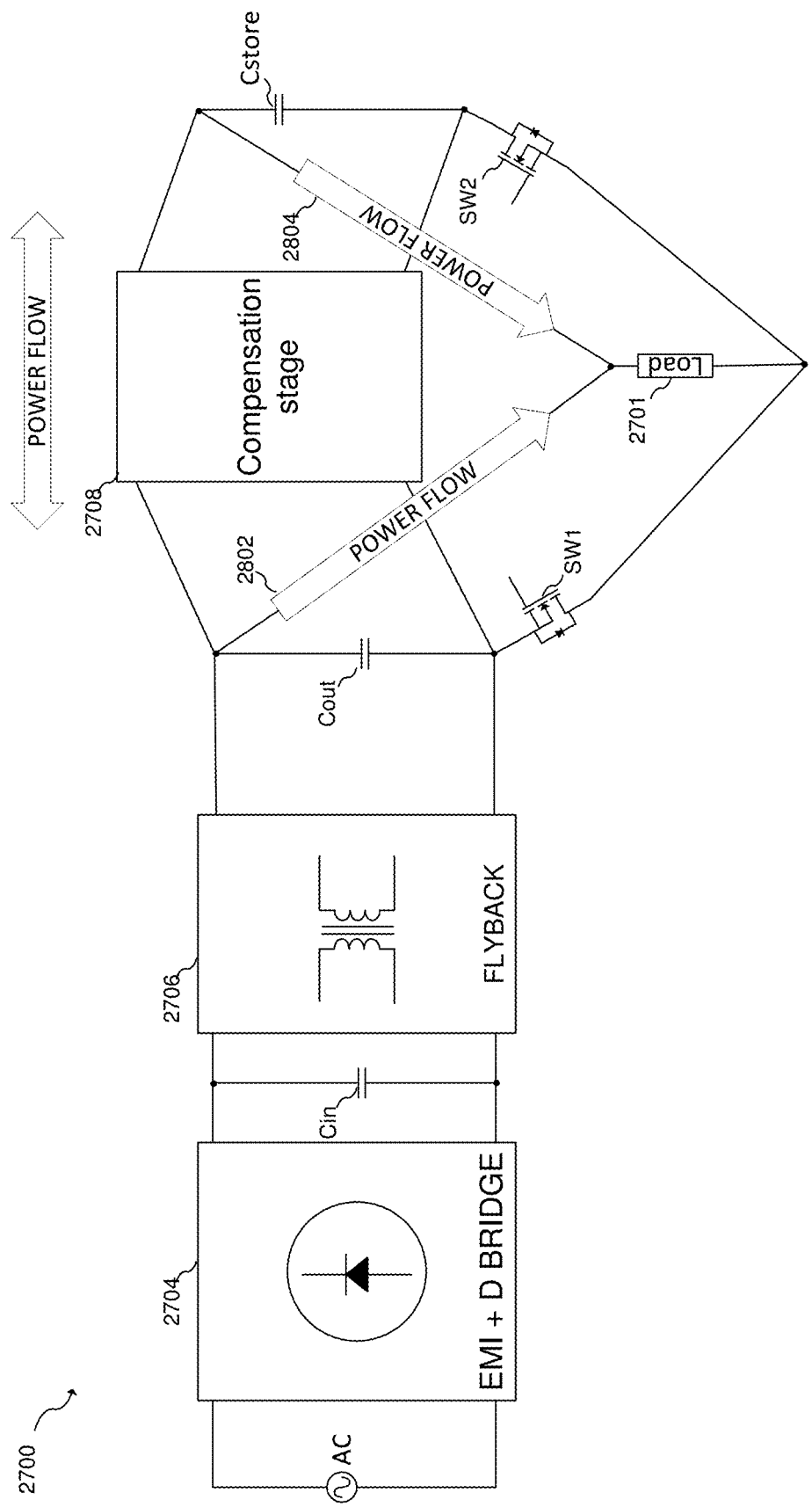
FIG. 27 illustrates an embodiment AC/DC fly-back converter configured to switch a load between the output of the fly-back and the output of the compensation stage.

FIG. 27 illustrates an embodiment power supply system that includes rectifier circuit 2704, fly-back converter 2706 and compensation stage 2708. As shown, load 2701 may be selectively coupled to capacitor Cout and the output of fly-back converter 2706 via switch SW1, or coupled to capacitor Cstore and the output compensation stage 2708. In various embodiments, fly-back converter 2706 is implemented using embodiment fly-back converter circuit using multiple primary stages as discussed herein, and compensation stage 2708 may be implemented using a buck converter as discussed hereinabove. Fly-back converter 2706 may interact with compensation stage 2708 as described above with respect to FIGS. 18-24 to reduce ripple across capacitor Cout. Rectifier block 2704 may include, for example, a diode rectifier circuit such as a diode bridge and an EMI filter. In alternative embodiments, fly-back converter 2706 may be implemented using various other power supply topologies.

In various embodiments, switch SW1 is closed and switch SW2 is opened when a high power profile is selected, for example, 20V at 3 A or 20 V at 5 A. In this mode, fly-back converter provides power directed to load 2701 and compensation stage 2708 actively reduces voltage ripple across capacitor Cout as described above. On the other hand, when a low power profile is elected, for example 5 V at 2 A, switch SW1 is opened and switch SW2 is closed. In this mode, power is provided through compensation stage 2708 to load 2701. In this configuration, storage capacitor Cstore is no longer used to compensate for the capacitor Cout; rather, storage capacitor Cstore is used as a reservoir capacitor for the load and compensation stage 2708 transfers energy from capacitor Cout to Cstore to provide a power to the load. The topology of SMPS remains the same and only the load is switched between two positions based on the power delivery profile. In another embodiment, the switches SW1 and SW2 are connected to the high side of the load.

FIG. 27A illustrates an embodiment SMPS AC/DC converter 2700 configured for a high power profile for high voltage application that includes fly-back stage 2706 and compensation stage 2708 connected in parallel configuration. The converter 2700 has a load connected at the output of fly-back stage 2706. SMPS AC/DC converter 2700 also includes an EMI filter and a diode bridge rectifier that is combined in 2704 with a capacitor Cin connected to the output to filter out high frequency interference. The rectified voltage at capacitor Cin is used as an input to fly-back stage 2706. A capacitor Cstore connected at the output of the compensation stage 2708 is used to compensate for the ripple voltage across capacitor Cout connected at the output of fly-back stage 2706 as described in embodiments above.

As shown, power flows in the parallel configuration of FIG. 28A from the AC input to the load coupled to capacitor Cout as indicated by arrow 2712. Power further flows bidirectionally through compensation stage 2708 as indicated by arrow 2714.

FIG. 28B shows SMPS AC/DC converter 2700 configured for a low power profile where the load is connected to capacitor Cstore coupled to the output of compensation stage 2708. Here, compensation stage 2708 performs a power conversion from the output of fly-back converter 2706 to the load. In embodiments where compensation stage 2708 is configured as a buck converter, compensation stage steps down the voltage. For example, in one embodiment, the output voltage provided by fly-back converter 2706 is about 20 V, while the output of compensation stage 2708 is about 5 V. Alternatively, other voltages may be used. As indicated by arrow 2712, power flows from the AC input source, though rectifier circuit 2704, through fly-back converter circuit 2706 and through compensation stage 2708 to the load.

Regulation with Secondary Side Enemy Storage

In a conventional power converter, the momentary power drawn from the input capacitor is about the same as the momentary power delivered to the load (minus converter power losses). In embodiments of the present invention, the momentary power drawn from the input does not have to equal the power delivered the load, as compensation stage 2708 can make up for a lack of power being delivered to the load by transferring energy from capacitor Cstore, or can absorb excess power transferred by converter 2706 by transferring this power to Cstore. In various embodiments, the momentary power transferred by converter 2706 changes over the course of an AC cycle. In particular, some embodiments are configures such that the average power transferred by converter 2706 over a full AC cycle equals the average power delivered to the load over a full AC cycle, such that the momentary power follows the equation:

$$Pout = Pin \pm Pstorage,$$

where Pout is the power delivered towards the load, Pin is the power drawn from the power input and Pstorage is the power delivered by the storage element. An energy storage device, as exemplified by compensation stage 2708 and Cstore can take power from the input during a charging phase and can deliver power towards the output during a discharging phase. The input power may be transferred intermittently, such that no power is drawn from the input during various phases of the AC cycle. In embodiments in which input capacitor Cin is significantly reduces or eliminated, the voltage at the input to converter 2706 substantially follows the AC input voltage. In some embodiments, the varying power intake may be defined as a function of the input voltage, and this function may be varied with varying levels of output power. These functions may use algorithms to optimize the overall efficiency, stand-by power, EMI behavior, frequency bands of the converter and may vary depending on the overall optimization targets.

In various embodiments, the momentary power provided by fly-back converter 2706 may be adjusted over the course of the AC cycle in order to provide more power to the system under more efficient source and load conditions, and to provide less power to the system under less efficient source and load conditions. For example, fly-back 2706 converter may be configured to provide more power to the load and compensation stage 2708 when the instantaneous voltage at the AC input is near peak voltage levels, and to provide less power to the load and compensation stage 2708 when the instantaneous voltage is at a low level. This power adjustment to fly-back converter 2706 may be implemented, for example, by preventing fly-back converter 2706 from switching when the instantaneous input voltage is less than a particular voltage threshold, and then resume switching when the instantaneous voltage increases beyond a minimum level. During the time when fly-back converter 2706 produces more energy than in needed by the load, this excess energy is stored in capacitor Cstore via compensation stage 2708. During the time when fly-back converter 2706 produces no energy and/or less energy than is needed by the load, the energy needed by the load is provided by capacitor Cstore via embodiment compensation stage 2708. In other embodiments, fly-back converter 2706 may be controlled to reduce its power output when the instantaneous voltage of AC input cycle is at lower values and to increase it its power output when the instantaneous voltage of AC input cycle is at higher values. This increase and decrease in instantaneous power may be accomplished by increasing or decreasing the duty cycle or frequency of switch control signals within fly-back converter 2706. In further embodiments, the fly-back converter 2706 may be enabled or disabled such that the switching frequency of fly-back converter 2706 stays within a predetermined range of frequencies. These frequency ranges may be determined based on the efficiency of power supply system 2700 and/or on the EMI emissions.

In embodiments that control the operation of fly-back converter 2706 based on an instantaneous input voltage, the value of input capacitor Cin may be reduced such that the input of fly-back converter 2706 sees a rectified input voltage. In addition, fly-back converter 2707 and compensation stage 2708 effectively work together to supply power to the load and compensate for output voltage ripple, the capacitance of output capacitor Cout may be reduced as well. In further embodiments, capacitor Cstore may be replaced by a battery and compensation stage 2708 may charge the battery according to a battery charging curve.

Figure 29:
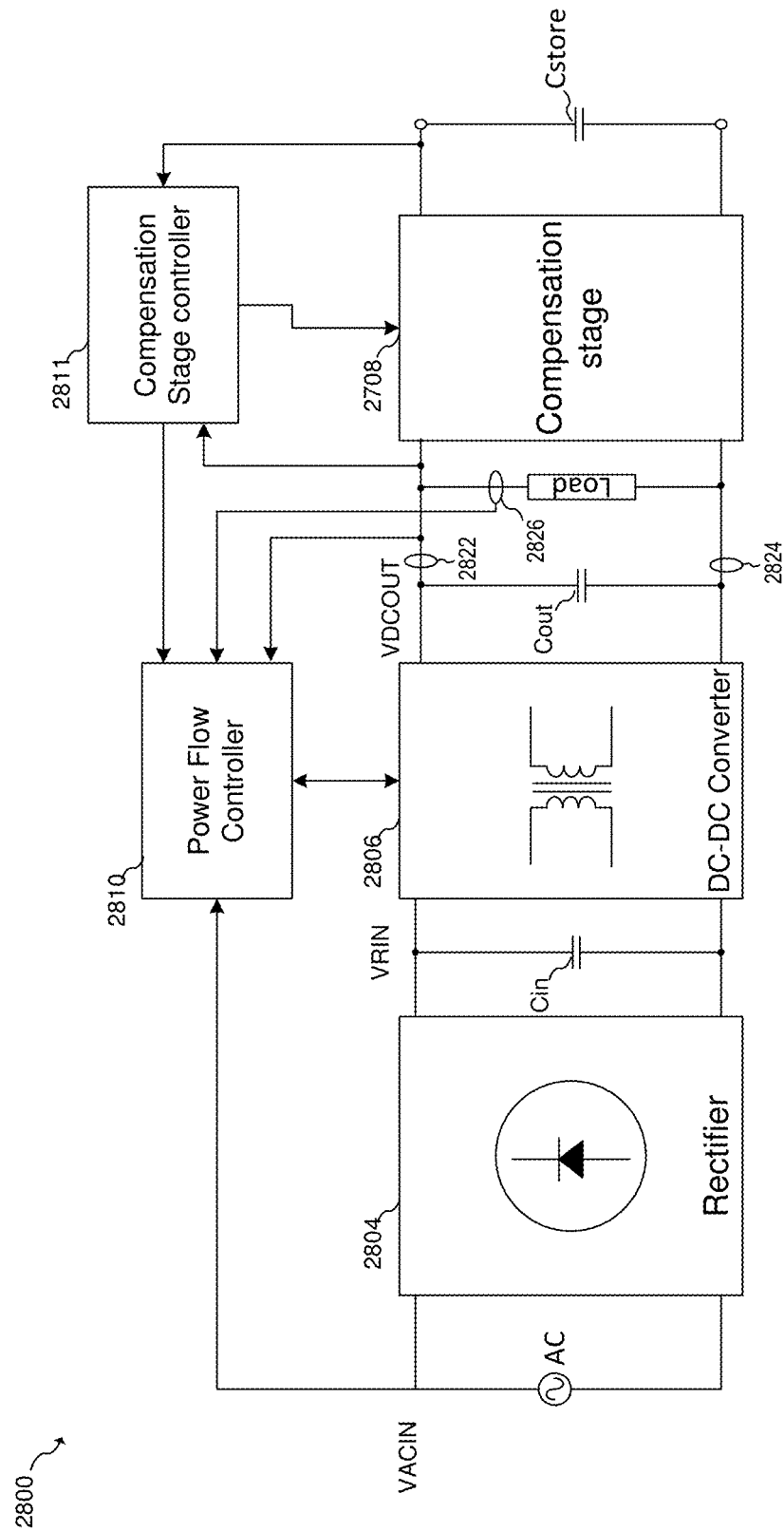
FIG. 29 illustrates an embodiment switched-mode power supply that includes secondary-side storage.

FIG. 29 illustrates SMPS AC/DC converter 2800 according to an embodiment that includes rectifier, 2804, DC-DC converter 2806 and compensation stage 2708. In various embodiments, rectifier 2808, which may be implemented using a diode bridge or other known rectifying circuits, rectifies input voltage VACIN to produce rectified voltage VRIN. This rectified voltage VRIN is converted to output voltage VDCOUT via DC-DC converter 2806. In various embodiments, DC-DC converter 2806 may be implemented using an embodiment fly-back converter using multiple primary windings as described above in various embodiments. Alternatively, other isolating and non-isolating DC-DC converter topologies may be used to implement DC-DC converter 2806. Compensation stage 2708 may be implemented using embodiment compensation stages and compensation stage control systems as described above. In various embodiments, the power produced by DC-DC converter 2806 is controlled by power flow controller 2810 and compensation stage 2708 is controlled by compensation stage controller 2811. Compensation stage controller may be implemented according to various compensation stage control systems and methods described herein. For example, in one embodiment, compensation stage controller 2811 is implemented using controllers 1812, 1816 and filter 1812, as described with respect to FIG. 18C. In such an embodiment, output voltage VDCVOUT is controlled by compensation stage controller 2811 and the voltage across capacitor Cstore is controlled by DC-DC converter 2806. In some embodiments, the interaction between power flow controller 2810 and compensation stage controller 2811 allows capacitor Cstore to maintain a voltage sufficient to regulate VDCOUT. Alternatively, other control topologies may be used. In one embodiment, the value of input capacitor Vin is about 2 μF, the value of output capacitor Cout is about 100 μF, and the value of storage capacitor Cstore is about 2 mF. Alternatively, other capacitance values may be used, however other values may be used depending on the particular implementation and its specifications.

In order to provide control signals to DC-DC converter 2806, power flow controller 2810 may monitor one or more of input voltage VACIN, load voltage VDCOUT, signals provided by compensation stage controller 2811 and the load current measured by current measurement circuit 2826 coupled to the load. In some embodiments, the load current may be measured by current measurement circuits 2822 and 2824 instead. Current measurement circuits, 2822, 2824 and 2826 may be implemented using current measurement circuits and methods known in the art such as measuring a voltage across a series resistor.

Figure 30:
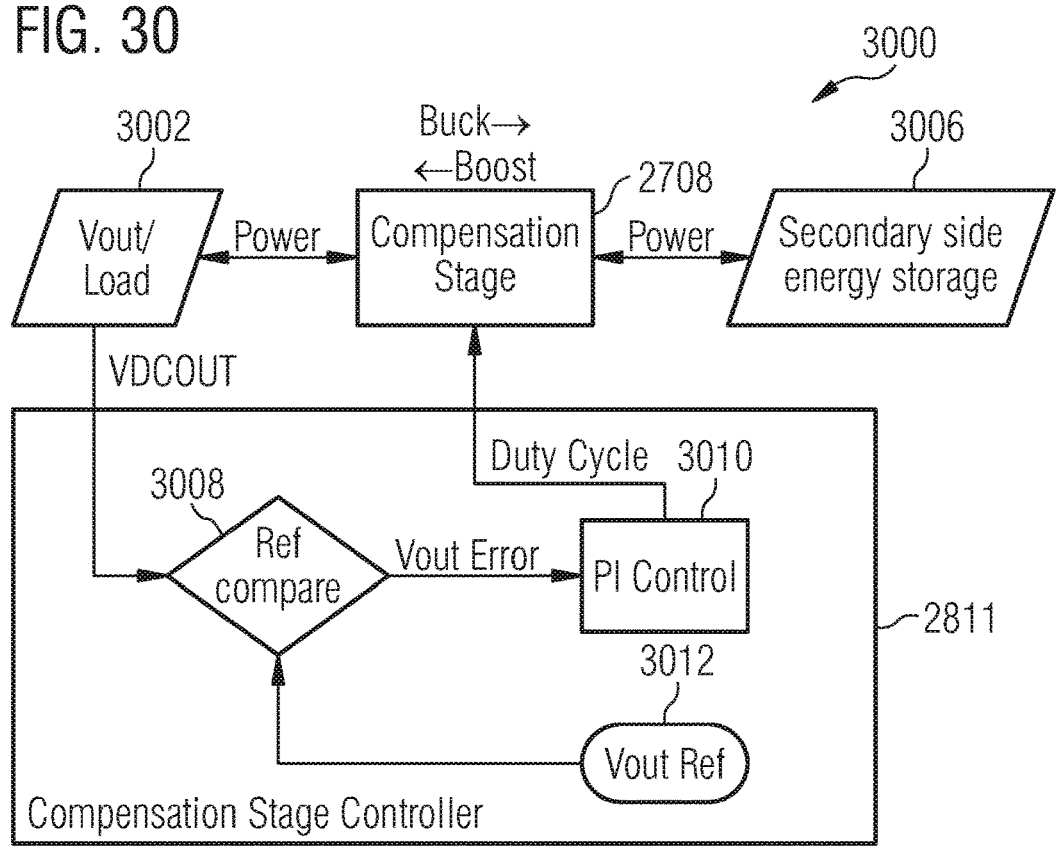
FIG. 30 illustrates a block diagram of an embodiment switched-mode power supply.

FIG. 30 illustrates a block diagram of a portion of a switched-mode power supply system including compensation stage controller 2811 coupled to compensation stage 2708. As shown, reference compare block 3008 compares the output voltage VDCOUT of the load (see FIG. 29) with reference voltage generated by block 3012. Reference compare block 2008 may be implemented, for example, in the analog domain using an amplifier or other suitable circuit known in the art, or in the digital domain using digital logic known in the art.

A proportional-integral (PI) controller 3010 processes error signal Vout_Error produced by reference compare block 2008 to calculate a duty cycle used by DC-DC converter 3004. Again, PI controller 3010 may be implemented using analog and/or digital PI controller circuit known in the art. In some embodiments, compensation stage controller 2811 may be used to control compensation stage 2708 shown in FIG. 29. Compensation stage 2708 may be implemented by a switched mode DC-DC converter and may operate in a buck mode when power is being transferred to secondary side energy storage 3006 from load 3002, and may operate in a boost mode when power is transferred to the load from secondary side storage 3006. In some embodiments, control circuits and methods described herein with respect with FIGS. 18A-18C, 19 and 20 may also be applied to embodiment compensations stages.

Figure 31A:
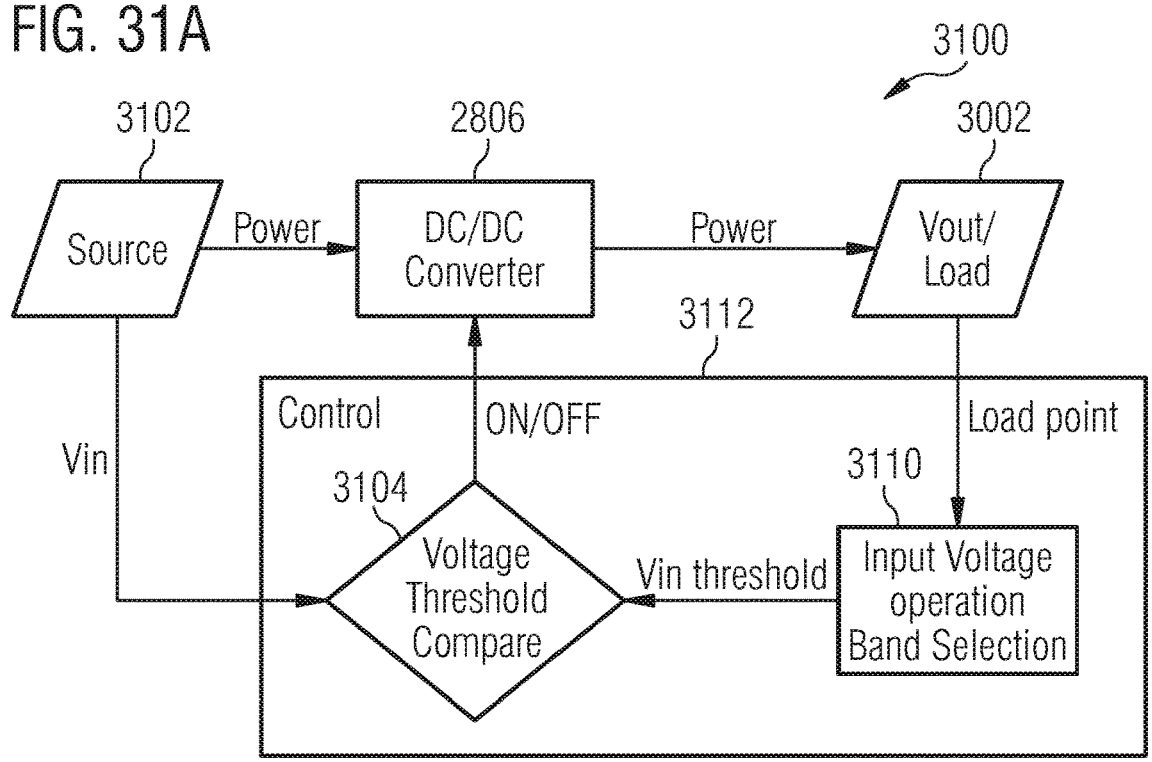

In various embodiments, power flow controller 2810 shown in FIG. 29 activates and deactivates DC-DC converter 2806 according to whether or not rectified input voltage VRIN is above or below a threshold. This threshold may be adjusted according to the voltage, current and/or power being delivered to the load. FIG. 31A illustrates an example control diagram 3100 that includes embodiment flow controller 3112 that implements this control scheme and can be used to implement power flow controller 2810 of FIG. 29.

In various embodiments, threshold comparison block 3104 compares input voltage Vin generated by source 3102 with a threshold generated by band selection block 3110. The result of this comparison determines whether or DC-DC converter 2806 operates at full power and transfers energy to load 3002, or whether switching of DC-DC converter 2806 is suspended such that no power is transferred. In some embodiments, band selection block 3110 determines the threshold used by comparison block 3104 according to the load voltage and/or load current. In some embodiments, this threshold is determined such that the power delivered to the load over the course of an entire AC cycle is delivered by DC-DC converter 2806 when the DC-DC converter is turned on. In various embodiments, threshold comparison block 3104 may be implemented in the analog domain using, for example, an amplifier and/or a comparator, or may be implemented in the digital domain using, for example, using a digital comparator, other digital logic known in the art or a processor. The various thresholds generated by band selection block 3110 may be implemented using a lookup table.

The load point provided to band selection block 3110 may be determined, for example, by monitoring load voltage Vout and/or by measuring the load current using current measurement circuits 2822, 2824 and 2826 shown in FIG. 29.

Figure 31B:
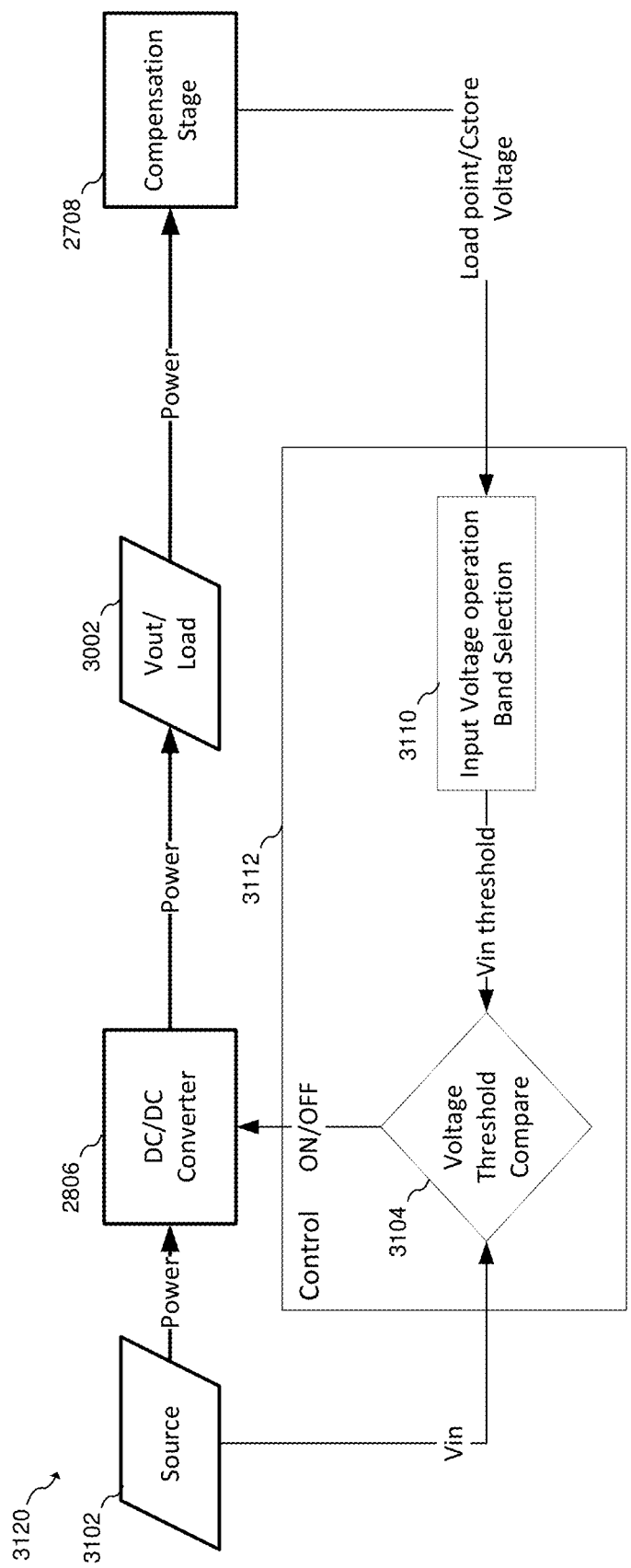

FIG. 31B illustrates an alternative example control diagram 3120 that is similar to control diagram 3100 illustrated in FIG. 31A, with the exception that the load point provided to band selection block 3110 is provided by compensation stage 2708. In some embodiments, compensation stage 2708 may provide the voltage across storage capacitor Cstore as an indication of the output load point.

Figures 31C, 31D:
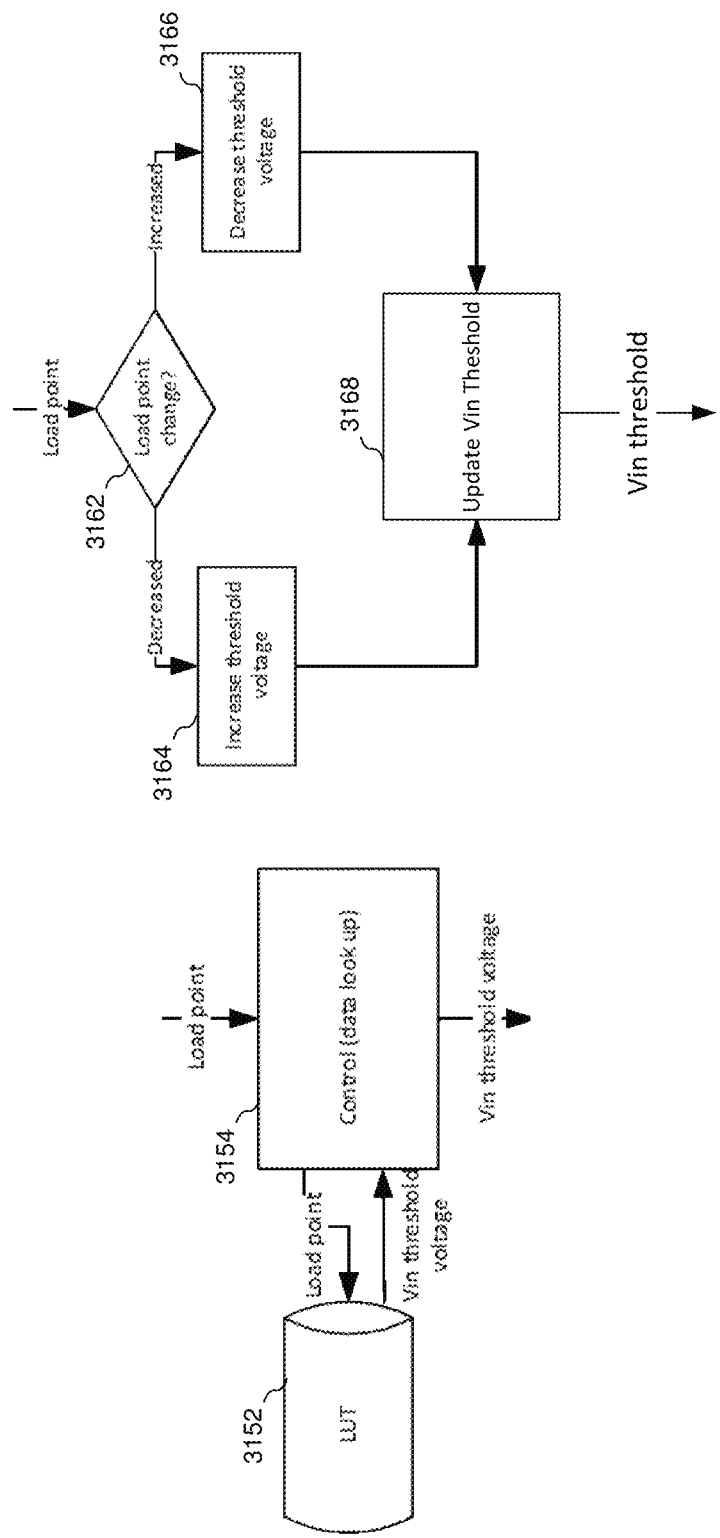

FIGS. 31C and 31D illustrate two implementations of band selection block 3110 shown in FIGS. 31A and 31B. In the embodiment of FIG. 31C, band selection block 3110 is implemented using lookup table (LUT) 3152 in which various threshold voltages are stored as a function of load point. Control circuit 3154 reads the load point provided by measuring the load or provided by compensation stage 2708, provides the load point to LUT 3152, reads LUT 3152 to determine the threshold voltage and provides the threshold voltage to voltage threshold compare block 3104 (FIGS. 31A and 31B). LUT 3152 may be implemented using lookup table circuits known in the art, and control circuit 3154 may be implemented using digital control logic, a software controlled processor such as a microcontroller, or other digital control circuits known in the art. The generated threshold voltage may be an analog voltage or a digital value representative of the threshold voltage.

FIG. 31D illustrates another implementation example of band selection block 3110 that includes Vin threshold update block 3168 that updates Vin threshold based on whether a change in load point is detected. During operation, load point tracking block 3162 determines whether there is a change in load point provided by measuring the load or provided by compensation stage 2708. If there is a decrease in the load point, block 3164 instructs update block 3168 to increase Vin threshold. On the other hand, if there is an increase in the load point, block 3166 instructs update block 3168 to decrease Vin threshold. In various embodiments, blocks 3162, 3164, 3166 and 3168 may be implemented using digital logic and/or a software controlled processor such as a microcontroller, or other digital control circuits to implement the functions of FIG. 31D. In some embodiments, update block 3168 may be implemented, for example, using a register or memory.

Figure 32A:
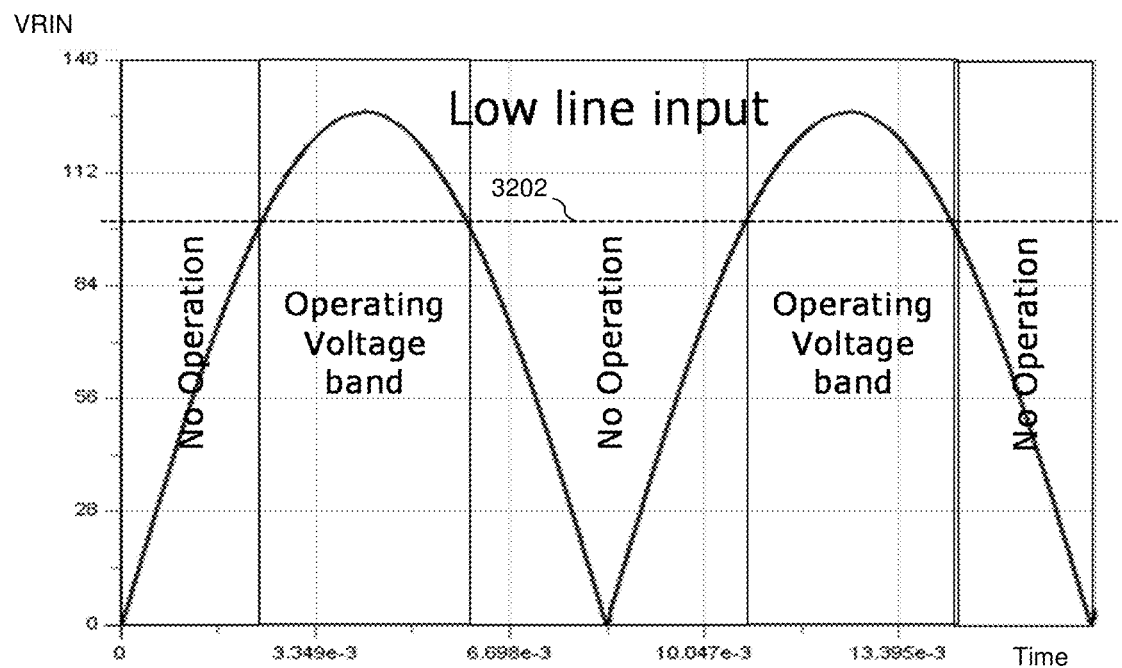

FIGS. 32A-32D illustrate waveform diagrams that show various examples of the operation of power flow controller 3112 shown in FIG. 31. FIG. 32A illustrates rectified AC input voltage VRIN with respect to time with respect to a low line input signal. This rectified AC input voltage VRIN may correspond to the rectified input voltage seen by DC-DC converter 2806. As shown, when rectified input voltage VRIN is below threshold voltage 3202, the operation of DC-DC converter 2806 is suspended. On the other hand, when rectified input voltage VRIN is above threshold voltage 3202, DC-DC converter 2806 is operational. As shown, rectified AC input voltage VRIN has a peak voltage of about 125 V and threshold 3202 is set to about 100 V. Alternatively, the system may operate with other thresholds and peak voltages. During operation, power is transferred to the load or to secondary side energy storage 3006 (or to storage capacitor Cstore) when the DC-DC converter 2806 is operational, and power is transferred from secondary side energy storage 3006 (or to storage capacitor Cstore) to the load when DC-DC converter 2806 is not operational.

Figure 32B:
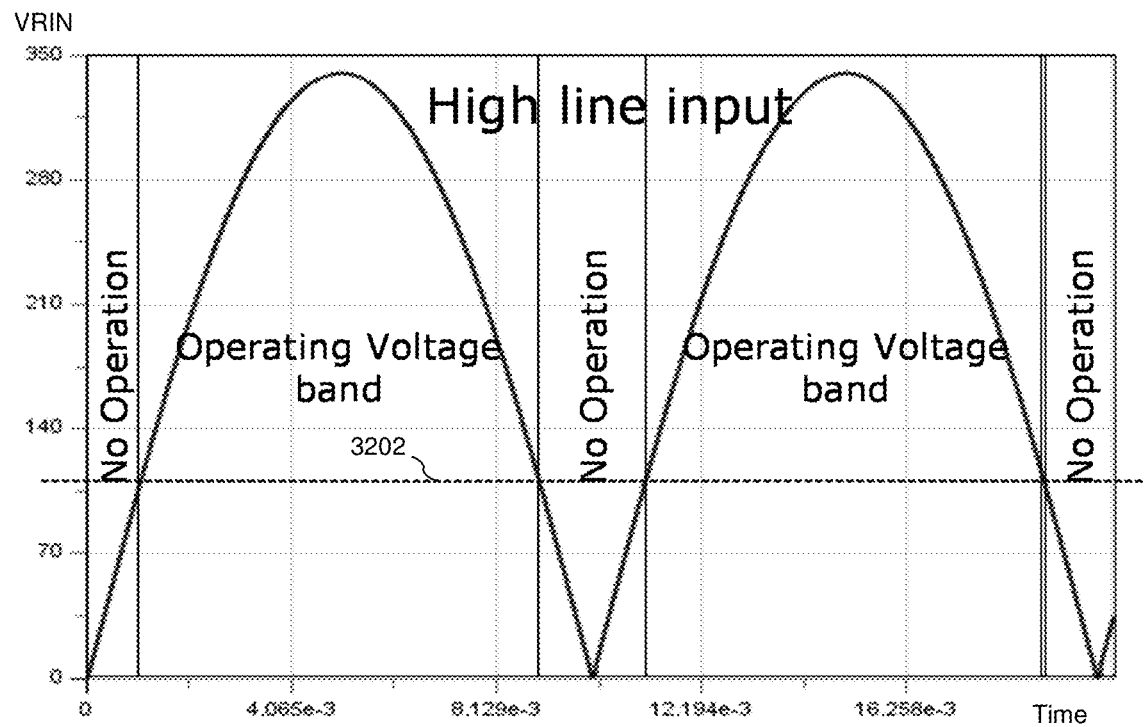

FIG. 32B illustrates rectified AC input voltage VRIN with respect to time with respect to a high line input signal having a peak voltage of about 340 V. As shown, the same threshold 3202 of about 100 V is applied such that when rectified input voltage VRIN is below threshold voltage 3202, the operation of DC-DC converter 2806 is suspended and when rectified input voltage VRIN is above threshold voltage 3202, DC-DC converter 2806 is operational. Because of the higher amplitude of the rectified AC input voltage VRIN under a high line input, DC-DC converter 2806 operates at a higher duty cycle compared with the lower duty cycle when a low line input is used as shown in FIG. 32A.

Figure 32C:
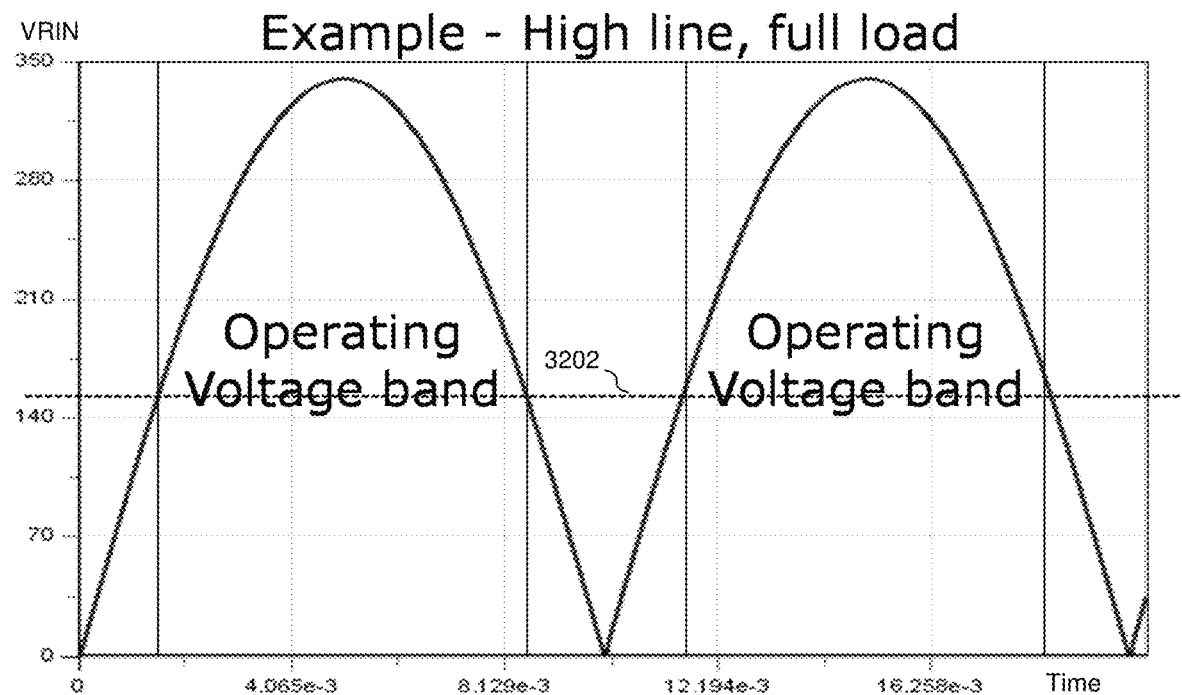
Figure 32D:
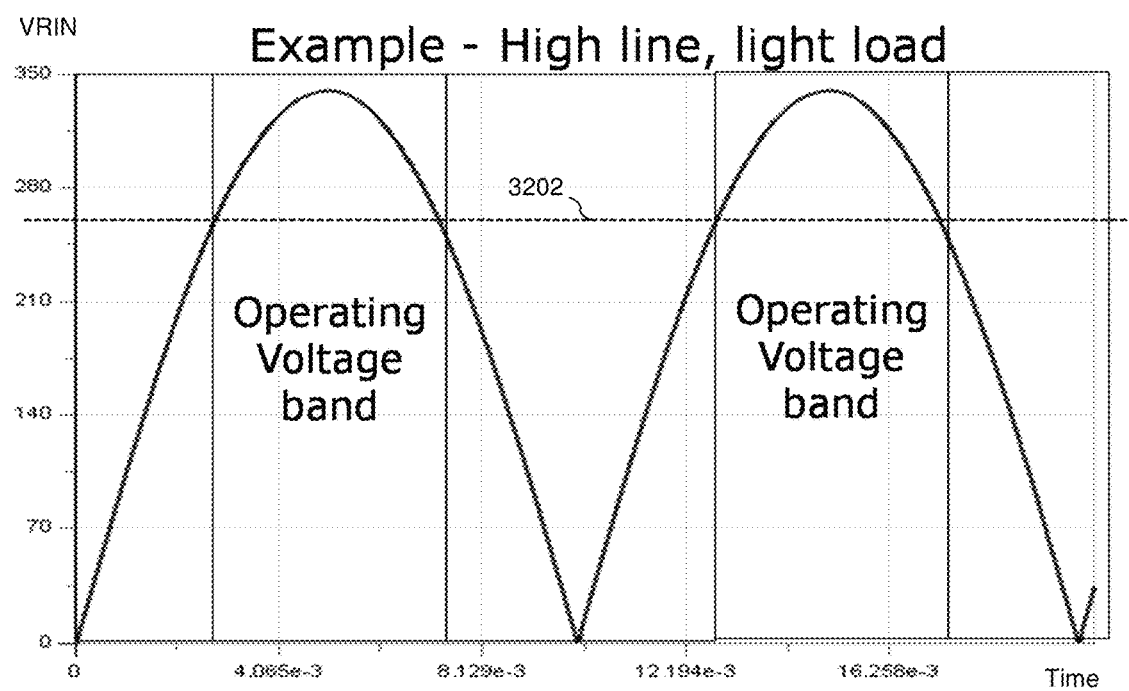

In some embodiments, threshold 3202 may be adjusted according to the power being delivered to the load such that the duty cycle that DC-DC converter 2806 operates over the AC cycle increases under heavier loads and decreases under lighter loads. Both FIGS. 32C and 32D illustrate a rectified AC input voltage VRIN having a peak voltage of about 340 V. FIG. 32C represents a fully loaded condition and FIG. 32D represents a lightly loaded condition. Under the fully loaded condition of FIG. 32C, threshold 3202 is set to about 150 V, while under the lightly loaded condition of FIG. 32D, threshold 3202 is set to a higher voltage of about 260 V. By increasing the threshold under the lightly loaded conditions, DC-DC converter 2806 operates for a shorter time over the course of a cycle, thereby delivering less power to the load and to secondary side energy storage 3006 (or to storage capacitor Cstore).

In some embodiments, threshold 3202 is adjusted such that the power delivered by DC-DC converter 2806 over the course of a full AC cycle is about equivalent to the power delivered to the load. Thus, under heavy load conditions, threshold 3202 is lowered to provide more power to the system and under light load conditions, threshold 3202 is increased to provide less power to the system. In embodiments, where secondary side energy storage 3006 is implemented using a battery, the threshold may be further adjusted to accommodate charging the battery. For example, if the battery is being charged, threshold 3202 may be decreased even under light load conditions so that enough power may be delivered to charge the battery.

As shown in FIGS. 32A-32D, DC-DC converter 2806 operates when the rectified AC input voltage VRIN is at its peak where DC-DC converter 2806 operates more efficiently, and deactivated when rectified AC input voltage VRIN is at lower voltages where DC-DC converter 2806 operates more efficiently. By operating DC-DC converter 2806 in an intermittent manner when operation is most efficient, the overall efficiency of the power conversion system may be increased.

In some embodiments, the efficiency of the power conversion system may be increased by weighting the amount of power produced by the DC-DC converter 2806 over the AC cycle. For example, instead of enabling or disabling DC-DC converter 2806, the momentary power transferred by 2806 can be increased during more efficient portions of the AC cycle and decreased during less efficient portions of the AC cycle. Such an embodiment may further increase the efficiency of power converters whose most efficient region of operation is not at its highest input voltage.

In an embodiment, a load point where efficiency is at its peak is determined. Typically this load point is between about 50% and about 80% of the full load, however, peak efficiency may be outside of this load range in some power converters. Efficiency as a function of input voltage is also determined. In some embodiments, this determination is made between 180 V and about 250 V for some applications. Efficiencies outside of this voltage range may also be determined.

Once these efficiencies are determined, a 3-D optimization problem is solved, where for each given power demand (average power across one full period of the sinusoidal input voltage) the respective input power as function of an instantaneous input voltage is found. In other words, we for various power demand scenarios, a power trajectory is found that defines a momentary power for the various input voltages over the course of an AC cycle. Such trajectories may be found for any number of output power levels. For example, in one specific embodiment, two trajectories are determined: one for a low line input and one for a high line input.

Figure 33:
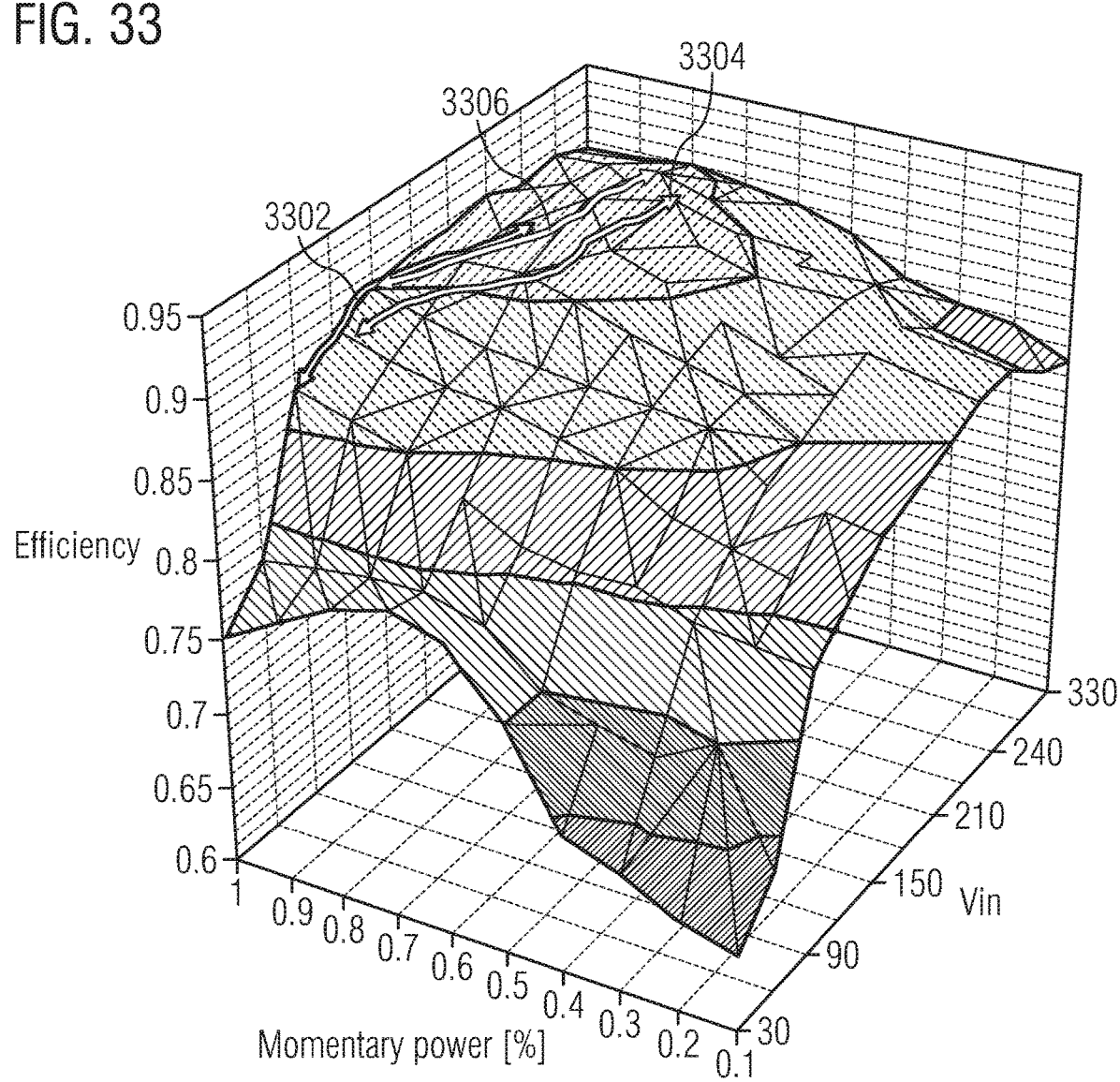
FIG. 33 illustrates a 3-D surface plot representing efficiency vs. momentary power percentage and input voltage for of efficiency vs. momentary power percentage and input voltage.

FIG. 33 illustrates a 3-D surface plot of efficiency vs. momentary power percentage and input voltage. Three example trajectories 3302, 3304 and 3306 are shown superimposed on the 3-D surface. Each of these trajectories 3302, 3304 and 3306 represent a given momentary power percentage provided by DC-DC converter 2806 for a given input voltage across the AC line cycle for a particular RMS input voltage. In other words, as the input voltage of the rectified AC input voltage changes within a single AC cycle, the momentary power of DC-DC converter is controlled such that it adheres to a particular predetermined trajectory. In various embodiments, trajectories 3302, 3304 and 3306 are set such that the integral of the momentary power across the trajectory equals the average power needed by the system. Also, in some embodiments, the trajectories are chosen such that the total efficiency of the system is maximized. Alternatively, some embodiments may utilize a trajectory having a non-maximum efficiency depending on the particular embodiment and its specifications.

Trajectory 3302 represents, a path taken at low line conditions (e.g., low input voltages); trajectory 3306 represents a path taken at high line conditions (e.g., high input voltages) and trajectory 3304 represents a path taken at high line conditions, but lower output power than the trajectory 3306.

In various embodiments trajectories are determined finding a peak efficiency throughout an AC cycle, which is graphically represented by the surface lines across the three dimensional (3D) data graph shown in FIG. 33, which represents efficiency data measured from an embodiment converter over a full range input voltage vs. load levels. These efficiency values may be determined by performing actual measurements of a physical system, by simulating the physical system, or via a mathematical model, for example. The trajectories may be found, using mathematical algorithms known in the art. Once the trajectories are found they may be stored in a look-up table that provides a momentary power as a function of the input voltage and the power demanded by the load. During operation, the input to the lookup table may be provided an address representing the instantaneous input voltage that the particular load condition and the lookup table provides an instantaneous power setting for DC-DC converter 2806. In another embodiment, the lookup table may be provided with other parameters that represent the input voltage and load conditions, such as a number representing the input voltage level (e.g. an average voltage or rms voltage), a number representing the phase of the AC cycle, and a number representing a load condition. The average or RMS voltage may be measured across a single AC cycle or over longer periods of times in some embodiments, for example, up to 1 second or longer. Longer measurement time intervals for the input voltage may be applied, for example, in burst mode. In some embodiments, when the load conditions and/or the input voltage change, the system moves from one trajectory to another.

Figure 34A:
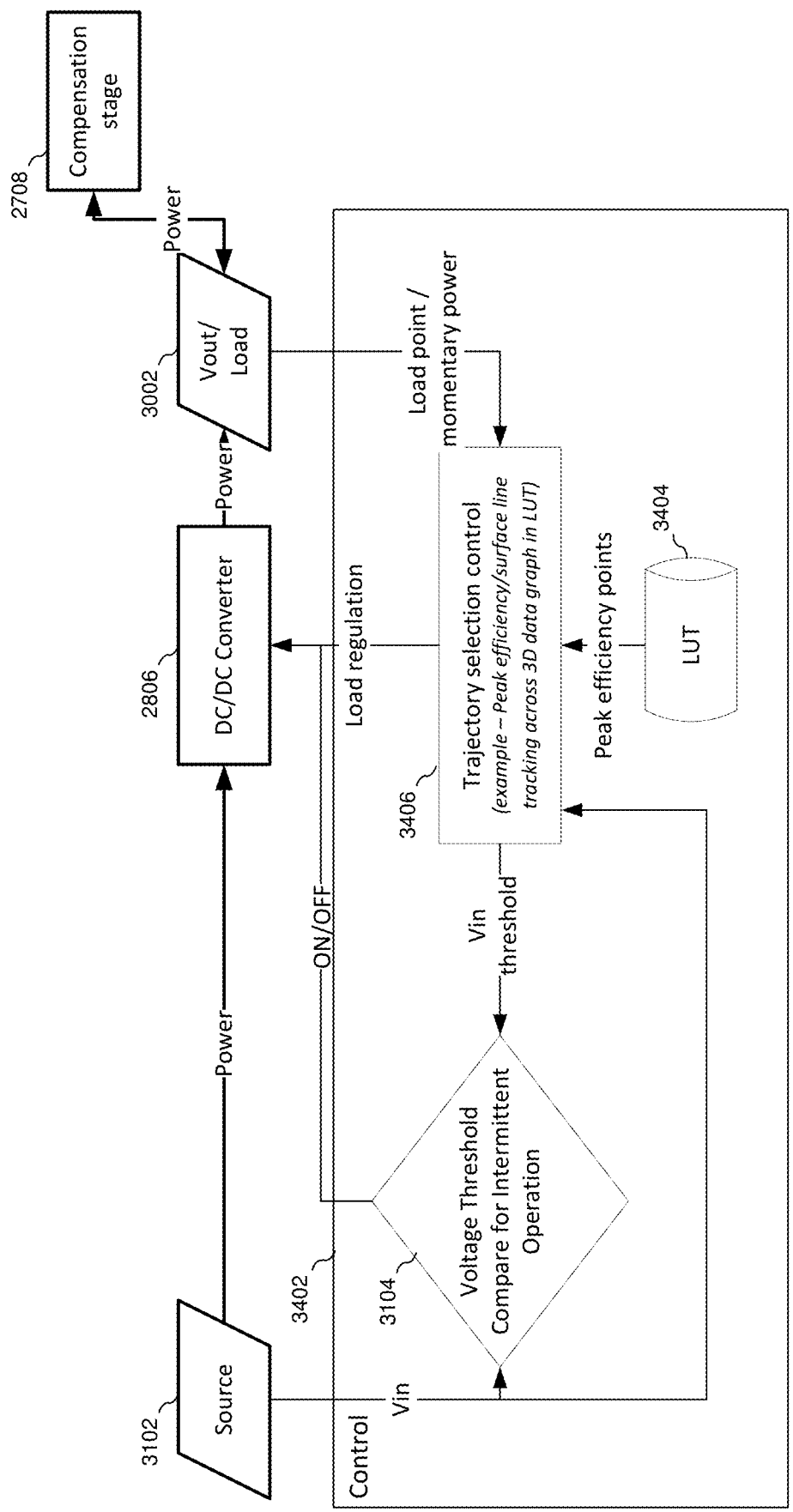
FIGS. 34A and 34B illustrates a control diagram and an implementation block diagram of an embodiment power converter.

FIG. 34A illustrates an example control diagram that includes embodiment power flow controller 3402 that implements an embodiment trajectory control scheme and can be used to implement power flow controller 2810 of FIG. 29. As shown, power flow controller 3402 includes trajectory selection controller 3406 and threshold comparison block 3104. In some embodiments, trajectory selection controller 3406 is coupled to lookup table 3404. During operation, trajectory selection controller 3406 provides a load regulation value to DC-DC converter 2806 based on a determined trajectory. This load regulation value may be in the form of control signal that represents a weighed value, momentary power, duty cycle, switching frequency or amount of power to be delivered to the load. The load regulation value may be an analog or a digital value. In some embodiments trajectory selection controller 3406 determines the load regulation value based on a measured or determined load point that includes power being delivered to load 3002 and/or compensation stage 2708. This load point may be determined based on the output voltage Vout and/or the output current of the power supply, the input voltage Vin of the power supply, and/or predetermined knowledge of the load.

Trajectory selection controller 3406 may determine the load regulation value based on peak efficiency points stored in lookup table 3404 that may contain, for example, a peak efficiency curve having peak efficiency points stored according to an instantaneous load voltage, load current load power, source voltage, source current, source power and/or other signals that vary according to the AC input cycle.

In one example, a load requirement is determined and trajectory selection controller 3406 controls the power flow though DC-DC converter 2806 based on a predetermined criteria. If controller 3406 operates according to peak efficiency, then a peak efficiency curve is stored in lookup table 3404, and controller 3406 provides a load regulation value that tracks a peak efficiency according. In some embodiments, this peak efficiency trajectory stored in lookup table 3404 corresponds to peak efficiency lines on the surface of the 3D plot in FIG. 33. Alternatively other peak efficiency lines corresponding to a particular application may be used. In some embodiments, controller 3402 causes DC-DC converter 2806 to operate at its most efficient point regardless of the actual power flowing out of DC-DC converter 2806. In some embodiments, the momentary power could be higher or lower than the overall required power such that the difference is provided or extracted the compensation stage 2708.

In some embodiments, threshold comparison block 3104 may also be used to turn-on and turn-off DC-DC converter 2806 based on the instantaneous input voltage Vin, such that DC-DC converter 2806 is shut-down during particular portions of the AC input cycle. For example, DC-DC converter 2806 may be shut down when input voltage Vin is less than Vin threshold. The comparison threshold Vin threshold used by threshold comparison block 3104 may be determined by trajectory selection control block 3406 and may be based on the peak efficiency points provided by lookup table 3404 and/or the determined load point.

In some embodiments, the operation of the power supply system may be optimized toward reducing EMI. This may be accomplished, for example, by disabling DC-DC converter 2806 during portions of the AC input cycle when DC-DC converter 2806 converter is prone to producing an EMI spectrum that exceeds a particular amount over certain or all frequencies. For example, in embodiments where DC-DC converter 2806 utilizes zero voltage switching (ZVS) or quasi-resonant switching, DC-DC converter may be disabled in regions where the zero voltage switching (ZVS) or quasi-resonant switching is less effective at reducing EMI.

Figure 34B:
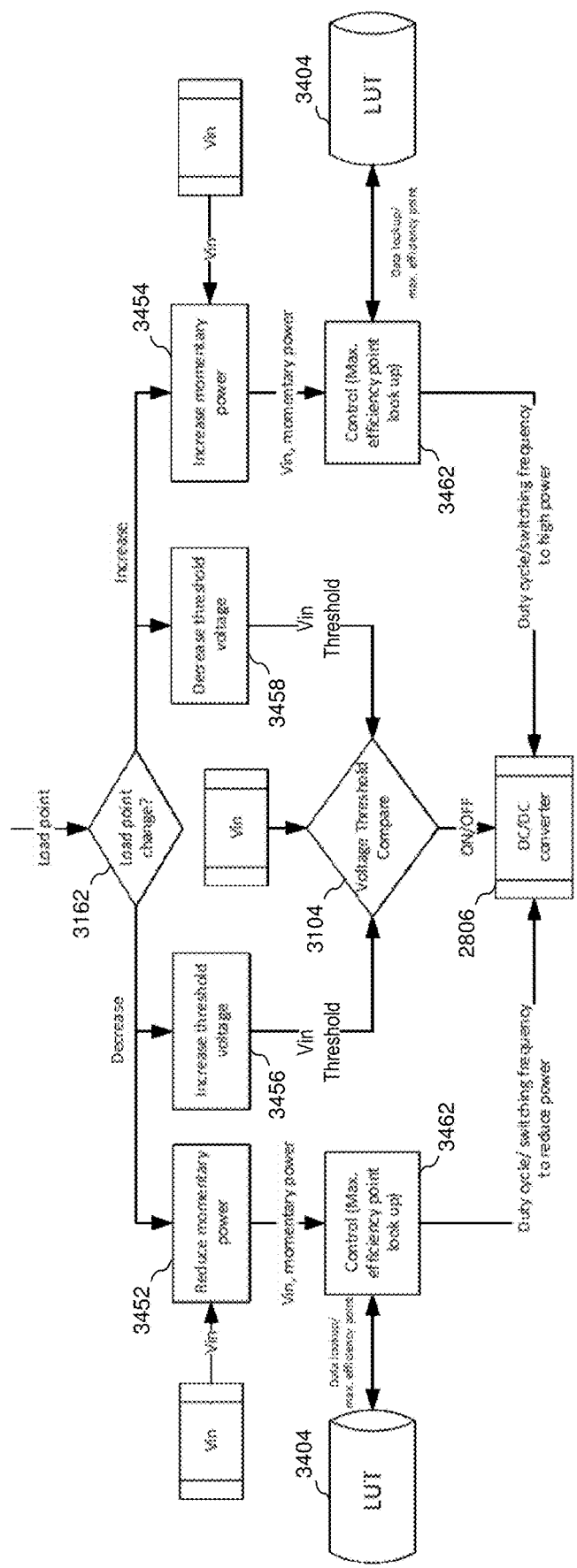

FIG. 34B illustrates a block diagram of one possible implementation of trajectory selection controller 3406. As shown, during operation, load point tracking block 3162 determines whether there has been a change in load point at the load 3002 or via compensation stage 2708. If the load has increased, the voltage threshold Vin threshold is decreased via block 3458 and the momentary power is increased via block 3454. This increase in momentary power is effected by providing an input representing the increased momentary power and input voltage Vin to LUT 3404 using control block 3462. From the output of the LUT, control block 3462 determines and provides a duty cycle and/or switching frequency to DC-DC converter 2806. On the other hand, if the load has decreased, the voltage threshold Vin threshold is increased via block 3456 and the momentary power is increased via block 3452. This increase in momentary power is effected by providing an input representing the increased momentary power and input voltage Vin to LUT 3404 using control block 3462. From the output of the LUT, control block 3462 determines and provides a duty cycle and/or switching frequency to DC-DC converter 2806. Blocks 3162, 3452, 3454, 3456, 3458 and 3462 may be implemented using digital control logic, a software controlled processor such as a microcontroller, or other digital control circuits known in the art. The generated threshold voltage, duty cycle and/or switching frequency may be an analog voltage or a digital value.

It should be understood that FIG. 34B represents just one possible manner of implementing trajectory selection controller 3406. In alternative embodiments, the function of trajectory selection controller 3406 may be implemented in using different circuits and methods.

Figure 35A:
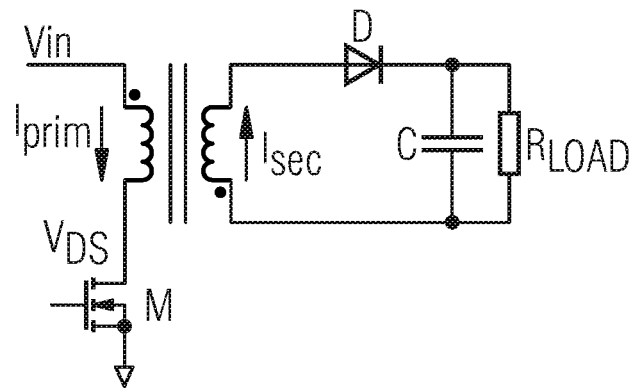
FIGS. 35A-35C include a schematic and a waveform diagrams of a quasi-resonant converter.
Figure 35B:
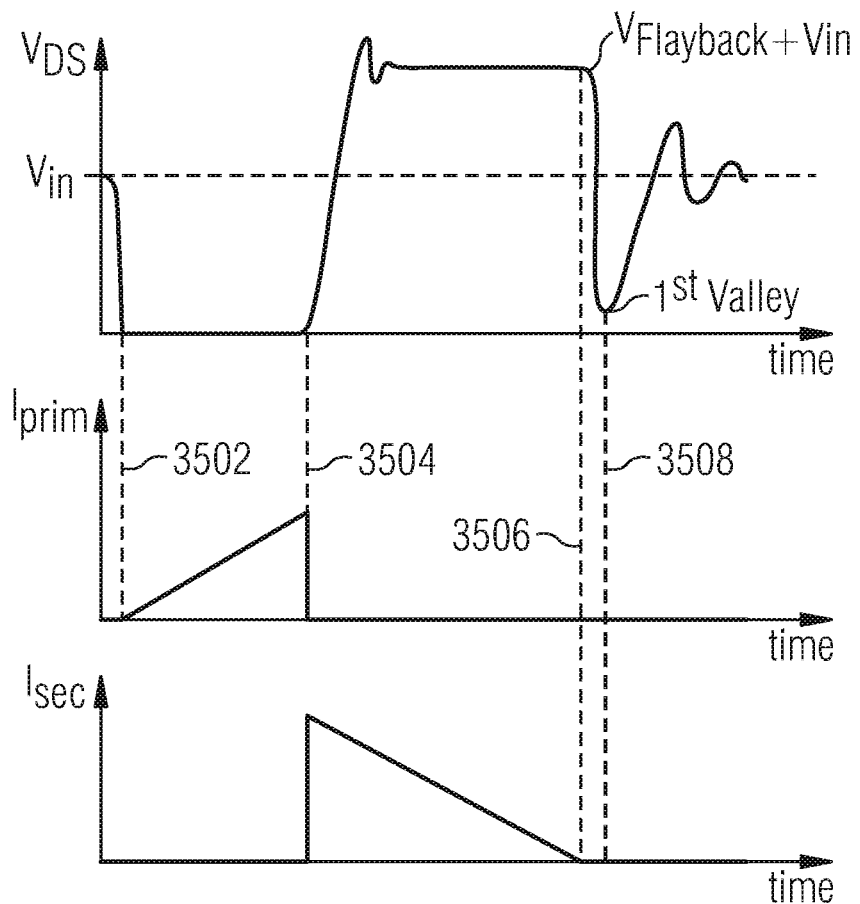

In some fly-back converter topologies, quasi-resonant switching may be less effective at high line conditions as illustrated in FIG. 35A that shows an example fly-back converter and FIG. 35B that shows a corresponding waveform diagram of voltages during quasi-resonant operation. As shown in FIG. 35A, an example fly-back converter includes switching transistor M coupled to the primary winding of a transformer. The secondary winding of the transformer is connected to a load represented by capacitor C and resistor $R_{LOAD}$ via Diode D.

As shown in FIG. 35B, between times 3502 and 3504, switching transistor M is turned-on, thereby causing a linearly increasing current $I_{prim}$ to flow through the primary winding of the transformer. At time 3504, switching transistor M is turned-off, thereby causing energy stored in the transformer to be transferred to the second side, thereby causing a linearly decreasing current $I_{sec}$ to flow through the primary winding of the transformer. During this time the voltage across the drain source voltage $V_{DS}$ of transistor M increases to Vin+Vflyback with Vin being the voltage applied to the converter, and Vflyback being the voltage of the secondary being reflected to the primary side via the transformer. When secondary side current $I_{sec}$ reaches zero, diode D become reversed bias, and the drain source voltage $V_{DS}$ of transistor M exhibits an underdamped response due to an LC network formed by the leakage inductor of the transformer and the capacitances of the secondary side rectifying diode or synchronously rectifying switch and the primary side output capacitance. This underdamped response exhibits a first minimum voltage or "valley" between times 3506 and 3508. This valley voltage is about Vin−Vflyback. In various embodiments, switching transistor M is turned at or near this minimum voltage in order to reduce the power dissipated by switching transistor and in order to reduce EMI. In various embodiments, in order to further reduce EMI, DC-DC converter 2806 is disabled when valley voltage Vin−Vflyback exceeds a given threshold. This threshold may be, for example, between about 30 V and about 40 V however other thresholds outside of the range may be used.

Figure 35C:
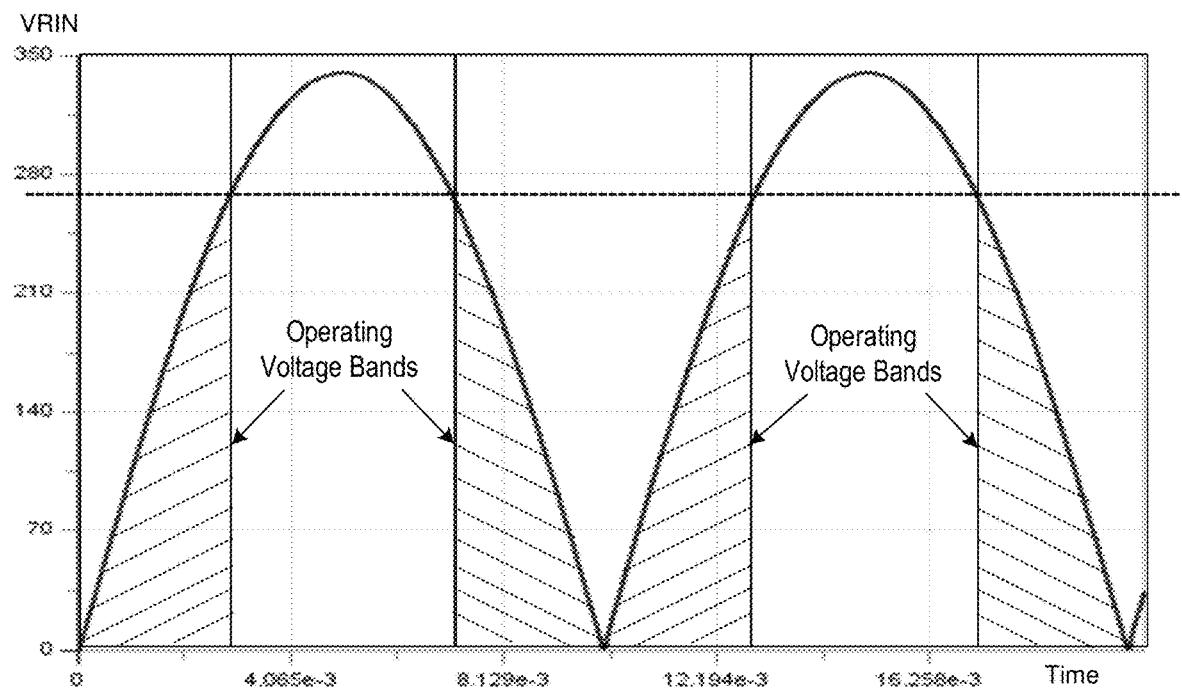

FIG. 35C illustrates a waveform diagram showing the times during which DC-DC converter 2806 is operational with respect to a waveform of rectified input voltage VRIN. As shown, DC-DC converter 2806 is enabled when rectified input voltage VRIN is less than a threshold of about 260 V, which corresponds to valley voltage of between about 30 V and 40 V. Alternatively, other input voltage threshold may be used. By disabling the switching of DC-DC converter when rectified input voltage VRIN is greater than a threshold, EMI may be reduced.

Figure 36A:
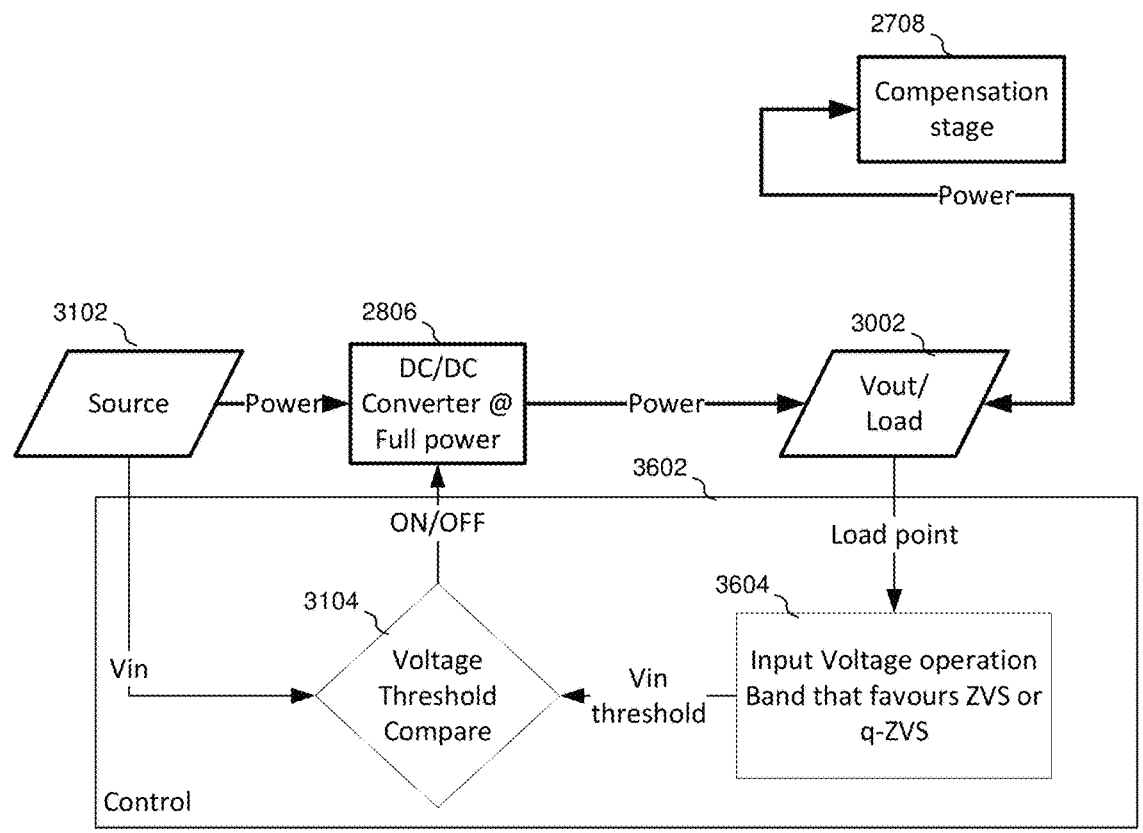
FIGS. 36A-36C illustrate a control diagram and implementation block diagrams an embodiment quasi-resonant converters.

FIG. 36A illustrates an example control diagram that includes embodiment power flow controller 3602 that implements a control scheme that reduces EMI according to the embodiments of FIGS. 35A-35C and can be used to implement power flow controller 2810 of FIG. 29. As shown, power flow controller 3602 includes threshold generation circuit 3604 and threshold comparison block 3104. During operation threshold comparison block 3104 compares the instantaneous input voltage Vin generated by source 3102 with a threshold generated by threshold comparison block 3104. When input voltage Vin is less than the generated threshold, DC-DC converter 2806 is enabled. On the other hand, when the input voltage Vin is not less than the generated threshold, the operation of DC-DC converter 2806 is suspended. In various embodiments, threshold generation circuit 3604 produces a threshold based on the load conditions 3002 and based on the ZVS and/or valley switching and EMI characteristics of DC-DC converter. In some embodiments, band selection circuit 3604 produces a threshold that corresponds to a valley switching level of between about 30 V and about 40 V. Alternatively, other levels may be used.

By controlling the threshold voltage Vin threshold, the amount of power being provided to load 3002 is effectively controlled. In embodiments in which the input voltage is low enough that DC-DC converter 2806 operates in a quasi-resonant mode of operation without appreciable losses (e.g, in a "natural ZVS" mode), Vin threshold is set such that DC-DC converter 2806 is shut off when input voltage Vin reaches a point in which natural ZVS is no longer attainable. Also, in some embodiments, DC-DC converter 2806 operates in a maximum power condition.

It should be understood that the application of embodiment EMI reductions methods to a fly-back converter is just one example of many possible examples. Alternatively, embodiment EMI reduction methods may be applied to other power supply topologies such as single or two switch forward topologies, boost topologies, and LLC topologies may be used.

In some embodiments, DC-DC converter 2806 is enabled when the switching frequency of the converter is within a predetermined range, and is disabled when the switching frequency would be outside of this predetermined range. In various fly-back converters, the use of quasi-resonant switching techniques may lead to an increase of switching frequency at light load conditions that result from lower current levels during this operation state. In some situations, however, this increase of switching frequency at reduced output power may reduce the efficiency of the power converter. With the concepts described in previous embodiments the percentage of AC input cycle during which power is drawn from the input by DC-DC converter 2806 may be reduced, thereby operating DC-DC converter at a higher momentary power during a shorter interval of the sinusoidal input voltage. Using this technique, a frequency law where the effective switching frequency stays constant with load or even decreases with lower load requirements may be provided. This may result in a higher efficiency that is flatter across the entire load range.

In some embodiments, the frequency law is set my standards or efficiency measurements. For example, the frequency of operation of DC-DC converter 2806 may be kept to a single frequency. By keeping the frequency of operation at a fixed or limited range of operation, the design of the EMI filter, such as EMI filter 1808 shown in FIGS. 18A and 18C, may be simplified, for example, by using an lower order filter than would otherwise be used.

Finally, an embodiment frequency law may be established to set a minimum switching frequency. For example by setting a minimum switching frequency of about 20 KHz, audible noise may be avoided. A higher limit, for example, 140 kHz, might be used to in conjunction with an EMI filter having a lowpass characteristic, such that harmonics of the switching frequencies are heavily attenuated for frequencies higher than the minimum frequency. In some embodiments, the frequency law may specify a load-dependent frequency. For example, the switching may be increased at higher loads in order to keep the physical size of the power converter smaller. The switching frequency may also be kept to a minimum frequency at low loads.

Figures 36B, 36C:
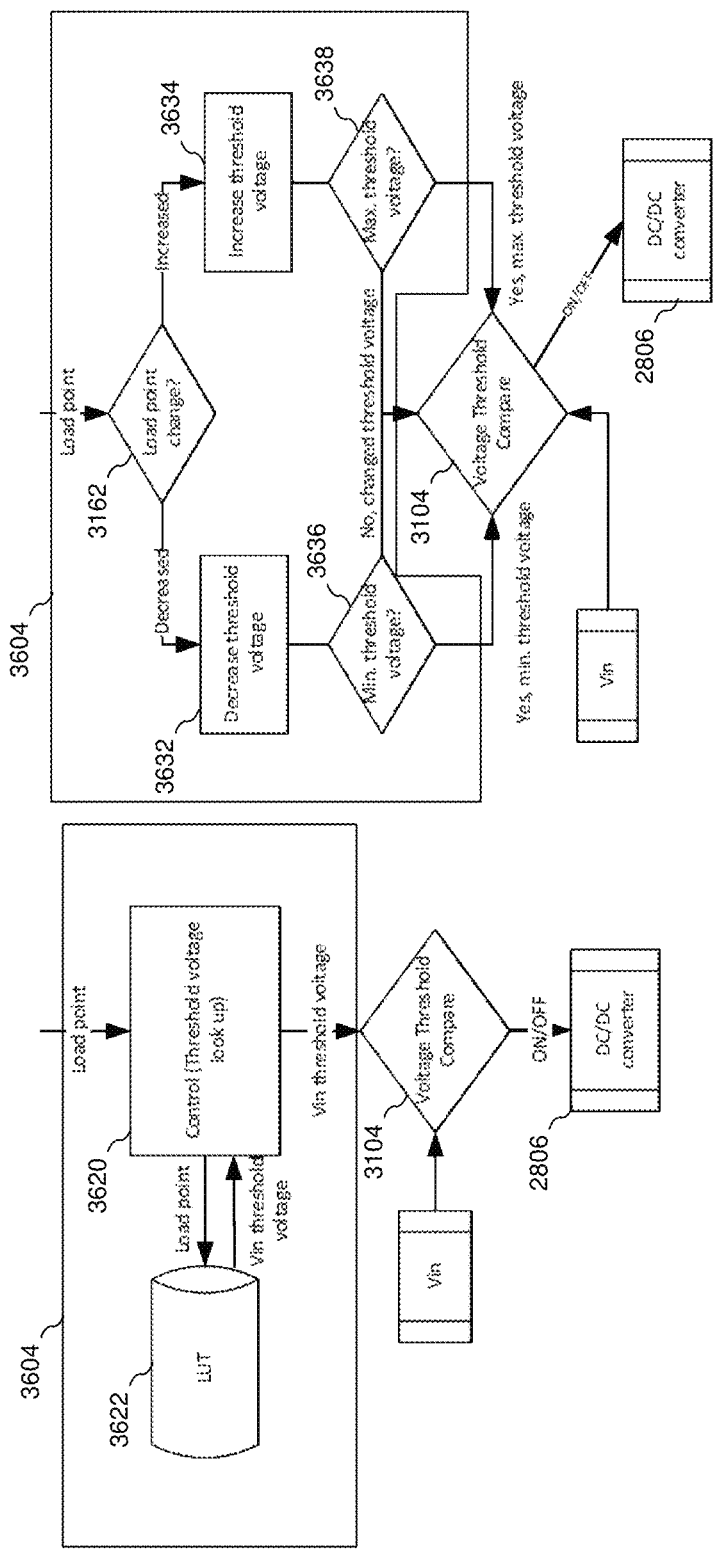

FIGS. 36B and 36C illustrate two possible implementation block diagrams of threshold generation circuit 3604. As shown in FIG. 36B threshold generation circuit 3604 is implemented using lookup table (LUT) 3622 in which various threshold voltages are stored as a function of load point. Control circuit 3620 reads the load point provided by measuring the load or provided by compensation stage 2708, provides the load point to LUT 3622, reads LUT 3622 to determine the threshold voltage and provides the threshold voltage to voltage threshold compare block 3104 (FIG. 36A). LUT 3622 may be implemented using lookup table circuits known in the art, and control circuit 3620 may be implemented using digital control logic, a software controlled processor such as a microcontroller, or other digital control circuits known in the art. The generated threshold voltage may be an analog voltage or a digital value representative of the threshold voltage.

As shown in FIG. 36C, load point tracking block 3162 determines whether there has been a change in the load point. If the load point has decreased, the threshold is decreased via block 3632 and the decreased threshold is compared to a minimum threshold in block 3636. If the decreased threshold is not less than the minimum threshold, the decreased threshold is used for threshold value Vin threshold and provided to voltage comparison block 3104, otherwise, the minimum threshold is used. On the other hand, if the load point has increased, the threshold is increased via block 3634 and the increased threshold is compared to a maximum threshold in block 3638. If the increased threshold is not greater than the maximum threshold, the increased threshold is used for threshold value Vin threshold and provided to voltage comparison block 3104, otherwise, the maximum threshold is used. Blocks 3620, 3622, 3162, 3632, 3634, 3636 and 3638 shown in FIGS. 36B and 36C may be implemented using digital control logic, a software controlled processor such as a microcontroller, or other digital control circuits known in the art. The generated threshold voltage, duty cycle and/or switching frequency may be an analog voltage or a digital value.

Figure 37:
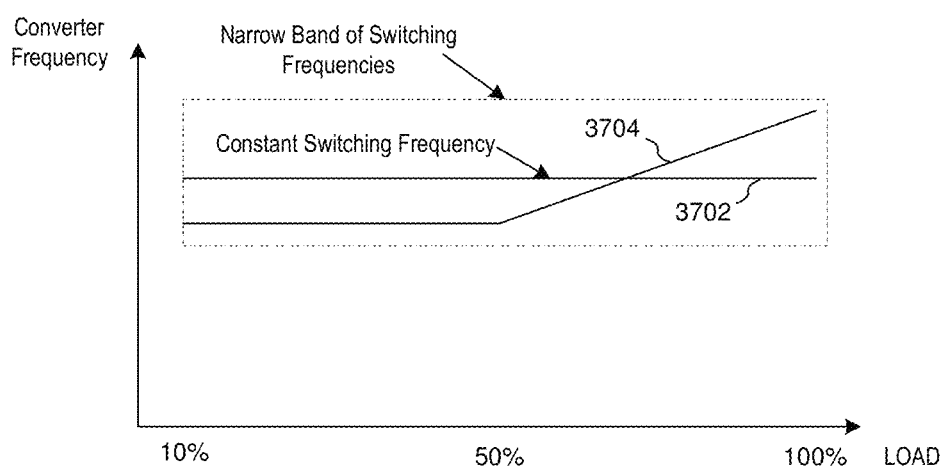
FIG. 37 illustrates a graph of frequency vs. percent load for an embodiment power converter.

FIG. 37 illustrates a plot of two such example frequency laws or frequency profiles 3702 and 3704. Frequency profile 3702 represents a constant switching profile from 10% load to 100% load, while switching profile 3704 represents a frequency profile in which the switching frequency of DC-DC converter 2806 is constant between a 10% load and a 50% load and increases with increasing loads over 50%. In various embodiments, burst mode techniques or other control methods for lightly loaded switched-mode power supplies may be used for loads that are less than 10% of full load. It should be understood that frequency profiles 3702 and 3704 are just two examples of many possible frequency profiles. Alternative profiles may have different shapes. Moreover the transition points between burst-mode operation, constant frequency operation and increasing frequency operation may occur at different load percentage than depicted in FIG. 37.

The embodiment of FIG. 37 may be further extended to provide operating frequency ranges of DC-DC converter 2806 that are designed to reduce or avoid audible noise, reduce or avoid magnetic friction in transformer core, or to reduce or avoid other frequency dependent conditions. For example, such embodiment frequency laws may include limited frequency ranges and/or discrete frequency points as a function of input voltage and/or output load. In some embodiments, the time during which DC-DC converter 2806 operates at a lower power level may be extended to increase output power instead of increasing the current level provided by DC-DC 2806 to meet higher load requirements (which may lead to a lower switching frequency). In some embodiments, resonant switching may be maintained over an entire load range in this manner. In such embodiments, limiting the frequency range of operation may also limit the frequency range of EMI produced by the power supply system. Accordingly, in some embodiments, the EMI filter used in the power supply system may be simplified. For example, if EMI can be optimized to occur within a narrow frequency band, the EMI filter itself may be designed to include fewer stages than otherwise would be necessary (e.g., a single stage instead of two stages), thereby saving cost and board space.

Figure 38A:
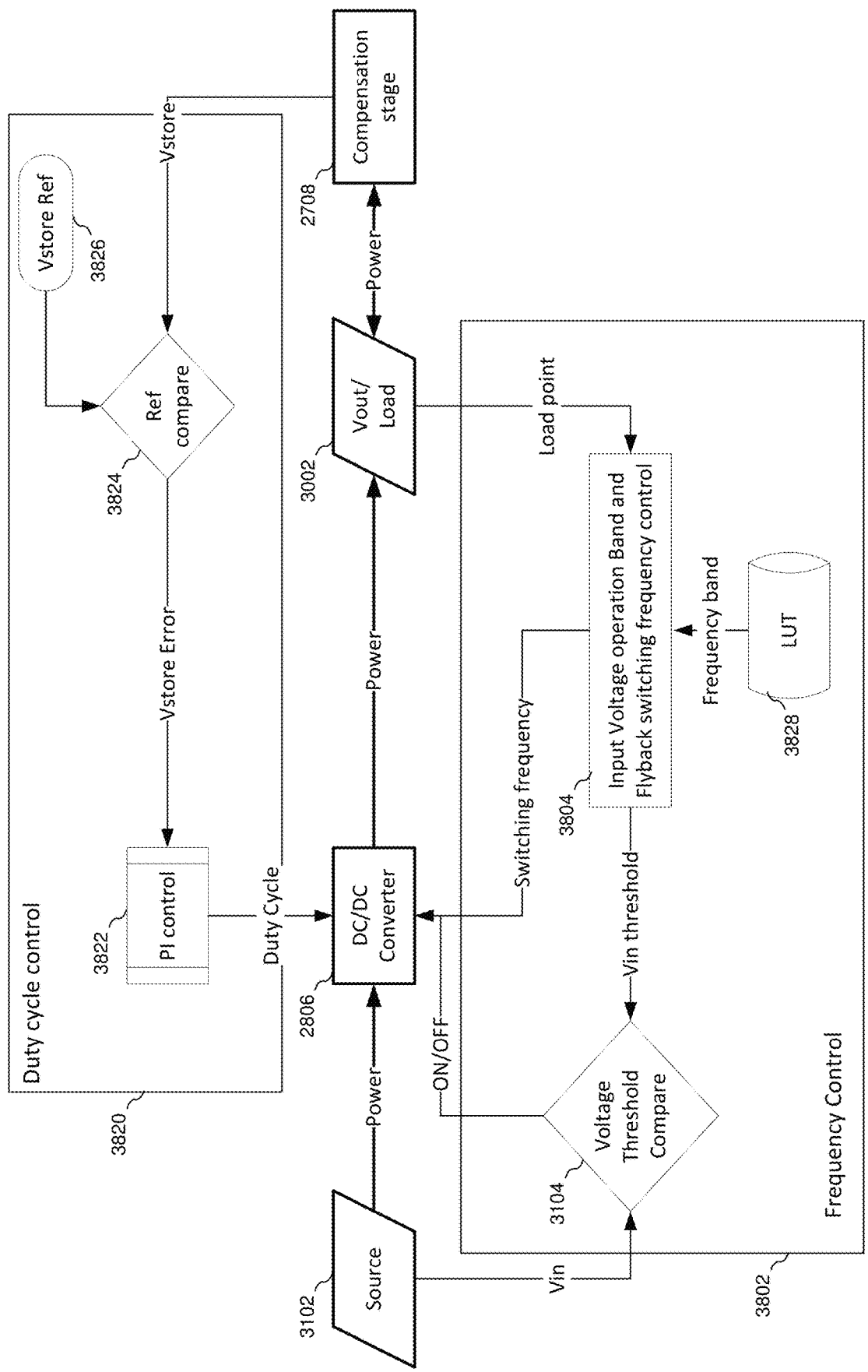
FIGS. 38A-38C illustrates a control diagram and implementation block diagrams of an embodiment power converter.

FIG. 38A illustrates an example control diagram that includes embodiment power flow controller 3802 that implements a control scheme that operates DC-DC converter 2806 according to a predetermined frequency law as discussed above, and can be used to implement power flow controller 2810 of FIG. 29. In addition, FIG. 38A also shows duty cycle controller 3820 interfaced to DC-DC converter 2806 and compensation stage 2708. As shown, power flow controller 3802 includes input voltage operation band and fly-back switching control block 3804 and voltage threshold comparison block 3104. During operation, input voltage operation band and fly-back switching control block 3804 analyzes a measured load point of load 3002 and determines a switching frequency for DC-DC converter 2806 and a Vin threshold used by voltage threshold comparison block 3104. This output variables may be determined, for example, by providing an address based on the determined load point to lookup table (LUT) 3828 and reading out the variables from LUT 3828. In such embodiments, a frequency law, such as the one depicted in FIG. 37, may be loaded into the LUT for retrieval during operation. Alternatively, the switching frequency and Vin threshold may be calculated or determined using other circuitry known in the art such as a digital processor running a program configured to determine the output variables or other digital logic. In various embodiments, voltage threshold comparison block 3104 compares Vin threshold with input voltage Vin provided by source 3102 and shuts down DC-DC converter 2806 when input voltage Vin is less than Vin threshold.

In various embodiments, duty cycle controller 3820 provides determines the duty cycle produced by DC-DC converter based on the voltage Vstore produced by compensation stage 2708. In some embodiments, voltage Vstore represents the voltage across an energy storage element such as a capacitor Cstore shown in FIG. 29. In some embodiments, duty cycle control block 3820 operates using similar principles of compensation stage controller 2811 shown in FIG. 30. During operation, reference comparison block 3824 compares voltage Vstore with a predetermined voltage produced by reference generator 3826 to form an error signal Vstore Error. Proportional-Integral (PI) controller 3822 adjusts the dynamics of the loop and determines a duty cycle for DC-DC converter 2806. By using duty cycle controller 3820 in conjunction with frequency controller 3802, the energy storage element (not shown) can be effectively "topped off" every cycle to ensure adequate energy storage. In various embodiments, reference comparison block 3824 is implemented using summing and/or differencing circuits known in the art, such as summing and differencing amplifiers, and reference voltage generator 3826 is implemented using voltage generation circuits known in the art such as bandgap circuits. Similarly, PI controller 3822 may be implemented using dynamic controller circuits known in the art that includes amplifiers and integrator circuits. In alternative embodiments, blocks 3822, 3824 and 3826 may be implemented using digital circuitry such as custom or programmable digital logic, processors such as microcontrollers, and the like.

It should be understood that the application of embodiment frequency laws to a fly-back converter is just one example of many possible examples. Alternatively, embodiment frequency law operation may be applied to other power supply topologies including, but not limited to single or two-switch forward topologies, boost topologies and LLC topologies.

Figure 38C:
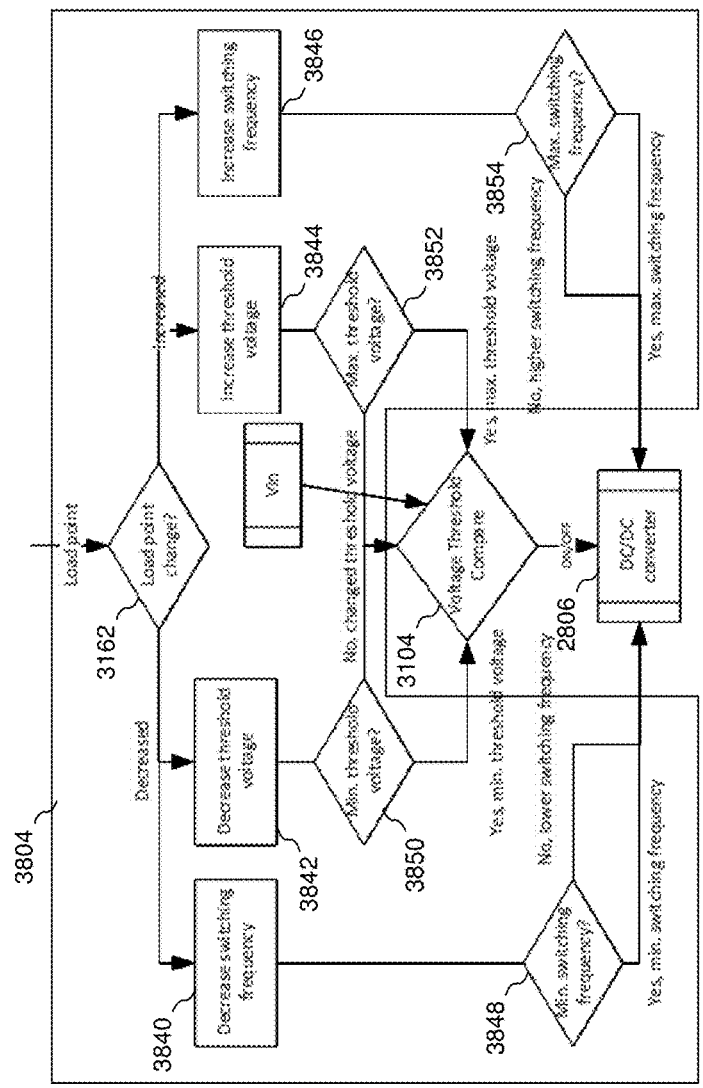
Figure 38B:
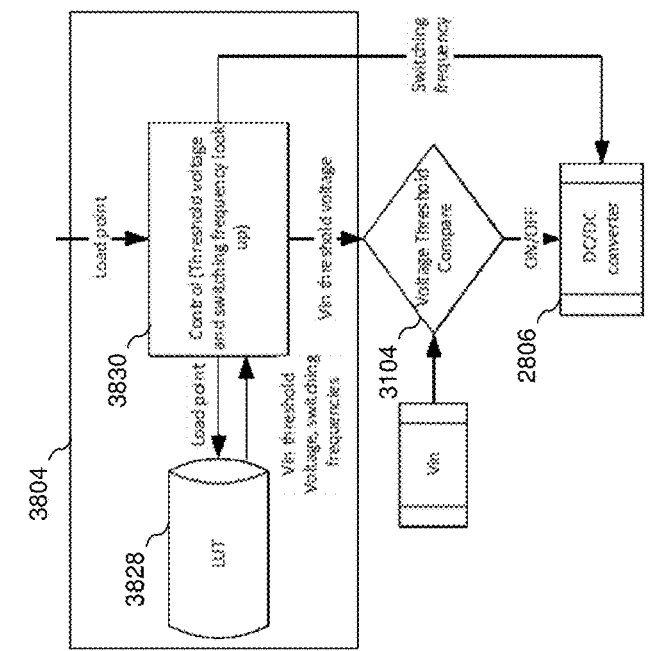

FIGS. 38B and 38C illustrate two possible implementation block diagrams of input voltage operation band and fly-back switching control block 3804. As shown in FIG. 38B input voltage operation band and fly-back switching control block 3804 is implemented using lookup table (LUT) 3828 in which various threshold voltages are stored as a function of load point. Control circuit 3820 reads the load point provided by measuring the load or provided by compensation stage 2708, provides the load point to LUT 3828, reads LUT 3828 to determine the threshold voltage and provides the threshold voltage to voltage threshold compare block 3104 (FIG. 38A). LUT 3828 may be implemented using lookup table circuits known in the art, and control circuit 3830 may be implemented using digital control logic, a software controlled processor such as a microcontroller, or other digital control circuits known in the art. The generated threshold voltage may be an analog voltage or a digital value representative of the threshold voltage.

As shown in FIG. 38C, load point tracking block 3162 determines whether there has been a change in the load point. If the load point has decreased, the threshold is decreased via block 3842 and the decreased threshold is compared to a minimum threshold in block 3850. If the decreased threshold is not less than the minimum threshold, the decreased threshold is used for threshold value Vin threshold and provided to voltage comparison block 3104, otherwise, the minimum threshold is used. In addition, the switching frequency is decreased using block 3840 and the decreased switching frequency is compared to a minimum switching frequency via block 3848. If the decreased frequency is not less than the minimum switching frequency, the decreased switching frequency is supplied to DC-DC converter 2806. Otherwise the minimum switching frequency is provided to DC-DC converter 2806.

On the other hand, if the load point has increased, the threshold is increased via block 3844 and the increased threshold is compared to a maximum threshold in block 3852. If the increased threshold is not greater than the maximum threshold, the increased threshold is used for threshold value Vin threshold and provided to voltage comparison block 3104, otherwise, the maximum threshold is used. In addition, the switching frequency is increased using block 3846 and the increased switching frequency is compared to a maximum switching frequency via block 3854. If the increased frequency is not greater than the maximum switching frequency, the increased switching frequency is supplied to DC-DC converter 2806. Otherwise the maximum switching frequency is provided to DC-DC converter 2806

Blocks 3162, 3828, 3830, 3840, 3842, 3844, 3846, 3848, 3850, 3852, and 3954 shown in FIGS. 38B and 38C may be implemented using digital control logic, a software controlled processor such as a microcontroller, or other digital control circuits known in the art. The generated threshold voltage, duty cycle and/or switching frequency may be an analog voltage or a digital value.

Figure 39:
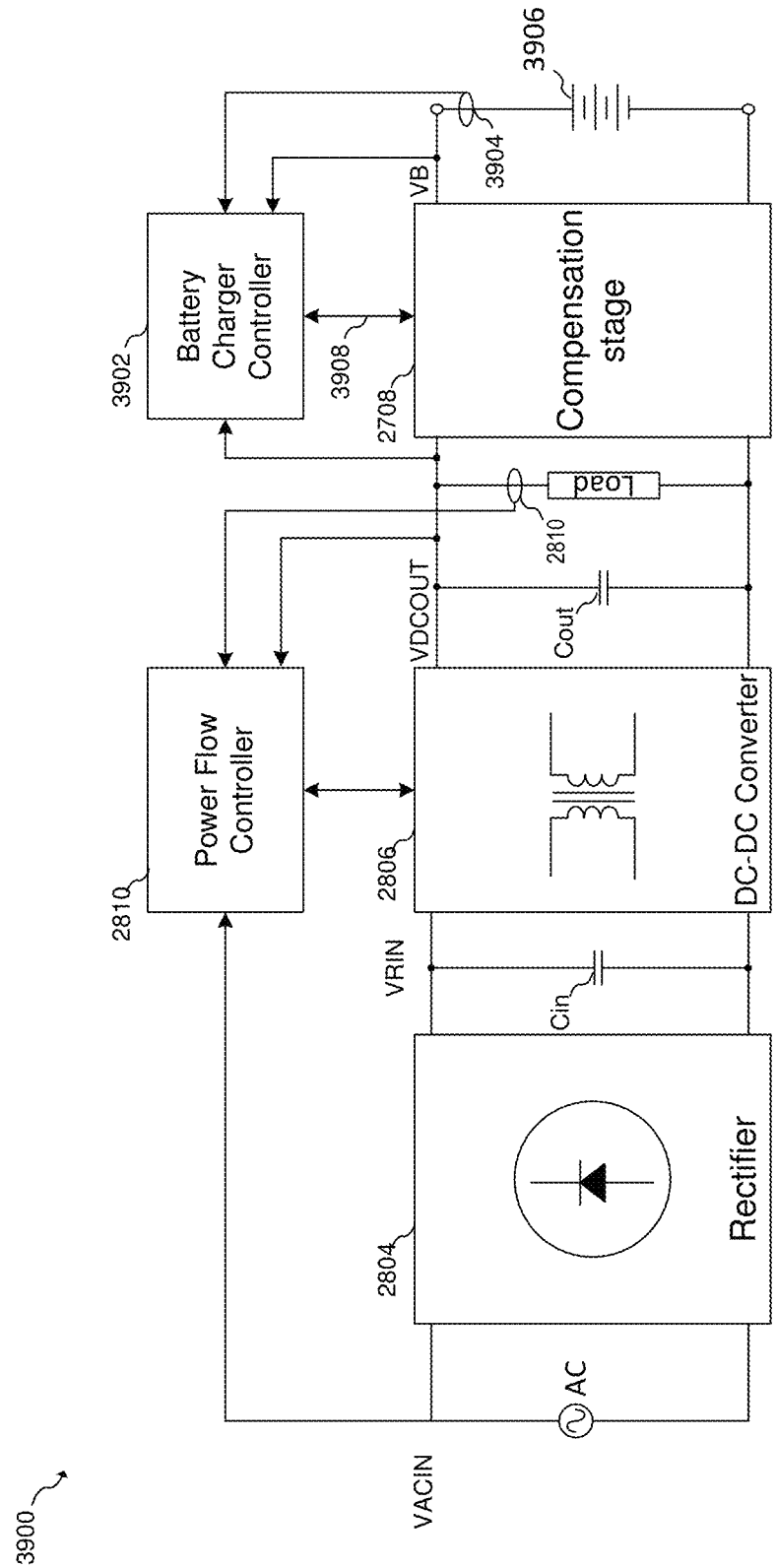
FIG. 39 illustrates an embodiment switched-mode power supply that includes secondary storage implemented as battery.

In accordance with further embodiments, the secondary energy storage element may be implemented using a battery instead of a capacitor as shown with respect to power supply system 3900 illustrates in FIG. 39. Power supply system 3900 is similar to power supply system 2900 illustrated in FIG. 29, except that secondary storage element Cstore is replaced by a battery 3906 and compensation stage 2708 is further controlled by battery charger controller 3902. During operation, when DC-DC converter produces more power than is required by the load, the excess power is used to charge battery 3906 via compensation stage 2708. On the other hand, when the load requires more power than is being produced by DC-DC converter, compensation stage 2708 transfers the remaining energy from battery 3906 to the load via compensation stage 2708. In various embodiments, battery charger controller 3902 is configured to measure power supply output voltage VDCOUT and battery voltage VB. Battery charger controller 3902 may also be configured to measure the battery via current measurement circuit 3904. It should be understood that embodiments utilizing a battery as the secondary side energy storage device may be combined with the various embodiments disclosed herein that utilize secondary side energy storage. In addition, power flow controller 2810 may be configured to implement any of the various disclosed embodiment systems and methods described with respect to FIGS. 29 to 38. Moreover, systems using a battery as a secondary side energy storage element may also be implemented without power flow controller 2810 and its associated systems and methods.

Figure 40A:
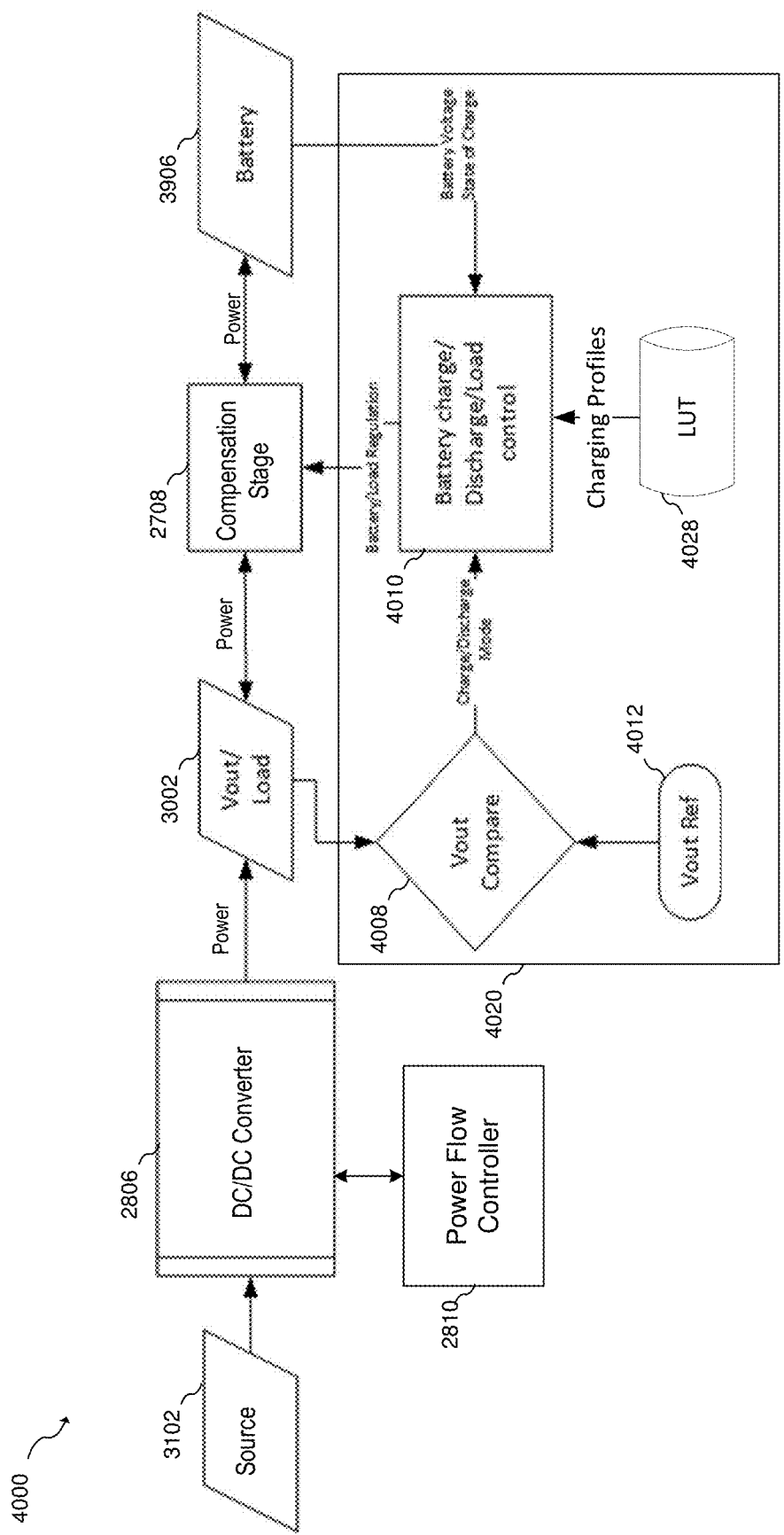
FIGS. 40A and 40B illustrate control diagrams of embodiment power supply systems having a secondary storage implemented as battery.

FIG. 40A illustrates an example control diagram that includes embodiment battery charger controller 4020, which may be used to implement battery charger controller 3902 shown in FIG. 39. As shown, battery charger controller 4020 includes a reference voltage generator 4012, a comparison circuit 4008 and a battery charge/discharge control circuit 4010. During operation, comparison circuit 4008 that compares a load output voltage with a reference voltage generated by reference voltage generator 4012.

When the load output voltage is greater than the reference voltage, battery charge/discharge control circuit 4010 is put in a charging mode. During this charging mode, battery charge/discharge control circuit 4010 provides control signals to compensation stage 2708 cause battery 3906 to be charged by excess power produced by DC-DC converter 2806. In some embodiments, battery charge/discharge control circuit 4010 causes compensation stage 2708 to operate in a buck mode to charge battery 3906. In various embodiments, the current provided by compensation stage 2708 is controlled according to a predetermined battery charging characteristic and according to a measured battery voltage and/or battery charge state. In some embodiments, battery charge/discharge control circuit 4010 determines the control signal sent to compensation stage 2708 using lookup table (LUT) 4028. For example, various battery/load regulation setpoints may be stored in LUT 4028 and retrieved during operation based on the voltage or charge state of battery 3906. In some embodiments, battery charge/discharge control circuit 4010 produces an address based on the determined voltage or charge state of battery 3906, outputs the address to LUT 4028, reads the stored setpoints from LUT 4028 and provides the retrieved setpoint to compensation stage 2708.

Figure 41:
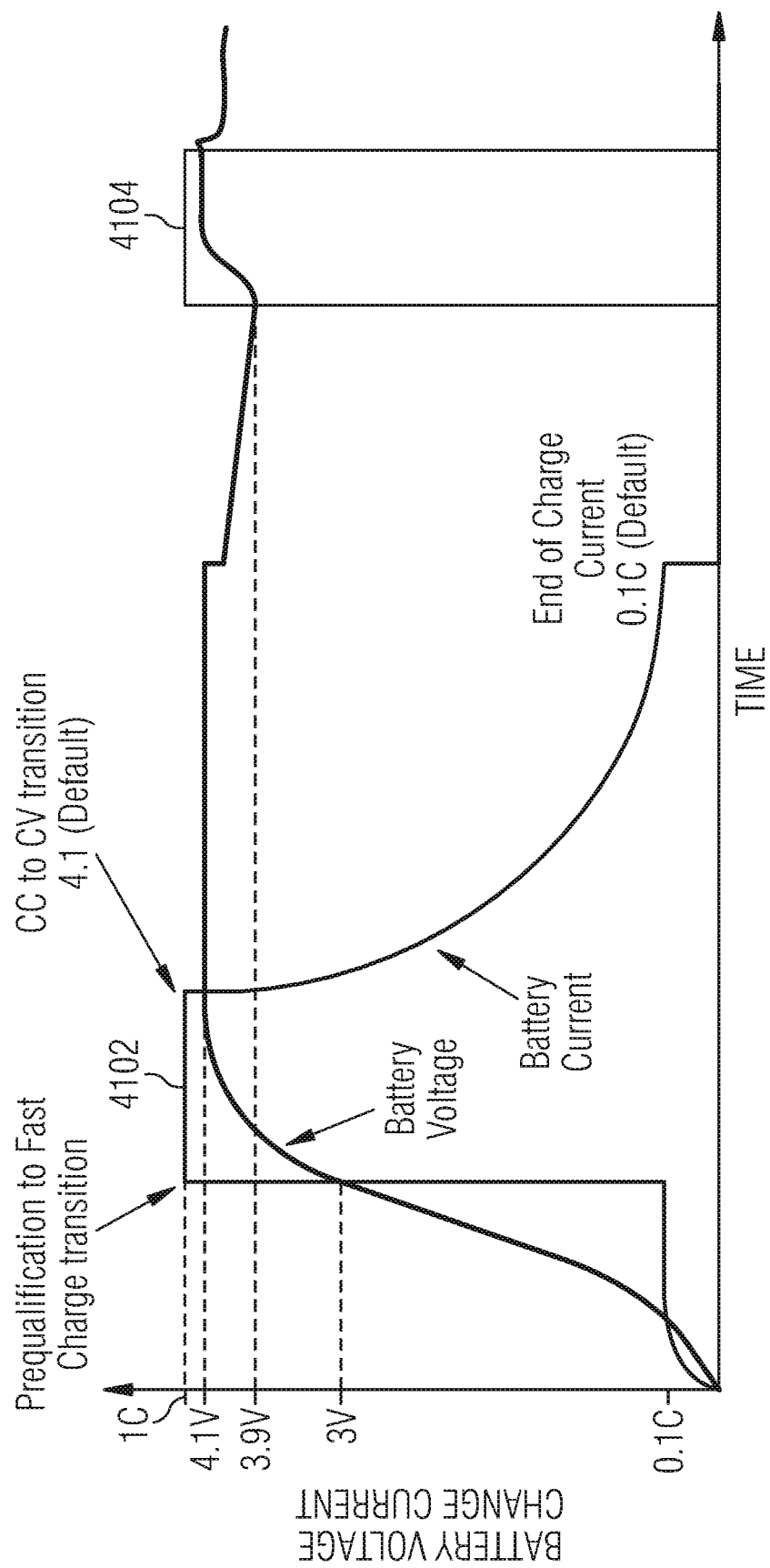
FIG. 41 illustrates and example battery charging curve.

When the load output voltage is not greater than the reference voltage produced by reference voltage generator 4012, battery charge/discharge control circuit 4010 is put in a discharge mode. During this discharge mode, battery charge/discharge control circuit 4010 provides control signals to compensation stage 2708 to cause battery 3906 to provide power to the load. In some embodiments, battery charge/discharge control circuit 4010 causes compensation stage 2708 to operate in a boost mode to discharge battery 3906. In some embodiments, a discharge profile of battery charge/discharge control circuit 4010 only depends on the load condition at Vout/Load 3002. In such an embodiment, the charging profile depends on the battery chemistry. Once such profile for a Li-ion battery is depicted in FIG. 41 where the charging profile depends on the state of the battery.

In various embodiments, battery 3906 is charged according to a battery profile that may include a constant current or constant voltage charging profile depending on state-of-health and state-of-charge of battery 3906. Depending on state-of-charge, the battery 3906 may create a net positive energy demand across the period of the sinusoidal input voltage or a net zero energy demand when being fully charged. In some embodiments, battery 3906 may also have a net negative energy demand when the battery is fully charged and is brought to particular percentage of full load. In some embodiments, this level may be, for example, 80% of full charge.

Battery 3906 may have a net zero energy demand when the output voltage is mainly or entirely supported by the battery such as intervals of the sinusoidal input voltage where the input voltage is below a given threshold or light load conditions. Under such conditions, the load may be fully supported by the battery when DC-DC converter 2806 is disabled. Battery 3906 may also be used to provide peak power above the power handling capability of DC-DC converter 2806.

On the other hand, battery 3906 may have a net positive energy demand when the input voltage is above a certain threshold and when the output power demand is below the power handling capability of DC-DC converter 2806. In this case, a portion of the power delivered by DC-DC converter 2806 may be used to charge the battery using, for example, a constant current charging profile.

In various embodiments, the secondary side battery management stage may be operated across a wide range of load conditions as to use the higher control bandwidth for fast reaction on load jumps and small ripple voltage on the output.

Figure 40B:
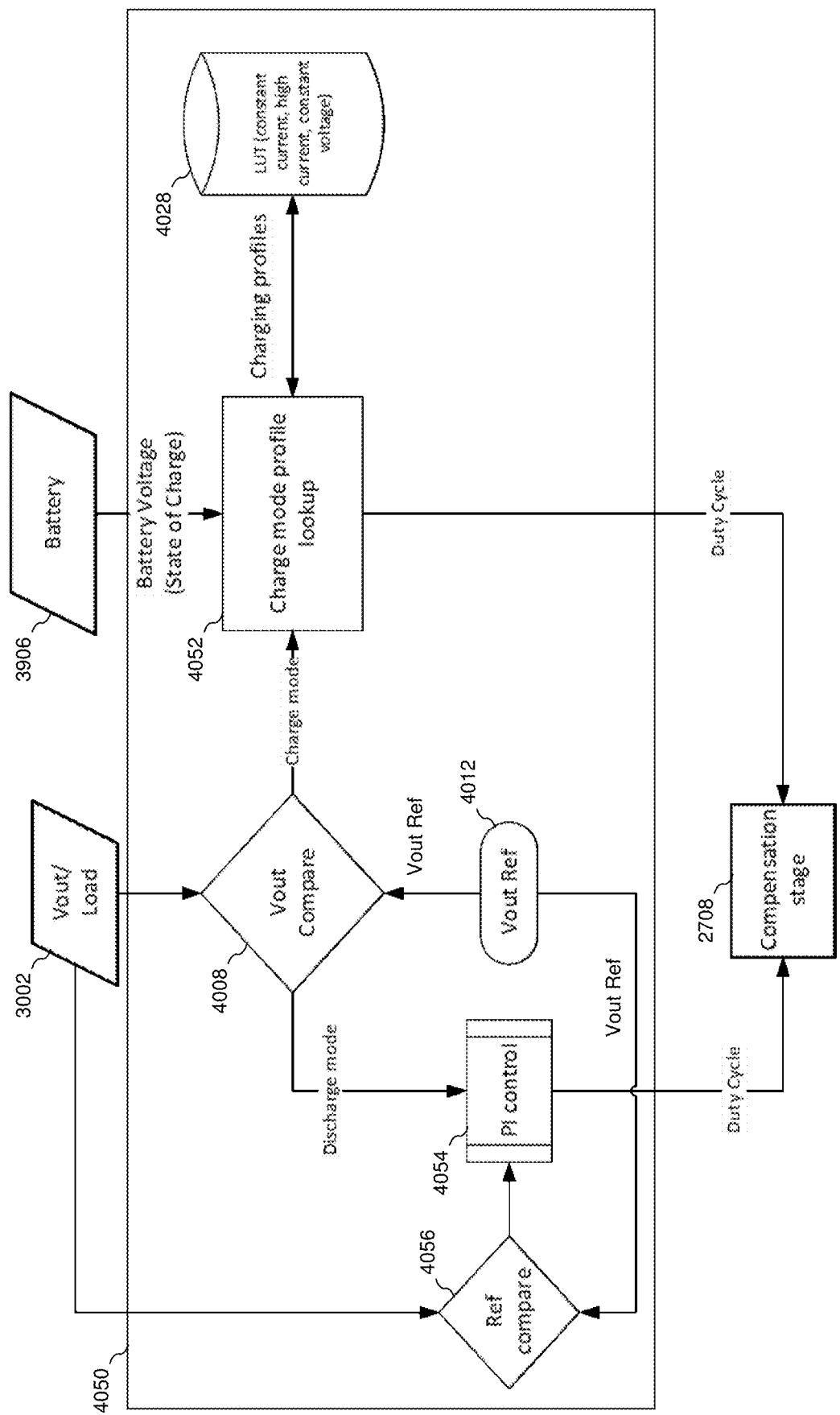

FIG. 40B illustrates a block diagram showing an alternative battery charger controller 4050 that may be used in place of battery charger controller shown in FIG. 40A. As shown battery charger controller includes charge mode profile lookup block 4052 coupled to LUT 4028. During operation, charge mode profile lookup block 4052 receives a measure of the battery charge state of battery 3906 in the form, for example, of a battery voltage. Charge mode profile lookup block 5052 uses the received charge state of battery 3906 and the output voltage Vout via comparison circuit 4008 to produce an input address to LUT 4028 and receives a selected charge mode from LUT based on the received charge state of battery 3906. This charge mode may include, for example, a constant current charge mode, a high current charge mode and a constant voltage charge mode. Based on the charge mode indicated by LUT 4028, a duty cycle (or other control signal such as frequency) is produced by charge mode profile lookup block 4052 and transmitted to compensation stage 2708.

In various embodiments, charge mode profile lookup block provides the duty cycle to compensation stage 2708 only when battery 3906 is being charged. The determination of whether or not battery 3906 is to be charged or discharged may be made by comparison block 4008. For example, when the Vout is greater than a reference voltage Vout Ref produced by reference voltage generator 4012, the system operates in a discharge mode. When Vout is less than the reference voltage, the system operates in a charging mode. In some embodiments, hysteresis is applied to the operation of comparison circuit 4008 to avoid the charging and discharging modes from rapidly changing back and forth.

During the discharge mode, PI controller 4054 provides the duty cycle (or other control variable such as frequency) to compensation stage 2708 to provide a voltage based on reference voltage Vout Ref. Reference comparison circuit 4056 compares the output voltage of the system and produces an error signal based on the difference between Vout Ref and output voltage Vout. This error signal is filtered and compensated by PI controller 4054 to produce the duty cycle control signal. In various embodiments, PI controller 4054 is activated and deactivated by comparison circuit 4008 and is activated only in discharge mode.

In various embodiments, charge mode profile lookup block 4052 may be implemented using digital circuitry and/or a processor that executes instructions. Comparison circuits 4008 and 4056, PI controller 4054 and reference voltage generator 4012 may be implemented in the analog domain or the digital domain. For example, in the analog domain, reference comparison circuit 4056 may implementing using an analog subtraction circuit using an amplifier, comparison circuit 4008 may be implemented using a comparator, PI controller 4054 may be implemented using an analog filter and reference voltage generator 4012 may be implemented using a known reference voltage generation circuit such as a bandgap. In other embodiments, the function of blocks 4008, 4012, 4054 and 4056 may be implemented using digital logic and or processors that execute instructions.

FIG. 41 illustrates an example battery charging curve for a lithium-ion battery that may be implemented by embodiment battery charging circuits. As shown, the battery is initially charged using a constant current charging scheme until the battery voltage reaches 4.1 V. During this charging period, the current provided to the battery is limited to a current defined by curve 4102. Once the battery reaches 4.1 V, the battery charger transitions from a constant current to a constant voltage charging scheme. When the battery voltage drops to 3.9V, a current is reapplied to the battery as represented by current profile 4104. In some embodiments, a constant voltage charging scheme is employed when the battery is almost full and the battery voltage is kept constant in order to prevent battery degradation due to overcharging. To keep the battery voltage constant, the controller provides a small periodic charging current that may not necessary be constant or constant across a predetermined period. It should be understood that the battery charging curve of FIG. 41 is just one example of many possible battery charging curves that may be supported by various embodiments. For example, in alternative embodiments, other battery chemistries may be supported using charging curves appropriate for the particular battery chemistry being used.

Embodiments of the present invention are summarized here. Other embodiments can also be understood form the entirety of the specification and the claims filed herein. One general aspect includes a switched-mode power supply (SMPS) including: a transformer having a plurality of windings sharing a common core; and a plurality of primary stages coupled in series, each of the plurality of primary stages including a winding of the plurality of windings, a switch having a first node coupled to a first terminal of the winding, and a first capacitor coupled between a second terminal of the winding and a second node of the switch.

Implementations may include one or more of the following features. The SMPS further including a bulk capacitor coupled between a power supply input to the SMPS and a reference supply node of the plurality of primary stages of the SMPS. The SMPS where: a capacitance of the bulk capacitor is at least 9 times higher than a capacitance of the first capacitor; and a power supply input to the SMPS includes a DC input. The SMPS where: a capacitance of the bulk capacitor is at least 2 times higher than a capacitance of the first capacitor; and a power supply input to the SMPS includes an AC input. The SMPS further including a driver circuit having an output coupled to control nodes of the switches of the plurality of primary stages. The SMPS where the transformer is configured to balance an unequal voltage across each of the plurality of primary stages via magnetic coupling between the primary stages when the switch is off. The SMPS where at least one primary stage of the plurality of primary stages includes: a driver circuit having a first output coupled to a control node of the switch of a first stage; a bootstrap capacitor coupled between the first output of the driver circuit and a control node of the switch of a second stage; and a diode coupled between the control node and the second node of the switch of the second stage. The SMPS further including synchronization capacitors, each synchronization capacitor coupled between adjacent stages of the plurality of primary stages. The SMPS where each synchronization capacitor is configured to provide an AC current path to equalize an AC voltage between the first terminals of the windings of a first stage and a second stage of the plurality of primary stages. The SMPS further including an energy recovery circuit having an input coupled to the first node of the switch of a second stage of the plurality of primary stages and an output coupled to the second terminal of the winding of a first stage of the plurality of primary stages, where the energy recovery circuit is configured to extract energy from a leakage inductance of the transformer into the first capacitor of the first stage, and the first stage and the second stage are located in a center of the plurality of primary stages, where the first stage is coupled adjacent to the second stage. The SMPS where the energy recovery circuit includes a diode. The SMPS further including: a plurality of synchronization capacitors coupled between the first nodes of adjacent stages of the plurality of primary stages; and a plurality of energy recovery circuits, each energy recovery circuit coupled between the first node of the switch of a second stage of the plurality of primary stages and the second terminal of the winding of a first stage of the plurality of primary stages, where the energy recovery circuit is configured to store energy recovered from a leakage inductance of the transformer when the switch is being turned off. The SMPS where: each energy recovery circuit includes a clamping diode coupled to the first node of the switch of the second stage and to the second terminal of the winding of the first stage; and a dissipative clamp circuit is coupled between the clamping diode and a power supply input of the SMPS. The SMPS where the dissipative clamp circuit includes a capacitor coupled between the diode and the input supply and a Zener diode coupled in parallel with the capacitor. The SMPS further including a bypass circuit coupled between an output of the energy recovery circuit of the second stage and the second terminal of the winding of the first stage. The SMPS where the bypass circuit is configured to reduce a rate of change of current flowing through the energy recovery circuit when the switch is being turned off. The SMPS where the bypass circuit includes: a clamp switch coupled between the output of the energy recovery circuit of the second stage and the second terminal of the winding of the first stage; and a sense circuit having an output coupled to a control node of the clamp switch and an input coupled to an input capacitor of a third stage, where the third stage is coupled in series with the first stage in the opposite direction of the second stage. The SMPS where the clamp switch includes a MOS switch having a gate terminal coupled to the output of the sense circuit, a first source/drain terminal coupled to the winding of the first stage and a second source/drain terminal coupled to the second node of the switch of the second stage. The SMPS where the clamp switch further includes: a level shift circuit having an output coupled to the control node of the clamp switch; a regulated power supply configured to power the level shift circuit; and the output of the sense circuit coupled to an input of the level shift circuit. The SMPS where the regulated power supply includes: an auxiliary winding of the transformer; a rectifying diode having an input coupled in series with a first terminal of the auxiliary winding; and a depletion n-channel MOS device coupled to an output of the rectifying diode to regulate an output voltage.

Another general aspect includes a method of operating a switched-mode power supply (SMPS) including a plurality of stages coupled in series, the method including; activating the plurality of stages, where each of the plurality of stages includes a winding and a switch, and a first node of the switch is coupled to a first terminal of the winding; de-activating the plurality of stages; and equalizing voltages across each stage of the plurality of stages using a plurality of input capacitors when the plurality of stages are de-activated, where an input capacitor of the plurality of input capacitors is coupled between a second terminal of the winding and a second node of the switch.

Implementations may include one or more of the following features. The method where activating on the plurality of stages includes activating control nodes of the switches using a driver circuit. The method where equalizing the voltages across each stage of the plurality of stages includes filtering a switching ripple of the SMPS by using a bulk capacitor between a first and a last stage of the plurality of stages. The method further including providing an alternating current (AC) input to the SMPS, where the bulk capacitor includes a capacitance that is at least two times larger than a capacitance of the input capacitor. The method further including providing a direct current (DC) input to the SMPS, where the bulk capacitor includes a capacitance that is nine times larger than a capacitance of the input capacitor. The method where equalizing the voltages across each stages of the plurality of stages includes balancing voltages across each of the windings via magnetic coupling between the plurality of stages when the plurality of stages are deactivated. The method further including controlling at least one primary stage of the SMPS, the controller including: driving a first stage of the plurality of stages with a driver circuit and driving a second stage of the plurality of stages with a bootstrap capacitor, where the bootstrap capacitor is coupled between an output of the driver circuit and a control node of the switch of the second stage; and equalizing a voltage of the second node of the switch of the second stage and a voltage of the bootstrap capacitor by activating a diode in a reverse biased condition, where the diode is coupled across the control node and the second node of the switch of the second stage. The method where equalizing the voltage further includes clamping the diode in reverse direction with a voltage that is within a threshold of a maximum output voltage of the driver circuit. The method further including providing an AC current path between the plurality of stages with a plurality of synchronizing capacitors coupled between adjacent stages of the plurality of stages, where each of the plurality of synchronizing capacitors is configured to balance an AC voltage between first terminals of a first stage of the plurality of stages and a second stage of the plurality of stages. The method further including: recovering energy from a first stage of the plurality of stages when the switch is being turned off, where recovering the energy includes using an energy recovery circuit having an input coupled to the first node of the switch of the first stage and an output coupled to a second terminal of the winding of a second stage of the plurality of stages; and storing the energy recovered from the first stage in a first capacitor of the second stage, where the first capacitor is coupled between the second terminal of the winding and the second node of the switch node of the second stage. The method further including: synchronizing voltages across the first terminals of the second stage and the first stage by providing a path for AC current with a plurality of synchronization capacitors coupled between the first terminals of the second stage and the first stage; and transferring energy from a leakage inductance of the first stage and storing the energy to the first capacitor of the second stage when the switch is being turned off. The method where the energy recovery circuit includes a diode coupled between the first terminal of the first stage and an input capacitor of the second stage, where the diode is forward biased while recovering the energy. The method where recovering the energy from the first stage includes providing a current path for a current flowing through the winding via a synchronization capacitor when the switch is being turned off, where the synchronization capacitor is coupled between the first terminals of the second stage and the first stage. The method where recovering energy includes reducing a rate of change of current by reducing a transient current with a bypass circuit coupled between an output of the energy recovery circuit and the second terminal of the winding of the second stage. The method where reducing the rate of change of the current includes: activating a clamp switch when an input voltage to a first capacitor of the first stage is above a threshold, where the clamp switch is coupled between the output of the energy recovery circuit of the second stage and the second terminal of the winding of the second stage; and de-activating the clamp switch when the input voltage to the first capacitor of the first stage is below the threshold.

A further general aspect includes a fly-back converter in a switched-mode power supply (SMPS) system including: a transformer having a plurality of primary windings and a secondary winding sharing a common core; a plurality of primary stages coupled in series including at least a first stage and a second stage coupled in series with one another, where each of the plurality of primary stages includes a primary winding having a first terminal coupled to first node of a switch and an input capacitor coupled between a second terminal of the primary winding and a second node of the switch; a synchronizing capacitor coupled between the first terminal of the primary winding of the first stage and the first terminal of the primary winding of the second stage; an energy recovery circuit having an input coupled to the first terminal of the primary winding of the second stage and an output coupled to the second terminal of the primary winding of the first stage; and a bypass circuit coupled to the output of the energy recovery circuit.

Implementations may include one or more of the following features. The fly-back converter further including: a rectifying diode having an input coupled to a first terminal of a secondary winding; and an output capacitor coupled between an output of the rectifying diode and a second terminal of the secondary winding. The fly-back converter where the energy recovery circuit further includes a diode having an input coupled to the first terminal of the primary winding of the second stage. The fly-back converter where the bypass circuit includes: a bypass capacitor coupled between the output of the energy recovery circuit and the second node of the switch of the first stage; and a bypass resistor coupled between the output of the energy recovery circuit of the second stage and an input capacitor coupled between the second terminal of the primary winding and the second node of the switch of the first stage. The fly-back converter where the bypass resistor includes: a clamp switch coupled between the output of the energy recovery circuit of the second stage and the input capacitor of the first stage; and a sense circuit having an output coupled to a control node of the clamp switch and an input coupled to an input capacitor of a third stage, where the third stage is coupled in series with the first stage. The fly-back converter where the clamp switch further includes: a level shift circuit having an output coupled to the control node of the clamp switch; an auxiliary regulated power supply configured to power the level shift circuit; and a sense circuit having an output coupled to an input of the level shift circuit. The fly-back converter where the auxiliary regulated power supply includes: an auxiliary winding in a secondary side of the transformer; and a rectifying diode having an input coupled in series with a first terminal of the auxiliary winding.

A further general aspect includes a method including: driving a control node of a first transistor using a first bootstrap capacitor coupled between an output of a first driver circuit and the control node of the first transistor, and clamping the control node of the first transistor to a reference node of the first transistor using a first clamping circuit.

Implementations may include one or more of the following features. The method further including equalizing a voltage, equalizing including: discharging the first bootstrap capacitor to equalize a voltage of the reference node of the first transistor and a voltage of the first bootstrap capacitor by clamping a voltage between the control node of the first transistor and the reference node of the first transistor in a first direction when the first transistor is on; and charging the first bootstrap capacitor to equalize the voltage of the reference node of the first transistor and the voltage across the first bootstrap capacitor by clamping the voltage between the control node of the first transistor and the reference node of the first transistor in a second direction when the first transistor is off. The method further including keeping the first transistor off during a non-switching period using a resistor coupled between the control node of the first transistor and the reference node of the first transistor. The method where keeping the first transistor off during the non-switching period includes: equalizing a voltage of the reference node of the first transistor with a voltage of the first bootstrap capacitor by activating the first clamping circuit when the voltage of the reference node of the first transistor is higher than a voltage of the control node of the first transistor; and equalizing a voltage between the reference node of the first transistor and the control node of the first transistor via the resistor when the voltage of the control node of the first transistor is higher than the voltage of the reference node of the first transistor. The method further including limiting a voltage between the reference node of the first transistor and the control node of the first transistor below a threshold voltage of the first transistor during the non-switching period. The method further including driving a control node of a second transistor using the first driver circuit. The method where the method further includes circulating an AC current between a first terminal of a first winding and the first terminal of a second winding through a synchronization capacitor, where the first winding is coupled in series with the second transistor and a second winding is coupled in series with the first transistor. The method further including: driving a control node of a third transistor using a second driver circuit; driving a control node of a fourth transistor using a second bootstrap capacitor coupled between the control node of the third transistor and the control node of the fourth transistor; and clamping the control node of the fourth transistor to a reference node of the fourth transistor using a second clamping circuit, where the second transistor and the third transistor are coupled in series to form a first half-bridge and the second and the fourth transistor are coupled in series to form a second half-bridge. The method where the first half-bridge and the second half-bridge form a full-bridge.

Another general aspect includes a circuit including: a first driver circuit, a first bootstrap capacitor coupled between an output of the first driver circuit and a first transistor control terminal configured to be coupled to a control node of a first switching transistor, and a clamp circuit coupled between the first transistor control terminal and a first transistor reference terminal configured to be coupled to a reference node of the first switching transistor.

Implementations may include one or more of the following features. The circuit where: the first driver circuit is configured to generate a first voltage to turn the first switching transistor; and the first driver circuit is configured to generate a second voltage to turn off the first switching transistor. The circuit where the first voltage is within a threshold of a first clamp voltage of the clamp circuit. The circuit where the clamp circuit is configured to: discharge the first bootstrap capacitor to equalize a voltage of the first transistor reference terminal and a voltage of the first bootstrap capacitor by clamping a voltage between the first transistor control terminal and the first transistor reference terminal in a first direction when the first switching transistor is on; and charge the first bootstrap capacitor to equalize the voltage of the first transistor reference terminal and the voltage of the first bootstrap capacitor by clamping the voltage between the first transistor control terminal and the first transistor reference terminal in a second direction when the first switching transistor is off. The circuit further including a first resistor coupled between the first transistor control terminal and the first transistor reference terminal. The circuit where the first resistor is configured to keep the first switching transistor off during a non-switching period when the output of the first driver circuit is in a first state.

The circuit where the clamp circuit includes a Zener diode. The circuit further including the first switching transistor and a second switching transistor having a control node coupled to the output of the first driver circuit. The circuit further including a first winding having a first terminal coupled to a first node of the first switching transistor and a second winding having a first terminal coupled to a first node of the second switching transistor, where the first switching transistor is coupled between the first winding and the second winding. The circuit where the first winding and the second winding are primary windings of a transformer. The circuit further including a synchronization capacitor coupled between a first terminal of a first winding and the first terminal of a second winding. The circuit where the synchronization capacitor is configured to provide an AC current path to equalize an AC voltage between the first terminal of the first winding and the first terminal of the second winding.

A further general aspect includes a bootstrap circuit including: a first half-bridge including a first switching transistor coupled in series with a second switching transistor, a second half-bridge including a third switching transistor coupled in series with a fourth switching transistor, a driver circuit having a first output coupled to a control node of the first switching transistor and a second output coupled to a control node of the second switching transistor, a first bootstrap capacitor coupled between the first output of the driver circuit and a control node of the third switching transistor, a second bootstrap capacitor coupled between the second output of the driver circuit and the control node of the fourth switching transistor, a first clamp circuit coupled between the control node of the third switching transistor and a reference node of the third switching transistor, and a second clamp circuit coupled between the control node of the fourth switching transistor and a reference node of the fourth switching transistor.

Implementations may include one or more of the following features. The bootstrap circuit further including: a third half-bridge coupled in parallel with the first half-bridge, where the first half-bridge and the third half-bridge forms a first full-bridge; and a fourth half-bridge coupled in parallel with the second half-bridge, where the second half-bridge and the fourth half-bridge forms a second full-bridge.

Another general aspect includes a method of operating a switched-mode power supply (SMPS) including a plurality of stages coupled in series, the method including; activating the plurality of stages, where each of the plurality of stages includes a winding and a switch having a first switch terminal coupled to a first terminal of the winding at a first node; deactivating the plurality of stages; and synchronizing an AC voltage between the first node of a first stage of the plurality of stages and the first node of a second stage of the plurality of the stages using a synchronization capacitor coupled between the first node of the first stage and the first node of the second stage.

Implementations may include one or more of the following features. The method where synchronizing the AC voltage includes maintaining a constant differential voltage between the first node of the first stage and the first node of the second stage. The method further including: recovering energy from a leakage inductance of the winding of the second stage when the switch of the second stage is being turned off; and storing the energy recovered from the leakage inductance in a first capacitor of the first stage, where the first capacitor is coupled between a second terminal of the winding of the first stage and a second switch terminal of the switch of the first stage. The method where recovering the energy includes using an energy recovery circuit having an input coupled to the first node of second stage and an output coupled to the second terminal of the winding of the first stage. The method where recovering energy includes using a diode coupled between the first node of the second stage and the first capacitor of the first stage, where the diode is forward biased while recovering the energy. The method further including reducing a rate of change of a current flowing through the winding of the second stage using a bypass circuit coupled the diode when the switch of the second stage is being turned off. The method where reducing a rate of change of current flowing through the winding of the second stage includes decreasing electro-magnetic interference (EMI). The method further including: driving a control node of the switch of the first stage using a driver circuit; driving a control node of the switch of the second stage with a bootstrap capacitor coupled between an output of the driver circuit and the control node of the switch of the second stage; and clamping a voltage across the control node of the switch of the second stage and a reference node of the switch of the second stage to a first clamping voltage.

A further general aspect includes a switched-mode power supply (SMPS) circuit including: a transformer having a plurality of windings sharing a common core; and a plurality of stages coupled in series, each of the plurality of stages including a winding of the plurality of windings, and a switch having a first switch terminal coupled to a first terminal of the winding at a first node; and a synchronizing capacitor coupled between the first node of a first stage of the plurality of stages and the first node of a second stage of the plurality of stages.

Implementations may include one or more of the following features. The SMPS circuit where each of the plurality of stages further includes an input capacitor coupled between a second terminal of the winding and a second switch terminal of the switch. The SMPS circuit further including: an energy recovery circuit having a first node coupled to the first switch terminal of the switch of the second stage and a second node coupled to a second terminal of the winding of the first stage; and a bypass circuit coupled to the second node of the energy recovery circuit. The SMPS circuit where the energy recovery circuit includes a diode. The SMPS circuit where the bypass circuit includes: a bypass resistor coupled between the second node of the energy recovery circuit and the input capacitor of the first stage; and a bypass capacitor coupled between the second node of the energy recovery circuit and the second switch terminal of the switch of the second stage. The SMPS circuit where the synchronizing capacitor is configured to maintain a constant differential voltage between the first node of the first stage and the first node of the second stage. The SMPS circuit where the windings of each stage form primary windings of the transformer. The SMPS circuit further including: a driver circuit having an output coupled to a control node of the switch of the first stage; and a bootstrap capacitor coupled between the output of the driver circuit and a control node of the switch of the second stage. The SMPS circuit further including a clamp circuit coupled between the control node of the switch of the second stage and a reference node of the switch of the second stage.

Another general aspect includes a fly-back converter including: a transformer having a plurality of primary windings and a secondary winding sharing a common core; a plurality of primary stages coupled in series, where each of the plurality of the primary stages includes a primary winding of the plurality of primary windings having a first terminal coupled to first node of a switch and an input capacitor coupled between a second terminal of the primary winding and a second node of the switch; synchronizing capacitors coupled between the first terminals of the primary windings of adjacent primary stages; and a rectifier coupled between the secondary winding and a load terminal.

Implementations may include one or more of the following features. The fly-back converter further including a diode having a cathode coupled to the second terminal of the primary winding of a first primary stage of the plurality of primary stages and an anode coupled to the first terminal of the primary winding of a second primary stage of the plurality of primary stages. The fly-back converter further including a bypass circuit including: a bypass capacitor coupled between the cathode of the diode and the second node of the switch of the second primary stage; and a bypass resistor coupled between the cathode of the diode of the second primary stage.

One general aspect includes a method of operating switched mode power supply (SMPS) converter, the method including: activating a first stage and a second stage of a plurality of stages, where each of the plurality of stages includes a winding, a switch having a first node coupled to a first terminal of the winding and an input capacitor coupled between a second terminal of the winding and a second node of the switch, where the first stage and the second stages are coupled in series, and the windings of each of the plurality of stages share a common core of a transformer; deactivating the first stage and the second stage; and transferring energy from a leakage inductance of the winding of the second stage to the input capacitor of the first stage when the first stage and the second stage are deactivated.

Implementations may include one or more of the following features. The method where: activating the first stage includes turning on the switch of the first stage; deactivating the first stage includes turning off the switch of the first stage; activating the second stage includes turning on the switch of the second stage; and deactivating the second stage includes turning off the switch of the second stage. The method where the windings of the each of the plurality of stages form primary windings of the transformer. The method where transferring energy from the winding of the second stage further includes providing a current path to the winding of the second stage via an energy recovery circuit coupled between the first node of the switch of the second stage and the second terminal of the winding of the first stage. The method where providing the current path includes clamping a voltage at the first node of the switch of the second stage using the energy recovery circuit. The method further including charging the input capacitor of the first stage with a current flowing through the energy recovery circuit when the first stage and the second stage are deactivated. The method further including transferring energy from the leakage inductance of the winding of the second stage to a dissipative clamp circuit coupled between the first terminal of the winding of the second stage and the second terminal of the winding of the first stage, where the second terminal of the winding of the first stage is coupled to an input power supply of the SMPS. The method where transferring energy from the leakage inductance of the winding of the second stage to the dissipative clamp circuit further includes charging a capacitor of the dissipative clamp circuit to a Zener voltage of a Zener diode coupled in parallel with the capacitor of the dissipative clamp circuit. The method further including high pass filtering a current flowing through an energy recovery circuit coupled between the first terminal of the winding of the second stage and the second terminal of the winding of the first stage. The method further including equalizing a voltage between the first node of the switch of the first stage and the first node of the switch of the second stage using a synchronizing capacitor coupled between the first node of the switch of the first stage and the first node of the switch of the second stage. The method further including circulating an AC current across the synchronizing capacitor when the first stage and the second stage are de-activated.

Another general aspect includes a switched-mode power supply (SMPS) converter including: a transformer having a plurality of windings sharing a common core; a plurality of stages coupled in series, where each stage of the plurality of stages includes a switching transistor, a winding of the plurality of windings having a first terminal coupled to a first switch node of the switching transistor, and a first capacitor coupled between a second terminal of the winding and a second switch node of the switching transistor; and an energy transfer circuit having an output coupled to the second terminal of the winding of a first stage of the plurality of stages and an input coupled to the first switch node of a second stage of the plurality of stages.

Implementations may include one or more of the following features. The SMPS converter where the energy transfer circuit provides a current path from the winding of the second stage to the first capacitor of the first stage when the switching transistors of the first stage and the second stage are turned off. The SMPS converter where the energy transfer circuit is configured to clamp a voltage at the first switch node of the switching transistor of the second stage when the switching transistor of the second stage is turned off. The SMPS converter where the energy transfer circuit includes a diode coupled between the first terminal of the winding of the second stage and the second terminal of the winding of the first stage. The SMPS converter further including a filtering circuit coupled between the output of the energy transfer circuit and the second switch node of the switching transistor of the second stage, where the filtering circuit is configured to filter a transient current flowing through the energy transfer circuit; a resistor coupled between the output of the energy transfer circuit and the first capacitor of the first stage, where the first capacitor is configured to store energy transferred from a leakage inductance of the winding of the second stage; and a synchronization capacitor coupled between the first switch node of the first stage and the first switch node of the second stage. The SMPS converter where the synchronization capacitor is configured to provide an AC current path from the first switch node of the first stage to the first switch node of the second stage. The SMPS converter where the filtering circuit further includes a capacitor coupled between the output of the energy transfer circuit and the second switch node of the switching transistor of the second stage. The SMPS converter further including: a clamp switch coupled between the output of the energy transfer circuit and the first capacitor; and a control circuit configured to turn on the clamp switch when an input supply voltage to the SMPS exceeds a threshold voltage and to turn off the clamp switch when the input supply voltage does not exceed the threshold voltage. The SMPS converter where the filtering circuit is configured to bypass a high frequency transient current and restrict a rate of change of voltage at the first switch node of the second stage when the switching transistor of the second stage is turned off. The SMPS converter where the resistor is configured to reduce an electro-magnetic interference (EMI) of the SMPS converter.

A further general aspect includes a method of operating a switched-mode power supply (SMPS) converter including a plurality of stages coupled in series, the method including: activating the plurality of stages, where each of the plurality of stages includes a winding, a switch and a first capacitor, a first node of the switch is coupled to a first terminal of the winding, the first capacitor is coupled between a second terminal of the winding and a second node of the switch, and activating the plurality of stages includes turning on the switch of each of the plurality of stages; deactivating the plurality of stages, where deactivating the plurality of stages includes turning off the switch of each of the plurality of stages; providing a current return path between the first capacitor of a first stage of the plurality of stages and the first node of the switch of a second stage of the plurality of stages, where the first stage and the second stage are adjacent to each other, and providing the current return path is based on an input supply voltage of the SMPS converter; and clamping a voltage at the first node of the switch of the second stage when deactivating the plurality of stages.

Implementations may include one or more of the following features. The method further including activating a clamping circuit having an input coupled to the first node of the switch of the second stage and an output coupled to a first terminal of a clamp switch, where a second terminal of the clamp switch is coupled to the first capacitor of the first stage. The method further including high pass filtering a current at the output of the clamping circuit using a bypass capacitor coupled between the output of the clamping circuit and a second node of the switch of the second stage. The method where providing the current return path includes activating a clamp switch having a first terminal coupled to an output of the clamping circuit and a second terminal coupled to the first capacitor of the first stage. The method where activating the clamp switch includes activating the clamp switch when the input supply voltage is above a threshold voltage, and deactivating the clamp switch when the input supply voltage is not above the threshold voltage. The method further including sensing the input supply voltage using a sensing circuit. The method where: an output of the sensing circuit is coupled to a control node of the clamp switch; an input of the sensing circuit is coupled to the input supply voltage across a first capacitor of a third stage; and the third stage and the second stage are adjacent to each other. The method where activating the clamp switch further includes: activating a Zener diode in a reverse direction and a first diode in forward direction, where a cathode of the Zener diode is coupled to a drain of the clamp switch and an anode of the Zener diode is coupled to an anode of the first diode and a cathode of the first diode is coupled to a gate of the clamp switch; and preventing the Zener diode from being activated in forward direction by the first diode when the clamp switch is on. The method where providing the current return path includes: sensing an input supply voltage; level shifting an output of a sensing circuit based on the sensing of the input supply voltage, where an input of the sensing circuit is coupled between the input supply voltage; and activating a clamp switch with the level shifted output to clamp a voltage at the first node of the switch of the second stage, where the clamp switch is coupled between the first node of the switch of the second stage and the second terminal of the winding of the first stage. The method where sensing the input supply voltage includes: turning on a first switch when the input supply voltage is above a threshold voltage, where the output of a sensing circuit is coupled to a control node of the first switch; and turning off the first switch when the input supply voltage is below the threshold voltage. The method where: activating the clamp switch includes applying a first voltage to a control node of the clamp switch when the first switch is turned off, where applying the first voltage includes pulling up the control node of the clamp switch to an output of a regulated supply; and the method further includes deactivating the clamp switch by applying a second voltage to the control node of the clamp switch when the first switch is turned on, where applying the second voltage including turning on a second switch that is coupled between the control node and a reference node of the clamp switch.

Another general aspect includes a fly-back converter in a SMPS including: a transformer having a plurality of primary windings and a secondary winding sharing a common core; a plurality of primary stages coupled in series including a first stage and a second stage coupled in series with one another, where each of the plurality of the primary stages includes a switch, a primary winding of the plurality of primary windings having a first terminal coupled to a first node of the switch and an input capacitor coupled between a second terminal of the primary winding and a second node of the switch; a synchronizing capacitor coupled between the first terminal of the primary winding of the first stage and the first terminal of the primary winding of the second stage; an energy recovery circuit having an input coupled to the first terminal of the primary winding of the second stage; and a clamp switch coupled between an output of the energy recovery circuit and a second terminal of the primary winding of the first stage, where the clamp switch is activated based on a voltage of power supply input of the SMPS.

Implementations may include one or more of the following features. The fly-back converter where the energy recovery circuit includes a diode. The fly-back converter further including a bypass capacitor coupled between the output of the energy recovery circuit and a second node of the switch of the second stage.

Another general aspect includes a method of operating a switched mode power supply, the method including: converting a first voltage at a power input port to a load voltage at a load port using a first power converter; transferring excess energy delivered by the first power converter from the load port to a storage capacitor using a second power converter when a first power delivered by the first power converter exceeds a load power; and transferring stored energy from the storage capacitor to the load port when the first power is less than the load power.

Implementations may include one or more of the following features. The method further including controlling a voltage of the storage capacitor between and lower limit and an upper limit, controlling including providing a control signal to the first power converter based on measuring the voltage of the storage capacitor. The method where controlling the voltage of the storage capacitor includes averaging the voltage of the storage capacitor over one-half of an AC line cycle to form an averaged value. The method further including: integrating the averaged value using an integrator; adding a first value to a feedback loop of the integrator when the upper limit is reached; and adding a second value to an output of the integrator to form the control signal, where the second value is added outside the feedback loop of the integrator. The method where: converting the first voltage includes performing a power factor correction; and transferring the power from the storage capacitor to the load port includes operating a buck converter. The method further including rectifying an AC line voltage to generate the first voltage at the power input port. The method further where transferring the power from the storage capacitor to the load port includes regulating a voltage of the load port to a first predetermined voltage using a controller having an input coupled to the load port and an output coupled to the buck converter. The method where converting the first voltage includes charging a load capacitor coupled to the load port. The method where the transferring excess power delivered by the first power converter from the load port to the storage capacitor and the transferring the power from the storage capacitor to the load port reduces ripple at the load port.

A further general aspect includes a switched-mode power supply including: a first power converter coupled between a power input port and a load port; a storage capacitor; and a second power converter coupled between the load port and the storage capacitor, the second power converter configured to transfer excess energy delivered by the first power converter from the load port to the storage capacitor when a first power delivered by the first power converter exceeds a load power, and transfer stored energy from the storage capacitor to the load port when the first power is less than the load power.

Implementations may include one or more of the following features. The switched-mode power supply further including a first controller having an input coupled to the storage capacitor and an output coupled to a control input of the first power converter, the first controller configured to control a voltage of the storage capacitor to be between a lower limit and an upper limit. The switched-mode power supply where the first controller includes a PID controller. The switched-mode power supply where: the power input port is configured to receive a rectified AC line voltage; and the first controller includes a filter configured to determine an average the voltage of the storage capacitor over one half of an AC line cycle. The switched-mode power supply where: the first controller includes an integrator coupled to an output of the filter; the first controller is configured to add a first value to a feedback loop of the integrator when the upper limit is reached; and the first controller is configured to add a second value to a forward path of the first controller outside of the feedback loop of the integrator. The switched-mode power supply where: the first power converter includes a power factor converter; and the second power converter includes a buck converter. The switched-mode power supply further including a rectifier coupled between an AC line terminal and the power input port. The switched-mode power supply further including a load capacitor coupled to the load port. The switched-mode power supply where the second power converter includes a second controller having an input coupled to the load port, the second controller configured to regulate a voltage of the load port to a first predetermined voltage. The switched-mode power supply where the second power converter is configured to reduce a ripple voltage at the load port.

A further general aspect includes a switched-mode power supply system including: a rectifier having an input configured to be coupled to an AC line; a first DC-DC converter including: a transformer having a plurality of primary windings coupled to an output of the rectifier and a secondary winding sharing a common core coupled to a load port of the switched-mode power supply system, and a plurality of primary stages coupled in series, where each of the plurality of the primary stages includes a switch and an input capacitor coupled to a respective primary winding of the plurality of primary windings, where a first terminal of the respective primary winding is coupled to first node of the switch and the input capacitor coupled between a second terminal of the respective primary winding and a second node of the switch; a storage capacitor; and a second DC-DC converter coupled between the load port and the storage capacitor, the second DC-DC converter including a buck converter.

Implementations may include one or more of the following features. The switched-mode power supply system where the second DC-DC converter is configured to: transfer excess energy delivered by the first Dc-DC converter from the load port to the storage capacitor when a first power delivered by the first DC-DC converter exceeds a load power, and transfer stored energy from the storage capacitor to the load port when the first power is less than the load power. The switched-mode power supply system further including a first controller having an input coupled to the storage capacitor and an output coupled to a control input of the first DC-DC converter, the first controller configured to control a voltage of the storage capacitor to be between a lower limit and an upper limit.

Another general aspect includes a method of operating a switched mode power supply system, the method including: operating a first power converter coupled between a power input port and a first switchable load port; operating a second power converter coupled between the first switchable load port and a second switchable load port; operating the switched mode power supply system in a first mode including routing the first switchable load port to an output load; and operating the switched mode power supply system in a second mode including routing the second switchable load port to the output load.

Implementations may include one or more of the following features. The method where: operating the switched mode power supply system in the first mode further includes transferring excess energy delivered by the first power converter from the first switchable load port to a storage capacitor coupled to the second switchable load port when a first power delivered by the first power converter exceeds a load power, and transferring stored energy from the storage capacitor to the first switchable load port when the first power is less than the load power; and operating the switched mode power supply system in the second mode further includes supplying power to the output load via the second power converter. The method where operating the switched mode power supply system in the first mode further includes configuring the second power converter to provide a bidirectional power flow between the first switchable load port and the second switchable load port; and operating the switched mode power supply system in the second mode includes configuring the second power converter to provide a unidirectional power flow from the first switchable load port to the second switchable load port. The method where the output load includes a USB power interface. The method further including: operating the switched mode power supply system in the first mode when the USB power interface operates according to a first profile; and operating the switched mode power supply system in the second mode when the USB power interface operates according to a second profile. The method further including: providing an output voltage of at least 15 V to the USB power interface when the USB power interface operates according to the first profile; and providing an output voltage of less than 15 V to the USB power interface when the USB power interface operates according to the second profile. The method further including: providing an output voltage of 20 V to the USB power interface when the USB power interface operates according to the first profile; and providing an output voltage of 5 V to the USB power interface when the USB power interface operates according to the second profile. The method where: operating the first power converter includes operating a power factor converter; and operating the second power converter includes operating a buck converter. The method further including: rectifying an AC line voltage to produce a rectified AC line voltage; and supplying the rectified AC line voltage to the power input port.

A further general aspect includes a switched mode power supply system including: a first power converter coupled between a power input port and a first switchable load port, a second power converter coupled between the first switchable load port and a second switchable load port, a first switch coupled between the first switchable load port and an output load port configured to be coupled to a load of the switched mode power supply system, and a second switch coupled between the second switchable load port and the output load port.

Implementations may include one or more of the following features. The switched mode power supply system further including: a first capacitor coupled to the first switchable load port; and a second capacitor coupled to the second switchable load port. The switched mode power supply system where: the switched mode power supply system is configured to operate in a first mode and in a second mode; in the first mode, the first switch is closed and the second switch is open; and in the second mode, the first switch is open and the second switch is closed. The switched mode power supply system where: in the first mode, the second power converter is configured to transfer excess energy delivered by the first power converter from the output load port to a storage capacitor coupled to the second switchable load port when a first power delivered by the first power converter exceeds a load power, and transfer stored energy from the storage capacitor to the output load port when the first power is less than the load power; and in the second mode, the second power converter is configured to provide power to the output load port via the second switchable load port. The switched mode power supply system where: in the first mode, the second power converter is configured to provide a bidirectional power flow between the first switchable load port and the second switchable load port; and in the second mode, the second power converter is configured to provide a unidirectional power flow from the first switchable load port to the second switchable load port. The switched mode power supply system where the output load port is configured to be coupled to a USB power interface. The switched mode power supply system further including a controller configured to: close the first switch and open the second switch when the USB power interface operates according to a first profile; and open the first switch and close the second switch when the USB power interface operates according to a second profile. The switched mode power supply system where: the switched mode power supply system is configured to provide an output voltage of at least 15 V when the USB power interface operates according to the first profile; and the switched mode power supply system is configured to provide an output voltage of less than 15 V when the USB power interface operates according to the second profile. The switched mode power supply system where: the switched mode power supply system is configured to provide an output voltage of 20 V when the USB power interface operates according to the first profile; and the switched mode power supply system is configured to provide an output voltage of 5 V when the USB power interface operates according to the second profile. The switched mode power supply further including the USB power interface. The switched mode power supply where the first power converter includes a power factor converter and the second power converter includes a buck converter.

Another general aspect includes a switched mode power supply system including: a rectifier having an input configured to be coupled to an AC line; a first DC-DC converter including: a transformer having a plurality of primary windings coupled to an output of the rectifier and a secondary winding sharing a common core coupled to a first switchable load port of the switched mode power supply system, and a plurality of primary stages coupled in series, where each of the plurality of the primary stages includes a switch and an input capacitor coupled to a respective primary winding of the plurality of primary windings, where a first terminal of the respective primary winding is coupled to first node of the switch and the input capacitor coupled between a second terminal of the respective primary winding and a second node of the switch; a second DC-DC converter coupled between the first switchable load port and a second switchable load port, the second DC-DC converter including a buck converter; a storage capacitor coupled to the second switchable load port; a first switch coupled between the first switchable load port and an output load port configured to be coupled to a load of the switched mode power supply system; and a second switch coupled between the second switchable load port and the output load port.

Implementations may include one or more of the following features. The switched mode power supply system where: the switched mode power supply system is configured to operate in a first mode and in a second mode; in the first mode, the first switch is closed and the second switch is open; and in the second mode, the first switch is open and the second switch is closed. The switched mode power supply system where: in the first mode, the second DC-DC converter is configured to transfer excess energy delivered by the first DC-DC converter from the output load port to the storage capacitor when a first power delivered by the first DC-DC converter exceeds a load power, and transfer stored energy from the storage capacitor to the output load port when the first power is less than the load power; and in the second mode, the second DC-DC converter is configured to provide power to the output load port via the second switchable load port. The switched mode power supply system further including a USB power interface coupled to the output load port.

Embodiments of the present invention are summarized here. Other embodiments can also be understood form the entirety of the specification and the claims filed herein. One general aspect includes a method of operating a switched-mode power supply, the method including: receiving ac power at a power input port of the switched-mode power supply; converting the received ac power to provide a load voltage at a load port using a first switched-mode power converter; adjusting a momentary power provided by the first switched-mode power converter during an ac cycle according to a voltage at the power input port; transferring excess energy delivered by the first switched-mode power converter from the load port to a storage device using a second power converter when a first power delivered by the first switched-mode power converter exceeds a load power; and transferring stored energy from the storage device to the load port when the first power is less than the load power.

Implementations may include one or more of the following features. The method where adjusting the momentary power includes: determining a switching frequency of the first switched-mode power converter; disabling switching of the first switched-mode power converter when the determined switching frequency exceeds a predetermined limit; and enabling the switching of the first switched-mode power converter when the determined switching frequency does not exceed the predetermined limit, where the enabling and disabling are performed within an AC cycle. The predetermined limit may include a constant frequency below a first frequency and a linearly increasing frequency above the first frequency. In some embodiments, determining the momentary power further includes: disabling switching of the first switched-mode power converter when a determined frequency of the first switched mode power converter is outside of a predetermined frequency band; and enabling the switching of the first switched-mode power converter when the determined frequency is within the predetermined frequency band, where the enabling and disabling are performed within an AC cycle. In some embodiments, the predetermined frequency band is within a stop-band of a filter coupled between the power input port of the switched-mode power supply and an input of the first switched-mode power converter.

In an embodiment, adjusting the momentary power includes: disabling switching of the first switched-mode power converter when the voltage at the power input port is less than a predetermined threshold; and enabling the switching of the first switched-mode power converter when the voltage at the power input port voltage is not less than the predetermined threshold. Converting the received AC power to a load voltage at a load port using the first switched-mode power converter may include operating the first switched-mode power converter in a quasi-resonant mode of operation.

In some embodiments, the predetermined threshold corresponds to a maximum voltage across a switch of the first switched-mode power converter when the switch is being turned-on. The maximum voltage across the switch may be, for example, between about 25 v and about 45 v. The method may further include adjusting the predetermined threshold and/or monitoring a load power of the switched-mode power supply, where the predetermined threshold is adjusted based on the monitored load power. The predetermined threshold may be adjusted to a level where an average converted received ac power is substantially equal to an average load power.

In various embodiments, the storage device includes a battery; and the predetermined threshold is adjusted by increasing the predetermined threshold to discharge the battery and decreasing the predetermined threshold to charge the battery. Adjusting the momentary power may include: determining the voltage at the power input port; determining present phase of the AC cycle; determining the momentary power based on the determined voltage at the power input port and the determined present phase of the ac cycle; and controlling the first switched-mode power converter to provide the determined momentary power. The method may further include determining a load power at the load port, where determining the momentary power is further based on the determining the load power.

In some embodiments, determining the momentary power further includes: disabling switching of the first switched-mode power converter when a determined frequency of the first switched-mode power converter exceeds a predetermined limit; and enabling the switching of the first switched-mode power converter when the determined frequency does not exceed the predetermined limit. The method may further include determining the frequency of the first switched-mode power converter. In some cases, determining the frequency of the first switched-mode power converter includes determining the frequency based on the determined voltage at the power input port, the determined present phase of the ac cycle, and a load power of the first switched-mode power converter. Determining the momentary power may further include: disabling switching of the first switched-mode power converter when a determined frequency of the first switched-mode power converter is outside of a predetermined frequency band; and enabling the switching of the first switched-mode power converter when the determined frequency is within the predetermined frequency band.

In some embodiments, determining the momentary power includes selecting the momentary power to maximize an efficiency of the switched-mode power supply over the AC cycle. Determining the momentary power may selecting the momentary power according to a predetermined power trajectory of the AC cycle. In some cases, this predetermined power trajectory is a function of the determined voltage of the power input port and the determined present phase of the AC cycle.

In some embodiments, determining the momentary power includes using a lookup table circuit. Determining the voltage at the power input port may include determining an rms voltage at the power input port. Controlling the first switched-mode power converter to provide the determined momentary power may include applying a pulse modulated signal having a duty cycle proportional to the determined momentary power to the first switched-mode power converter. The storage device may include a capacitor. In some embodiments, storage device includes a battery.

Another general aspect includes a power supply system including: a first power converter coupled between a power input port and a load port, the first power converter including a first controller configured to adjust a momentary power provided by the first power converter during an ac cycle according to a voltage at the power input port; a storage device; and a second power converter coupled between the load port and the storage device, the second power converter configured to transfer excess energy delivered by the first power converter from the load port to the storage device when a first power delivered by the first power converter exceeds a load power, and transfer stored energy from the storage device to the load port when the first power is less than the load power.

Implementations may include one or more of the following features. The power supply system where the storage device includes a capacitor. The power supply system where the storage device includes a battery. In an embodiment, the first controller includes: an input voltage measurement circuit having an input coupled to the power input port; and a momentary power determination circuit having an input coupled to the input voltage measurement circuit and an output coupled to a switching control circuit of the first controller. The momentary power determination circuit may be configured provide a duty cycle value to the switching control circuit, where the duty cycle value is proportional to a momentary power determined by the momentary power determination circuit. In some embodiments, the input voltage measurement circuit is configured to determine an rms voltage at the power input port.

The momentary power determination circuit may be configured to: disable switching of the first power converter when the voltage at the power input port is less than a predetermined threshold; and enable the switching of the first power converter when the voltage at the power input port voltage is not less than the predetermined threshold. The first power converter may be configured to operate in a quasi-resonant mode of operation; and the predetermined threshold may correspond to a maximum voltage across a switch of the first power converter when the switch is being turned-on. In an embodiment, the maximum voltage across the switch is between about 25 v and about 45 v.

In some embodiments, the power supply system further includes a load monitoring circuit coupled to the momentary power determination circuit, where the predetermined threshold is adjusted based on an output of the load monitoring circuit. The momentary power determination circuit may be configured to adjust the predetermined threshold to a level where an average converted received AC power is substantially equal to an average load power. In some embodiments, the storage device includes a battery and the momentary power determination circuit is configured to adjust the predetermined threshold to increase the predetermined threshold to discharge the battery and decrease the predetermined threshold to charge the battery. In various embodiments, the momentary power determination circuit is configured to: determine present phase of the ac cycle; determine the momentary power based on a measured voltage at the power input port and the determined present phase of the AC cycle; and control the first power converter to provide the determined momentary power.

The momentary power determination circuit may be configured to select the momentary power to maximize an efficiency of the power supply system over the AC cycle. In some embodiments, the momentary power determination circuit is configured according to a predetermined power trajectory of the AC cycle. The predetermined power trajectory may be a function of an output of the input voltage measurement circuit and the determined present phase of the ac cycle. In some embodiments, the momentary power determination circuit includes a lookup table circuit configured to produce a momentary power value based on the determined present phase of the ac cycle and an output of the input voltage measurement circuit.

A further general aspect includes a method of operating a switched mode power supply that includes converting a first voltage at a power input port to a load voltage at a load port using a first power converter; transferring excess energy delivered by the first power converter from the load port to a battery using a second power converter when a first power delivered by the first power converter exceeds a load power and when the battery has a net positive energy demand; and transferring stored energy from the battery to the load port when the first power is less than the load power.

Implementations may include one or more of the following features. The method where transferring the excess energy to the battery includes charging the battery according to a battery charging profile. The method where the battery charging profile includes a charging current for a given battery voltage. The method where transferring the excess energy to the battery includes controlling a current to the battery. In some embodiments, transferring the excess energy to the battery includes using a second power converter in a first mode; and transferring the stored energy from the battery the load port includes using the second power converter in a second mode. In one example, the first mode includes a buck mode and the second mode includes a boost mode.

Transferring the stored energy from the battery to the load port may include regulating a voltage of the load port to a first predetermined voltage using a controller having an input coupled to the load port and an output coupled to the second power converter. In one example, the battery has a net positive energy demand when the battery is not fully charged. The battery may have net positive energy demand when a voltage of the battery is below a predetermined threshold. In some embodiments, the method further includes rectifying an AC line voltage to generate the first voltage at the power input port. Converting the first voltage may include charging a load capacitor coupled to the load port. In some embodiments, transferring the excess energy delivered by the first power converter from the load port to the battery and the transferring the stored energy from the battery to the load port reduces ripple at the load port.

Another general aspect includes a switched-mode power supply including: a first power converter coupled between a power input port and a load port; a battery; and a second power converter coupled between the load port and the battery, the second power converter configured to transfer excess energy delivered by the first power converter from the load port to the battery when a first power delivered by the first power converter exceeds a load power and when the battery has a net positive energy demand, and transfer stored energy from the battery to the load port when the first power is less than the load power.

Implementations may include one or more of the following features. The switched-mode power supply where the second power converter is configured to transfer the excess energy to the battery according to a battery charging profile. The battery charging profile may include a charging current for a given battery voltage. In various embodiments, the second power converter is configured to transfer the excess energy to the battery by controlling a current to the battery. The second power converter may be configured to operate in a first mode when the excess energy is transferred to the battery; and the second power converter is configured to operate in a second mode when the stored energy is transferred from the battery to the load port.

In an embodiment, the first mode includes a buck mode and the second mode includes a boost mode. The second power converter may include a controller having an input coupled to the load port and an output coupled to the second power converter, and the controller may be configured to regulate a voltage of the load port to a first predetermined voltage when transferring the stored energy from the battery to the load port. The battery may have a net positive energy demand when the battery is not fully charged. In some embodiments, the battery has net positive energy demand when a voltage of the battery is below a predetermined threshold.

In various embodiments, the first power converter includes a power factor converter; and the second power converter includes a buck converter. The switched-mode power supply may further include a rectifier coupled between an AC line terminal and the power input port. The switched-mode power supply may also include a load capacitor coupled to the load port. IN some embodiments, the second power converter includes a second controller having an input coupled to the load port, the second controller configured to regulate a voltage of the load port to a first predetermined voltage. The second power converter may be configured to reduce a ripple voltage at the load port.

Advantages of embodiment power supply systems disclosed herein include increased efficiency in and lower cost. For example, the efficiency of the converter may be increased by using embodiment energy recovery systems and methods described herein. In addition, by cascading stages, low voltage switching devices may be used, which may reduce system cost. An embodiment power supply in which clamp switching is implemented provides an advantage of maintaining system performance throughout the AC line cycle. Advantages of embodiment power systems that use a switched mode power converter coupled in parallel with a compensating power converter, such as a buck converter include the ability to deliver a smooth, low-ripple output voltage with fast load regulation using small output capacitors. The use of small output capacitors in such systems allows for less board area and lower system cost. Further advantages of embodiment power conversion systems include the ability to provide multiple selectable power profiles using a fixed architecture. In some embodiments, further power profiles may be added without adding additional secondary windings and output capacitances.

Embodiments that control the operation of the DC-DC converter according to input voltage and output load conditions in conjunction with secondary-side energy storage are advantageous in that they allow for increased power efficiency and/or control of EMI.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, while many of the embodiments described here are directed toward fly-back converters, embodiments may also be directed toward other power supply converter topologies such as forward converters, LLC converter, frequency converters, and like. It is therefore intended that the appended claims encompass any such modifications or embodiments.

What is claimed is:

1. A switched-mode power supply (SMPS) comprising:
a transformer having a plurality of windings sharing a common core;
a plurality of primary stages coupled in series, each of the plurality of primary stages including a winding of the plurality of windings, a switch having a first node coupled to a first terminal of the winding, and a first capacitor coupled between a second terminal of the winding and a second node of the switch; and
synchronization capacitors and/or an energy recovery circuit, each synchronization capacitor being coupled between stages of the plurality of primary stages and configured to provide an AC current path to equalize and synchronize an AC voltage between the first terminals of the windings of a first stage and a second stage of the plurality of primary stages, the energy recovery circuit being coupled between the switch of the first stage of the plurality of primary stages and the first capacitor of the second stage of the plurality of primary stages and configured to transfer energy from a leakage inductance of the transformer to the first capacitor of the second stage.

2. The SMPS of claim 1, further comprising a bulk capacitor coupled between a power supply input to the SMPS and a reference supply node of the plurality of primary stages of the SMPS.

3. The SMPS of claim 2, wherein:
a capacitance of the bulk capacitor is at least 9 times higher than a capacitance of the first capacitor; and
a power supply input to the SMPS comprises a DC input.

4. The SMPS of claim 2, wherein a power supply input to the SMPS comprises an AC input.

5. The SMPS of claim 4, wherein a capacitance of the bulk capacitor is at least 2 times higher than a capacitance of the first capacitor.

6. The SMPS of claim 1, further comprising a driver circuit having an output coupled to control nodes of the switches of the plurality of primary stages.

7. The SMPS of claim 1, wherein the transformer is configured to balance an unequal voltage across each of the plurality of primary stages via magnetic coupling between the primary stages when the switch is on.

8. The SMPS of claim 1, wherein at least one primary stage of the plurality of primary stages comprises:
   a driver circuit having a first output coupled to a control node of the switch of a first stage;
   a bootstrap capacitor coupled between the first output of the driver circuit and a control node of the switch of a second stage; and
   a diode coupled between the control node and the second node of the switch of the second stage.

9. The SMPS of claim 8, wherein the diode comprises a Zener diode.

10. The SMPS of claim 1, wherein each synchronization capacitor is coupled between adjacent stages of the plurality of primary stages.

11. The SMPS of claim 1, wherein the first stage and the second stage are located in a center of the plurality of primary stages, and the first stage is coupled adjacent to the second stage.

12. The SMPS of claim 1, wherein the energy recovery circuit comprises a diode.

13. The SMPS of claim 1, wherein the energy recovery circuit comprises a clamping diode coupled to the first node of the switch of the first stage of the plurality of primary stages and to the first capacitor of the second stage of the plurality of primary stages.

14. The SMPS of claim 13, further comprising a dissipative clamp circuit coupled between the first node of the switch of one stage of the plurality of primary stages and the second terminal of the winding of the one stage of the plurality of stages.

15. The SMPS of claim 14, wherein the dissipative clamp circuit comprises:
   a first diode coupled to the first node of the switch of the one stage of the plurality of primary stages;
   a capacitor coupled between the first diode and the second terminal of the of the winding of the one stage of the plurality of stages; and
   a Zener diode coupled between the first diode and the second terminal of the of the winding of the one stage of the plurality of stages.

16. The SMPS of claim 13, further comprising a bypass circuit coupled between the at least one energy recovery circuit of the first stage and the first capacitor of the second stage.

17. The SMPS of claim 16, wherein the bypass circuit is configured to reduce a rate of change of current flowing through the energy recovery circuit when the switch is being turned off.

18. The SMPS of claim 16, wherein the bypass circuit comprises:
   a clamp switch coupled in series with the energy recovery circuit; and
   a sense circuit having an output coupled to a control node of the clamp switch, the sense circuit configured to sense an input voltage of the SMPS.

19. The SMPS of claim 18, wherein the sense circuit comprises an input coupled to an input capacitor of a third stage, wherein the third stage is coupled in series with the first stage.

20. The SMPS of claim 18, wherein the clamp switch is configured to
   interrupt a return path of the energy recovery circuit when an input voltage of the SMPS is below a first voltage; and
   provide a resistance to the return path of the energy recovery circuit when the input voltage of the SMPS is above the first voltage.

21. The SMPS of claim 18, wherein the clamp switch comprises a MOS switch having a gate terminal coupled to the output of the sense circuit, a first source/drain terminal coupled to the first capacitor of the second stage and a second source/drain terminal coupled to the switch of the first stage.

22. The SMPS of claim 21, wherein:
   the clamp switch further comprises a level shift circuit having an output coupled to the control node of the clamp switch, and a regulated power supply configured to power the level shift circuit; and
   the output of the sense circuit is coupled to an input of the level shift circuit.

23. The SMPS of claim 22, wherein the regulated power supply comprises:
   an auxiliary winding of the transformer;
   a rectifying diode having an input coupled in series with a first terminal of the auxiliary winding; and
   a depletion n-channel MOS coupled to an output of the rectifying diode to regulate an output voltage.

24. The SMPS of claim 1, wherein the SMPS has one of a fly-back topology, a forward-type topology, a boost topology or a LLC topology.

25. The SMPS of claim 1, wherein the SMPS comprises a fly-back converter topology.

26. The SMPS of claim 1, wherein the SMPS comprises a half-bridge topology, a full-bridge topology, an inductor-inductor capacitor (LLC) topology, or a two transistor forward (TTF) topology.

27. A method of operating a switched-mode power supply (SMPS) comprising a plurality of stages coupled in series, the method comprising;
   activating the plurality of stages, wherein each of the plurality of stages comprises a winding and a switch, and a first node of the switch is coupled to a first terminal of the winding;
   de-activating the plurality of stages; and
   equalizing voltages across each stage of the plurality of stages using a plurality of input capacitors when the plurality of stages are activated, wherein an input capacitor of the plurality of input capacitors is coupled between a second terminal of the winding and a second node of the switch,
   wherein the method further comprises:
      driving the switch of a first stage of the plurality of stages with a driver circuit, driving the switch of a second stage of the plurality of stages with a bootstrap capacitor, the bootstrap capacitor being coupled between an output of the driver circuit and a control node of the switch of the second stage, and equalizing a voltage of the second node of the switch of the second stage and a voltage of the bootstrap capacitor by activating a diode coupled between the control node and the second node of the switch of the second stage; and/or
      providing an AC current path between the plurality of stages with a plurality of synchronizing capacitors coupled between stages of the plurality of stages, each synchronizing capacitor being configured to equalize and synchronize an AC voltage between first terminals of at least two stages of the plurality of stages; and/or recovering energy from the first stage of the plurality of stages when the switch is being turned off by using an energy recovery circuit coupled between the switch of the first stage of the plurality of stages and the input capacitor of the second stage of the plurality of stages and storing the energy recovered from the first stage in the input capacitor of the second stage.

28. The method of claim 27, wherein activating on the plurality of stages comprises activating control nodes of the switches using the driver circuit.

29. The method of claim 27, wherein equalizing the voltages across each stage of the plurality of stages comprises filtering a switching ripple of the SMPS using a bulk capacitor coupled between the first stage and a last stage of the plurality of stages.

30. The method of claim 29, further comprising providing an alternating current (AC) input to the SMPS, wherein the bulk capacitor comprises a capacitance that is at least two times larger than a capacitance of the input capacitor.

31. The method of claim 29, further comprising providing a direct current (DC) input to the SMPS, wherein the bulk capacitor comprises a capacitance that is nine times larger than a capacitance of the input capacitor.

32. The method of claim 27, wherein equalizing the voltages across each stages of the plurality of stages comprises balancing voltages across each of the windings via magnetic coupling between the plurality of stages while the switches of the plurality of stages are turned-on.

33. The method of claim 27, wherein the diode is a Zener diode.

34. The method of claim 33, wherein the Zener diode has a Zener voltage that is within a threshold of a predetermined output voltage of the driver circuit.

35. The method of claim 27, further comprising:
equalizing and synchronizing AC voltages across the input capacitors of the plurality of stages using the synchronization capacitors coupled between stages of the plurality of stages; and
transferring energy from a leakage inductance of the winding coupled to the first stage and storing the energy to the input capacitor of the second stage when the switch is switching.

36. The method of claim 27, wherein the energy recovery circuit comprises a diode coupled between the first terminal of the first stage and an input capacitor of the second stage, wherein the diode is forward biased while recovering the energy.

37. The method of claim 27, wherein recovering the energy from the first stage comprises providing a current path for a current flowing through the winding via a first synchronization capacitor when the switch is being turned off, wherein the first synchronization capacitor is coupled between the first terminals of the second stage and the first stage.

38. The method of claim 27, wherein recovering energy comprises reducing a rate of change of current by reducing a transient current with a bypass circuit coupled between the energy recovery circuit and input capacitor of the second stage.

39. The method of claim 38, wherein reducing the rate of change of the current comprises:
activating a clamp switch when an input voltage to a first capacitor of the first stage is above a threshold, wherein the clamp switch is coupled between the energy recovery circuit and the input capacitor of the second stage; and
deactivating the clamp switch when the input voltage to the first capacitor of the first stage is below the threshold.

40. A fly-back converter in a switched-mode power supply (SMPS) system comprising:
a transformer having a plurality of primary windings and a secondary winding sharing a common core;
a plurality of primary stages coupled in series comprising at least a first stage and a second stage coupled in series with one another, wherein each of the plurality of primary stages includes a primary winding having a first terminal coupled to a first node of a switch and an input capacitor having a first terminal coupled to a second terminal of the primary winding and a second terminal coupled to a second node of the switch; and
a driver circuit comprising
a first output coupled to a control node of the switch of the first stage,
bootstrap capacitors coupled between the first output of the driver circuit and corresponding control nodes of switches of further stages of the plurality of stages, and
diodes coupled between the control node and the second node of the switch of the further stages of the plurality of stages.

41. The fly-back converter of claim 40, further comprising resistors coupled to the corresponding control nodes of the switches of the further stages, wherein the resistors are configured to place the switches of the further stages in a predetermined state in the absence of switching activity.

42. The fly-back converter of claim 40, further comprising:
a synchronizing capacitor coupled between the first node of the switch of the first stage and the first node of the switch of the second stage or a third stage of the plurality of stages;
an energy recovery circuit having a first terminal coupled to the first node of the switch of the first stage and a second terminal coupled to the first node of the input capacitor of the second stage; and
a bypass circuit coupled to the second terminal of the energy recovery circuit.

43. The fly-back converter of claim 42, wherein the energy recovery circuit comprises a diode.

44. The fly-back converter of claim 42, wherein the bypass circuit comprises:
a bypass resistance circuit coupled between the second terminal of the energy recovery circuit of the second stage and the input capacitor of the second stage; and
a bypass capacitor coupled between the second terminal of the energy recovery circuit and the second node of the switch of the first stage.

45. The fly-back converter of claim 44, wherein the bypass resistance circuit comprises:
a clamp switch coupled between the second terminal of the energy recovery circuit and the input capacitor of the second stage; and
a sense circuit having a first output coupled to a control node of the clamp switch and an input coupled to the input capacitor of a third stage, wherein the third stage is coupled in series with the first stage.

46. The fly-back converter of claim 45, wherein the clamp switch further comprises:

a level shift circuit having an output coupled to the control node of the clamp switch; and an auxiliary regulated power supply configured to power the level shift circuit, wherein the sense circuit has a second output coupled to an input of the level shift circuit.

47. The fly-back converter of claim 46, wherein the auxiliary regulated power supply comprises:

an auxiliary winding magnetically coupled to the transformer; and a rectifier having an input coupled in series with a first terminal of the auxiliary winding.

48. The fly-back converter of claim 40, further comprising:

a rectifier having an input coupled to a first terminal of a secondary winding; and an output capacitor coupled between an output of the rectifier and a second terminal of the secondary winding.

* * * * *

UNITED STATES PATENT AND TRADEMARK OFFICE
CERTIFICATE OF CORRECTION

PATENT NO. : 10,879,805 B2  
APPLICATION NO. : 15/265686  
DATED : December 29, 2020  
INVENTOR(S) : C. Notsch Page 1 of 1

It is certified that error appears in the above-identified patent and that said Letters Patent is hereby corrected as shown below:

In the Claims

Column 73, Line 42 (Claim 15) please change "of the of the" to -- of the --

Column 73, Line 45 (Claim 15) please change "of the of the" to -- of the --

Column 73, Line 48 (Claim 16) please change "the at least one energy" to -- the energy --

Column 75, Line 29 (Claim 32) please change "each stages" to -- each stage --

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*